United States Patent [19]

Murdock

[11] Patent Number: 5,317,733
[45] Date of Patent: May 31, 1994

[54] OFFICE AUTOMATION SYSTEM FOR DATA BASE MANAGEMENT AND FORMS GENERATION

[75] Inventor: David M. Murdock, New Milford, N.J.

[73] Assignee: CISGEM Technologies, Inc., Simsbury, Conn.

[21] Appl. No.: 954,416

[22] Filed: Sep. 30, 1992

Related U.S. Application Data

[63] Continuation of Ser. No. 471,290, Jan. 26, 1990, abandoned.

[51] Int. Cl.⁵ .............................................. G06F 15/40
[52] U.S. Cl. .................................... 395/600; 395/575; 364/225.1; 364/225.3; 364/225.4; 364/282.1; 364/283.1; 364/DIG. 1
[58] Field of Search ........................ 395/575, 600, 145; 364/200, 900

[56] References Cited

U.S. PATENT DOCUMENTS

| | | |
|---|---|---|
| 3,970,992 | 7/1976 | Boothroyd et al. ............ 340/172.5 |
| 4,346,442 | 8/1982 | Musmanno ..................... 364/408 |
| 4,347,568 | 8/1982 | Giguere et al. .................. 364/300 |
| 4,359,631 | 11/1982 | Lockwood et al. ............. 235/381 |
| 4,383,298 | 5/1983 | Huff et al. ...................... 364/200 |
| 4,410,940 | 10/1983 | Carlson et al. .................. 364/200 |
| 4,491,725 | 1/1985 | Pritchard ........................ 235/375 |
| 4,553,206 | 11/1985 | Smutek et al. ................. 364/200 |
| 4,567,359 | 1/1986 | Lockwood ..................... 235/381 |
| 4,591,974 | 5/1986 | Dornbush et al. ............. 364/200 |
| 4,598,367 | 7/1986 | DeFrancesco et al. ........ 364/408 |
| 4,633,430 | 12/1986 | Cooper .......................... 364/900 |
| 4,642,768 | 2/1987 | Roberts .......................... 364/408 |
| 4,646,229 | 2/1987 | Boyle ............................. 364/200 |
| 4,646,250 | 2/1987 | Childress ....................... 364/518 |
| 4,648,037 | 3/1987 | Valentino ....................... 364/408 |
| 4,730,252 | 3/1988 | Bradshaw ....................... 364/403 |
| 4,831,526 | 5/1989 | Luchs et al. .................... 364/401 |
| 4,912,628 | 3/1990 | Briggs ............................ 364/200 |
| 4,918,588 | 4/1990 | Barrett et al. .................. 364/200 |
| 4,928,243 | 5/1990 | Hodges et al. ................. 364/519 |
| 4,928,252 | 5/1990 | Gabbe et al. ................... 364/519 |
| 4,951,194 | 8/1990 | Bradley et al. ................. 364/200 |
| 5,086,502 | 2/1992 | Malcolm ........................ 395/575 |

OTHER PUBLICATIONS

Snodgrass et al, Temporal Databases, IEEE Computer, Sep. 1986, pp. 35-42.

Gadia, A Homogeneous Relational Model and Query Languages for Temporal Databases, Dec. 1988, pp. 418-448.

Primary Examiner—Gareth D. Shaw
Assistant Examiner—Dennis M. Butler
Attorney, Agent, or Firm—Elman Wilf & Fried

[57] ABSTRACT

A system is disclosed for the automation of virtually all clerical functions in an office, such as for example, an insurance agency. Virtually any document generated by the office may be printed without the need for preprinted forms, as the system prints such forms on a laser printer near the worker requesting the form, using a page description language (PDL) appropriate to the printer. The clerical activity involved in maintaining, updating, retrieving, displaying and printing information relating to the functions of the office is supported.

A complete audit history of all activity to a specific database (DB) file record is maintained without saving the entire DB record in a historical file. The system also supports a worker when it is desired to interrupt a particular task and execute a different task, without losing information already entered for the first task, but without allowing the worker to exit the system without completing or accounting for the first task.

20 Claims, 65 Drawing Sheets

```
GEMINI II Agency Automation System
Printed by David M. Murdock on 01/22/90, at 17:09:14.
```

```
Ref: CP.100$7.1           CISCO Demo Agency (Accrual)         Last Changed  DMM
                           Basic Client Information           01/20/90 10:50:33
Client Code: MURDOCK        BillTo: MURDOCK          Ref.Code:
Client Name: David M. Murdock                        Statuses: NBB :       :
Address #1 : 625 Duke Road              ?            Producer: DMM :       :
Address #2 : SUITE 202                               Servicer: DMM :       :
ZIP=City+St: 07646       New Milford            NJ   Cr.Terms: 1    Net%: 15.00
Phone#1 Ext: 201 265-6206      #2: 201 265-6563      Fax No..:
Categories : CAL    :         :         :            Source..: DMM : 09/24/87
Commentary :
 L# Contact / Alternate Name     Salutation (no Dear) Typ Occup./Title Birthday
  1 Mr.David Murdock             Dave                  1                02/23/45
  2 Mrs. Eileen A. Murdock       Eileen                SP1
  3 Mr. Sean E. Murdock          Sean                  2               12/22/49
  3 No. of Contact Lines
  Policies       Written Premium           Annual            #Locations
  Comm. %        Commission Amt.           Annual            #Vehicles
  #Losses        Total Paid Amt.                             #Memos Due Total Balance  Current Balance  30-60 Balance  60-90 Balance  Over 90 Balance Doc CERT          SCHI
 Exit File Help Cmd? POL LOSS MKT MEMO INV CERT NEW# Xref CALC Disp Srch Menu Revw Quit
```

FIG. 6

```
                    GEMINI II Agency Automation System
             Printed by David M. Murdock on 01/22/90, at 17:20:19.
┌─────────────────────────────────────────────────────────────────────────┐
│Ref: CP.100$7.1         CISCO Demo Agency (Accrual)      Last Changed CFH│
│                         Basic Client Information        12/07/88 16:10:15│
│                                                                         │
│Client Code: MURDOCK         BillTo: WHEATLY         Ref.Code:           │
│Client Name: David M. Murdock ZZ9Z                   Statuses: NBB :    :│
│Address #1 : 625 Duke Road                           Producer: EAM :    :│
│Address #2 : 1nd. Floor                              Servicer: EAM :    :│
│ZIP=City+St: 07646        New Milford            NJ  Cr.Terms: 1  Net%: 15.00│
│Phone#1 Ext: 201 265-6206     #2: 201 265-6563       Fax No..:           │
│Categories : CAL     :         :          :          Source..: DMM : 09/24/87│
│Commentary :                                                             │
│ L# Contact / Alternate Name     Salutation (no Dear) Typ Occup./Title Birthday│
│  1 Mr.David Murdock             Dave                                  02/23/45│
│  2                                                                      │
│  3                                                                      │
│  5 No. of Contact Lines                                                 │
│ Policies     Written Premium              Annual         #Locations     │
│ Comm. %      Commission Amt.              Annual         #Vehicles      │
│ #Losses      Total Paid Amt.                             #Memos Due     │
│                                                                         │
│ Total Balance  Current Balance  30-60 Balance  60-90 Balance  Over 90 Balance│
│                                                                         │
│                                                                         │
│      │    │Doc │CERT│    │    │    │SCHI│    │    │    │    │CALC│    │    │Revw│
│ Exit │File│Help│Cmd?│ POL│LOSS│    │MKT │MEMO│INV │CERT│NEW#│Xref│Disp│Srch│Menu│Quit│
└─────────────────────────────────────────────────────────────────────────┘
```

FIG. 7

GEMINI II Agency Automation System

Printed by David M. Murdock on 01/22/90, at 17:22:48.

```
Ref: CP.100$7.1          CISCO Demo Agency (Accrual)         Last Changed  DMM
                          Basic Client Information           10/11/88 13:10:26

Client Code: MURDOCK         BillTo: WHEATLEY           Ref.Code:
Client Name: David M. Murdock ZZ9Z                      Statuses: NBB  :         :
Address #1 : 625 Duke Road                              Producer: EAM  :         :
Address #2 : 2nd Floor                                  Servicer: EAM  :         :
ZIP=City+St: 07646        New Milford            NJ     Cr.Terms: 1    Net%: 15.00
Phone#1 Ext: 201 265-6206       #2: 201 265-6563        Fax No..:
Categories : CAL   :         :         :                Source..: DMM  : 09/24/87
Commentary :
L# Contact / Alternate Name       Salutation (no Dear) Typ Occup./Title Birthday
 1 Mr. David Murdock              Dave                                  02/23/45
 2
 3
 5 No. of Contact Lines
Policies        Written Premium           Annual              #Locations
Comm. %         Commission Amt.           Annual              #Vehicles
Losses         Total Paid Amt.                               #Memos Due Total Balance   Current Balance   30-60 Balance  60-90 Balance  Over 90 Balance

|     |Doc |CERT|    |    |SCHI|    |   |    |   |    |CALC|    |    |Revw
Exit |File |Help|Cmd?| POL|LOSS| MKT|MEMO|INV|CERT|NEW#|Xref|Disp|Srch|Menu|Quit
```

FIG. 8

```
                    GEMINI II Agency Automation System
             Printed by David M. Murdock on 01/22/90, at 17:23:06.
Ref: CP.100$7.1        CISCO Demo Agency (Accrual)      Last Changed DMM
                         Basic Client Information        09/24/87 15:13:48
Client Code: MURDOCK          BillTo: MURDOCK        Ref.Cod
Client Name: David M. Murdock                        Statuses:    :    :
Address #1 : 625 Duke Road                  r        Producer: EAM :    :
Address #2 :                                         Servicer: EAM :    :
ZIP=City+St: 07646         New Milford           NJ  Cr.Terms: 1    Net%: 15.00
Phone#1 Ext: 201 265-6206     #2: 201 265-6563       Fax No..:
Categories :         :           :         :         Source..: DMM : 09/24/87
Commentary :
 L# Contact / Alternate Name    Salutation (no Dear) Typ Occup./Title Birthday
  1 Mr. David Murdock            Dave                                 02/23/45
  2
  3
  1 No. of Contact Lines
 Policies        Written Premium           Annual            #Locations
 Comm. %         Commission Amt.           Annual            #Vehicles
 #Losses         Total Paid Amt.                       .     #Memos Due Total Balance  Current Balance  30-60 Balance  60-90 Balance  Over 90 Balance Doc  CERT             SCHI                                    CALC           Revw
 Exit File Help Cmd?  POL LOSS MKT MEMO INV CERT NEW# Xref Disp Srch Menu Quit
```

FIG. 9

```
                    GEMINI II Agency Automation System
            Printed by David M. Murdock on 01/22/90, at 17:23:26.
Ref: CP.100$7.1         CISCO Demo Agency (Accrual)       Last Changed DMM
                          Basic Client Information        01/20/90 10:50:33
Client Code: MURDOCK          BillTo: MURDOCK         Ref.Code:
Client Name: David M. Murdock                         Statuses: NBB  :    :
Address #1 : 625 Duke Road                            Producer: DMM  :    :
Address #2 : SUITE 202                                Servicer: DMM  :    :
ZIP=City+St: 07646      New Milford             NJ    Cr.Terms: 1   Net%: 15.00
Phone#1 Ext: 201 265-6206     #2: 201 265-6563        Fax No..:
Categories : CAL  :      :       :       :            Source..: DMM  : 09/24/87
Commentary :
  L# Contact / Alternate Name    Salutation (no Dear) Typ Occup./Title Birthday
   1 Mr. David M. Murdock         Dave                 1                02/23/45
   2 Mrs. Eileen A. Murdock       Eileen              SP1               12/22/49
   3 Mr. Sean E. Murdock          Sean                 2
   3 No. of Contact Lines
Policies     Written Premium              Annual          #Locations
Comm. %      Commission Amt.              Annual          #Vehicles
Losses      Total Paid Amt.                       .      #Memos Due Total Balance  Current Balance  30-60 Balance  60-90 Balance  Over 90 Balance

|Doc |CERT|    |    |SCHI|    |   |    |    |   |CALC|    |    |Revw|
 Exit|File|Help|Cmd?|POL |LOSS|MKT |MEMO|INV|CERT|NEW#|Xref|Disp|Srch|Menu|Quit|
```

FIG. 10

```
                    GEMINI II Agency Automation System
            Printed by David M. Murdock on 01/22/90, at 17:23:45.
Ref: CP.100$7.1          CISCO Demo Agency (Accrual)      Last Changed DMM
                          Basic Client Information         01/20/90 10:50:06
Client Code: MURDOCK          BillTo: MURDOCK        Ref.Code:
Client Name: David M. Murdock                        Statuses: NBB  :      :
Address #1 : 625 Duke Road                           Producer: DMM  :      :
Address #2 : SUITE 202                               Servicer: DMM  :      :
ZIP=City+St: 07646       New Milford              NJ Cr.Terms: 1    Net%: 15.00
Phone#1 Ext: 201 265-6206    #2: 201 265-6563        Fax No..:
Categories : CAL    :         :         :            Source..: DMM  : 09/24/87
Commentary :
L# Contact / Alternate Name        Salutation (no Dear) Typ Occup./Title Birthday
 1 END David M. Murdock            Dave                  1                02/23/45
 2 Mrs. Eileen A. Murdock          Eileen                SP1
 3 Mr. Sean E. Murdock             Sean                  2               12/22/49
 5 No. of Contact Lines
Policies       Written Premium
Comm. %        Commission Amt.           Annual               #Locations
#Losses        Total Paid Amt.           Annual     .         #Vehicles
                                                              #Memos Due Total Balance  Current Balance  30-60 Balance  60-90 Balance  Over 90 Balance Doc  CERT              SCHI                          CALC           Revw
Exit File Help Cmd?  POL LOSS   MKT  MEMO INV CERT NEW# Xref Disp Srch Menu Quit
```

FIG. 11

```
                GEMINI II Agency Automation System
           Printed by David M. Murdock on 01/22/90, at 17:24:05.
Ref: CP.100$7.1         CISCO Demo Agency (Accrual)      Last Changed  DMM
                          Basic Client Information       12/08/89 13:17:48
Client Code: MURDOCK       BillTo: MURDOCK         Ref.Code:
Client Name: David M. Murdock                      Statuses: NBB :      :
Address #1 : 625 Duke Road                         Producer: DMM :      :
Address #2 : SUITE 202                             Servicer: DMM :      :
ZIP=City+St: 07646      New Milford           NJ   Cr.Terms: 1    Net%: 15.00
Phone#1 Ext: 201 265-6206      #2: 201 265-6563    Fax No..:
Categories : CAL   :         :          :          Source..: DMM : 09/24/87
Commentary :
 L# Contact / Alternate Name    Salutation (no Dear) Typ Occup./Title Birthday
  1 Mr. David M. Murdock        Dave                  1                02/23/45
  2 Mrs. Eileen A. Murdock      Eileen                BP1              12/22/49
  3 Mr. Sean E. Murdock         Sean                  2
  5 No. of Contact Lines
 Policies      Written Premium            Annual          #Locations
 Comm. %       Commission Amt.            Annual          #Vehicles
 #Losses       Total Paid Amt.                .           #Memos Due Total Balance  Current Balance  30-60 Balance  60-90 Balance  Over 90 Balance Doc  CERT            SCHI                        CALC             Revw
    Exit|File|Help|Cmd?| POL|LOSS| MKT|MEMO|INV|CERT|NEW#|Xref|Disp|Srch|Menu|Quit
```

FIG. 12

GEMINI II Agency Automation System
Printed by David M. Murdock on 01/22/90, at 17:54:05.

```
01/22/90              The GEMINI II Insurance System            05:53:51PM
Menu: DMM
                         CISCO Demo Agency (Accrual)
                  1. Client Marketing & Servicing
                  2. Accounts Receivable Menu
                  3. Accounts Payable Menu
                  4. Financial Management Menu
                  5. Insurance Forms & Reports Menu
                  6. Insurance Codes & Lists Menu
                  7. Accounting Codes & Lists Menu
                  8. Nightly Sleep Save
                  9. Monthly Reports Menu
                 10. Memo & Word Processing Menu
                 11. System Coordinator's Menu
                 12. The CICSO Development Menu
                 13. The Report Builder Menu
                 14. Project Status Menu
                 15. The Interface Menu
                 16. Copyright Preparation Enter Selection #; (OFF); or <Return>:

|Exit|   |Help|Cmd?|   |   |   |   |   |   |   |Disp|   |   |Quit|
```

FIG. 18

```
                    GEMINI II Agency Automation System
           Printed by David M. Murdock on 01/22/90, at 17:54:36.
Ref: CP.100$7.1         CISCO Demo Agency (Accrual)      Last Changed
                          Basic Client Information
Client Code:            BillTo:                   Ref.Code:
Client Name:                                      Statuses:    :     :
Address #1  :                                     Producer:    :     :
Address #2  :                                     Servicer:    :     :
ZIP=City+St:                                      Cr.Terms:    Net%:
Phone#1 Ext:             #2:                      Fax No..:
Categories :     :    :       :        :          Source..:    :
Commentary :
 L# Contact / Alternate Name    Salutation (no Dear) Typ Occup./Title Birthday No. of Contact Lines
 Policies       Written Premium         Annual           #Locations
 Comm. %        Commission Amt.         Annual           #Vehicles
 #Losses        Total Paid Amt.                          #Memos Due Total Balance  Current Balance  30-60 Balance  60-90 Balance  Over 90 Balance Doc  CERT                 SCHI                            CALC                Revw
   Exit File Help Cmd?  POL  LOSS   MKT MEMO INV CERT NEW# Xref Disp Srch Menu Quit
```

FIG. 19

```
                   GEMINI II Agency Automation System
           Printed by David M. Murdock on 01/22/90, at 17:55:06.
Ref: CP.100$7.1         CISCO Demo Agency (Accrual)      Last Changed  DMM
                          Basic Client Information       01/20/90 10:50:33
Client Code: MURDOCK        BillTo: MURDOCK          Ref.Code:
Client Name: David M. Murdock                        Statuses: NBB :     :
Address #1 : 625 Duke Road                           Producer: DMM :     :
Address #2 : SUITE 202                               Servicer: DMM :     :
ZIP=City+St: 07646        New Milford          NJ    Cr.Terms: 1   Net%: 15.00
Phone#1 Ext: 201 265-6206    #2: 201 265-6563        Fax No..:
Categories : CAL     :          :         :          Source..: DMM : 09/24/87
Commentary :
 L# Contact / Alternate Name    Salutation (no Dear) Typ Occup./Title Birthday
  1 Mr. David M. Murdock        Dave                  1               02/23/45
  2 Mrs. Eileen A. Murdock      Eileen
  3 Mr. Sean E. Murdock         Sean                 SP1              12/22/49
  3 No. of Contact Lines                              2
 Policies    8 Written Premium           0 Annual         #Locations     8
 Comm. %     0 Commission Amt.           0 Annual         #Vehicles     13
 #Losses     0 Total Paid Amt.           0                #Memos Due    14

Total Balance  Current Balance  30-60 Balance  60-90 Balance  Over 90 Balance
        4,760               0              0              0             4,760

Doc  CERT             SCHI                         CALC            Revw
Exit File Help Cmd?  POL LOSS MKT MEMO INV CERT NEW# Xref Disp Srch Menu Quit
```

FIG. 20

GEMINI II Agency Automation System

Printed by David M. Murdock on 01/22/90, at 17:57:09.

```
Ref: PI.100$6           CISCO Demo Agency (Accrual)
                          Policy Selection List
Client Code: MURDOCK         BillTo MURDOCK            Ref.Code
Client Name  David M. Murdock                          Statuses NBB
Address #1   625 Duke Road                             Producer DMM
 Ln#      -- Policy Number --  Ins Cov Eff.Date  Exp.Date B -CNR Date-  Premium
   1      1DRIVER2VEHICLES     AET PA  01/01/90  01/01/91 A
   2      TESTING&PREFILL      AET PA  01/01/90  01/01/91 A
   3      BINDER2676           AET PA  01/01/90  01/01/91 A
   4      SAFARI1111111111111  AET PA  01/01/90  01/01/91 A
   5      128345045            AET PA  12/12/89  12/12/90 A
   6      APP644               AET PA  07/01/97  07/01/98 A
   7      APP2254              AET PA  12/01/89  12/01/90 A
   8      APP2202              AET PA  01/01/89  01/01/90 A R 01/01/90
   9      APP1983              GA  PA  01/01/91  01/01/92 A
  10      APP644               AET PA  07/01/96  07/01/97 A R 07/01/97
  11      APP644               AET PA  01/01/96  07/01/96 A R 07/01/96
  12      APP644               AET PA  01/01/95  01/01/96 A R 01/01/96
  13      APP644               AET PA  01/01/94  01/01/95 A R 01/01/95
  14      APP644               AET PA  01/01/93  01/01/94 A R 01/01/94
 38 Lines
Ln#: 1    Tran: COR (NEW/END/AUD/CAN/REI/REW/REN/NRW/COR/DIS) Eff.Date:
```

| APP  | BIND |      | CERT | LNOT |      | SCHI |      |      | AAID | CLPR |      |      |      | Copy |      |
|------|------|------|------|------|------|------|------|------|------|------|------|------|------|------|------|
| Exit | File | Help | Cmd? | POL  | LOSS |      | Memo |      |      |      | Xref | Disp | Srch | Menu | Quit |

FIG. 21

```
              GEMINI II Agency Automation System
        Printed by David M. Murdock on 01/22/90, at 18:01:37.
┌─────────────────────────────────────────────────────────────────────────┐
│Ref: PI.101$11         CISCO Demo Agency (Accrual)      Entry 01/22/90 DMM│
│                       Basic Policy Information      Effective 01/20/90 14│
│                                                                         │
│Policy Seq. #:    2810   Division No.: 1       Client Code: MURDOCK      │
│Policy Number: 1DRIVER2VEHICLES       State: NJ BillTo Code: MURDOCK     │
│Named Insured: David M. Murdock                                          │
│Inurer Code:   AET Aetna Casualty & Surety Producer Code1: DMM   2:   3: │
│Coverage Code: PA Personal Automobile      Bill Meth. A/C:A Agency Bill  │
│Term / Status: A / NEW                     Cancel Method :               │
│Eff.Date/Time: 01/01/90  : 12:01AM         Premium Amount:               │
│Exp.Date/Time: 01/01/91  : 12:01AM         Comm:         % $             │
│Orig. Incept.: 01/01/90                              Written    Annualized│
│Binder Effect:           :                 Premium $                     │
│Binder Expire:           :                 Agt.Comm$                     │
│Binder Reason:                             Prd.Comm$                     │
│Misc. Remarks:                                                           │
│:                                                                        │
│  <LOC>    1 Location & Building Info. <INV>   1 Inv & Prem Trans  N Inst?│
│  <DRI>    2 Driver Information        <PHO>   0 Prior History & Other Ins.│
│  <VEH>    2 Vehicle Information       <REM>   0 Remarks & Attachments   │
│  <SCH>    0 Scheduled Property Info.  <AOI>   0 Additional/Other Interests│
│  <COV>    2 Coverage Information      <URI>   4 Underwriting & Rating Info.│
│                                                                         │
├────┬────┬────┬────┬────┬────┬────┬────┬────┬────┬────┬────┬────┬────┬───┤
│APP │BIND│CHNG│CERT│LNOT│LOSS│SCHI│Memo│EPI │AIID│CLPR│SAFA│Disp│Next│Copy│Revw│
│Exit│File│Help│LOC │DRI │VEH │SCH │COV │INV │PHO │REM │AOI │URI │Srch│Menu│Quit│
└────┴────┴────┴────┴────┴────┴────┴────┴────┴────┴────┴────┴────┴────┴───┘
```

FIG. 22

GEMINI II Agency Automation System
Printed by David M. Murdock on 01/22/90, at 17:58:09.

```
01/22/90                                                         05:57:53PM
Menu: DMM        The GEMINI II Insurance System
                      CISCO Demo Agency (Accrual):
                 1. Client Marketing & Servicing
                 2. Accounts Receivable Menu
                 3. Accounts Payable Menu
                 4. Financial Management Menu
                 5. Insurance Forms & Reports Menu
                 6. Insurance Codes & Lists Menu
                 7. Accounting Codes & Lists Menu
                 8. Nightly Sleep Save
                 9. Monthly Reports Menu
                10. Memo & Word Processing Menu
                11. System Coordinator's Menu
                12. The CICSO Development Menu
                13. The Report Builder Menu
                14. Project Status Menu
                15. The Interface Menu
                16. Copyright Preparation Enter Selection #; (OFF); or <Return>:

Exit     Help Cmd?                                   Disp        Quit
```

FIG. 23

GEMINI II Agency Automation System
Printed by David M. Murdock on 01/22/90, at 17:58:24.

```
01/22/90                CISCO Demo Agency (Accrual)            05:58:12PM
Menu: AR.000
                        Accounts Receivable Menu 1. Preliminary Invoice Register
              2. Invoice Print & Update
              3. Invoice Correction Screen
              4. Cash Receipts Entry Screen
              5. Cash Receipts Report & Update
              6. Check Disbursements Entry Screen
              7. Check Disbursements Print& Update
              8. Accounts Receivable Adjustments
              9. Adjustments Report & Update
             10. Direct Bill Insurance Receipts
             11. Direct Bill Ins Receipts Prt & Upd Enter Selection #; (OFF); or <Return>:

Exit    Help Cmd?                              Disp        Quit
```

Fig. 24

GEMINI II Agency Automation System

Printed by David M. Murdock on 01/22/90, at 18:00:45.

```
Ref: AR.105$6            CISCO Demo Agency (Accrual)
                               Cash Receipts
Division No. :  1              CISCO Demo Agency (Accrual)
Reference No.:     1394
Bank Code    : HFT             Bank of Hartford
Deposit Date : 01/22/90        Period End Date: 01/31/90
Client Code  : JONES           JOE JONES              Balance      2,890.00
G/L Acct. No.: 1.1100.00       Accounts Receivable
Check Number : 12345                                  Remains to Post   0.00
Check Amount :      100.00
Check Comment: ON ACCOUNT CASH RECEIPT
 Ln#  Inv.# Inv.Date Trn Policy No Cov Eff.Date Inv. Balance   Post Amounts
   1 OA1394 01/22/90 COA                                *           100.00
   2   4323 12/15/89 NEW            01/01/90     2,222.00 B
   3   4323 12/15/89 NEW            01/01/90     2,222.00 B
   4   4327 12/15/89 FEE            12/11/89     2,990.00 *
   5
   6
   7
   8
   9
  10

|    |Doc |    |
Exit |File|Help|Cmd?|                           |Xref|Disp|Srch|Menu|Quit
```

FIG. 25

GEMINI II Agency Automation System
Printed by David M. Murdock on 01/22/90, at 18:01:03.

```
01/22/90              CISCO Demo Agency (Accrual)            06:00:51PM
Menu: AR.000
                        Accounts Receivable Menu 1. Preliminary Invoice Register
                2. Invoice Print & Update
                3. Invoice Correction Screen
                4. Cash Receipts Entry Screen
                5. Cash Receipts Report & Update
                6. Check Disbursements Entry Screen
                7. Check Disbursements Print & Update
                8. Accounts Receivable Adjustments
                9. Adjustments Report & Update
               10. Direct Bill Insurance Receipts
               11. Direct Bill Ins Receipts Prt & Upd Enter Selection #; (OFF); or <Return>:

Exit    Help Cmd?                                    Disp         Quit
```

Fig. 26

GEMINI II Agency Automation System

Printed by David M. Murdock on 01/22/90, at 18:01:17.

```
01/22/90          The GEMINI II Insurance System           06:01:05PM
Menu: DMM
                    CISCO Demo Agency (Accrual)
              1.  Client Marketing & Servicing
              2.  Accounts Receivable Menu
              3.  Accounts Payable Menu
              4.  Financial Management Menu
              5.  Insurance Forms & Reports Menu
              6.  Insurance Codes & Lists Menu
              7.  Accounting Codes & Lists Menu
              8.  Nightly Sleep Save
              9.  Monthly Reports Menu
             10.  Memo & Word Processing Menu
             11.  System Coordinator's Menu
             12.  The CICSO Development Menu
             13.  The Report Builder Menu
             14.  Project Status Menu
             15.  The Interface Menu
             16.  Copyright Preparation Enter Selection #; (OFF); or <Return>:

|Exit|  |Help|Cmd?|    |    |    |    |    |    |    |Disp|    |    |Quit|
```

FIG. 27

```
                    GEMINI II Agency Automation System
              Printed by David M. Murdock on 01/22/90, at 18:01:37.
┌─────────────────────────────────────────────────────────────────────────────┐
│ Ref: PI.101$11         CISCO Demo Agency (Accrual)        Entry 01/22/90 DMM│
│                          Basic Policy Information     Effective 01/20/90  14│
│                                                                             │
│ Policy Seq. #:    2810   Division No.: 1          Client Code: MURDOCK      │
│ Policy Number: 1DRIVER2VEHICLES        State: NJ BillTo Code: MURDOCK       │
│ Named Insured: David M. Murdock                                             │
│ Inurer Code:   AET Aetna Casualty & Surety  Producer Code1: DMM   2:    3:  │
│ Coverage Code: PA Personal Automobile       Bill Meth. A/C: A Agency Bill   │
│ Term / Status: A / NEW                      Cancel Method :                 │
│ Eff.Date/Time: 01/01/90  : 12:01AM          Premium Amount:                 │
│ Exp.Date/Time: 01/01/91  : 12:01AM          Comm:         % $               │
│ Orig. Incept.: 01/01/90                                Written    Annualized│
│ Binder Effect:           :                  Premium $                       │
│ Binder Expire:           :                  Agt.Comm$                       │
│ Binder Reason:                              Prd.Comm$                       │
│ Misc. Remarks:                                                              │
│ :                                                                           │
│   <LOC>     1 Location & Building Info.  <INV>   1 Inv & Prem Trans  N Inst?│
│   <DRI>     2 Driver Information         <PHO>   0 Prior History & Other Ins│
│   <VEH>     2 Vehicle Information        <REM>   0 Remarks & Attachments    │
│   <SCH>     0 Scheduled Property Info.   <AOI>   0 Additional/Other Interests│
│   <COV>     2 Coverage Information       <URI>   4 Underwriting & Rating Info│
│                                                                             │
│ ┌────┬────┬────┬────┬────┬────┬────┬────┬───┬────┬────┬────┬────┬────┬────┐│
│ │APP │BIND│CHNG│CERT│LNOT│LOSS│SCHI│Memo│EPI│AIID│CLPR│SAFA│Disp│Next│Copy│Revw
│ │Exit│File│Help│LOC │DRI │VEH │SCH │COV │INV│PHO │REM │AOI │URI │Srch│Menu│Quit
│ └────┴────┴────┴────┴────┴────┴────┴────┴───┴────┴────┴────┴────┴────┴────┘│
└─────────────────────────────────────────────────────────────────────────────┘
```

FIG. 28

```
                    GEMINI II Agency Automation System
            Printed by David M. Murdock on 01/22/90, at 18:11:39.

┌─────────────────────────────────────────────────────────────────────────────┐
│Ref: ACRD.FRMS$2.1         CISCO Demo Agency (Accrual)                       │
│                       ACORD Forms Generation Parameters             P/L     │
│ACORD Form #: 1       Description: ACORD 1 Property Loss Notice p. 1   P     │
│------------------------------Lines and Boxes--------------------------------│
│Line Horiz  Vert  Height  Width  Wt T Patt ----- Comments ------------------ │
│ 1    1.00  2.00   63.50  81.00  10 0                                        │
│ 2   66.00  4.50    1.00  16.00   1 0                                        │
│ 3   32.00  6.50    1.00  50.00   1 0                                        │
│ 4   32.00  8.50    1.00  50.00   1 0                                        │
│ 5   32.00  9.50    1.00  50.00   1 0                                        │
│- Check Off Boxes-    ------------------Printing Offsets ------------------- │
│ 1   67.00    4.00   -------- Background --------   --------Foreground ----- │
│ 2                   Horiz:       Vert:    1.50 Horiz:       Vert:   -1.75   │
│------Horiz----Vert-O-Pt-Wt-----  Background Text -------------------------- │
│ 1    3.00   3.10  H 16 B ACORD                                              │
│ 2   13.50   3.25  H 18 B PROPERTY LOSS NOTICE                               │
│ 3   67.00   2.50  H  6 B DATE                                               │
│ 4   70.00   2.50  H  6 M (MM/DD/YY)                                         │
│ 5    2.00   4.55  H  6 B PRODUCER                                           │
│ 6   33.00   4.55  H  6 B PRODUCER PHONE                                     │
│ 7   42.00   4.55  H  6 B (A/C, No., Ext.)                                   │
│ 8   51.00   4.55  H  6 B MISCELLANEOUS INFORMATION                          │
│                                                                             │
│Exit│File│Help│Cmd?│    │    │    │    │    │    │    │Srch│Menu│Quit       │
└─────────────────────────────────────────────────────────────────────────────┘
```

| ACORD. PROPERTY LOSS NOTICE | | | DATE (MM/DD/YY) 07/22/89 | |
|---|---|---|---|---|
| PRODUCER GEMINI II Demo Agency 95 Grand Avenue P.O. Box 1000 CODE 4564161 SUB CODE | PRODUCER PHONE (A/C, No., Ext.) 5167981000 | MISCELLANEOUS INFORMATION (Site & Location Code) | | |
| | COMPANY Aetna Casualty & Surety | | POLICY NUMBER 1234567890 | CAT.# |
| | POLICY EFF. DATE (MM/DD/YY) 01/01/89 | POLICY EXP. DATE (MM/DD/YY) 01/01/90 | DATE (MM/DD/YY) & TIME OF LOSS 07/19/89 A.M. P.M. | REPORTED YES NO |

INSURED

| NAME AND ADDRESS David M. Murdock 625 Duke Road SUITE 1 New Milford, NJ 07646 | INSURED'S RESIDENCE PHONE (A/C, No.) 201 265-6206 | INSURED'S BUSINESS PHONE (A/C, No., Ext.) 201 265-6563 |
|---|---|---|
| | PERSON TO CONTACT Mr. David M. Murdock | WHERE TO CONTACT |
| | | WHEN |
| | CONTACT'S RESIDENCE PHONE (A/C, No.) 201 265-6206 | CONTACT'S BUSINESS PHONE (A/C, No., Ext.) 201 265-6563 |

LOSS

| LOCATION OF LOSS See Remarks for Location of Loss | POLICE OR FIRE DEPT. TO WHICH REPORTED |
|---|---|
| KIND OF LOSS (Fire, Wind, Explosion, Etc.) Property | PROBABLE AMOUNT ENTIRE LOSS |

DESCRIPTION OF LOSS & DAMAGE (Use additional pages, if necessary)
WIND BLEW DOWN A TREE BRANCH ON THE HOUSE

POLICY INFORMATION

MORTGAGEE (If none so indicate)

HOMEOWNER POLICIES SECTION 1 ONLY (Complete for coverages A, B, C, D & additional coverages. For Homeowners Section II Liability Losses, use ACORD 3.)

| COVERAGE A DWELLING | COVERAGE B APPURTENANT PRIVATE STRUCTURES | COVERAGE C UNSCHEDULED PERSONAL PROPERTY | COVERAGE D ADDITIONAL LIVING EXPENSES | DESCRIBE ADDITIONAL COVERAGES PROVIDED |
|---|---|---|---|---|
| | | | | ON |
| | | | | ON |

| SUBJECT TO FORMS. (Insert form nos. & edition dates, special deductibles) | DEDUCTIBLES |
|---|---|

FIRES, ALLIED LINES & MULTI-PERIL POLICIES (Complete only those items involved in loss)

| ITEM | AMOUNT | BLDG. | CONTENTS | OTHER | %COINS | DEDUCTIBLE | COVERAGE AND/OR DESCRIPTION OF PROPERTY INSURED |
|---|---|---|---|---|---|---|---|
| 1 | 15000000 SeeRemarks | See> XXXX | | | 50 | 1000 | Blanket #: 5 |
| 2 | 25000 SeeRemarks | | | See-----> XXXX | | 5000 | Blanket #: 5 Trees, Shrubs & Plants |
| 3 | 150000 | | XXXX | XXXX | 90 | 500 | |

SUBJECT TO FORMS. (Insert form nos. & edition dates, special deductibles)

MISCELLANEOUS INFORMATION

OTHER INSURANCE (List companies, policy numbers, coverages & policy amounts)

| REMARKS ---------- Location of Loss ---------- 625 Duke Road; SUITE 1 New Milford, NJ 07646 (Continued on additional Remarks page.) | | |
|---|---|---|
| ADJUSTER ASSIGNED | | DATE ASSIGNED (MM/DD/YY) |
| REPORTED BY | REPORTED TO David M. Murdock | SIGNATURE OF PRODUCER OR INSURED |

FIG. 38

```
                    GEMINI II Agency Automation System
           Printed by David M. Murdock on 01/26/90, at 15:12:13.
 ┌─────────────────────────────────────────────────────────────────────────┐
 │Ref: BANKS$3             CISCO Demo Agency (Accrual)    Last Changed:MCB │
 │                         Add/Change Bank Codes          08/12/88 11:23:09│
 │                                                                         │
 │Bank Code: CHP                                                           │
 │Bank Name: Chase Manhattan Bank                                          │
 │Bank G/L#: 1.1021.00           PREMIUM TRUST - CHASE                     │
 │1st Chk #: 50000                                                         │
 │Last Chk#: 50171                                                         │
 │Address  : Main Street                                                   │
 │Zip Code : 11743         City: Huntington             State: NY          │
 │Routing Code                  : 01-216/212                               │
 │Print Checks on Printer (Y/N): Y                                         │
 │Print Check Stubs (Y/N)       : N                                        │
 │Adjustment G/L Number         : 1.6080.00                                │
 │Bank Transit Number           :         02800024                         │
 │Account Number                : 343 1 101215                             │
 │Spaces in MICR Line (Y/N)     :                                          │
 │                                                                         │
 │Order of (C)heck#-(T)ransit#-(A)ccount# MICR Output (e.g., TCA):          │
 │                                                                         │
 │                                                                         │
 │                                                                         │
 │     Doc                                                                 │
 │Exit File Help Cmd?                              Disp Srch Menu Quit     │
 └─────────────────────────────────────────────────────────────────────────┘
```

FIG. 39

OFFICE AUTOMATION SYSTEM FOR DATA BASE MANAGEMENT AND FORMS GENERATION

This is a continuation of copending application Ser. No. 07/471,290, filed on Jan. 26, 1990 now abandoned.

A portion of the disclosure of this patent document contains material which is subject to copyright protection. The copyright owner has no objection to the facsimile reproduction by anyone of the patent disclosure as it appears in the PTO patent file or records, but otherwise reserves all copyright rights whatsoever.

BACKGROUND OF THE INVENTION

1. Field of the Invention

The present invention relates to office automation and specifically to the automation of virtually all clerical functions in an office, such as for example, an insurance agency. It involves means for the creation of virtually any document generated by the office without the need for pre-printed forms and the automation of clerical activity involved in maintaining, updating, retrieving, displaying and printing information relating to the functions of the office.

One feature of this invention relates to means for storing a complete audit history of all activity to a specific database (DB) file record without saving the entire DB record in a historical file.

Another feature of this invention relates to means for permitting a worker to interrupt a particular task and execute a different task, without losing information already entered for the first task, and without being permitted to exit the system without completing or accounting for the first task.

A further feature of the present invention relates to a method of generating printed forms on a laser or equivalent printer without the user needing to learn the specific Page Description Language (PDL) of a particular brand of laser printer.

2. State of the Art

Although there has been much publicity given to the idea that widespread use of computers would usher in an age of the "paperless office" or "electronic office," for the most part such predictions are yet to be realized. The present inventor believes that certain inadequacies of current computer technology prevent available systems from achieving this potential. By addressing and overcoming these inadequacies, the present invention permits the implementation of computer systems which can truly be said to achieve the primary goals of office automation.

When a body of information is to be shared and accessed in common by more than one worker in an office, a system with greater power than a conventional personal computer is needed. The present invention involves a system including a multi-terminal business computer with the ability to create and access a common database while maintaining an audit history of all additions and changes, with the ability to produce filled-in forms on an as-needed basis, and with the ability to permit the operator to interrupt a current task in favor of a more urgent one, without losing data and the ability to return where the first task was left off.

As the body of information in a database (DB) is created, added to, and changed as new and corrected data is entered, it is important to be able to determine when and under what circumstances each entry was made. The purpose of such a feature is to be able to isolate any errors, either systematic errors or inadvertent errors, that may have been made in the data, so that they may be corrected; a further advantage of such a feature is to be able to determine what the state of facts was at any time in the past. For accounting systems, and more generally for DBs that maintain such information, a trail of entries modifying a particular record is generally known as an "audit trail," and in general the information comprising the history of a given DB or portion of a DB is known as an "audit history."

It has been customary in the past to maintain an audit history of a DB file by saving complete copies of each DB record in a historical file. As time passes, and the number of changes made to any specific record increases, enormous amounts of disk storage are required to maintain the audit history of the DB files. This causes the system designer to make several compromises. The number of DB files for which history will be maintained is severely limited, or there must be a periodical compression of the history images to conserve disk space, with the consequence that detail of audit information is lost. The ability to maintain audit history on a wide range of DB files without the necessity of compressing out the detail would be a valuable tool to any system designer.

One of the primary failures of many multi-user office automation systems is that the programs do not operate in the same way an employee would operate manually. Specifically, workers are constantly being interrupted by requests for information by other employees or by outside clients.

Using past systems, when a worker is involved in a computer-related function (e.g. adding a new client or customer to the database) and is interrupted by a phone call from an existing client who has a question about last month's statement, the employee would have to choose from among the following alternatives:

1. Take down some basic information from the client, offer to call the client back once the information has been found, finish up the computer operation currently in progress, and then call up the necessary programs to answer the client's inquiry. In that event, the client would have to wait for a callback.
2. Throw away the work done so far by aborting the current computer operation and then call up the programs necessary to answer the client's inquiry. Later, the work thrown away would have to be re-entered.
3. Place the client on hold, get up from the workstation, find another workstation where the terminal is free, ask the employee sitting there to move, and then use that terminal to call up the programs to answer the client's question. The worker and possibly one other employee are displaced while the question is being answered, and the worker is away from any notes or other information that may also help respond to the client.

Each of the choices described above has undesirable consequences. And even though this problem has been addressed on some graphics-based operating environments, e.g. on Macintosh personal computers as well as Microsoft Windows and IBM OS/2, they remain as serious problems on multi-user computer systems that utilize ASCII terminals as their primary input device.

Modern laser printers are delivered to the end user with a command language built in. While the Page Description Language (PDL) may differ from one manufacture to another, each of the PDLs provided will allow the end user to perform various tasks such as to draw a line or draw a circle. The languages differ in capability and style, but all PDLs provide a basic graphics capability to the end user. However, in general these PDLs are difficult to learn and use. The commands tend to be very difficult to specify, and often the user needs many trials and errors before achieving the desired result on the page.

There are several products currently on the market that will allow an end user to graphically build an image of the desired form on the monitor and then generate that image on a printer. However, these products build "bit-mapped" images, which require large amounts of disk space for storage and take a long time to print. Moreover these products are based on personal computers and require a bit-mapped monitor to use. Because the products do not utilize the PDL that is provided with the printer to generate the documents, very substantial amounts of printing time are consumed for each page that is printed, so much so that such products are not well suited for generating filled-in forms on an as-needed basis in a busy office.

SUMMARY OF THE INVENTION

The present invention involves an integrated system providing a workstation having access to a common database of information for each of a plurality of office workers (operators). The system supports workstations that are capable of displaying on demand whatever information is needed or requested by the operator. The operator also updates information in the database by entering it into the workstation. A feature of the present invention is that the system has the capability of re-creating and displaying the information as it existed in the database at any time in the past, utilizing audit history data, and optionally of displaying the information as it is expected to be at some future date.

The system is especially useful for information-intensive service businesses, for example an insurance agency, an accounting firm, or a law office, as well as nonprofit organizations, e.g. a hospital, and governmental agencies, e.g. a taxing authority. For many such functions, inquiries and new information may arrive on an unpredictable basis, such as by telephone or walk-in, and it is desirable that any system serving that office be capable of responding immediately to an inquiry and that any task of more than one step be susceptible of being interrupted in favor of a more urgent task.

The system has the capability of producing printouts, e.g. forms, documents, correspondence, and checks, close to the time they are requested and in most instances at a location in proximity to the operator requesting the printout, because the amount of pre-printed material can be limited and most forms can be generated on an as-needed-and-used basis, with all information already filled in.

Desirably each workstation is a terminal of a multi-terminal general purpose business computer, for example a microcomputer serving from two to eight or nine terminals, and preferably a minicomputer serving up to about 120 ASCII terminals or the like. The system of the present invention could also be incorporated in a mainframe computer, such as one serving hundreds of terminals, if desired. Each terminal comprises a conventional keyboard and display screen, with the capability of displaying conventional ASCII characters. An advantage of the present invention is that the features are implemented without the need for graphics display capabilities which could require more expensive communication links and terminal hardware.

Audit History Feature

In accordance with the audit history feature of the present invention, all programs that are written or generated that utilize a file that maintains history, will call a particular program. This program will compare the record as it resides on disk and the record as it is about to be written back to disk, and create one audit history record that records all of the changes that have transpired. One record is created each time that the record is written to disk. These records become the audit trail for the record. In the preferred embodiment of the invention described in greater detail below, this program is named STD.HISTORY.SUB.

If the operator wishes to examine the history for a record, a command is entered that will call the STD.HISTORY.SUB program. The operator is prompted for information about how the audit history is to be displayed. The program will then utilize the audit records created earlier to recreate the record as of the date desired. The display logic of the program will then display the version to the operator, with all changes displayed in a special graphical format such as reverse video or some other highlighting technique. The operator may then examine other versions of the historical record by entering various commands.

There are two variations to displaying record history as follows:
1. Strictly in the order that they were made based on the date and time of original entry.
2. Sorted and displayed in an alternate order that the developer may designate. In a preferred embodiment of the system (i.e. for insurance agency management), the alternate order is by the Effective Date of the change. For example, changes may be entered into the system to be effective in the past or the future. Changes effective in the future anticipate certain events, such as the date a student will be leaving for college and going off the policy. Changes made in the past record events that have happened but which, for one reason or another, are not recorded until some later date, such as the purchase of an additional family car.

Interrupt Feature

This feature of the present invention provides the operator with the ability to temporarily suspend the current operation and initiate an entirely new operation. The software allows the operator to be "interrupt-driven" as required by the working environment. A preferred embodiment of this feature will allow the operator to perform the interruption process up to twelve times before the system requires the operator to conclude a previously interrupted task. The system prevents the operator from logging off for the day without resolving each of the suspended sessions. Various pieces of information are passed from level to level by the program, thus allowing for seamless operation of multi-level tasks.

Utilizing this feature in the example mentioned in the State of the Art section above, the operator enters the (M)enu command regardless of where the focus of activity (i.e. the curser) happens to be in any screen. The system will thereupon perform the following steps:

1. Suspend the current operation (adding the new client).
2. Initiate a new computer task.
3. Execute the Menu Program, which permits the operator to perform any computer operation necessary to satisfy the client's question.

Once finished with the new task, the operator enters (E)xit from the menu program and the system will:

4. Re-establish the original program.
5. Re-display the original program background and data.
6. Place the operator back into the field from which the interruption was initiated.

Forms Builder Feature

The forms builder feature of the present invention permits an unskilled operator to design a form without ever having to learn the PDL of the device being used to print the forms. This feature of the invention does not require the use of a bit-mapped monitor and generates a printer-compatible series of commands in the PDL of the printer. Armed with nothing more than a standard forms ruler, the developer can enter in all of the necessary information to allow the Forms Builder to build the form.

Two steps are required to generate each form. The operator enters the image specifics into a database record via a screen entry program. Once complete, the system interprets the "Source" information and generates the printer-compatible "Object" commands.

Because of the virtually universal acceptance of the Hewlett-Packard PDL throughout the laser printer industry, this PDL is implemented as the language of choice in the preferred embodiment of this invention.

BRIEF DESCRIPTION OF THE DRAWINGS

FIG. 6 to FIG. 12 are screen images depicting the various historical data presentations generated by the audit history program.

FIG. 18 to FIG. 28 are a series of screen images that illustrate the interruption function.

FIG. 36 is a screen image of the Forms Generation Parameter entry screen. A portion of the information necessary to generate a form is also displayed.

FIG. 37 is the actual form created by the Forms Generator as a result of the information entered and depicted in FIG. 36.

FIG. 38 is an example of the form of FIG. 37 combined with actual data and printed.

FIG. 39 is a screen image produced by the program BANKS$3.MAIN.

BRIEF DESCRIPTION OF THE APPENDICES

APPENDIX A. STD.HISTORY.SUB$8 (Version 8): Source Code Listing. Used to maintain and display audit history.

APPENDIX B.
1) BANKS$3.MAIN (Version 3): Generated Source Code Listing. Typical program that maintains and displays history.
2) BANKS$3.BGFG (Version 3): Generated Source Code Listing. Display routines used by BANKS$3.MAIN to display Background (static data), Foreground (DB record data), and Historical information (both visual presentation data and history data).

APPENDIX C. STD.MESSAGE$17 (Version 17): Source Code Listing. This program is used by all applications programs to prompt the operator with a message, and then capture the operator's response.

APPENDIX D. STD.INPUT$18 (Version 18): Source Code Listing. This program is used by all applications programs to accept data from the operator. This program differs from STD.MESSAGE in that there is no prompt involved and the resulting data is validated and placed into a data record.

APPENDIX E. STD.EXECUTE$4 (Version 4): Source Code Listing. Used by all applications programs to freeze the current level and initiate the next higher level.

APPENDIX F. PROGRAM.MAIN$4 (Version 4): Source Code Listing. Used by all applications programs to perform various house-keeping tasks and to communicate between levels.

APPENDIX G. STD.FORMS.BUILDER$2 (Version 2): Source Code Listing. Used to compile the printer understandable (Object Code) necessary to create a laser printed document.

APPENDIX H.
1) ACORD.FORMS$2.MAIN (Version 2): Source Code Listing. Used to enter document image parameters. Creates and maintains the Image Source information.

2) ACORD.FORMS$2.BGFG (Version 2): Source Code Listing. The display routines for the above entry program.

DETAILED DESCRIPTION OF A PREFERRED EMBODIMENT

Figure 1:
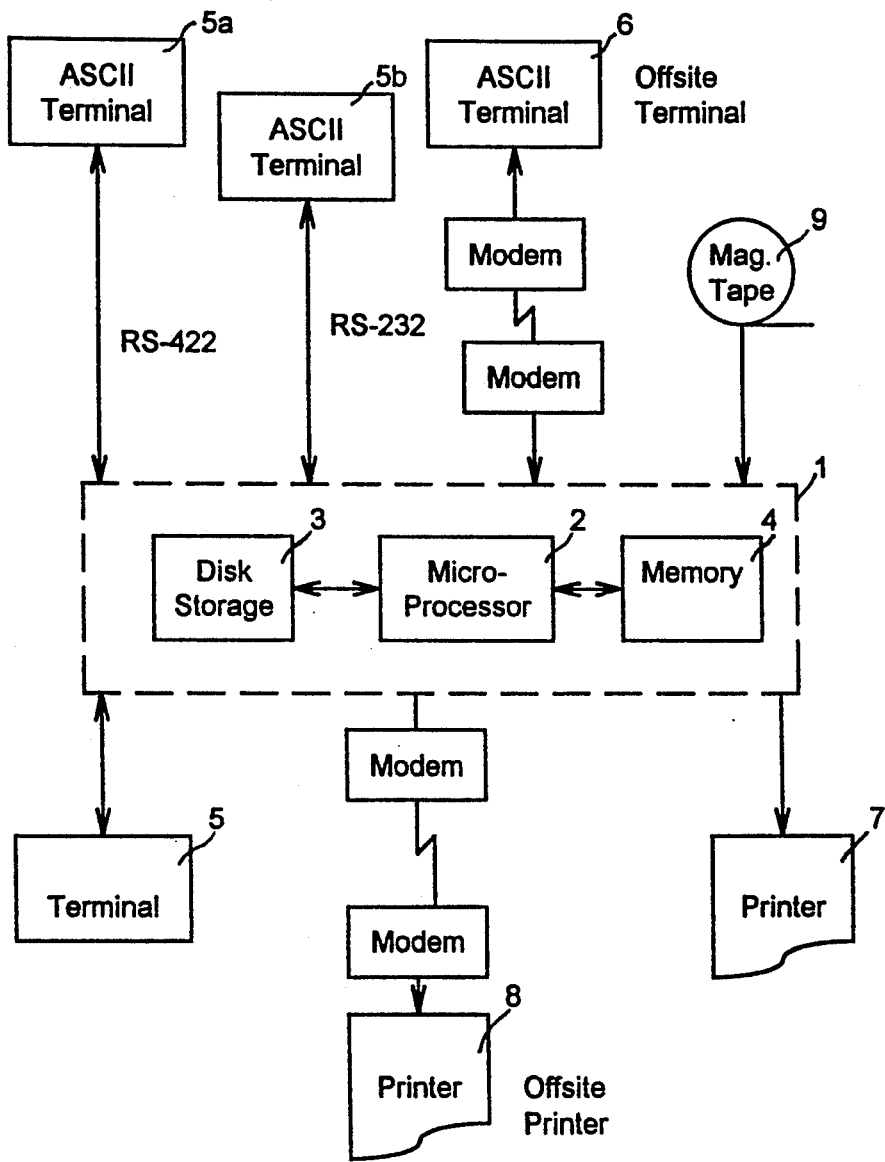
FIG. 1 shows a typical computer hardware configuration that could utilize this invention.

FIG. 1 shows diagrammatically a typical computer hardware configuration that would be appropriate for the system of the present invention. The host computer 1 generally comprises a microprocessor 2 in communication with disk storage 3 and high-speed memory 4. A plurality of terminals, here schematically represented by 5, 5a, and 5b, are in communication with the host computer 1 through any one or more of various forms of cabling.

Any of the various conventional techniques of connecting terminals to a host computer may be used in the system of the present invention. As an illustrative example and not by way of limitation, terminal 5 represents one or more terminals coupled to the host computer through coaxial cable; terminal 5a represents optionally one or more terminals communicating through an RS-422 link; and terminal 5b represents one or more terminals communicating through an RS-232 link. Terminals 5, 5a, and 5b are all within the distance of effective cable runs from the host computer 1.

Terminal 6, shown as being connected to the host computer 1 through telecommunications link by modem, represents optionally one or more terminals that may be beyond the effective distance of direct cabling to the host computer 1 and may operate anywhere that electromagnetic signals may be communicated, including via the public switched telephone network and cellular phone communication. As mentioned previously, the terminals should be capable of displaying conventional ASCII characters but do not require graphics capabilities, even though the printers used in connection with the present system are capable of generating the graphics of a variety of forms.

Printer 7, shown as connected by cabling to the host computer 1, represents one or more printers within the distance of effective cable runs of the host computer. Desirably a plurality of printers having graphics capability, which are preferably laser or similar high-speed, high quality printers but alternatively may be conventional dot-matrix printers, are provided at spaced-apart locations in the office that are generally in proximity to the various terminals 5, 5a, and 5b.

Printer 8, shown as connected via modem to the host computer 1, represents one or more printers that are off site, and desirably in general proximity to the off-site terminals 6.

Bulk memory is provided by one or more magnetic tape drives 9, which also communicate with the host computer 1.

Audit History Feature

The implementation of the audit history feature is facilitated by the generation of various parts of the software in a strictly uniform format. Each calling program would set up the initial conditions, accept and process the commands the same, and contain a display routine that would display the visual image record and the historical image record simultaneously on the screen to properly represent each image to the operator.

In producing the software for the office automation system of the present invention, it is quite helpful to employ a Computer-Aided Software Engineering (CASE) program generator to create all data input programs. Once the concepts of audit history have been programmed into the CASE tool, every program generated would then include all of the necessary code to properly process audit history. An example of one of the generated programs illustrates the necessary steps:

Program Name BANK.MAIN (Version 3). See APPENDIX B for listing.

FIG. 39 Screen 1/26/90—15:12:13: Screen dump of how the Bank File Maintenance program appears to the screen (including typical bank information; in this instance Chase Manhattan Bank).

APPENDIX B, pages 1-16 Program Listing BANKS$3.MAIN: This is the code generated by the CASE tool and contains the main logic portion of the program.

APPENDIX B, pages 17-19. Program Listing BANKS$3.BGFG: This is the code generated in concert with the ".MAIN" program above that contains all of the data display routines (including the audit history display). The pertinent sections of this program are as follows:

| Lines | Box | Description |
| --- | --- | --- |
| 37-57 | | Display the static background text |
| 58-83 | | Display the current Data Base record |
| 109-134 | 696 | Display the visual and historical image records |
| | 720 | |

Figure 2A:
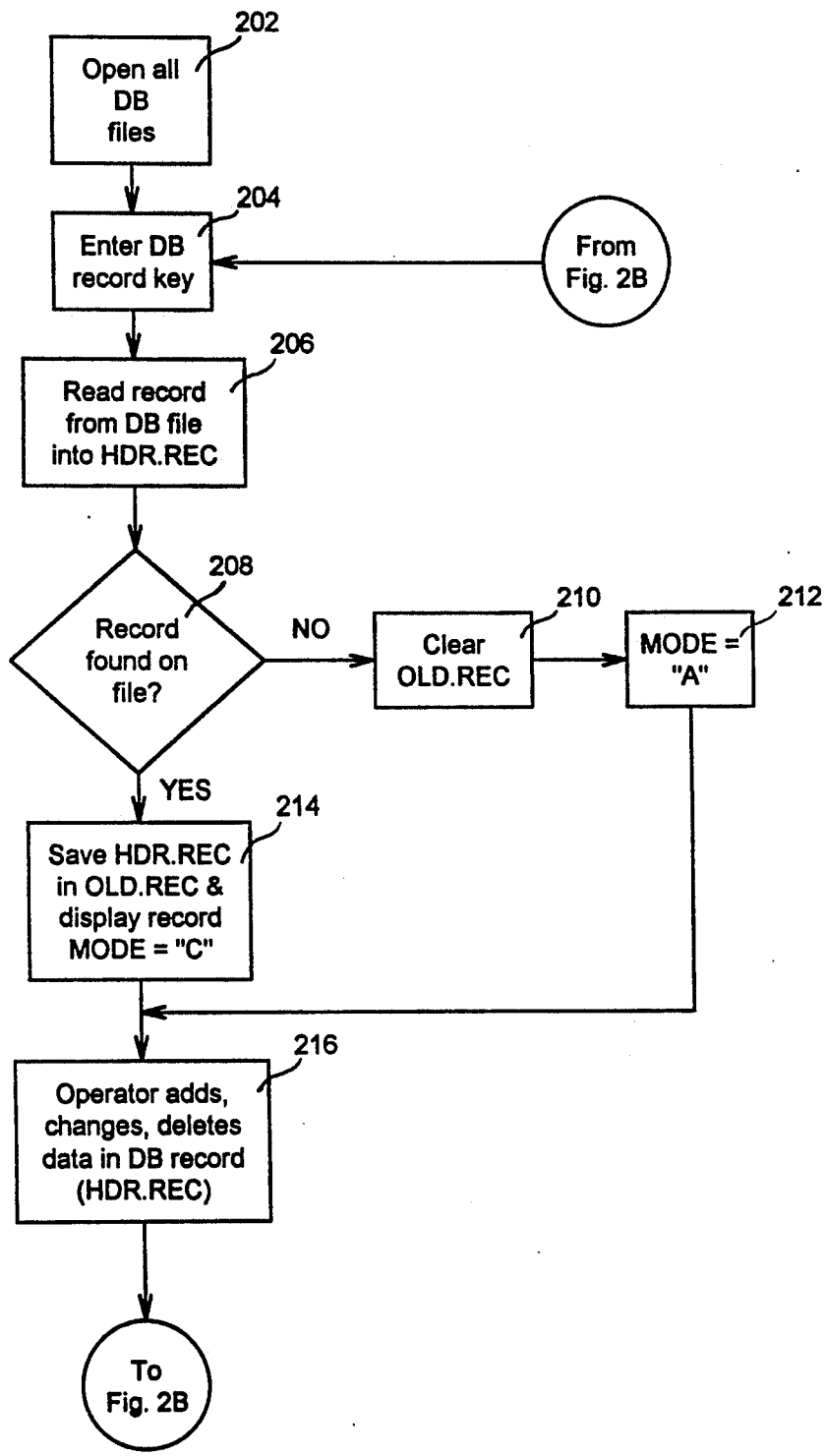
FIGS. 2A and 2B are a block diagram of a typical program that would maintain and display audit history.
Figure 2B:
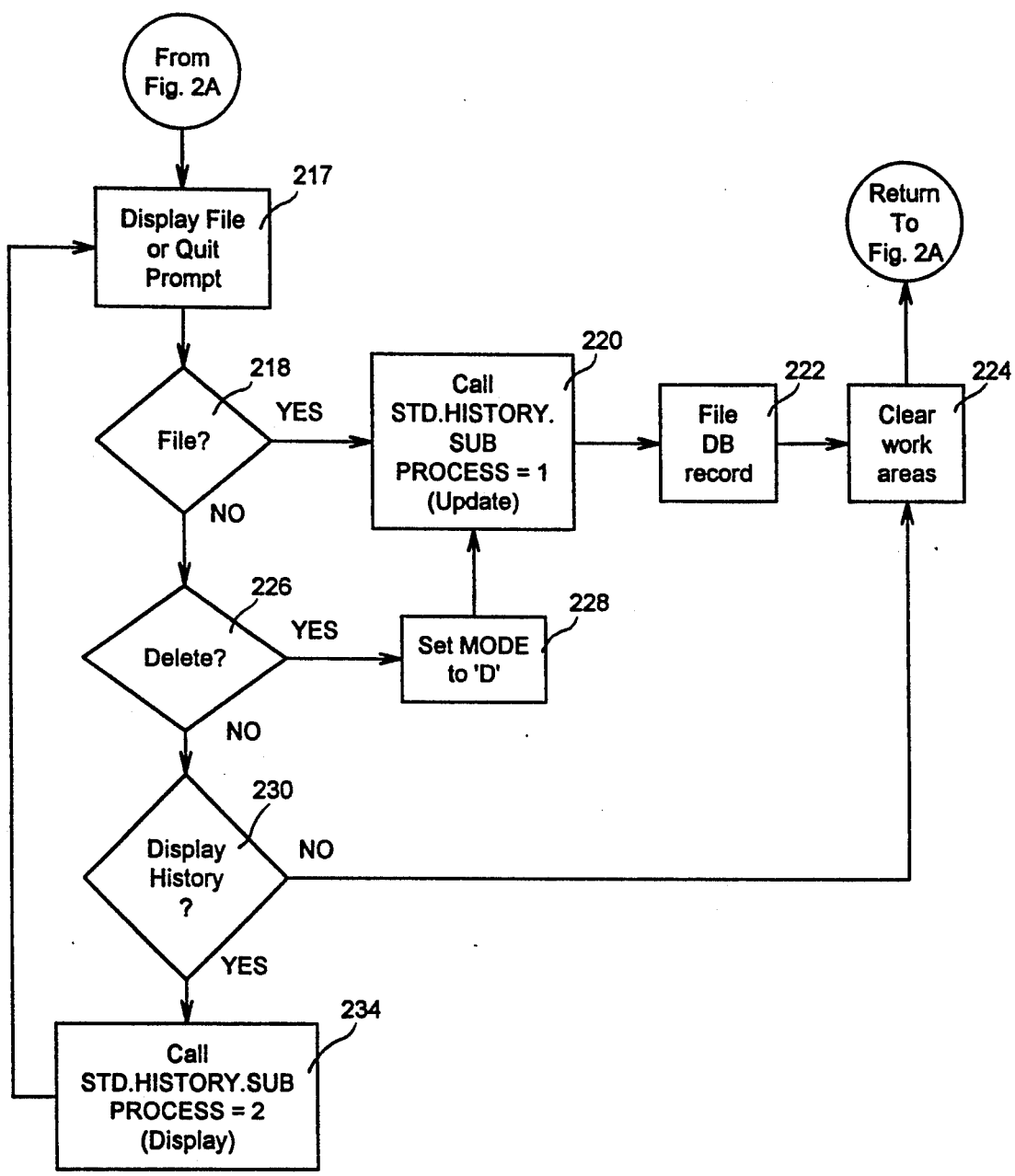
Figure 3:
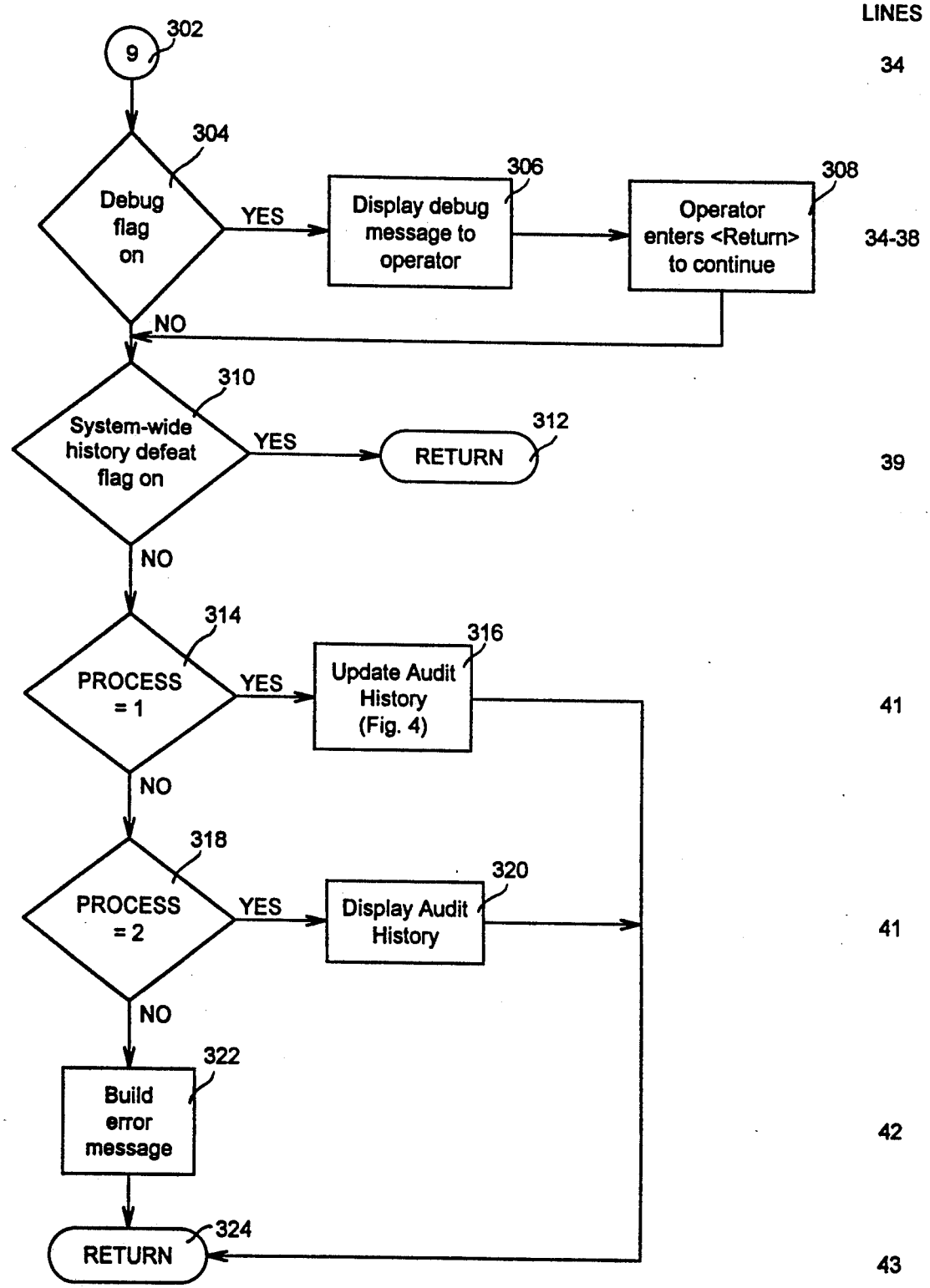
FIG. 3 shows the overall logic flow of the audit history program (STD.HISTORY.SUB) of a preferred embodiment of the present invention.

Please refer to FIGS. 2A and 2B and program listing BANKS$3.MAIN, APP. B.

| Lines | Box | Description |
| --- | --- | --- |
| 41-47 | 202 | Data Base files are opened (including BANKS.HISTORY FILE (line 43) |
| 84-95 | 204 | Operator enters Data Base record key |
| 107-115 | 206 | Program attempts to read DB record from disk |
| 112-115 | 212 | MODE set to "A" |
| 109-111 | 214 | DB record saved in OLD.REC, DB record displayed to the operator, and MODE set to "C" |
| 127-325 | 216 | Operator may enter/change data fields in the DB record. |
| 326-343 | 217 | Operator is prompted for (F)ile, (Q)uit, (R)eview, and various other commands |
| 345-382 | 218 | Operator selects (F)ile. |
| 512 | 220 | File routine calls STD.HISTORY.SUB to update the history file. |
| 513-514 | 222 | DB record is filed to disk |
| 518-546 | 224 | Work areas are cleared to prepare for a new DB key to be entered |
| 394-426 | 226 | Operator selects to delete the DB record |
| 401 | 228 | MODE is set to "D" |
| 402 | 220 | STD.HISTORY.SUB routine is called to update the history file. |

Note: Due to various program efficiency reasons, the recognition of the (R)eview command takes place in another program. This program is used to prompt the operator and return to the calling program the operator's response. The program name is STD.MESSAGE, and a complete program listing is APPENDIX C. The following line numbers refer to line numbers in STD.MESSAGE.

| | | |
|---|---|---|
| 129 | 230 | The operator requests that audit history be displayed. |
| 426–432 | 234 | The STD.HISTORY.SUB program is called after setting PROCESS to 2 to signify that the display routine is to be executed. |
| 433 | | The original screen Background (static text) and Foreground (record data) are displayed. |

FILES REQUIRED:

Each file that is to have history recorded must have a database file to store the current active record and a history file to store the audit history records. In the system of the preferred embodiment, the history file is named XXX.HISTORY where XXX is the name of the database file.

| Data File | History File |
|---|---|
| CLIENTS | CLIENTS.HISTORY |
| POLICIES | POLICIES.HISTORY |
| DRIVERS | DRIVERS.HISTORY |

RECORD LAYOUTS:

Database Record

The layout of the database record has no bearing on the creation of audit history with the following restriction: A field must be designated to hold the Audit Information in the database record. This field will hold the following information:

1. The Initials of the operator who made the change.
2. The System Date that the change was made.
3. The System Time that the change was made.
4. The Audit History Change Number.
5. The Mode of the program:
   A—Adding a new record
   C—Changing an existing record
   D—Deleting a record
6. The name of the program making the change.
7. Any other optional piece of information that the system designer wishes to use as an alternate display sequence.

The database file record will hold the above-described information for the last change entered. Each time a new history record is created, the Audit History information is replaced with new information recording the conditions of the latest change.

Audit History Record

The key to each Audit History record is composed of the key to the database file record and the Audit History Change Number.

Attribute (Field) #1—This field contains the same audit history information as contained in the database file record.

The next two attributes will record the fact that an individual field in the database record was changed as follows:

First Attribute: The specific data field location that has been changed. The operating system that a preferred embodiment of this Audit History is implemented on (the Pick Operating System) has Fields (Attributes), Sub-Fields (Values), and Sub-Sub-Fields (Sub-Values). Each of these is identified by the Attribute Mark Count (AMC), Value Mark Count (VMC), or Sub-Value Mark Count (SVMC). This first attribute will contain the AMC, VMC, and SVMC of the field changed.

Second Attribute: The second attribute of each pair will contain the old contents of the field changed. The new contents are in the database record. If the old contents of the field were Null (empty), then a Delete Mark (ASCII 127) is stored.

Each field changed in the database record will require a pair of attributes in the history record. Additional pairs of fields are added to the history record as necessary to record multiple changes.

When records are added to the database file, the only information recorded is the information in the attribute #1.

When records are deleted from the database file, the audit history record will contain all of the information in the database record just prior to deletion.

The following examples will demonstrate the file layout of a typical Audit History transaction:

| AMC Key | DB RECORD FIELD CONTENTS (BEFORE) MURD023MA |
|---|---|
| 1 | DMM |
| 8900 | |
| 14123 | |
| C | |
| 4 | |
| CP.100 | |
| 2 | Megan M. Murdock |
| 3 | 123 Main St. |
| 4 | Anywhere |
| 5 | New Jersey |
| 6 | 07003 |
| 7 | 201-429-7733 |

Three changes will be made to this record.

1. Expand the middle initial to the complete middle name
2. Change "Anywhere" to "Bloomfield"
3. Remove the telephone number

| AMC Key | DB RECORD FIELD CONTENTS (AFTER) MURD023MA |
|---|---|
| 1 | DMM |
| 8935 | |
| 16274 | |
| C | |
| 5 | |
| CP.100 | |
| 2 | Megan Maria Murdock |
| 3 | 123 Main St. |
| 4 | Bloomfield |
| 5 | New Jersey |
| 6 | 07003 |
| 7 | (empty) |

The Audit History record created to record this transaction will be as follows:

| AMC Key | AUDIT HISTORY FIELD CONTENTS MURD023MA*5 |
|---|---|
| 1 | DMM |
| 8935 | |
| 16274 | |
| C | |
| 5 | |
| CP.100 | |
| 2 | 2 |
| 3 | Megan M. Murdock |
| 4 | 4 |
| 5 | Anywhere |
| 6 | 7 |
| 7 | |

| AMC Key | AUDIT HISTORY FIELD CONTENTS MURD023MA*5 |
|---|---|
| 8 | 201-429-7733 |

Notes: Attribute 1 of the Audit History record is identical to the Audit History Attribute in the database record (Attribute 1 in this case). Each attribute changed in the database record requires two attributes in the Audit History record. One records the Attribute Mark Count (field number) and one records the old contents of the field. The key to this history record is composed of the key to the database record and the Audit History Change Number.

INITIAL CONDITIONS IN CALLING PROGRAM

Any program that is to call the history routine (STD.HISTORY.SUB) must initialize the following variables:

HDR.REC: This is an array that contains the record as it has been changed by the program.

OLD.REC: This is an array that contains the record as it existed just after this program read the data record.

MODE: This is the Program Mode as specified above (A)dd, (C)hange, or (D)elete.

HIST.FILE: This is the internal file name (opened).

INT.HDR.KEY: This is the key of the database record.

MAX.AUDIT: This is the highest Attribute number (Field number) to be processed by the audit history routine. All fields above this limit are cleared and ignored.

ADDL.HIST.DATA: This is the optional additional information that the developer may designate as additional auditing information to be included.

PROCESS: This flag is set by the program depending on which function the program is to perform. If set to one (1), the program will perform the audit history update function. If set to two (2), the program will display any audit history that exists for the record as specified by INT.HDR.KEY.

CHANGE.HIST: This indicator is set to the Attribute Number of the DB record that will hold the audit history information.

CALLING PROGRAM NARRATIVE

The process starts with the calling program (FIGS. 2A and 2B). This program will open all necessary database and history files 202. The operator will be prompted for and enter the key to a DB record 204. The program will store the response in INT.HDR.KEY and attempt to read the record from the DB file. If the record is not found in the file 208, the program will clear OLD.REC 210 and set the program MODE to "A" 212. If the record is found, the program will save the initial image of the DB record in OLD.REC 214.

At this point the operator has the ability to enter new information (Add Mode) or change existing information (Change Mode) 216. Once all additions or changes have been made, the program will prompt the operator to (F)ile the record, (D)elete the record, (Q)uit without saving any changes made, or (R)eview the audit history 217. If the operator responds (F)ile 218, the program will set the PROCESS flag to 1 (Update) and call STD.HISTORY.SUB 220, write the DB record back to disk 222, clear the work areas 224 and return to prompt the operator for another DB record key 204. If the operator responds (D)elete 226, the program will change the program mode from (A)dd to (D)elete 228 and then call STD.HISTORY.SUB to update 220. If the operator responds (R)eview 230, the program will set the PROCESS flag to 2 and call STD.HISTORY.-SUB 234 to display the audit history for the record and then return to the (F)ile, (D)elete, (R)eview prompt 217.

STD.HISTORY.SUB MAIN LOGIC NARRATIVE (FIG. 3)

If the programmer is debugging the calling program and has set the DEBUG.FLAG on, the program will halt and allow the operator (programmer) to set debug points in the program 304-308. If the system-wide history defeat flag has been set 310, then this installation of the Office Automation System is not maintaining history on any files, and the program will return to the calling program with no further processing 312. If the calling program has set the PROCESS flag to one (1) 314, then the program will execute the audit history update routine 316 and return to the calling program 324. If the calling program has set the PROCESS flag to two (2) 318, then the program will execute the audit history display routine 320 and return to the calling program 324. If the PROCESS flag is not set to either one or two, the program will return to the calling program 324 after setting an error condition 322.

Figure 4A:
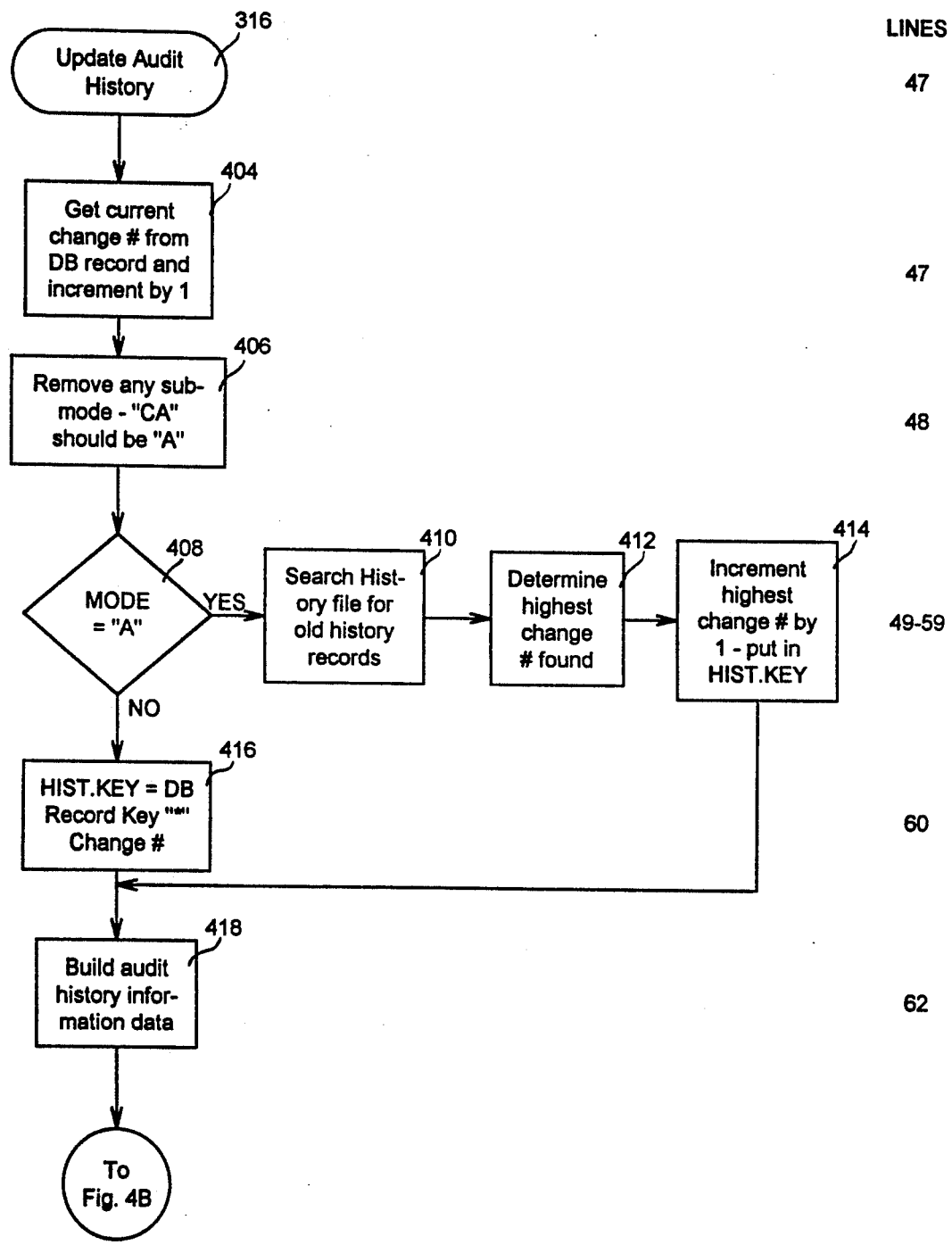
FIGS. 4A to 4I are a logic diagram of the updating portion of the audit history program.
Figure 4B:
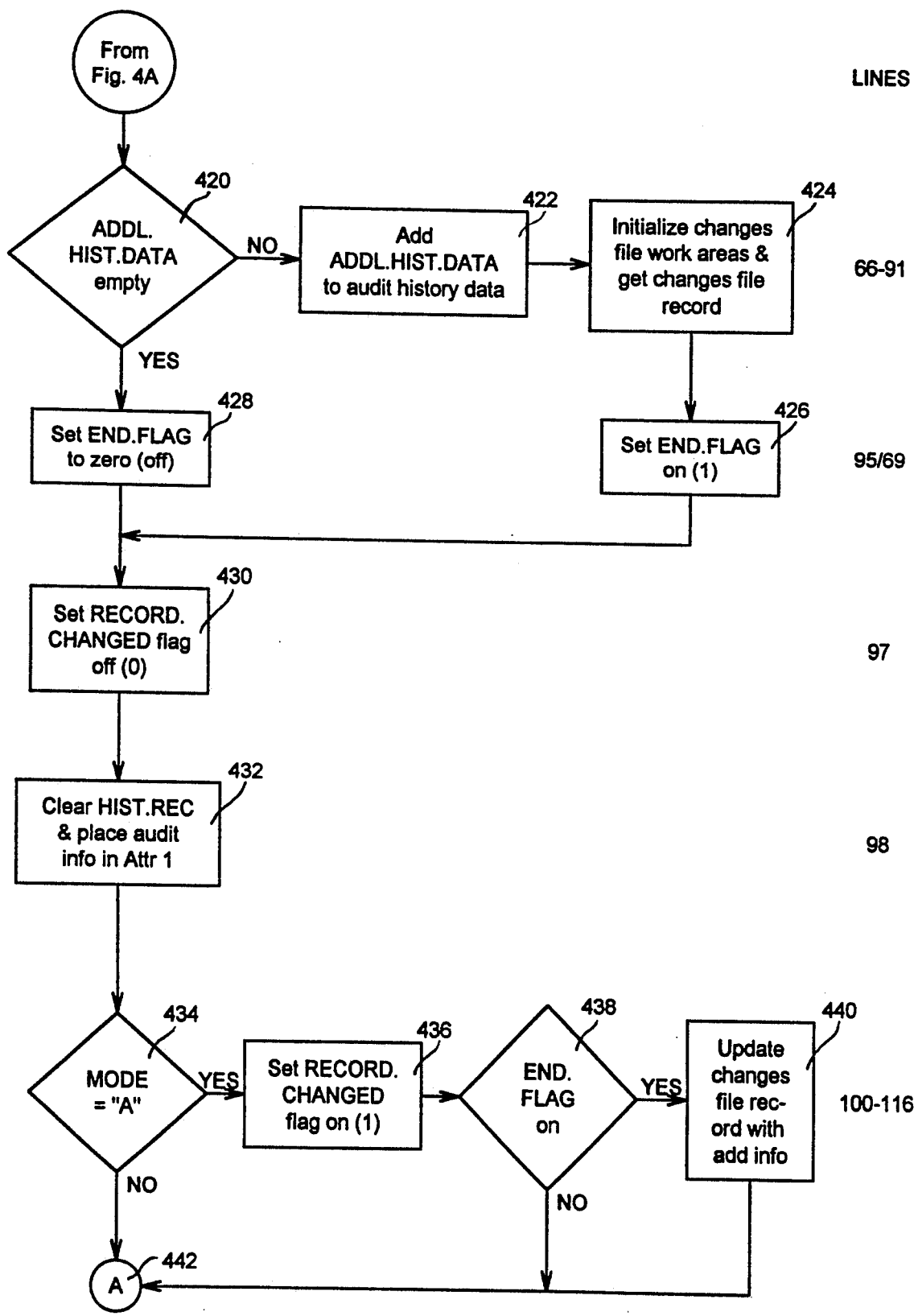

STD.HISTORY.SUB UPDATE LOGIC NARRATIVE (FIGS. 4A and 4B)

The program will determine the CHANGE.NO of the new audit history record (if any is ultimately created) by retrieving the last change number from the DB record's audit information and incrementing it by one 404. The program then will resolve any sub-Mode changes that might have taken place in the calling program 406. If the program mode is (A)dd 408, then the program will search the history file to see if this record had been deleted from the file at an earlier point 410, determine the highest change number found on the old record 412, and increment it and save the result in CHANGE.NO 414. The program will then specify the key of this audit history record 416 by constructing the history key as INT.HDR.KEY,*CHANGE.NO as determined by step 404 or steps 410-414.

Next, the program will build the new audit history information string that will ultimately be stored in the DB record and in Attribute 1 of the audit history record 418. If the developer of the calling program has specified any additional information to be included 420, the program will add the contents of ADDL.HIST.DATA to the audit history data string 422, and initialize the Changes file to prepare to accept history information 424 and 426. At this point the program initializes various flags and work areas 430, and loads the audit information into the new audit history record 432.

If the program MODE was (A)dd 434, then there is no need to examine each data field. It is given that all fields are new. The program will set the RECORD.-CHANGED flag on 436, and if the END.FLAG (set in step 424) is on 438, updates the changes file with information about the record being added 440. The program will then continue with step 540 (See FIG. 4I).

Figure 4C:
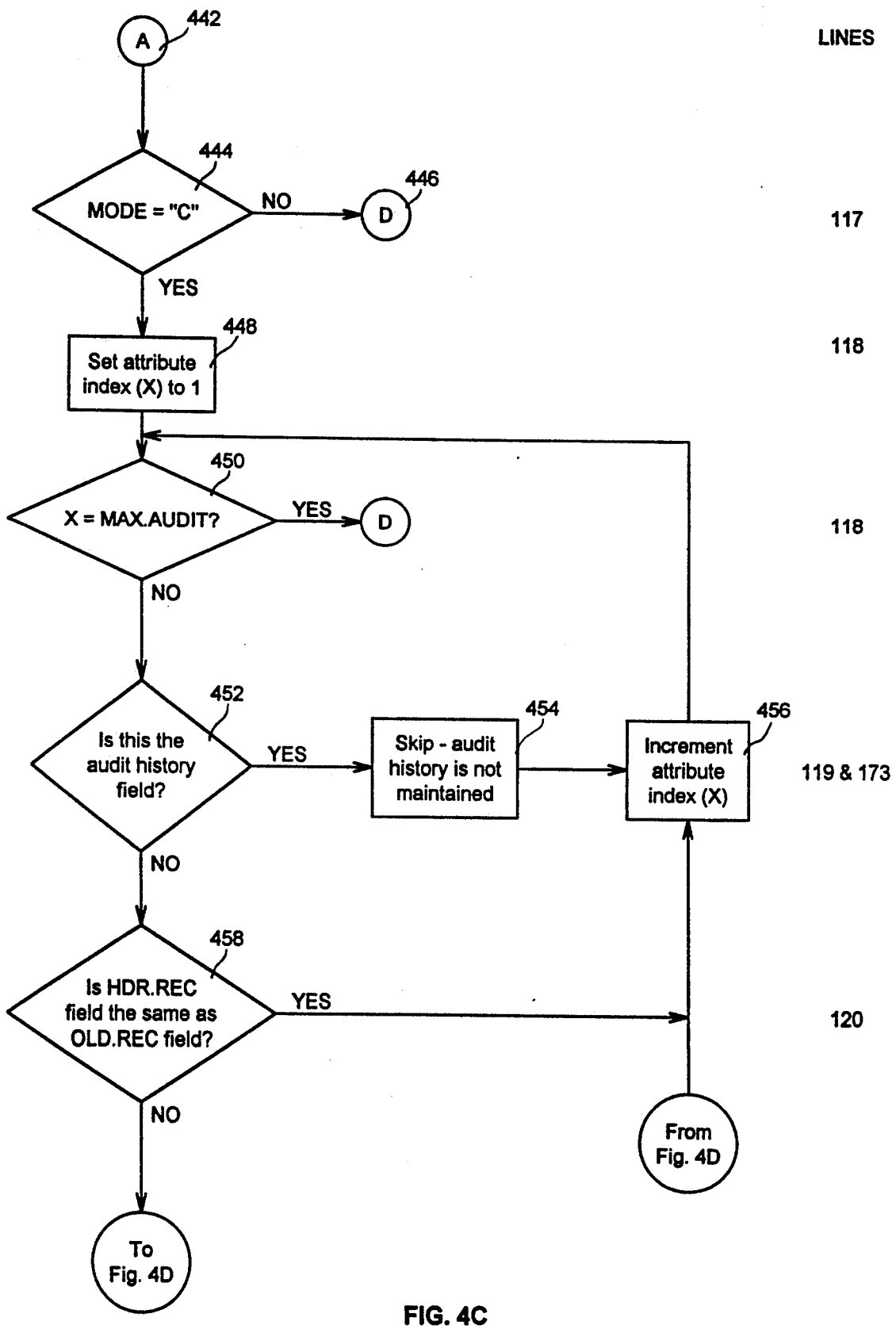
Figure 4D:
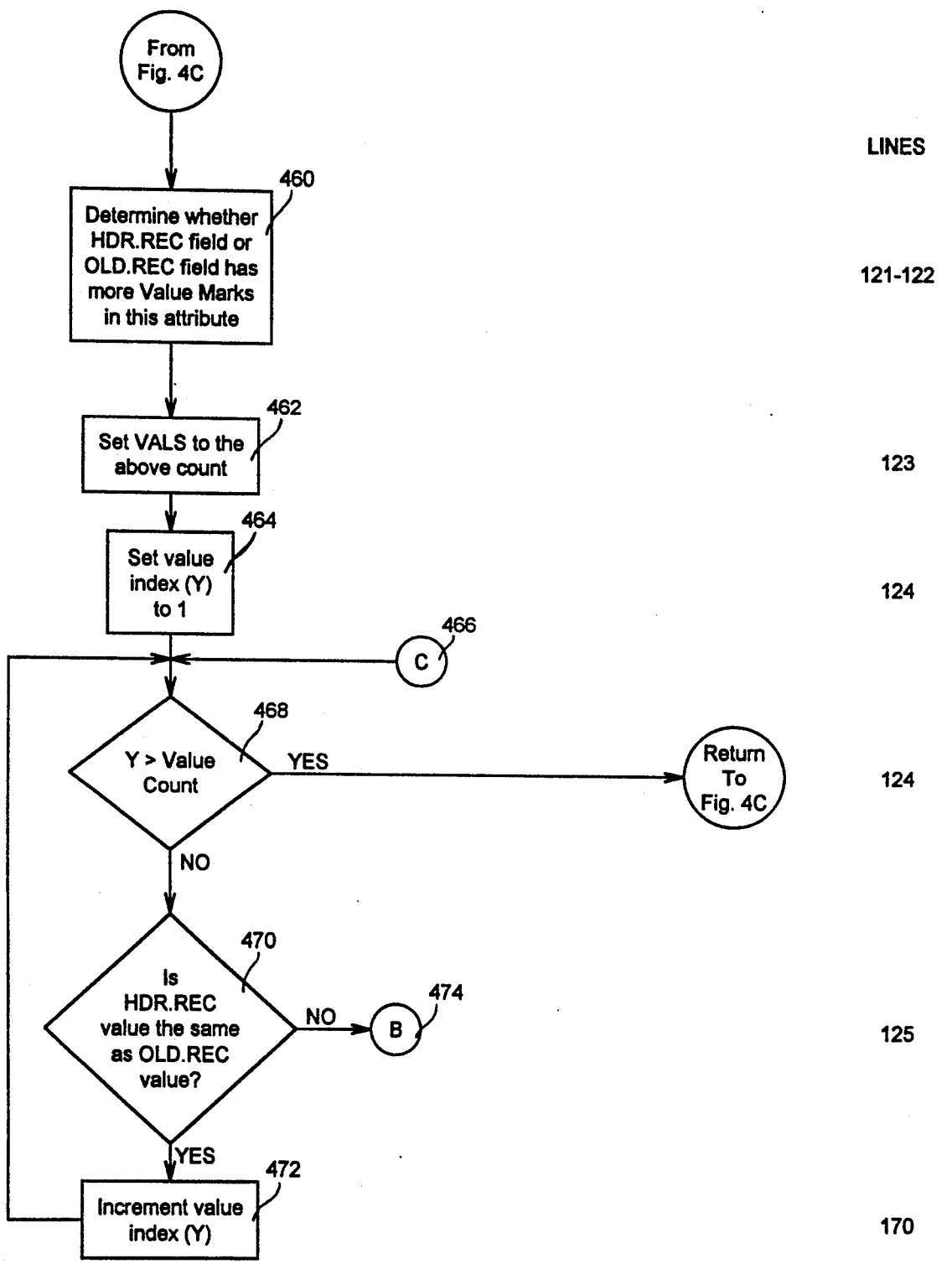

Refer to FIGS. 4C and 4D. If the program MODE is (C)hange 444, then each Attribute (Field), Value (Sub-Field), and Sub-Value (field within a Sub-Field) must be examined individually to determine if any changes have been made by the operator to this record. This is accomplished as follows:

The Attribute Index (X) is initialized to one (1) 448, and utilizing a programming "FOR-NEXT" loop, each Attribute is examined individually. If the loop logic has reached the last field to be processed 450, then the program will continue with step 540 (See FIG. 4I). The program is also designed to skip over the field that holds the audit history information in the DB record 452-456. Each Attribute is examined as a whole 458 to see if there are any differences between OLD.REC (the record as it existed when first read by the calling program 214) and HDR.REC (the record as it exists after the operator made any changes). If the are no differences 458 then no further checking is needed for this Attribute and the next Attribute may be examined 456. If there are differences, then additional checking is required at a Value level. The program will determine whether this Attribute is broken down into Values by counting the number of Value Marks (ASCII 253) that separate the Values 460. If none are found, the program will treat this Attribute as having one Value. This value count is then used by another "FOR-NEXT" loop to examine each Value within the Attribute 462-468. Each Value is examined individually. The Value in OLD.REC is compared to the Value in HDR.REC and if they are the same 470, then no additional checking must be performed on this Value and the next Value may checked 472.

Figure 4E:
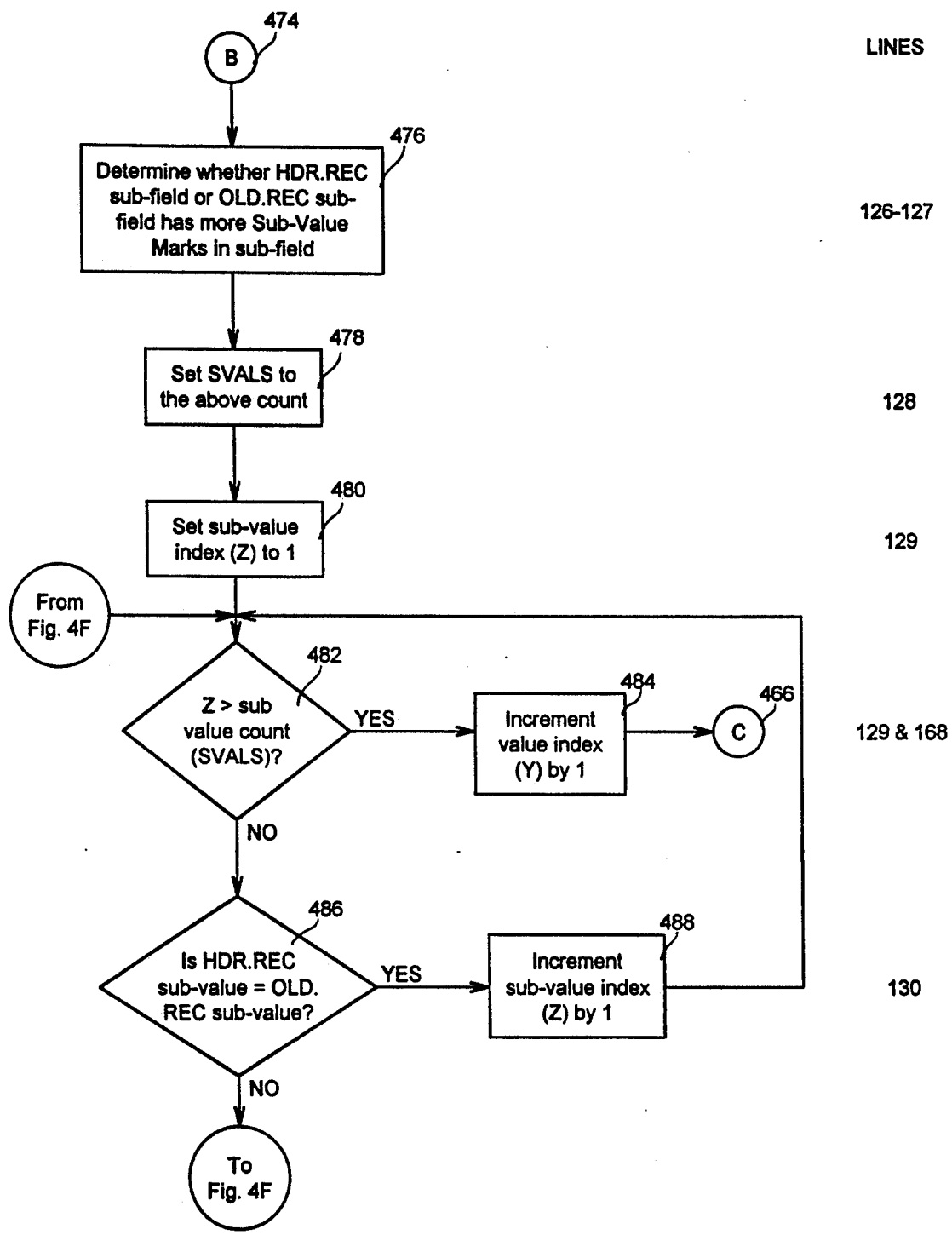
Figure 4F:
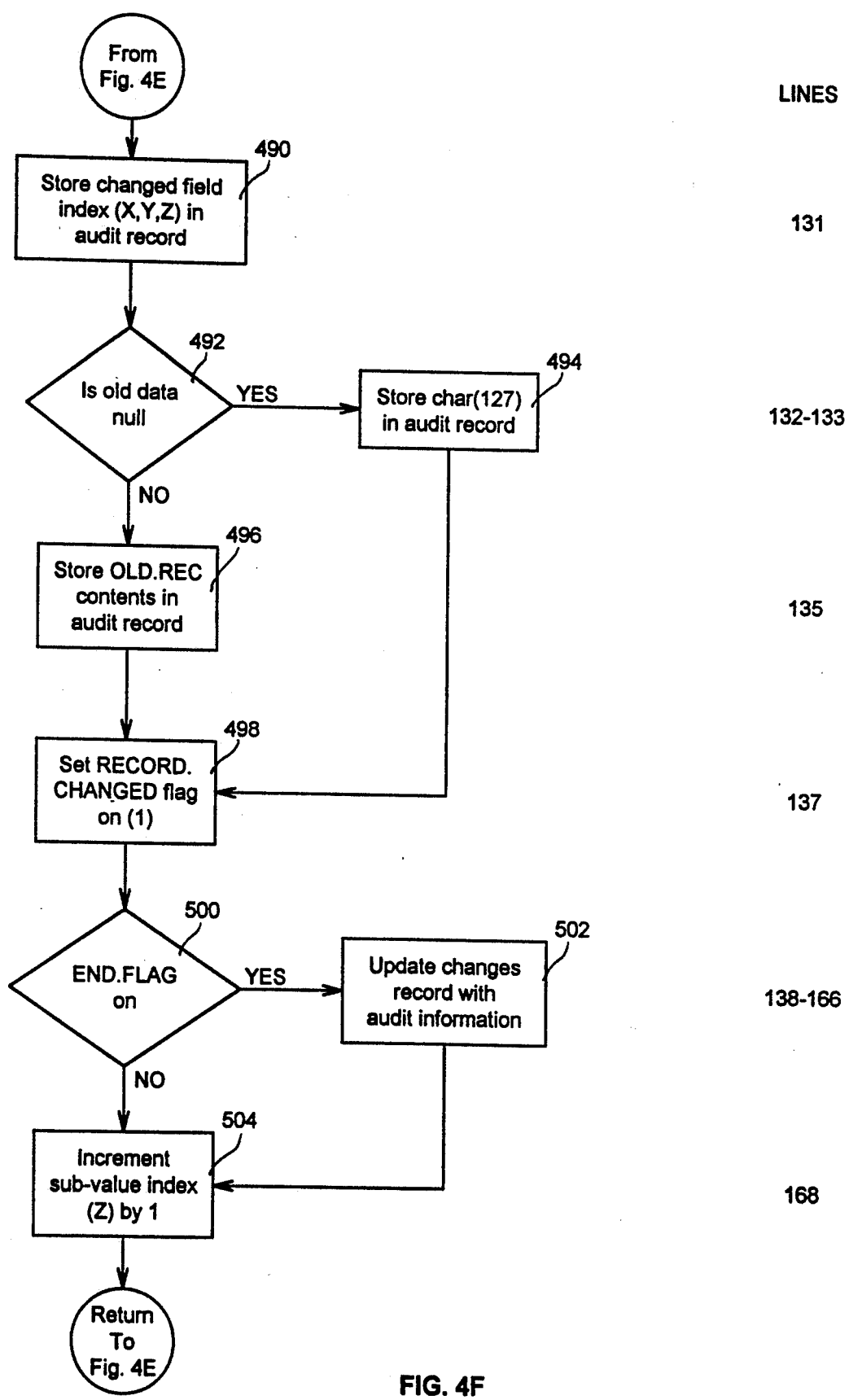

Refer to FIGS. 4E and 4F. If there are differences, then additional checking is required at a Sub-Value level. The program will determine whether this Value is broken down into Sub-Values by counting the number of Sub-Value Marks (ASCII 252) that separate the Sub-Values 476. If none are found, the program will treat this Value as having one Sub-Value. This value count is then used by the third and last "FOR-NEXT" loop to examine each Sub-Value within the Value 478-482. Each Sub-Value is examined individually. The Sub-Value in OLD.REC is compared to the Sub-Value in HDR.REC and if they are the same 486, then the next Sub-Value is examined. If they are different, then the location of the changed data (Attribute Mark Count (AMC), Value Mark Count (VMC), and Sub-Value Mark Count (SVMC) is stored in the next available Attribute in the Audit History record 490. If the data field in OLD.REC is Null (empty), then an ASCII 127 is stored in the Audit History record. Otherwise the actual contents of the field in OLD.REC is stored in the Audit History record 496. In either event, the RECORD.CHANGED flag is set on 498 and the program continues on to check the remaining Attributes, Values, and Sub-Values for additional changes. Once again, if the END.FLAG is "no" 500, the Changes file is updated with a history information. Once all of the Attributes have been examined, the program will continue with step 540 (See FIG. 4I).

Figure 4G:
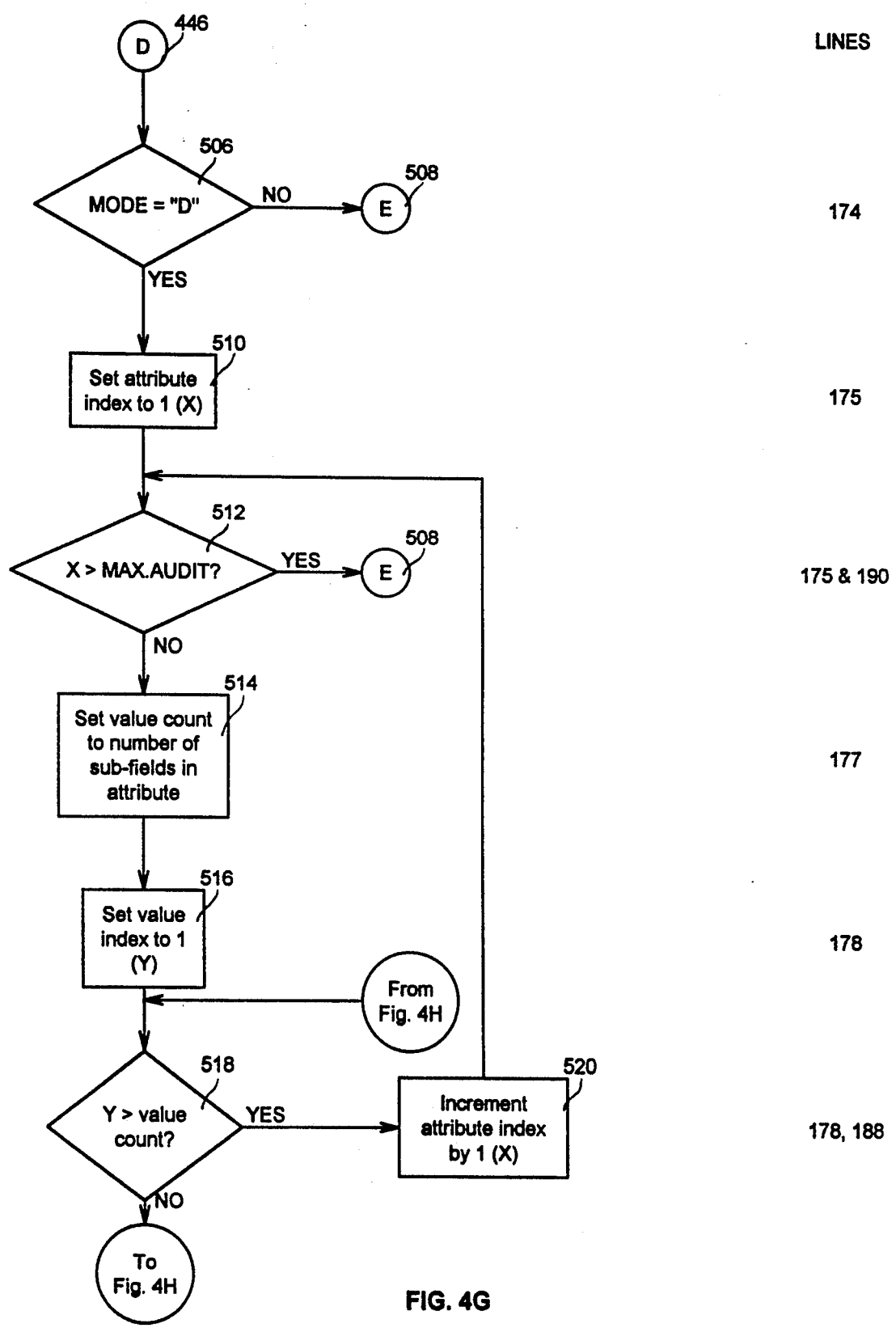
Figure 4H:
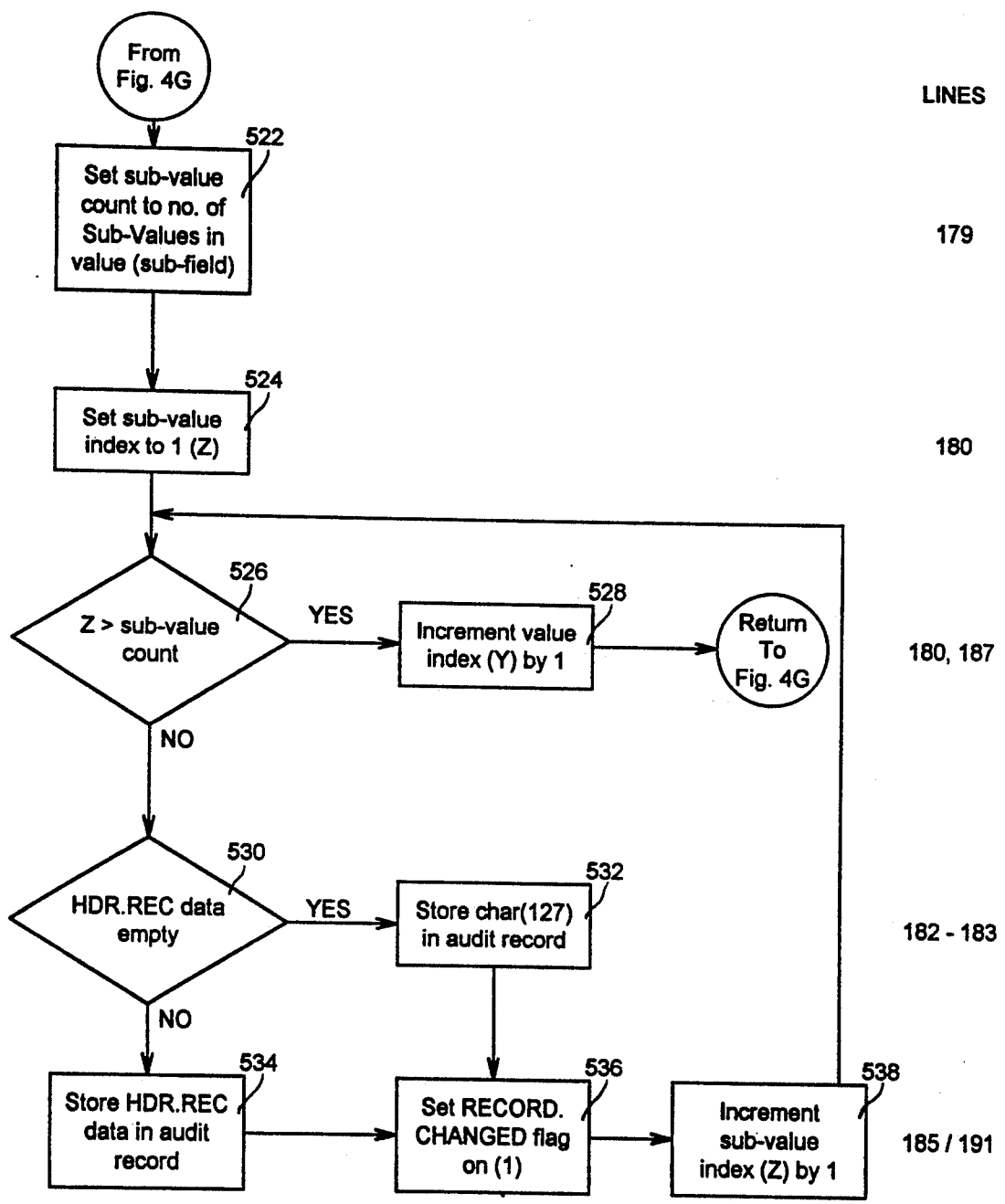

Refer to FIGS. 4G and 4H. If the calling program MODE is (D)elete 506, then each Attribute, Value, and Sub-Value is examined and a complete Audit History record is built of all of the contents found 506-538. The examination method is very similar to the examination as described above and so need not be described in detail.

Figure 4I:
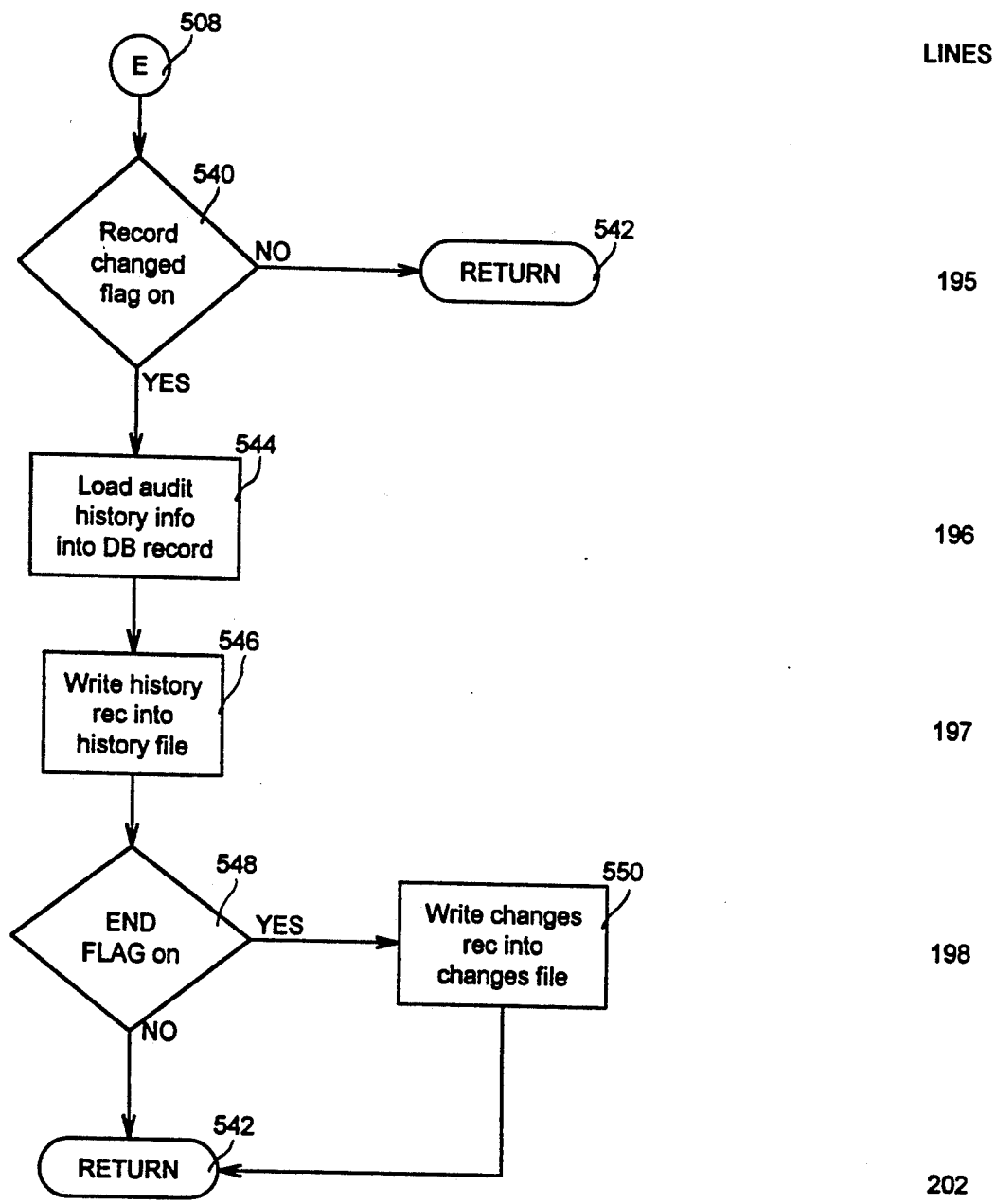

Refer to FIG. 4I. If, after all of the aforesaid checking, no changes have been uncovered 540, the program will return to the calling program with no further processing 542. 15 If changes have been found, then the Audit History Data String (created in step 418-422) is stored in the audit history attribute in the DB record 544 and the Audit History record is written to the History file 546. If the END.FLAG is on 548, then the Changes file record is also written out to the Changes file 550.

Update processing is now complete, and the program returns to the calling program 542.

Figure 5A:
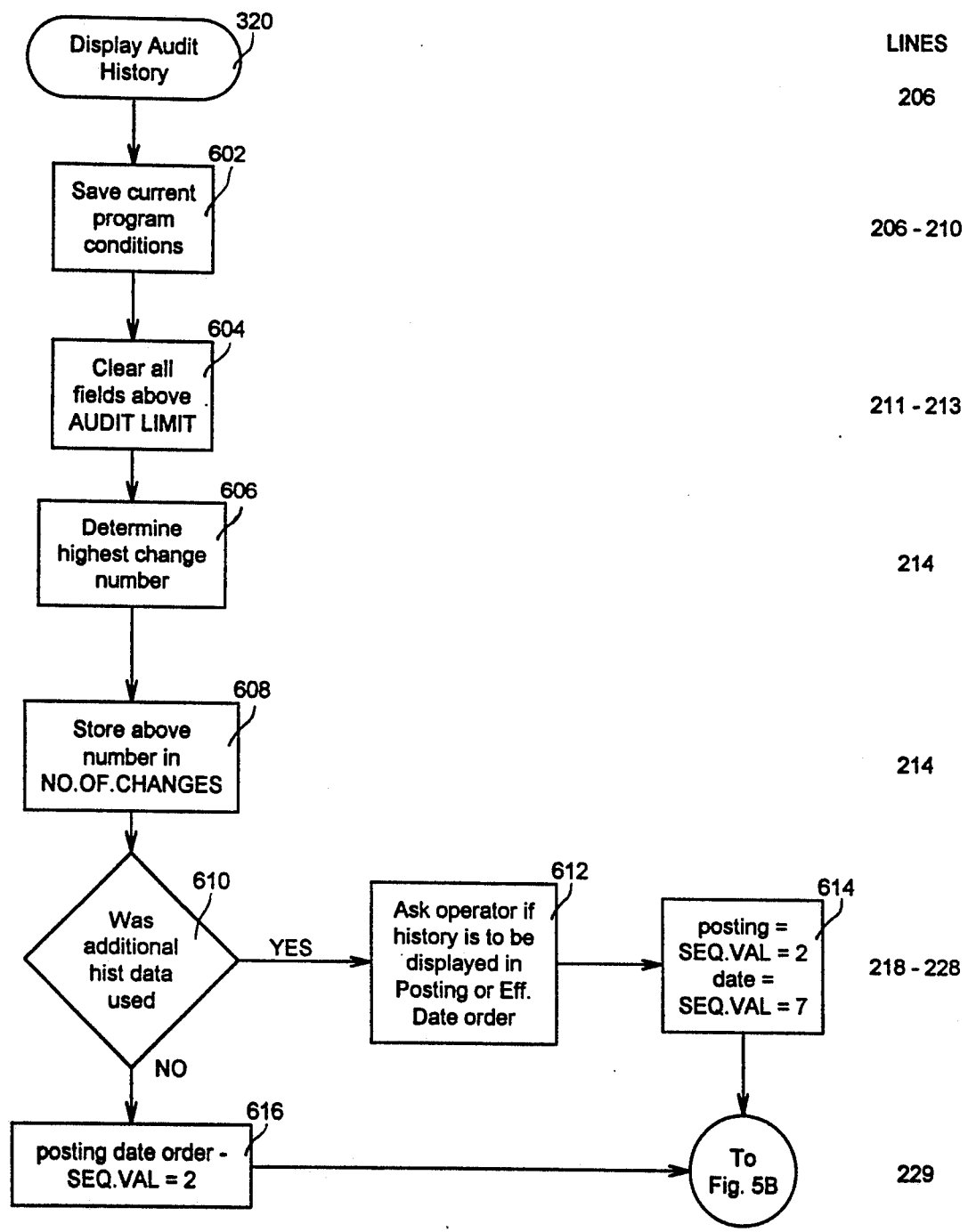
FIGS. 5A to 5K are a logic diagram of the display portion of the audit history program.
Figure 5B:
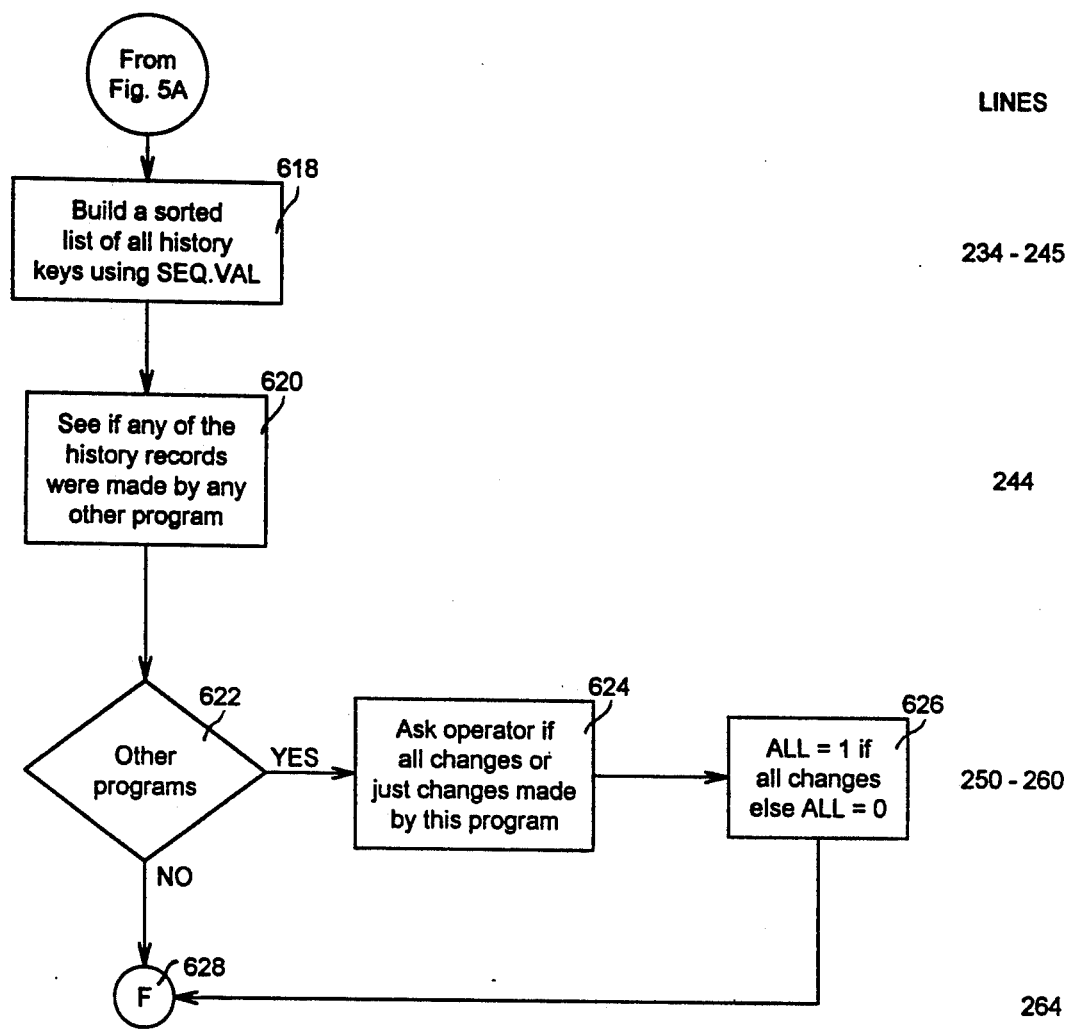

STD.HISTORY.SUB DISPLAY LOGIC NARRATIVE (FIGS. 5A and 5B)

The first step is to save the current program conditions 602, clear all DB record Attributes above the audit limit 604, and determine the last (also the highest) Change Number for this DB record 606. This number is saved in NO.OF.CHANGES 608. If there is Additional History Information stored in the audit history data string 610, the program will request the operator as to the order that the history is to be displayed: in Posting order, or sorted by the Additional History Data supplied 612. If the operator selects posting order, then the sorted key table (built in step 618) will be sorted by Posting Date & Change Number. If the operator selects the alternate order, then the sorted key table will be sorted by the Additional History Data (e.g. the Effective Date of the change). The sorted key table is built 618, and while it is being built, a flag will be set if any other programs other than the calling program have history records 620. If there are history records built by other programs 622, then the operator is asked to indicate if all changes (regardless of which program created then) are to be displayed, or only the changes made by this program 624-626.

Figure 5C:
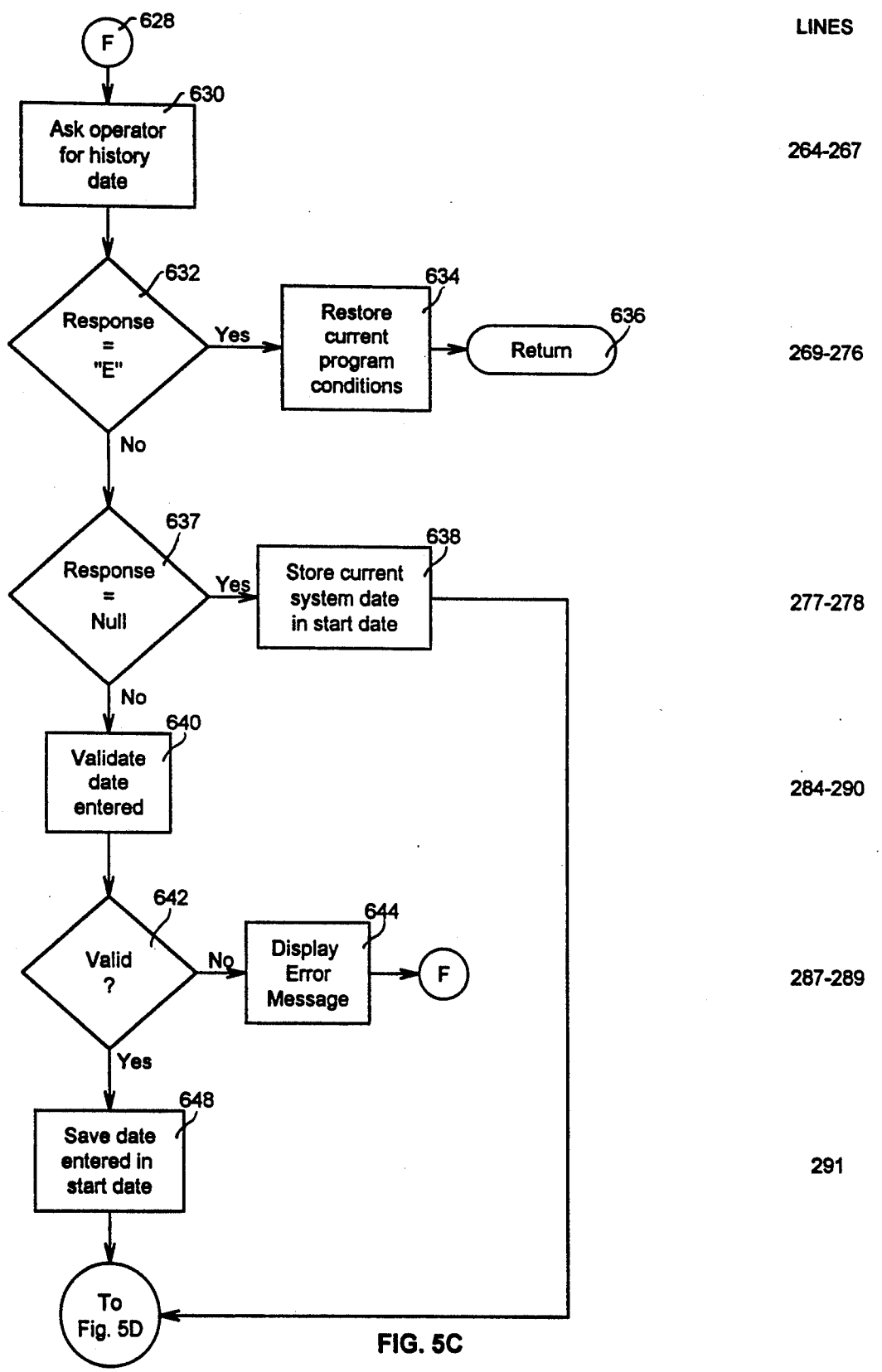
Figure 5D:
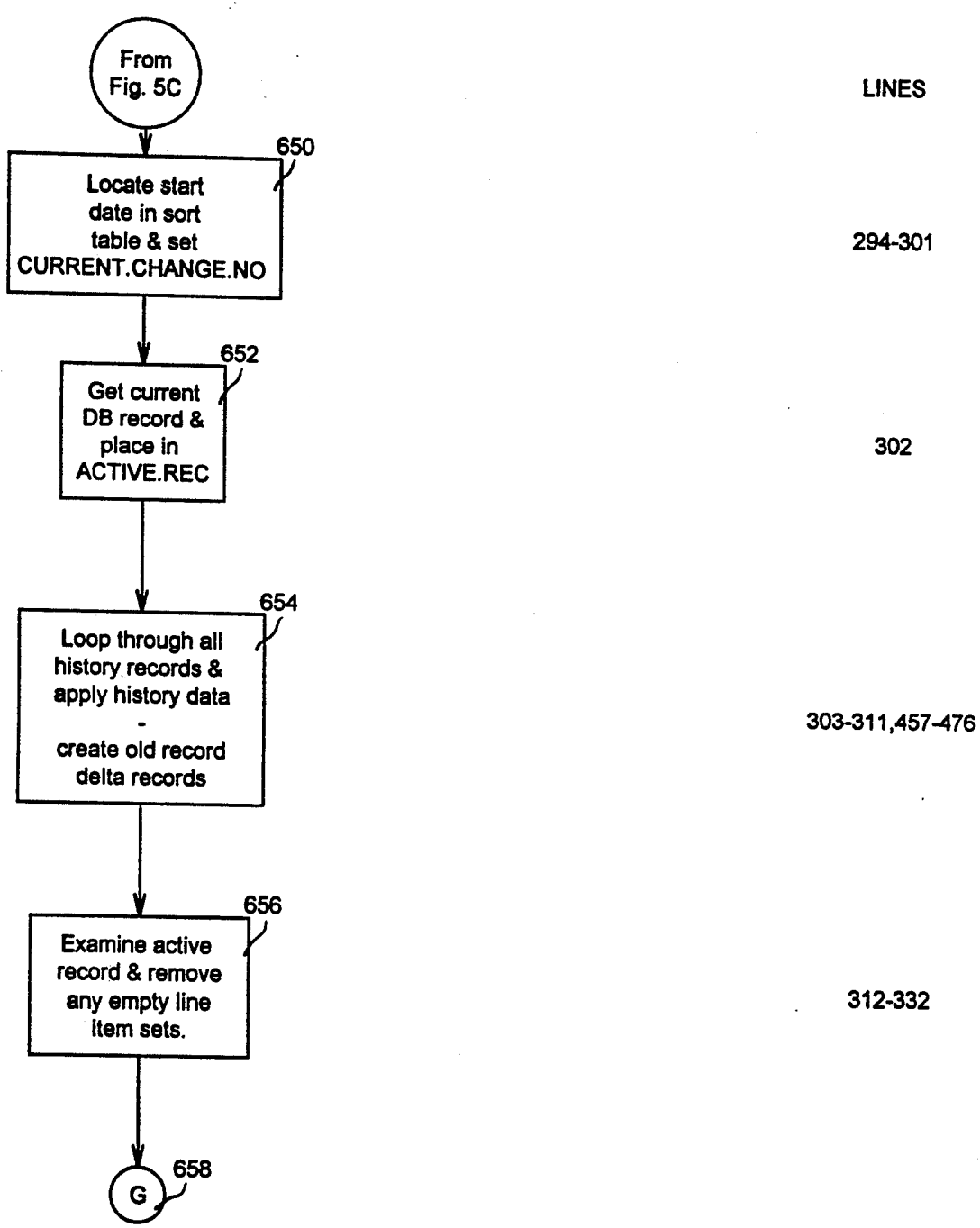

Refer to FIG. 5C and 5D. Next, the operator is requested to enter the date for which the first history image is to be displayed 630. If the response is (E)xit 632, then the program restores the current program conditions 634 and returns to the calling program 636. If the response is Null (Return key only is pressed) 637, then the program will store today's date (the system date as maintained by the computer) 638 as the starting date. If a date is entered, it is validated for accuracy 640 and saved as the start date 648. The correct entry in the sorted key table is located using the start date as determined above 650.

At this point, the current active DB record is read from disk and saved in ACTIVE.REC 652. Since the Audit History records store the old contents of any changed field, new temporary history records need to be created which contain the new changed data 654. These delta records are identical in format to the Audit History records except that the data saved is the NEW contents instead of the OLD contents. As these delta records are being built, the program is regressing the ACTIVE.REC to its original state by re-applying all of the old data contents saved in the history records to the ACTIVE.REC. Once all history records have been applied, ACTIVE.REC now looks exactly as it did the day it was added to the DB file. The original ACTIVE.REC is examined and all empty Line Item Set values are removed. These can cause a false display when changes are contained in a Line Item Set 656.

Figure 5E:
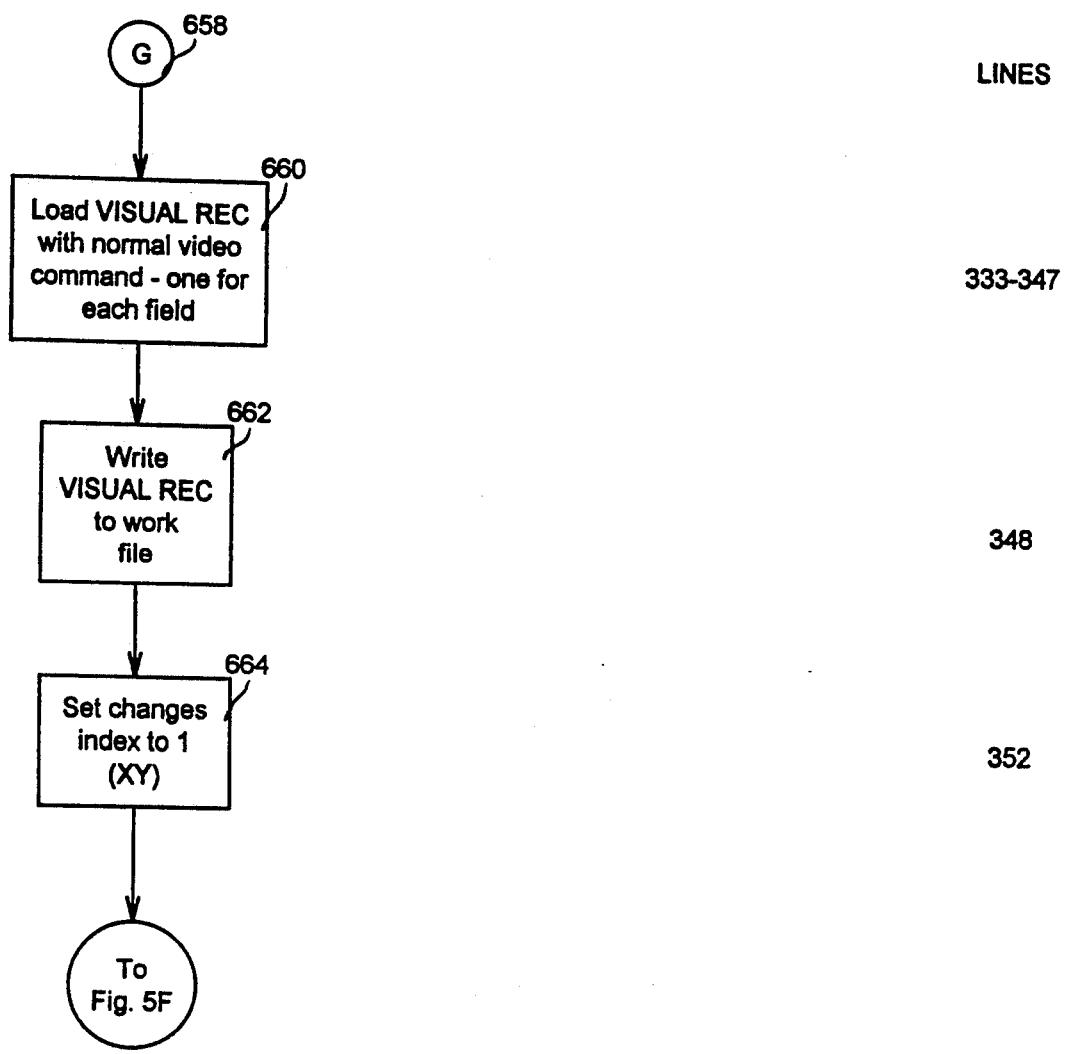
Figure 5F:
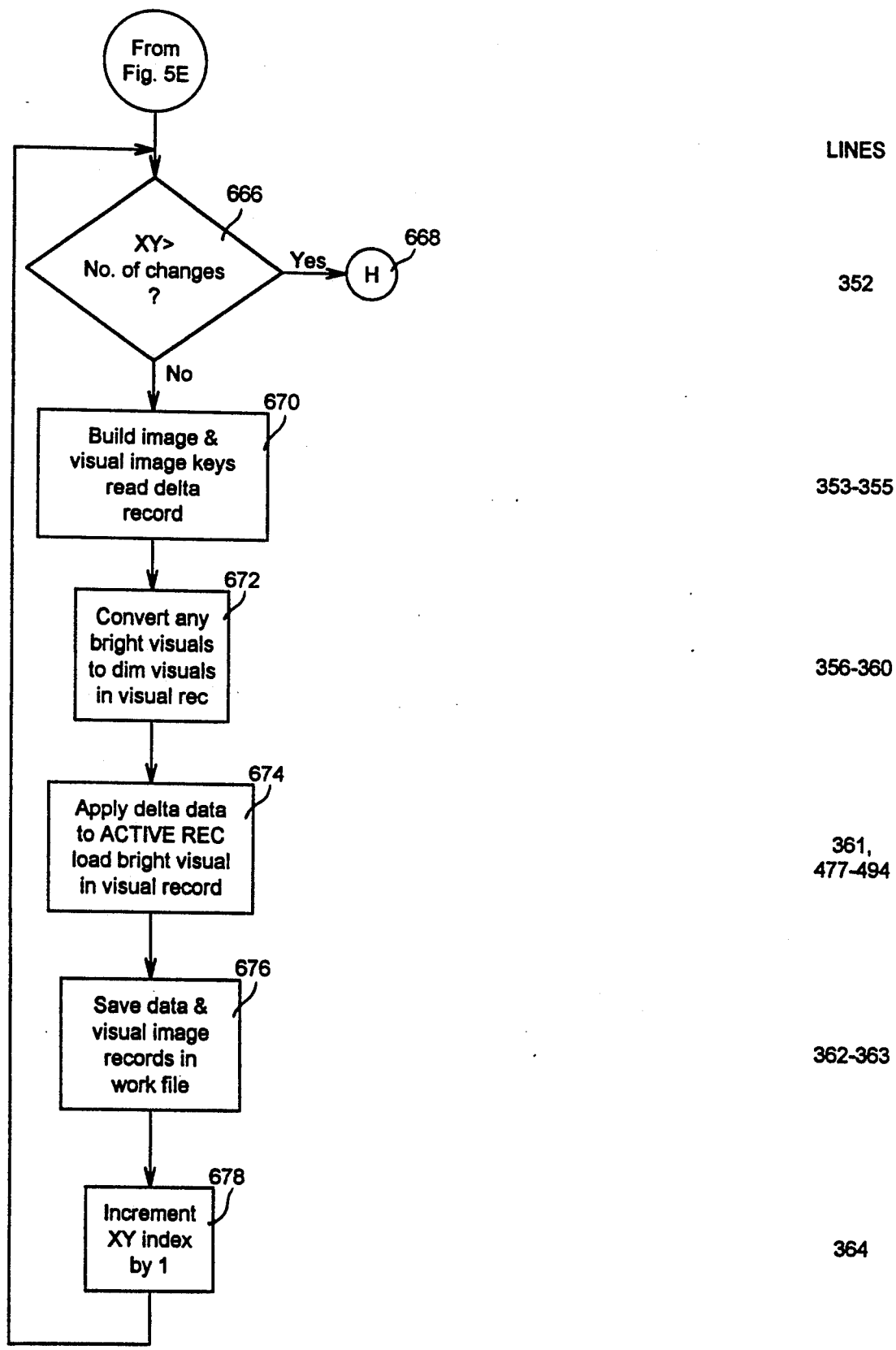

Refer to FIGS. 5E and 5F. The audit history display uses two visual attributes to display the historical images. All changes made to the record are shown in reverse video with the specific change shown in bright reverse video. For example, if the only field changed during one session was the name of a client, then when that specific change is displayed, all of the fields that have changed since the record was created will be shown in reverse video and the client's name will be shown in bright reverse video. See FIG. 6 to FIG. 12, wherein reverse video is represented by one form of shading (darker shade) and bright reverse is represented by another form of shading (lighter shade).

In order to display these two different visual attributes, whenever a historical image record is made using the audit history records, a corresponding visual record is also built to display it properly. The system starts the process by building a visual record using normal video display attributes 660. That visual record is written to a work file 662 as the basic model from which all future visual records will be built. This is the original visual record that will be displayed along with the original ACTIVE.REC built in step 654. To build each historical image, the delta records are processed one at a time and the NEW data is applied to the older record 670-672 and the Visual record is updated in the same corresponding fields 674. This pair (ACTIVE.REC containing the data and VISUAL.REC containing the visual display attributes) is saved in the work file 676. Once completed, there will be two records in the work file for each image of the record. If there had been thirty-two changes to a particular record, there would be thirty-two data image records and thirty-two visual image records at this point.

Figure 5G:
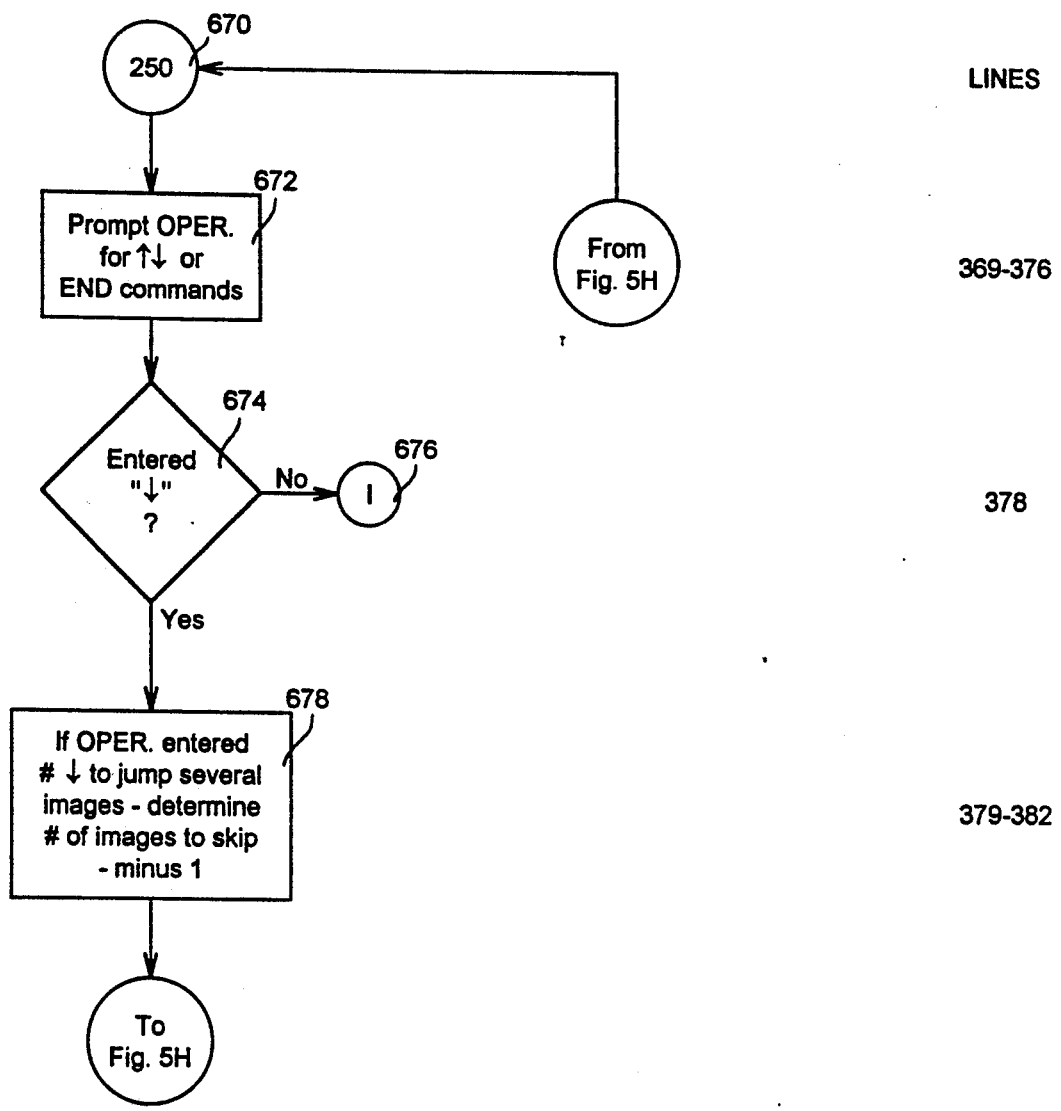
Figure 5H:
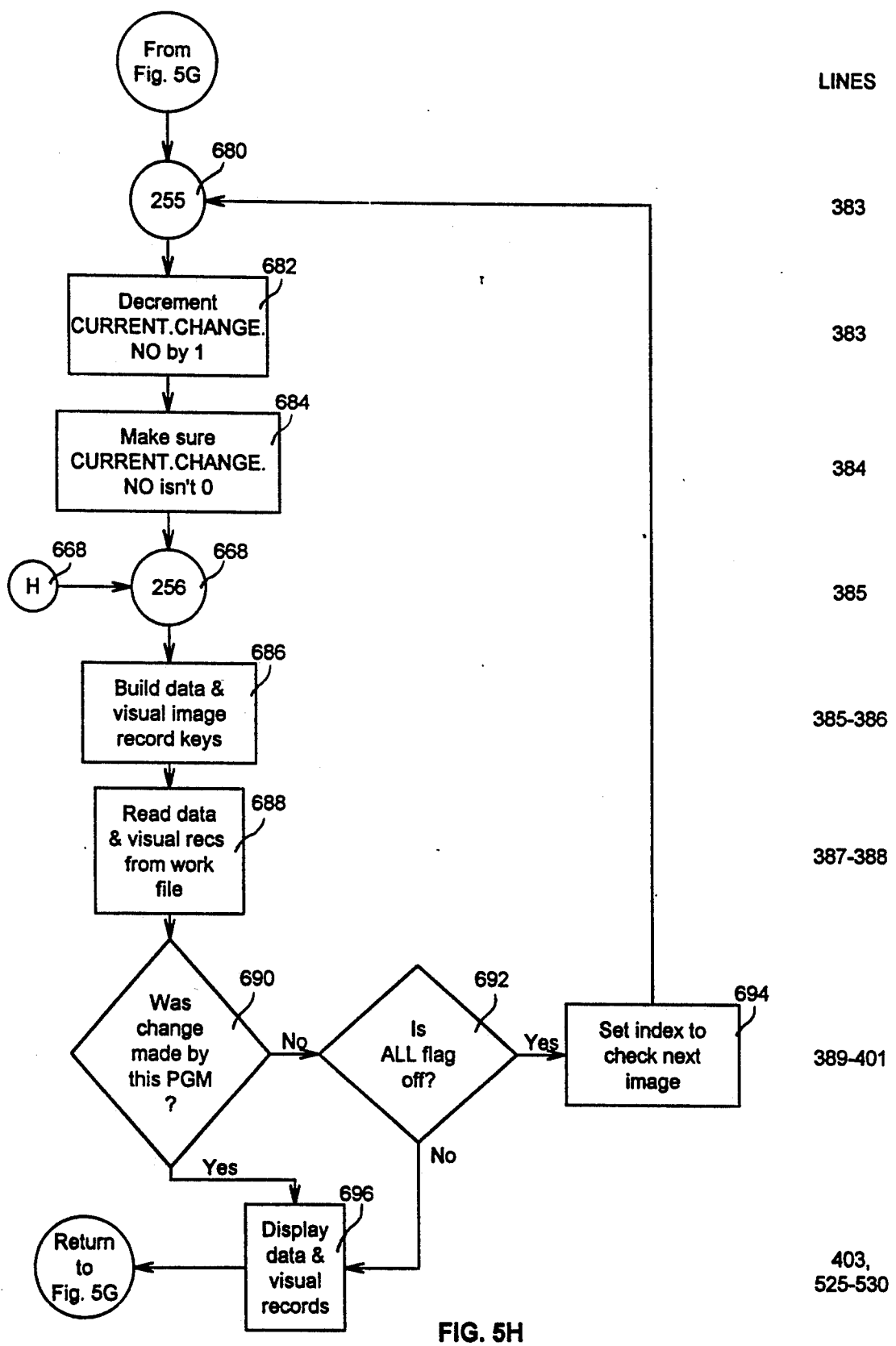

Refer to FIGS. 5G and 5H. Using the starting date entered by the operator in step 630, the correct image is selected from the sorted key table and the calling program's audit history display routine is called to display the data image and its associated visual image 696. If the operator has requested that only changes created by this calling program be displayed, and the image about to be displayed was created by another program 690, then the next sequential image created by this program will be found and displayed 694.

Each calling program that is going to display audit history requires a specific display routine that will display the historical data image and its associated visual image. Preferably when the principles of such a display routine are built into a CASE (Computer Aided Software Engineering) program generator, so that the correct display routines for each calling program are generated automatically.

Once the historical slice has been displayed, the operator is prompted for the next display command 672. If the operator enters a (down arrow) 674 either as a single character or in the format of #(down arrow), the program will regress the images back in time 678-696. In the aforesaid entry, if the operator enters 5(down arrow), then the program will regress back five (5) images. If no number is entered, then the regression will take place one image at a time.

Figure 5I:
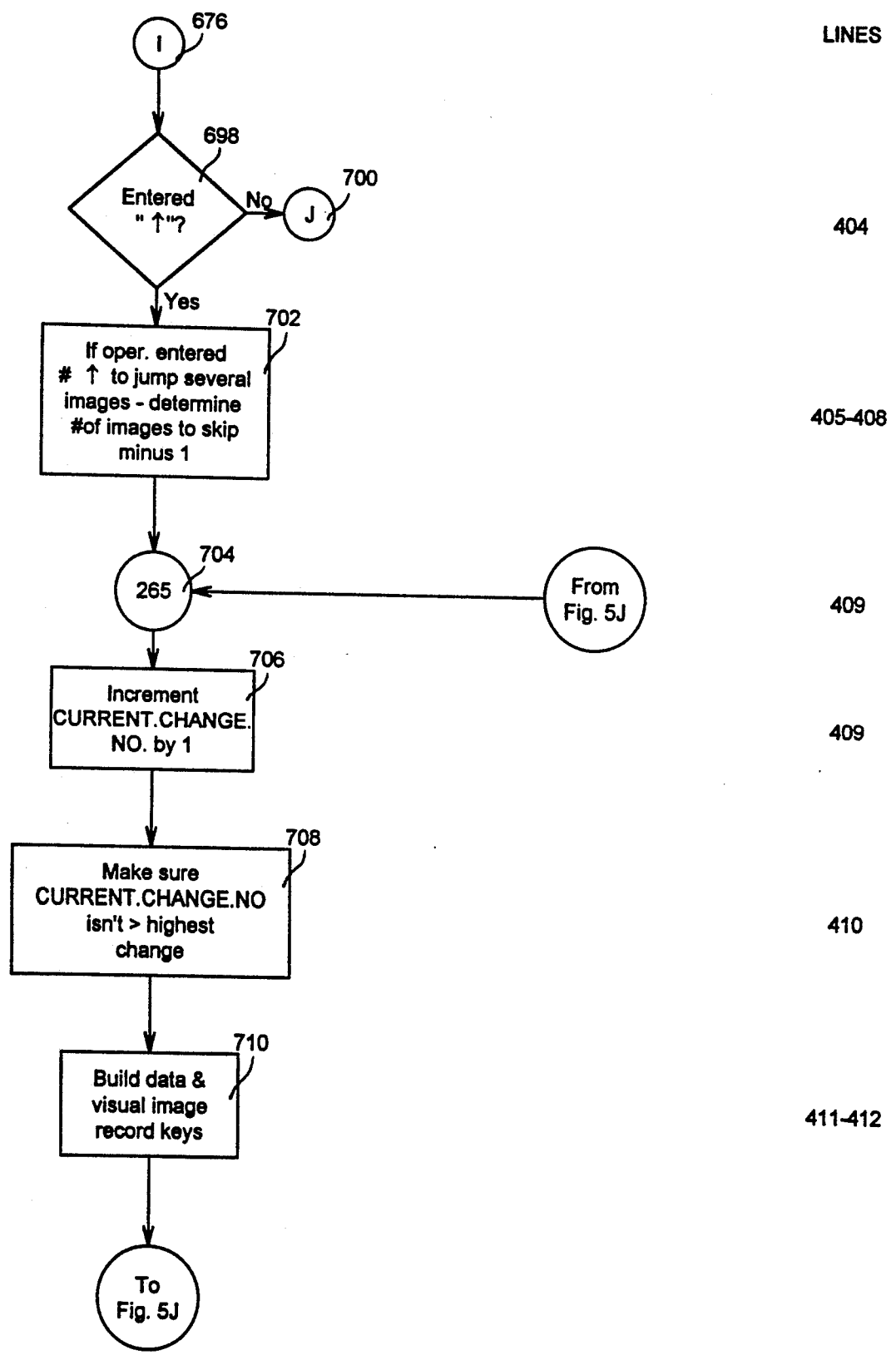
Figure 5J:
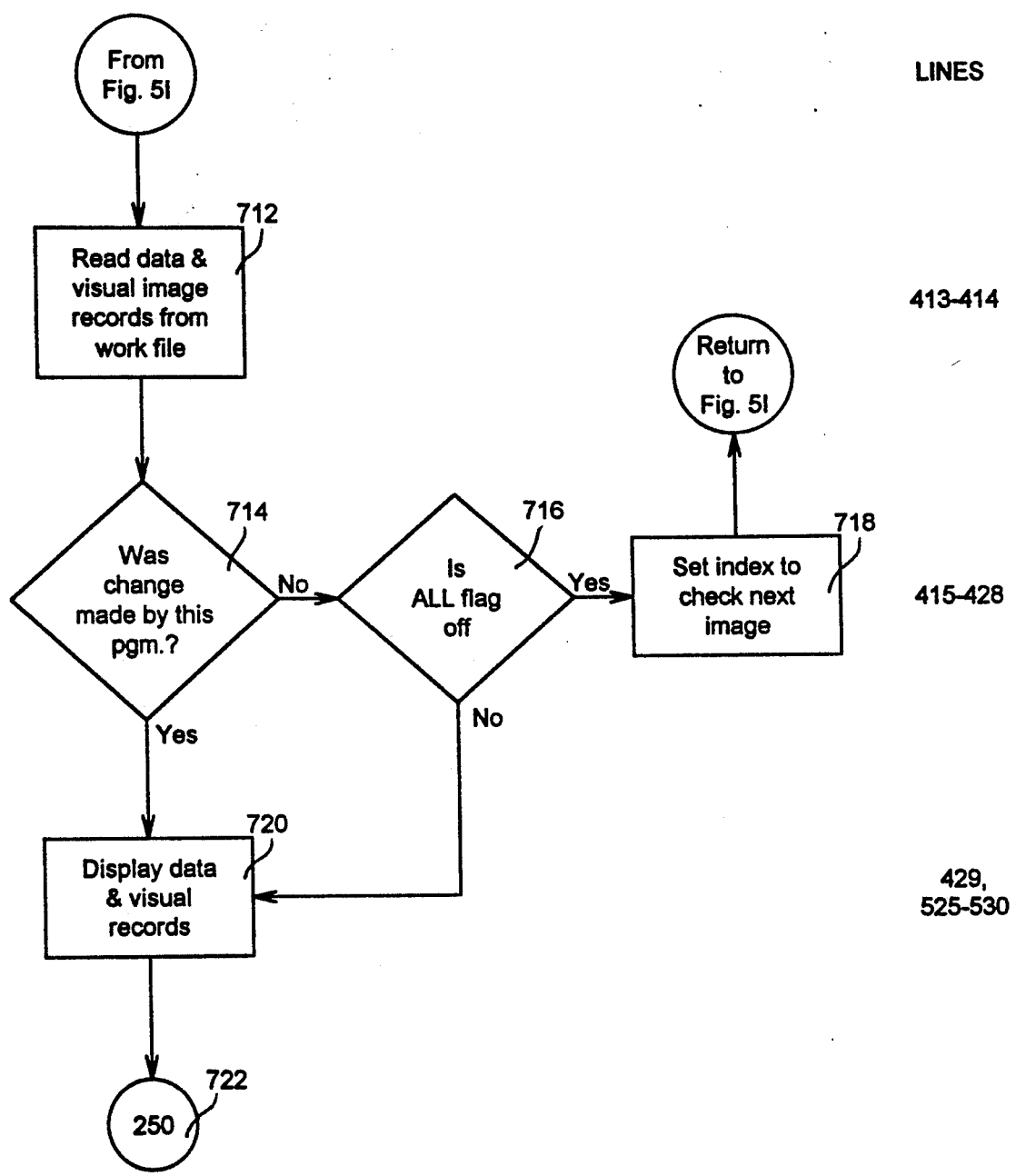

Refer to FIGS. 5I and 5J. If the operator enters an (up arrow) 698 either as a single character or in the format of #(up arrow), the program will progress the images forward in time 702-722.

Figure 5K:
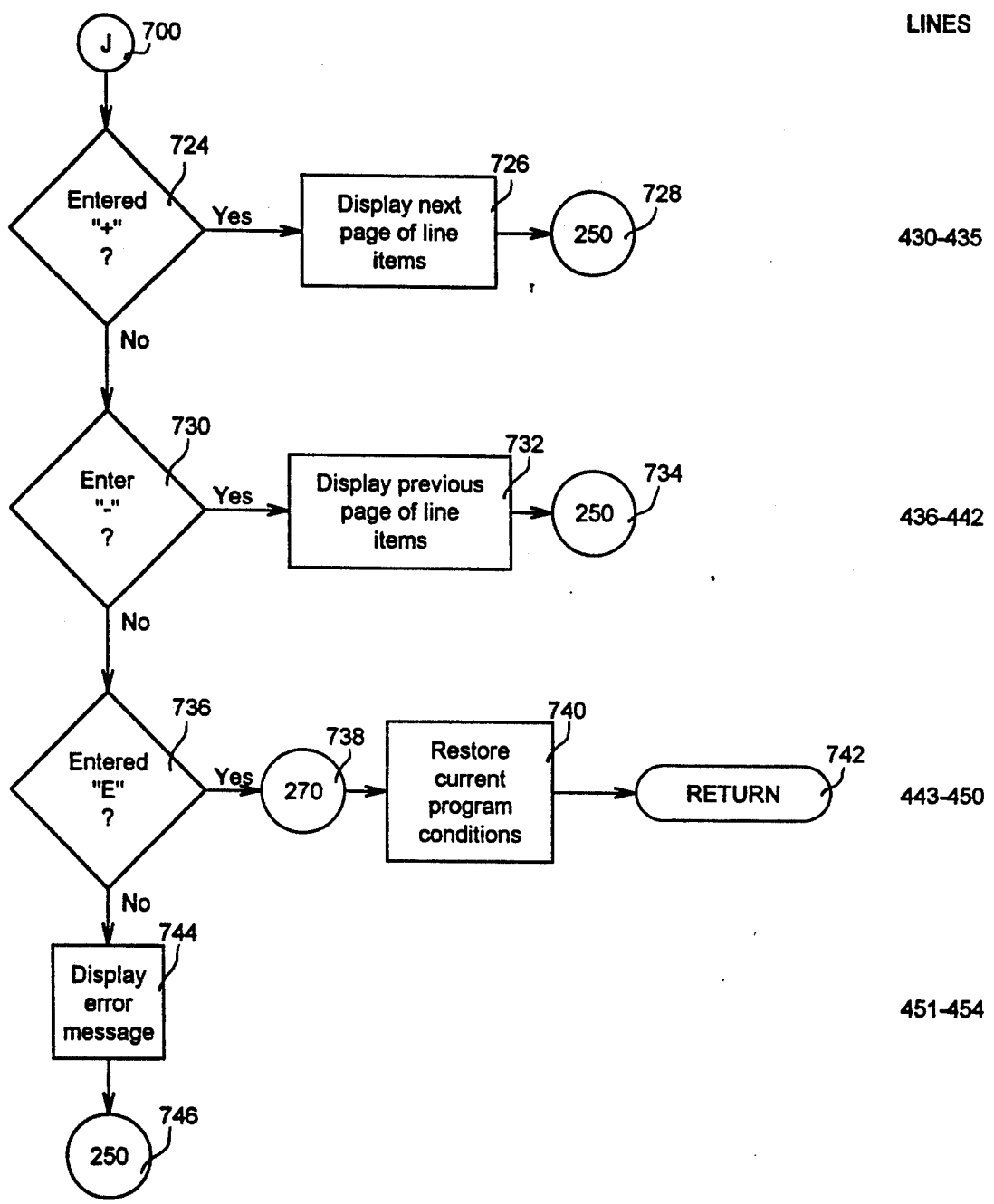

Refer to FIG. 5K. If the DB record contains Line Item Sets, then the operator may display other pages of items by entering either a (+) command 724-728 to see the next page or a (-) command 730-734 to see the previous page. In any case, if the operator enters (E)xit, the program will restore the current calling program's conditions and return 742.

AN EXAMPLE OF AUDIT HISTORY DISPLAY

The example screens that follow will demonstrate the various display images as outlined above.

FIG. 6. Screen 1/22/90—17:09:14: This is the initial screen as it would appear after the operator has entered the key to the DB record 204 and the calling program (CP.100 Version 7.1) has displayed the record 214. The last change made is displayed in the upper right hand corner of the screen (Last Changed by DMM on 1/20/90 at 10:50:33). The operator selects the review function by entering "R" at the screen acceptance prompt 217 & 230. The calling program calls STD.HISTORY.SUB which has prompted the operator for the starting information (612, 624, and 630) and the operator has selected to see the historical image of the record on 1/1/89 and to see only those changes made by this program.

FIG. 7. Screen 1/22/90—17:20:19: This is the historical image of how the record looked on 1/1/89. The last change was made by CFH on 12/7/88 at 16:10:16 and the field changed was Address #2. This is change 32 of 49. Note that the following fields have been changed since the record was created:

| | |
|---|---|
| BillTo | WHEATLEY |
| Client Name | David M. Murdock ZZ9Z |
| Address #1 | 625 Duke Road |
| Statuses | NBB |
| Categories | CAL |
| Contact Line Item Set # 2 | (Empty fields) |
| Contact Line Item Set # 3 | (Empty fields) |

The above fields are displayed in reverse video.
The following fields are displayed in bright reverse video:

| | |
|---|---|
| Last Changed By | CFH |
| Last Changed Date | 12/07/88 |
| Last Changed Time | 16:10:16 |
| Address #2 | 1nd. Floor |

The operator enters (down arrow) to see the next older record image (change 32 of 49) 672.

FIG. 8. Screen 1/22/90—17:22:48: This screen shows the old Address #2 field contents (2nd. Floor). Address #2 field is also displayed in bright reverse video which indicates that change 31 was applied to this field as well.

The operator enters 99(down arrow) to see the original record image 672.

FIG. 9. Screen 1/22/90—17:23:48: This screen shows the record as it was added (Change 1 of 49) to the database file by DMM on 9/24/87 at 15:13:48. None of the fields are shown in reverse video since no fields have been changed yet. The operator enters 99(up arrow) to see the current record image 672.

FIG. 10. Screen 1/22/90—17:23:26: This screen shows the current image (Change 49 of 49) but all of the fields that have been changed since it was added are shown in reverse video:

| Field Name | Changed Data |
|---|---|
| Last Changed By | DMM |
| Client Code | MURDOCK |
| BillTo | MURDOCK |
| Client Name | David M. Murdock |

-continued

| Field Name | Changed Data |
|---|---|
| Address #1 | 625 Duke Road |
| Address #2 | Suite 202 |
| Categories | CAL |
| Statuses | NBB |
| Producer | DMM |
| Servicer | DMM |
| Contact Type (Line 1) | 1 |
| Contact/Alternate Name (Line 2) | Mrs. Eileen A. Murdock |
| Contact Salutation (Line 2) | Eileen |
| Contact Type (Line 2) | SP1 |
| Contact/Alternate Name (Line 3) | Mr. Sean E. Murdock |
| Contact Salutation (Line 3) | Sean |
| Contact Type (Line 3) | 2 |

The fields displayed in bright reverse video to indicate that they were the last fields changed are:

| Last Changed Time | 10:50:33 |
|---|---|
| Contact/Alternate Name (Line 1) | Mr. David M. Murdock |

The operator enters (down arrow) to see change number forty-eight (48)

FIG. 11, Screen 1/22/90—17:23:45: This screen (change 48 of 49) indicates that one field was changed, Contact/Alternate Name (Line 1) END David M, Murdock The operator enters (down arrow) to see change number forty-seven (47) 672.

FIG. 12. Screen 1/22/90—17:24:05: This screen (change 47 of 49) indicates that three fields were changed.

| Client Name | David M. Murdock |
|---|---|
| Address #1 | 625 Duke Road |
| Address #2 | Suite 202 |

The operator enters "E" to exit history review 672. The original active record is re-displayed and the operator is prompted for (F)ile or (Q)uit 217.

OPERATING ENVIRONMENT

The operating environment necessary to support this feature of the invention is any operating system (OS) that will support variable length database records containing variable length data fields. The preferred embodiment of the invention, as described herein, has been implemented under the Pick Operating System, which supports such a file structure. For further reference to this operating system, refer to publications of the Spectrum Manufacturers Association, San Diego, Calif., as well as to Pick Systems, Inc. and other implementers of the PICK operating system.

DESCRIPTION OF TERMINALS

The terminals appropriate for use in the system of the present invention would need to support at least three visual attributes, for example:

| Protected Background | Display static background text |
|---|---|
| Reverse Video | Display net record changes |
| Bright Reverse Video | Display last change |

Currently, the following computer terminals have been used successfully to display audit history in systems embodying the present invention:

Wyse 30; Wyse 50; Wyse 50+; Wyse 60; and
IBM 3151 (with Wyse 60 personality card)

If bright reverse video is unavailable on a proposed terminal, but the machine is able to implement flashing reverse video instead, such a terminal could be used alternatively.

Interrupt Feature

FILES REQUIRED:

The only file required for this feature of the invention is the TERMINAL file. There is a record in that file for each port (terminal) in the system. There are two fields that are used in each Terminal File record:

Attribute 14: This field is used to hold all communications between levels. The field is broken down into Values as follows:

| Value | Description |
|---|---|
| 1 | Program Name - The Calling Program. |
| 2 | DEBUG.FLAG - (0 = Off; 1 = On) Used by developers to halt the programs at certain milestones. |
| 3 | THIS.RETURNING.KEY - If the level is interrupted while there is an active record in a program, this variable will contain the key of that active record. If no record is active, then this variable will contain the last DB record key filed. |
| 4 | CURRENT.CLIENT - If a program was running in the level being interrupted that relates to a client, then this variable will contain the key to the CLIENTS file record for that client. |
| 5 | CURRENT.POLICY - If a program was running in the level being interrupted that relates to a policy, then this variable will contain the key to the POLICIES file record for that policy. |
| 6 | CURRENT.LOSS - If a program was running in the level being interrupted that relates to a loss, then this variable will contain the key to the LOSSES file record for that loss. |
| 7 | CURRENT.EFF.DATE - If a program was running in the level being interrupted that relates to a policy, then this variable will contain the Effective Date of the specific transaction being processed against that policy. |
| 8 | CURRENT.END.NO - If a program was running in the level being interrupted that relates to a policy, then this variable will contain the key to the CHANGES file record that refers to that transaction. |
| 9 | CURRENT.TRAN - If a program was running in the level being interrupted that relates to a policy, then this variable will contain the Transaction Code selected by the operator when the policy was accessed. |
| 10 | NEXT.COM.AREA - Into this variable, the programmer may specify any additional information that may be required by the next higher level. |

Attribute 15: This attribute contains the current level being utilized.

INITIAL CONDITIONS IN CALLING PROGRAM

There are no pre-conditions that are necessary to effect a level interruption. All conditions that existed in the interrupted program will be restored.

CALLING PROGRAM NARRATIVE

Figure 13:
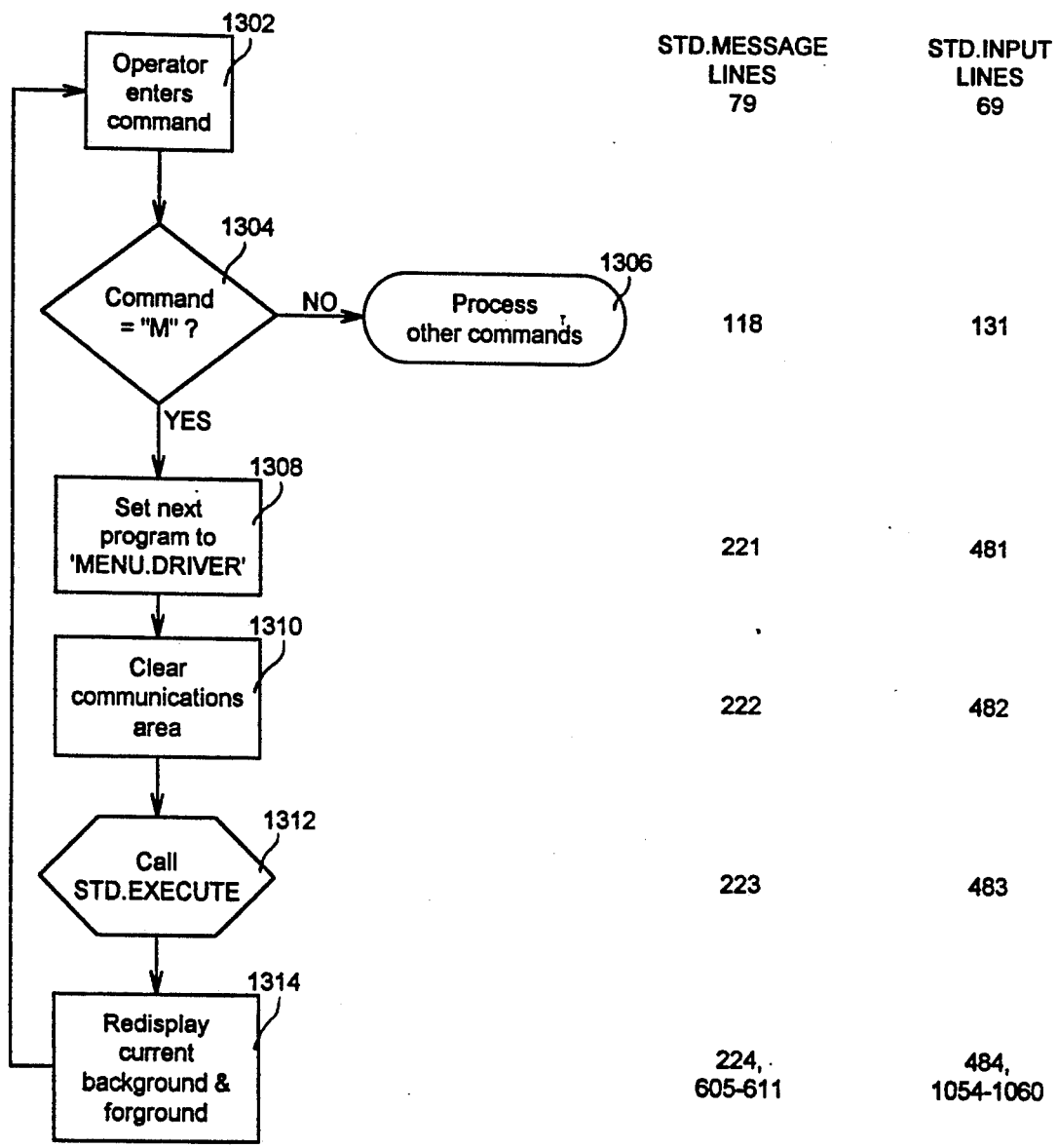
FIG. 13 is a logic flow diagram describing how the calling program initiates a request for a new session.

Refer to FIG. 13: The calling program. Each calling program utilizes two programs to get all operator input.

STD. INPUT: This program is used to get data from the operator that will ultimately become database record information. The data is validated based on parameters set forth in the calling program. For example: If the data being entered is to be stored in the DB record as a date, then this program will insure that a valid date has been entered. If the data being entered is to be stored in the record as a dollar amount, then this program will insure that no letters (A-Z) or any special characters (!@# etc.) have been entered and will format the data with two decimal places.

STD.MESSAGE: This program is used to prompt the operator with a question and get a response. The responses are not validated in any way (but all responses are converted to upper case). It is the duty of the calling program to perform any validation necessary.

Both of these programs are programmed with a command recognition logic. This way the operator may select a function from any field regardless of whether it is a data field input (STD.INPUT) or a question response (STD.MESSAGE). The logic flow diagram, FIG. 13, refers to lines in both programs since the flow is identical.

The operator enters a command 1302. One of the commands being tested for in the input string is the (M)enu command. If found 1304, the program will select the program to be executed at the next level to be "MENU.DRIVER". This is the program that processes all of the menu records and will permit the operator to select any other task to be executed during this interruption. The program clears the NEXT.COM.AREA 1310 since the system does not pass any input to the next level and calls the STD.EXECUTE program 1312 to initiate the next level.

STD. EXECUTE PROGRAM NARRATIVE

Figure 14A:
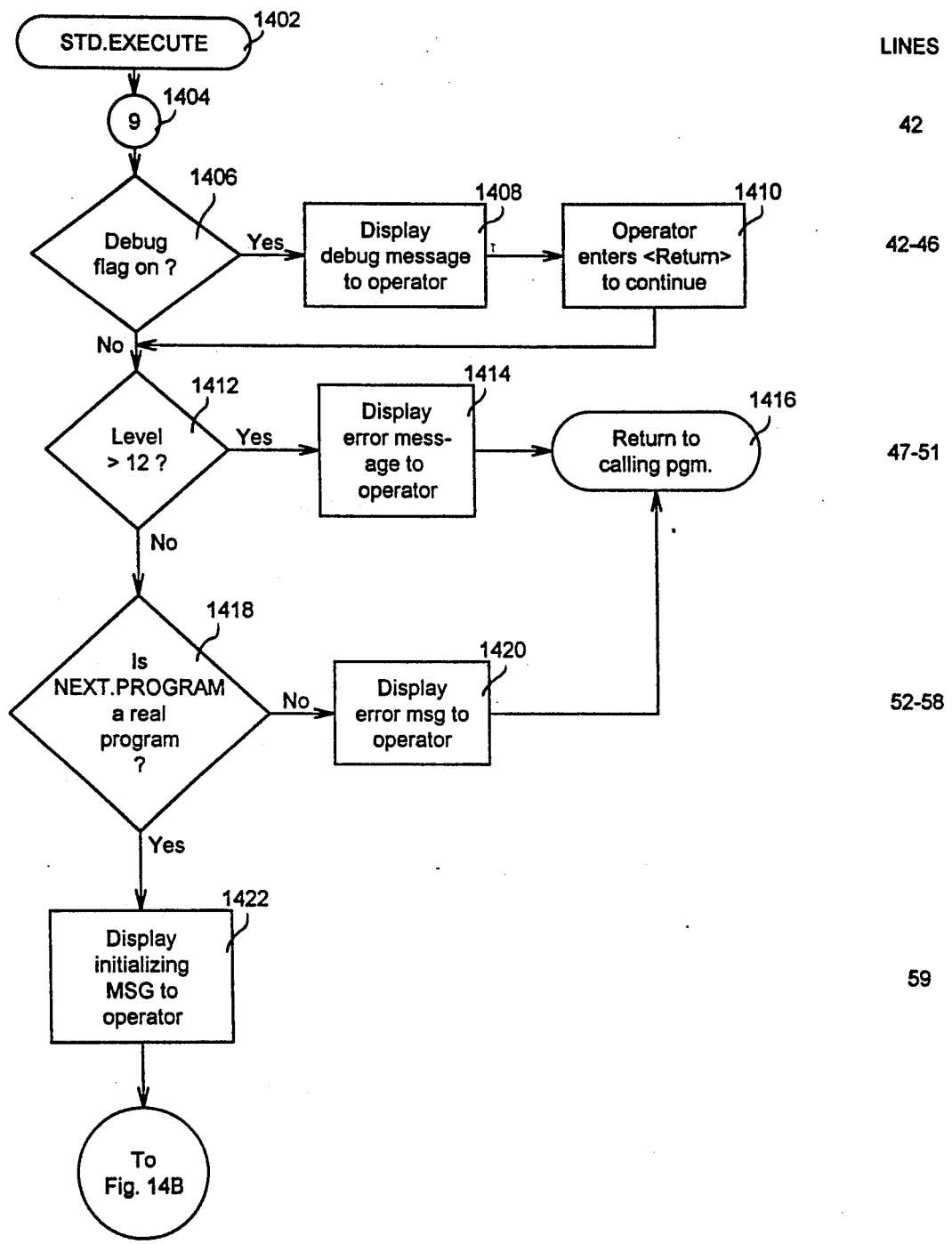
FIGS. 14A to 14C are logic flow diagram describing how STD.EXECUTE suspends the current task, stores any communications for the next higher level, and initiates the new task.
Figure 14B:
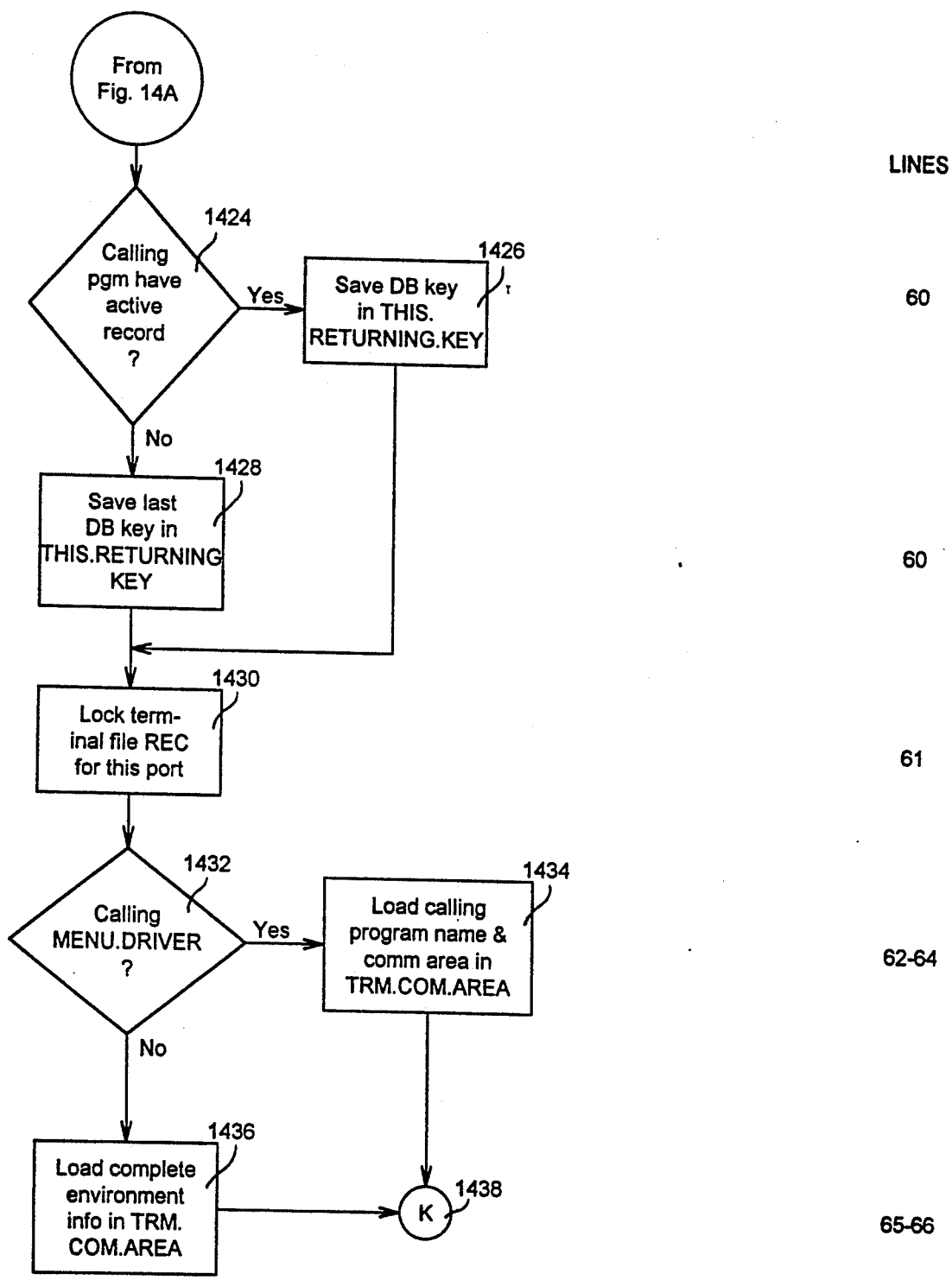

Refer to FIGS. 14A and 14B. STD.EXECUTE (before the EXECUTE)

If the program is under development, the programmer has the opportunity to stop at various places by setting the DEBUG.FLAG on. If it is on 1406, then the program will display a message to the programmer and wait for a response. The first thing to be checked is the current level. If it is greater than twelve (12) 1412, then the program will display an error message 1414 and return to the calling program 1416. The program will check to insure that the program being called is a validly cataloged program 1418. If not, then the program will display an error message 1420 and return to the calling program 1416. Once past these checks, the program displays a message to the operator that the next level is being initiated 1422. The program then checks the MODE variable. If it contains data ("A", "C", etc.) 1424 then there was a DB record active when the operator requested the interrupt and the key to that record is saved in THIS.RETURNING.KEY 1426. If MODE is null (empty) then the calling program is between active records and the last DB record key filed is saved in THIS.RETURNING.KEY 1428. Because the system is about to write to the TERMINAL file, the record being updated is locked to prevent simultaneous updates from other users 1430.

There are two basic kinds of interruptions. A planned interruption where the program is designed to call another program in a job stream and pass information to it; and an unplanned interruption (initiated by the operator) where the next level program being executed is the MENU.DRIVER program and no information is to be passed. If the operator requests an interruption to run the menu program 1432, then none of the standard system common fields (listed above) need to be loaded 1434. If the system is not going to run the menu program, then the complete complement of standard system common information is loaded into the TRM.COM.AREA field in the Terminal file record for this port 1436.

Figure 14C:
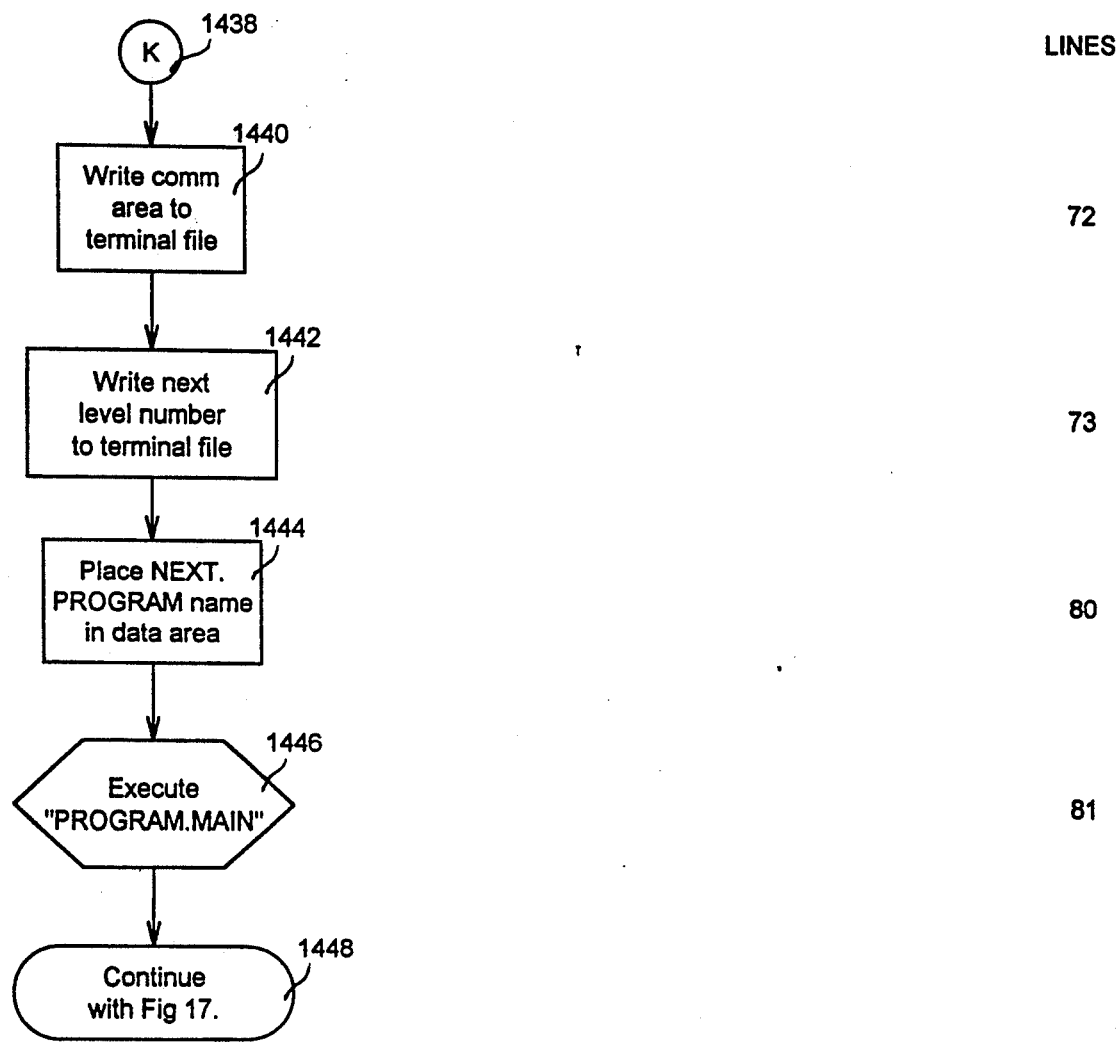

Refer to FIG. 14C. STD.EXECUTE (continued)

The updated TRM.COM.AREA field is written to the Terminal file into Attribute 14 of the record for this port 1440, and the level that is about to be initiated is written to Attribute 15 of the record for this port 1442. The name of the program to be run at the next level (in this case MENU.DRIVER) is placed into the system input area via the "DATA" statement 1444 and PROGRAM.MAIN is executed via the "EXECUTE" statement.

PROGRAM.MAIN PROGRAM NARRATIVE

Figure 15A:
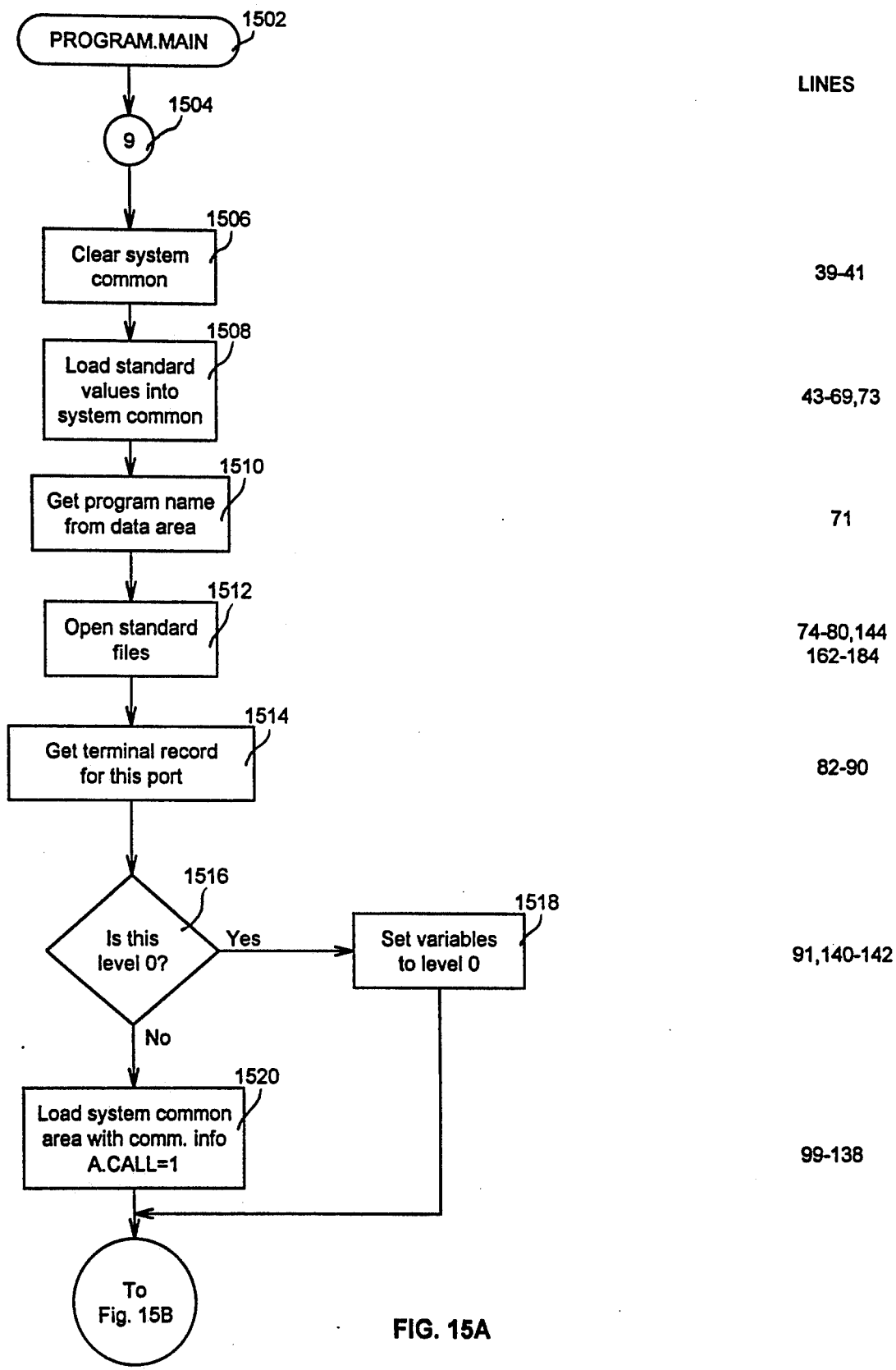
FIGS. 15A and 15B are a logic flow diagram describing how PROGRAM.MAIN processes the new task request and sets up any communications from the lower level.
Figure 15B:
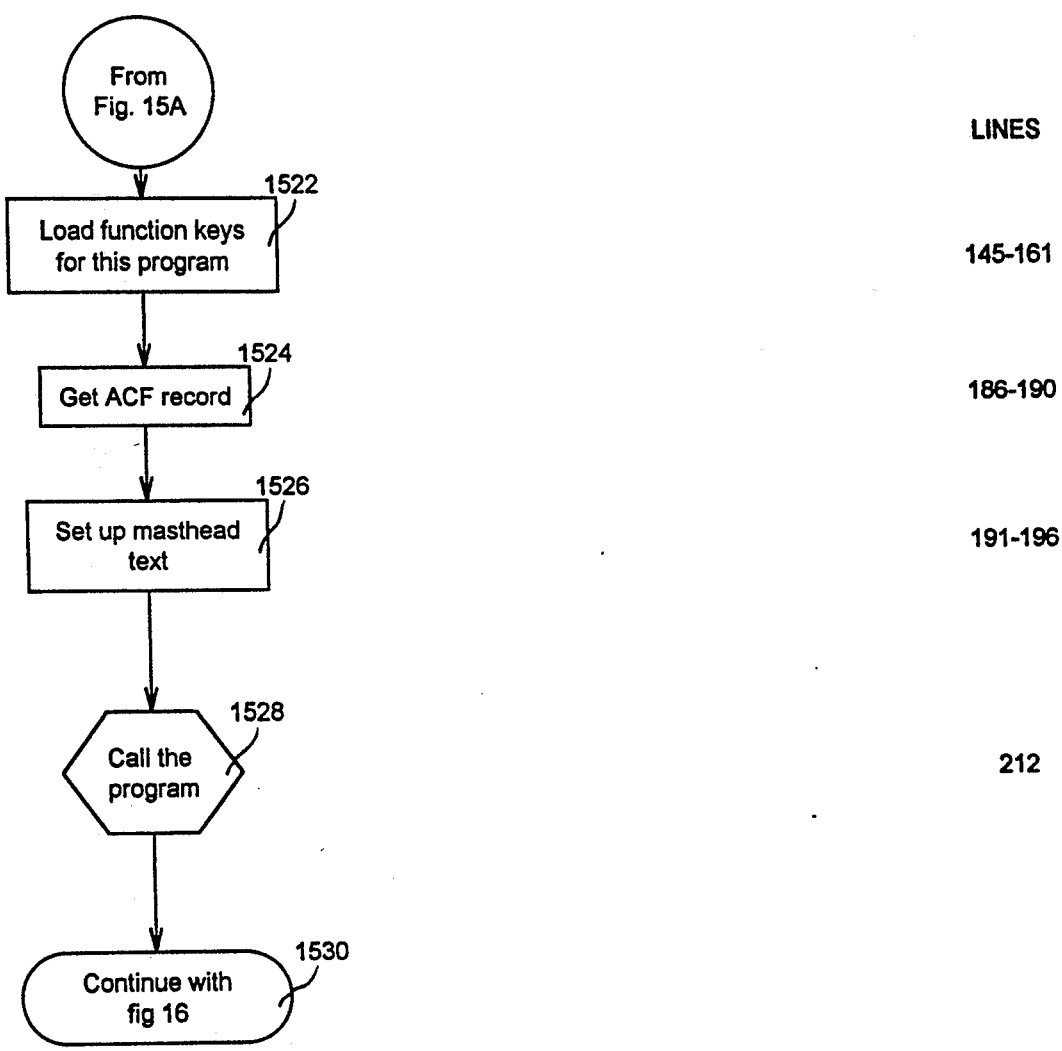

Refer to FIGS. 15A and 15B. PROGRAM.MAIN (before the program call)

This program is used to run all applications programs. It will perform those tasks that every program needs to do and open the files that every program needs to open. Once its house-keeping tasks are finished, the applications program is run via the "CALL" statement.

The first thing that is done is that all System Common areas are cleared 1506. System common is a common communications area where data can be passed back and forth between programs that are "CALLED" from one another. There is no common communications area between levels that are "EXECUTED". Next, there are several standard variables that are initialized 1508, and the name of the program to be called (in this case MENU.DRIVER) is retrieved from the system input area via an "INPUT" statement. Next the standard files are opened 1512 and the Terminal file record is read for this port 1514. This record will contain (in Attribute 14) all of the inter-level communications passed by STD.EXECUTE. If the program is running in Level 0 (the primary level that is running when the operator "logs on" in the morning) 1516, then there is no communications to process, and the communications is not processed and the variables are set to Level 0 values 1518. If this is not level 0, then there are communications variables that need to be stored in the various System Common fields 1520. Each variable is extracted from the communications area and placed into its respective variable, and the appropriate communications variable is removed. In addition, a flag (A.CALL) is set to signify that this level was initiated from another lower level 1520. The function keys are loaded for the program being run 1522, the Account Control File Record (ACF) is read 1524, and the masthead that will be displayed at the top of any screen is built 1526. Finally, the program (MENU.DRIVER) is run via the "CALL" statement 1528.

At this point the operator will see the MENU.-DRIVER screen and may make any selection desired. Once the reason for the interruption has been satisfied, the operator will exit from the applications program and find the system displaying the menu 20 once again. If the operator enters (E)xit or (OFF), the program recognizes that the level is not at 0 and automatically returns control to PROGRAM.MAIN to prepare to shut down this level and return to the previous lower level.

Figure 16:
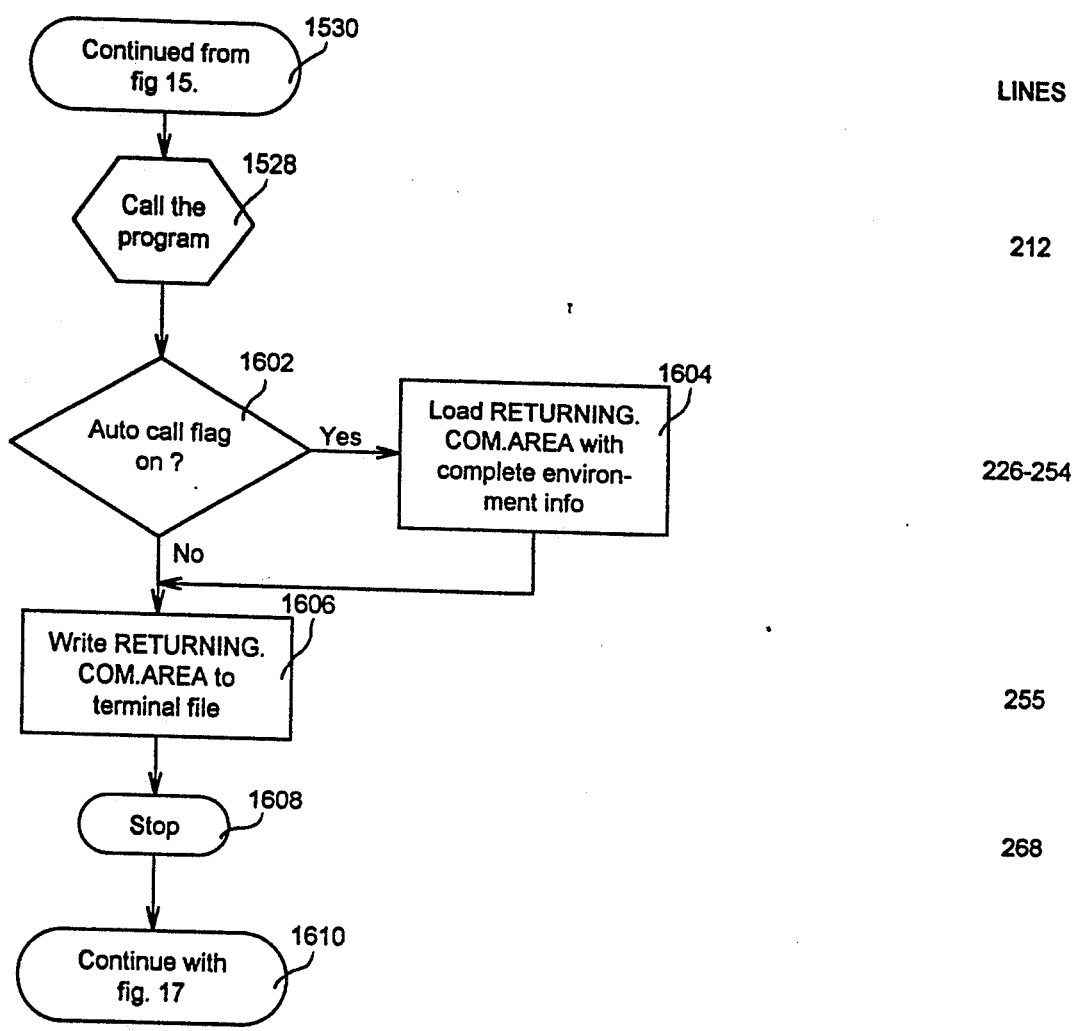
FIG. 16 is a logic flow diagram of how PROGRAM.MAIN closes down the higher level, prepares any communications to be passed back down to the lower level and shuts down the task.

Refer to FIG. 16. PROGRAM.MAIN (after the program call)

If the A.CALL flag is on 1602 then the very same system common variables which define the current environment will be loaded into the RETURNING-.COM.AREA 1604 in order to pass them back to the lower level. The communications field is written back to the Terminal File 1606 and the program stops 1608. The operating system recognizes that this task is completed, closes down the task, and returns control to STD.EXECUTE at the lower level.

Figure 17:
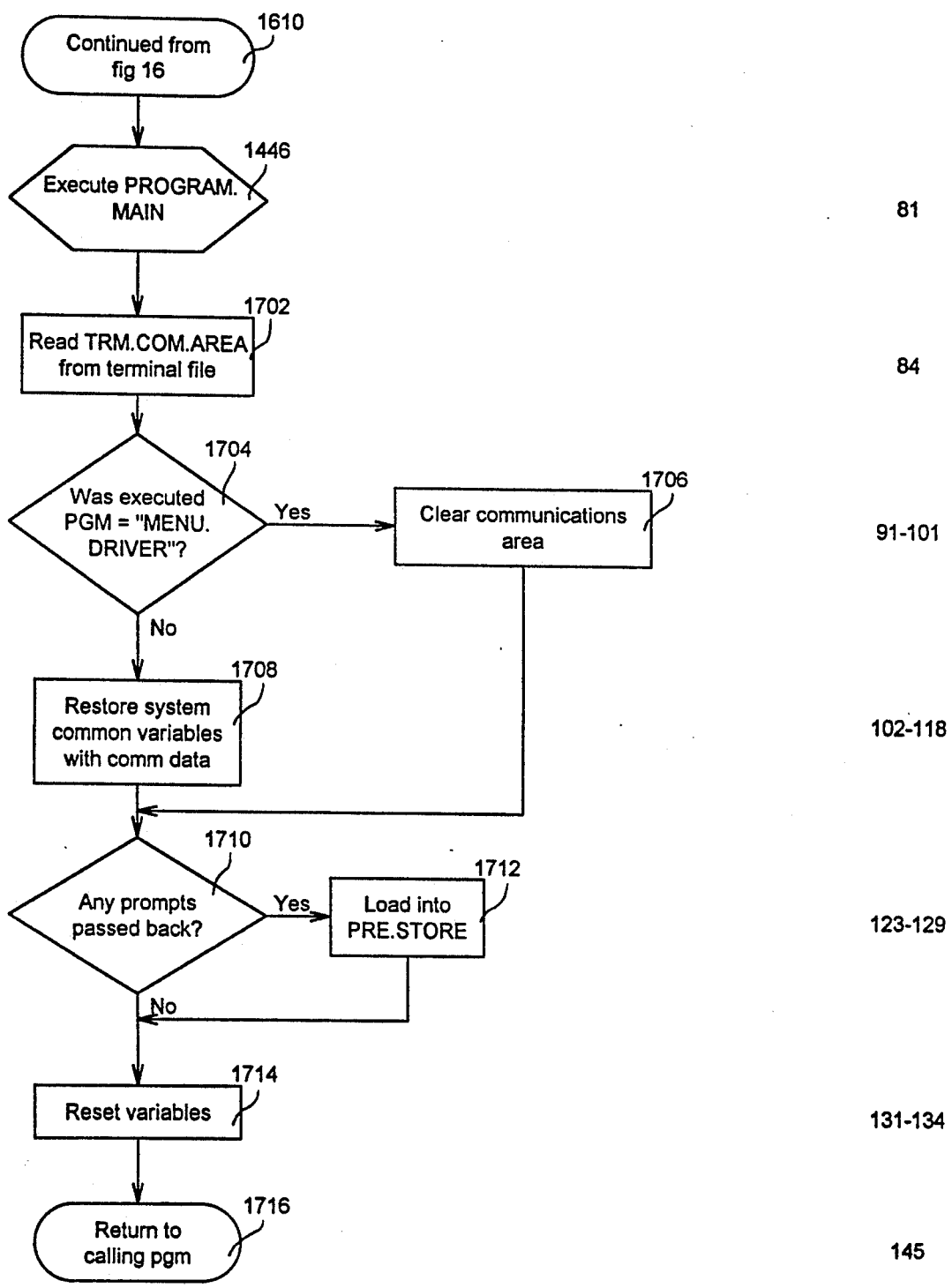
FIG. 17 is a logic flow diagram of how STD.EXECUTE handles the communications passed back from the higher level, re-establishes the calling program's display screens, and concludes the interrupt command.

Refer to FIG. 17. STD.EXECUTE (after the EXECUTE)

Once the operating system closes down an executed task, control is automatically passed to the next lower level. The program that was being executed at the time of the initiation of the higher level task is STD.EXECUTE. Once control is returned to this program, the program has access, once again, to System Common. System Common is a portion of the memory work area designed to hold the totality of information that describes the current executing applications environment of each task in effect on the system. Among the information maintained in System Common is:

1. The name of the program currently being executed (PGM.NAME).
2. The currently active Data Base record (HDR.REC).
3. The current coordinates of the cursor (HRZ & VRT).
4. The Attribute (Field) location being processed
5. The current help record key (HELP.KEY).

There are approximately 770 individual variables that are include in System Common. STD.EXECUTE will utilize some of these variables to re-establish the screen so that the operator is returned to the exact program, data record, and field that were active at the time of the interruption.

The updated communications data as saved in step 1606 is read from the Terminal file. If the program being run at the higher level is "MENU.DRIVER" 1704, then there is no communications to process and the area is cleared 1706. If any other program was being run at the higher level, then the System Common Variables that describe the current environment are updated into their respective places in System Common 1758. If any data was passed back by the higher level program 1715, it is loaded into PRE.STORE for later processing 1712. Finally, the communications variables are cleared 1714 and STD.EXECUTE returns control to the calling program 1716.

Refer to FIG. 13. Calling program

The calling program will re-display the background and foreground of the program that was running before the interruption 1314, and the operator is placed back into the same field where the original command was issued 1302. The operator may then continue with the original task.

EXAMPLE OF PROGRAM INTERRUPTION

The scenario being illustrated is as follows:

"While making a change to a policy that belongs to Client David M. Murdock, another customer, Joe Jones, arrives at the office and wishes to leave a $100.00 deposit against a new policy."

Earlier

FIG. 18. Screen 1/22/90—17:54:05. This screen depicts the main menu screen that a typical operator would see after first "Logging On" in the morning. The operator selects program number 1 (Client Marketing and Servicing). This is the gateway program to all client/policy transactions.

FIG. 19. Screen 1/22/90—17:54:36. This screen is the Basic Client Information screen. The curser is resting just to the left of the Client Code: text. The operator enters "MURDOCK" to recall the DB record for David M. Murdock. The program accesses the database, retrieves the appropriate database record and displays . . .

FIG. 20. Screen 1/22/90—17:55:06. This screen contains the client information about client David M. Murdock. The operator verifies that this is the client desired and depresses the "POL" Function Key to call up the list of policies for this client. The program performs a planned interruption to call the Policy Selection List program, passes the Client Code so that the operator doesn't have to re-enter it and displays . . .

FIG. 21. Screen 1/22/90—17:57:09. This screen will allow the operator to select which of the policies for the client is to be processed. The operator selects a policy "1" enters a Transaction Code "COR" and depresses the "POL" function key again to indicate that an individual policy has been selected for processing. The program performs another planned interruption to call the Basic Policy Information program, passes the Policy Sequence Number so that the operator doesn't have to enter it and displays . . .

FIG. 22. Screen 1/22/90—18:01:37. This screen shows the operator the basic information about a policy. Just as the operator is about to enter the new information about this policy . . .

JOE JONES ARRIVES

The operator now has to satisfy the request of Joe Jones to process the $100.00 deposit immediately (after all he is sitting right there). The operator enters "M" to call the menu program. The program performs an unplanned interruption and displays . . .

FIG. 23. Screen 1/22/90—17:58:09. The main menu screen. The operator selects number 2 (Accounts Receivable Menu), and the program displays . . .

FIG. 24. Screen 1/22/90—17:58:24. The A/R menu where the operator selects number 4. (Case Receipts Entry Screen). The menu program calls the Cash Receipts program which displays . . .

Screen 1/22/90—18:00:45. The operator enters the necessary information to record the fact that Joe Jones is leaving $100.00 (Check number 12345) and files the screen. The program terminates and returns control to the menu program which displays the last menu processed . . . FIG. 26.

JOE JONES LEAVES

After a cheerful goodby, the operator must now finish up the interrupted task of correcting David M. Murdock's policy. So the operator enters (E)xit which causes the menu program to re-display . . .

FIG. 27. Screen 1/22/90—18:01:17. The main menu screen. The operator enters (E)xit again, and the program terminates this task and returns to the lower level. The original screen is re-displayed.

FIG. 28. Screen 1/22/90—18:01:37. The operator is now back where he started in the same field where he entered the (M)enu command just moments ago. The correction is now completed. The Policy record is filed, and the rest is history.

OPERATING ENVIRONMENT

The operating environment required for this feature of the present invention is any operating system that allows for the execution of system level commands from within a program. The environment must also be capable of assigning to each port (terminal/user/operator) a task automatically as the port "Logs On" to the system. In addition, the environment must be able to assign multiple tasks to any active port. The Pick Operating System and most (if not all) of its derivatives have this capability. UNIX and most (if not all) of its variations also have this capability. While these two are listed specifically, there are other operating systems/environments that support the execution of system level commands from within programs and automatically manage one or more tasks for each port/user.

Forms Builder

FILES REQUIRED

There are two files required to support the Forms Generator.

Source Parameter File: This file will contain the image information as entered by the developer. All modifications to the form are affected by changing the contents of this file. This file becomes the "Source" code for the Forms Generation program.

Object Command File: This file will contain the image information once it has been translated into printer-understandable commands. Each form will have s separate record in this file.

RECORD FORMATS

Source File - The following fields are required.

Key: This is the key to each forms record and must be unique for each form. The key may take any form (Alpha only; Numeric only; or Alpha/Numeric).

2: Orientation. This field will contain either a "P" or "L" and signifies the orientation of the document. If (P)ortrait is selected, the document will print in a vertical format similar to a letter. If (L)andscape is selected, the document will print in a horizontal format similar to a check.

3: Description of the form.

The following fields all relate to any lines, boxes, shaded areas, and pattern fills that the form is to contain. The following fields are all entered and maintained in hundredths of a character (horizontally) and in hundredths of a line (vertically) in the format NNN.NN.

4: Horizontal Starting Point.

5: Vertical Starting Point.

6: Height. Used in conjunction with Width as follows:
  If the Height is 1 and the Width is greater than 1, then a horizontal line is drawn. If the Height is greater than 1 and the Width is 1, a vertical line is drawn. If both Height and Width are greater than 1, a box is drawn.

7: Width. Used in conjunction with height (see above).

8: Weight. How wide is the line. Specified in dots, with 300 dots to the inch.

9: Type of graphics as follows:
  0=Solid line
  1=Dashed line
  2=Shaded area
  3=Pattern fill 10: Pattern. Valid only if Type is 2 (Shaded area) or 3 (Pattern fill). This field will specify any one of 8 shades (Type=2) or 6 patterns (Type=3)

23: Comments. These comments are for the convenience of the developer and are used to hold notes about any line, box, shade, or pattern.

The next set of fields refer to check-off boxes. These small 1 character by 1 character boxes are often sprinkled around the form.

11: Horizontal character position.

12: Vertical character position.

The next set of fields specify where on the form all text is to be located.

13: Horizontal Starting Position.

14: Vertical Starting Position.

16: Text orientation (Vertically or Horizontally).

17: The Point Size of the text to be printed. Based on how many font sizes are contained in the printer. In the present Office Automation System, the following sizes are supported: 18, 16, 14, 12, 10, 9, 8, 7, 6, and 4.

18: Weight. This refers to whether the text will be printed in medium strike weight or bold strike weight.

15: The text to be printed.

The following fields are printer offset fields which allow the entire background or foreground to be shifted around without having to adjust hundreds of horizontal and vertical entries.

19: Horizontal background offset.

20: Vertical background offset.

21: Horizontal foreground offset.

22: Vertical foreground offset.

Object File—The following fields are generated.

Key: The same key is used to identify this record as was entered by the developer in the Source file.

1: The date that this form was last generated.

3: The description of the form as entered by the developer.

4: The horizontal background offset.

5: The vertical background offset.

6: The horizontal foreground offset.

7: The vertical foreground offset.

8−n: The rest of the fields contain the printer compatible commands that will generate the document. n will vary depending on the complexity of the form.

IMAGE ENTRY PROGRAM NARRATIVE

Figure 29A:
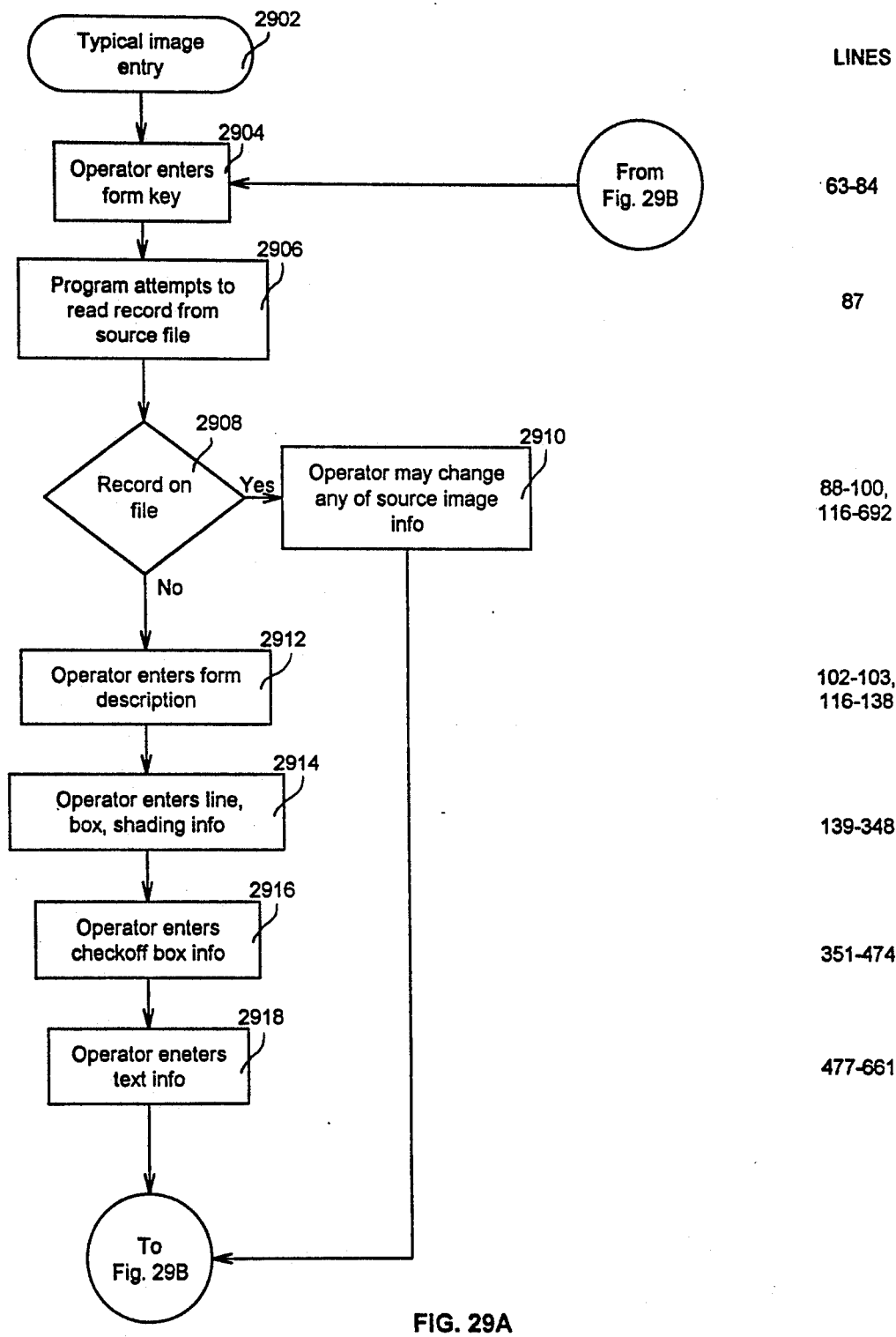
FIGS. 29A and 29B are a block logic diagram of a typical Forms Generation Parameter entry program.
Figure 29B:
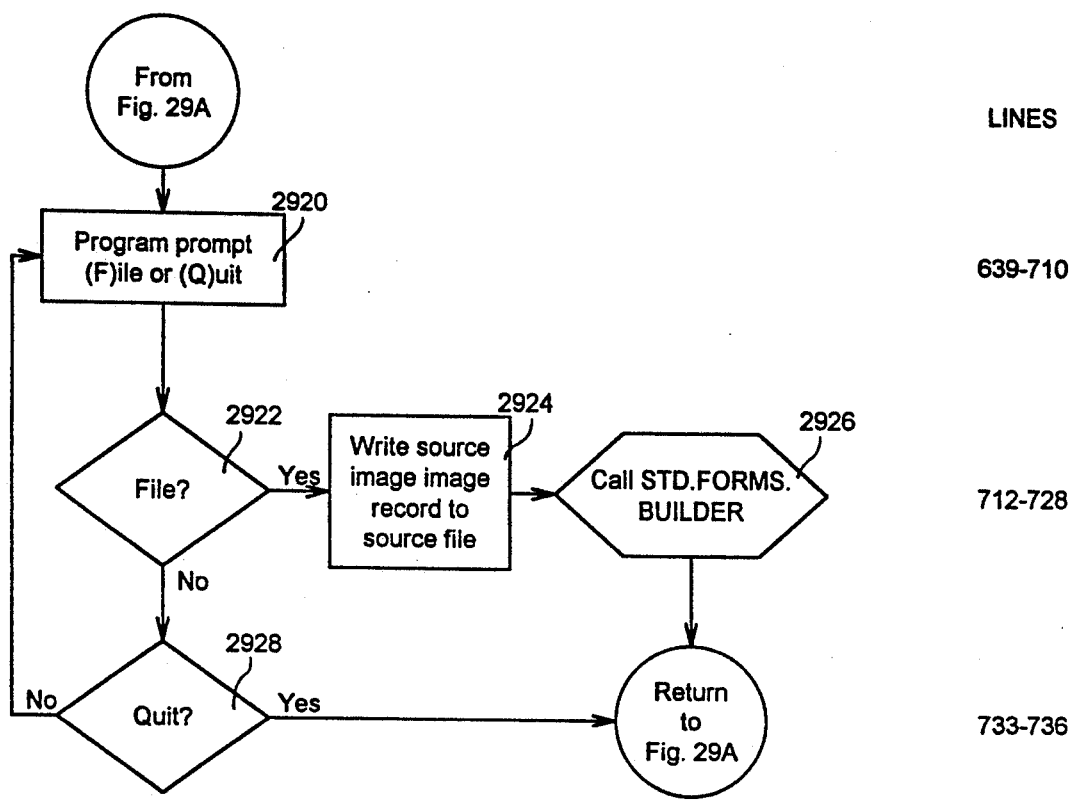
Figure 30A:
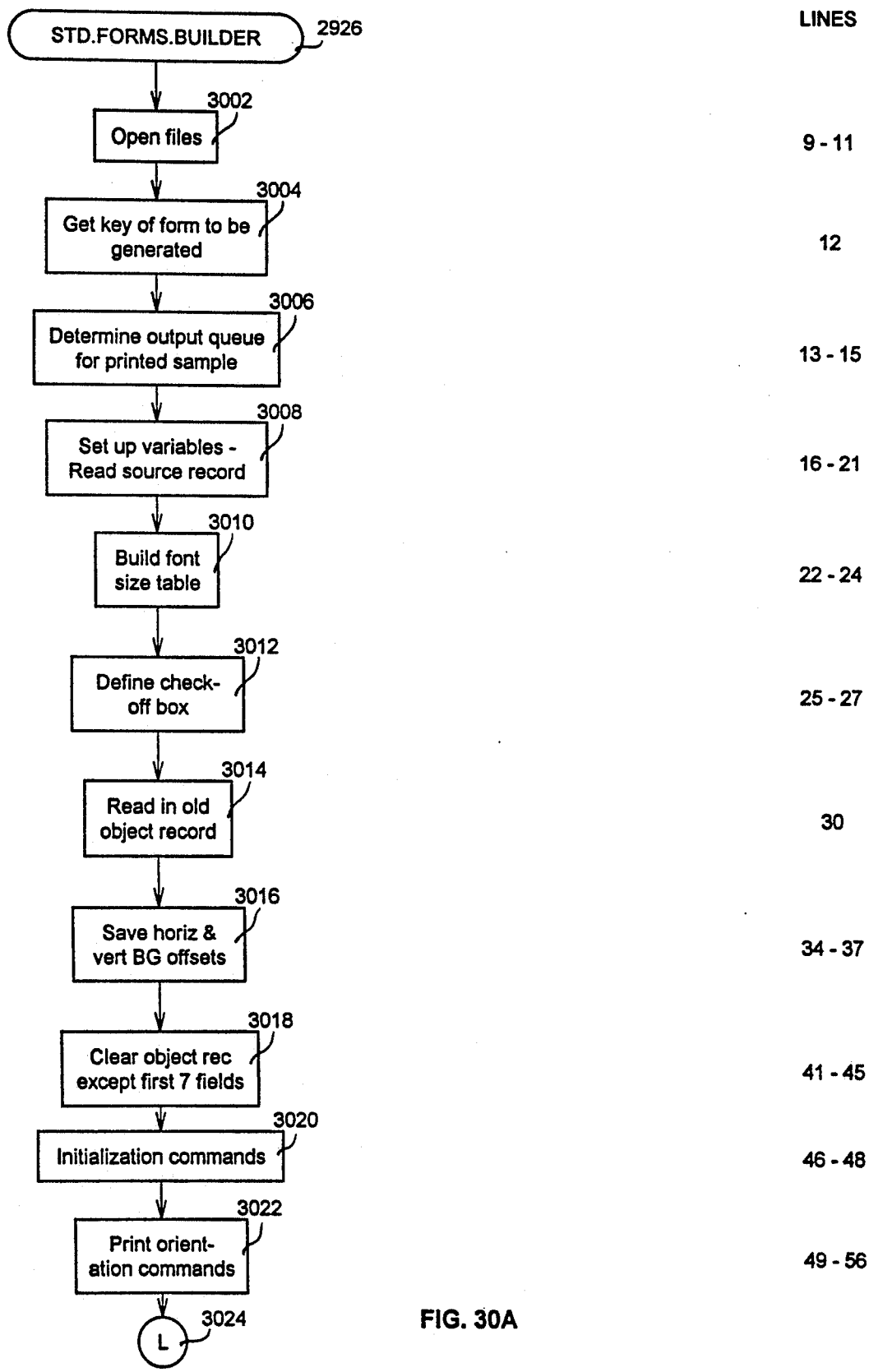
FIGS. 30A and 30B are the main program logic flow diagram of the STD.FORMS.BUILDER.
Figure 30B:
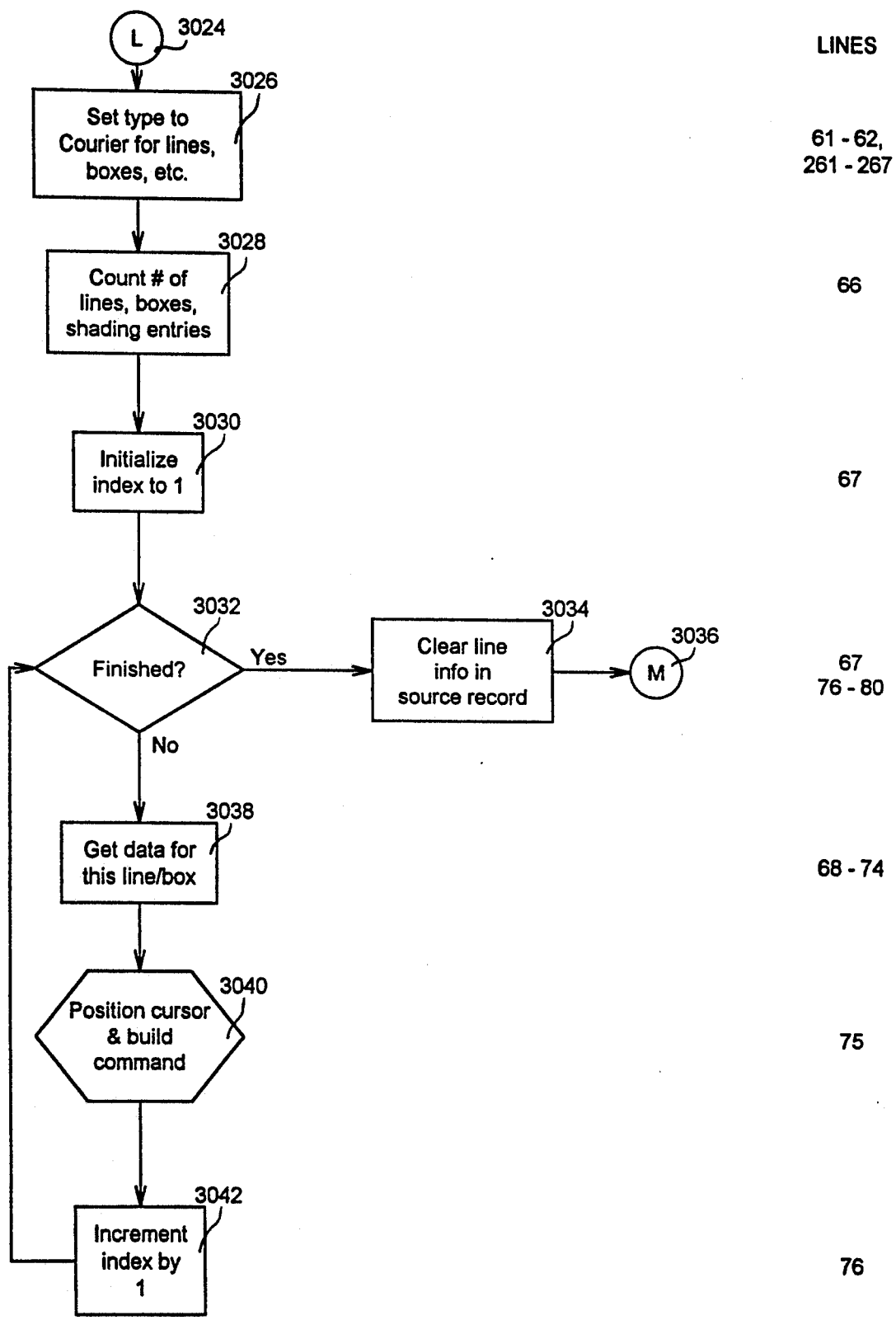

Refer to FIGS. 29A and 29B. Typical Image Entry Program

The program used to enter the document image information is any standard data capture program. This program will display a prompt to the operator for the document key 2904, attempt to read the record from the Source file 2906, and if found 2908, allow the operator to modify the contents of the image information 2910. If the record is not found, then the operator may enter the information necessary to compose a document. This information would include the description of the document being created 2912; the line, box, shading, and pattern data 2914; the check-off box data 2916, and the text to be printed on the document 2918. As a guide, the developer would have taken an original of the form and laid out guide markings using a forms ruler.

For ease of entry, all data entered is in the format NNN.NN or hundredth of a character. Since there are 10 characters to each inch, this equates to being able to specify the position of any line, box, shading, pattern, check-off box, or text to the thousandths of an inch horizontally. Vertically, all positioning is in hundredths of a line and with 6 lines per inch, so the developer may position anything to 1/600th of an inch.
Some examples:
To generate a horizontal line with the following statistics:

| Horiz. character | 6 |
|---|---|
| Vertical line | 3 |
| Length | 2.5 inches |
| Weight | 5 dots |

The following information would be entered:

| Horiz | Vert | Height | Width | Wt | T | Patt | ----- Comments ---- |
|---|---|---|---|---|---|---|---|
| 6.00 | 3.00 | 1.00 | 25.00 | 5 | 0 | | |
| | | | | | | | Optional Comments |
| | | | | | | +- | No Pattern for lines |
| | | | | | +------- | | Type 0 (line) |
| | | | | +-------------- | | | Weight 5 (dots) |
| | | | +------------------- | | | | Width 25 characters (2.5") |
| | | +------------------------ | | | | | Height 1 (horizontal line) |
| | +--------------------------- | | | | | | Vertical Position Line 3 |
| +------------------------------- | | | | | | | | Horizontal Pos'n Char. 6 |

The developer would continue to enter in the image, periodically printing out the document to check on the exact placement of the graphics. Once all of the information has been entered, the system displays a prompt asking whether to (F)ile or (Q)uit 2920. If the operator enters (F)ile 2922, then the system will write the Source image data to the Source file 2924, and call the STD.FORMS.BUILDER program 2926 to generate the object (printer-understandable) commands.

STD. FORMS. BUILDER PROGRAM NARRATIVE

This program will create the object commands based on the image information entered by the operator, and write the resulting series of commands to the Object file.

The first step in this process is the housekeeping chore necessary to perform the generation. Open the files 3002, get the key of the Source file record to be compiled 3004, set up the Spooler output queue to print the sample form 3006, set up some standard variables and then read in the Source Image record 3008, build a temporary font size table 3010, define the check-off box as a series of printer commands 3012, read in the old object record 3014, save the horizontal and vertical offsets from that old table 3016, clear the old object record to prepare it for the new commands 3018, and, last but not least, save the new printer initialization commands in the Object record.

All line drawing is performed while the printer is set up to print Courier Type Font, so the necessary commands are issued 3026. The program causes the system to count the number of line, box, shading, and pattern entries there are 3028, and then starts to loop through each entry 3032-3042, looking at each entry in turn 3038, and calling the Curser Positioning and Command Generation routine (Tag 9000 in the program code). Once finished generating all of the lines, boxes, etc. the program continues with the Check-Off boxes (See FIG. 32.)

Figure 31:
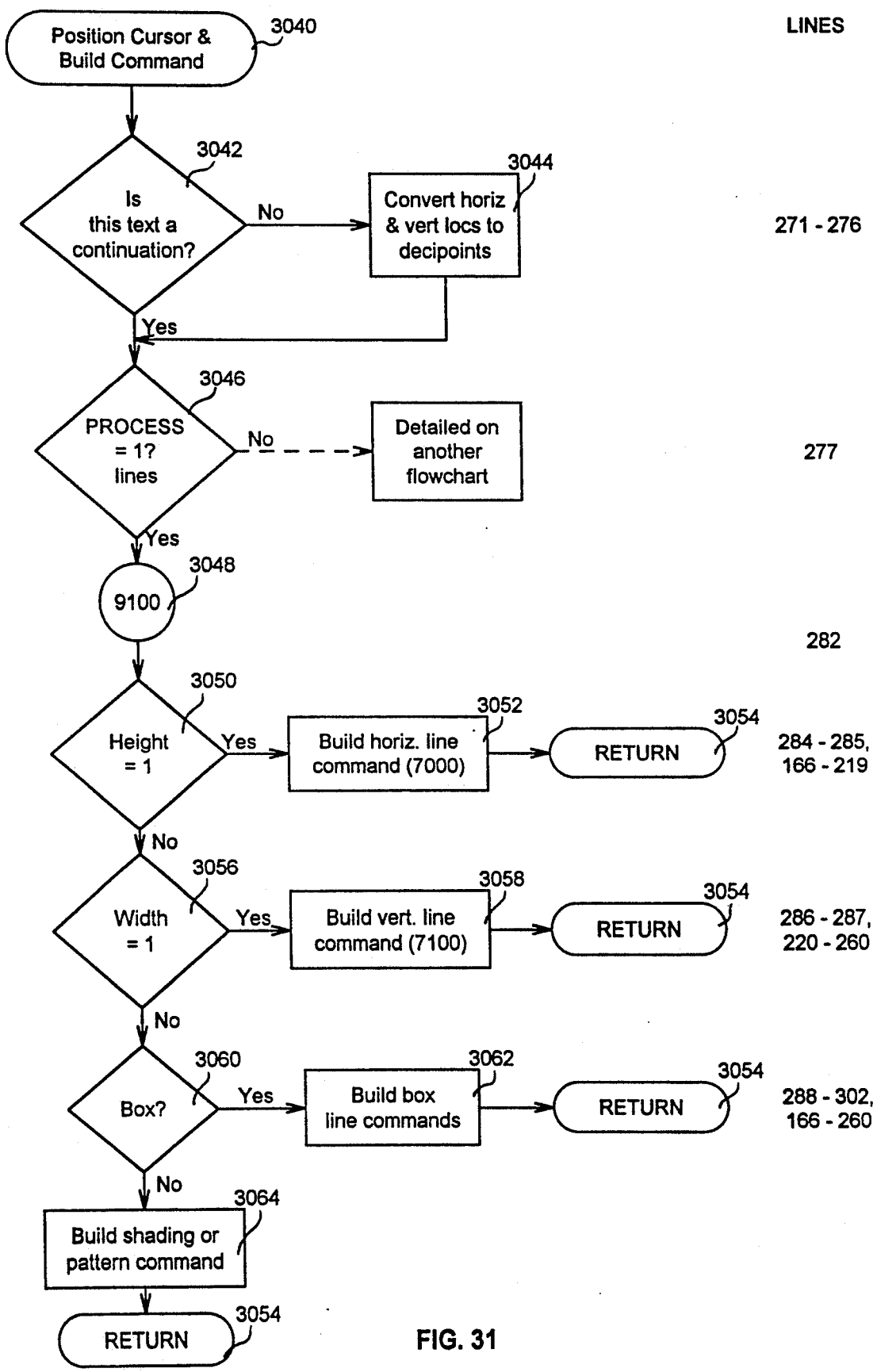
FIG. 31 is a program logic diagram of the Line, Box, Shading, and Pattern Fill commands routine.

Refer to FIG. 31. Lines, Boxes, Shading, and Patterns

If there is no horizontal position, that means that the system is concatenating two or more strings of text and there would not be any new curser placement command 3042. If there is a horizontal position, then the Horizontal and Vertical positions are converted into decipoints (720 decipoints to the inch) 3044. Because decipoints are not a unit of measure that people readily work with, the Forms Builder is designed so that all positional data entered is in characters and lines. To convert characters to decipoints, the program multiplies by 72 (i.e. 720 divided by 10 characters to the inch). To convert the lines to decipoints, the program multiplies by 120 (6 lines to the inch). Now the system is ready to generate the actual graphic command that will perform the action defined in the entry.

If the Height entered for this entry is one (1) 3050, then the program will build a horizontal line command 3052 and then return to process the next entry 3054. The same routine that builds solid horizontal will also build a dashed line as a series of short lines separated by a space that is two-thirds of the length of the short line.

If the Width entered is one (1) 3056, then the program will build a vertical line command 3058, and then return 3054.

If both the Height and Width have data 3060, then the program will build a box that has the height and width specified 3062 and then return 3054.

If the type indicates that this is a pattern fill or shading, then the program will build the shading/pattern fill command 3064 and return 3054.

Figure 32:
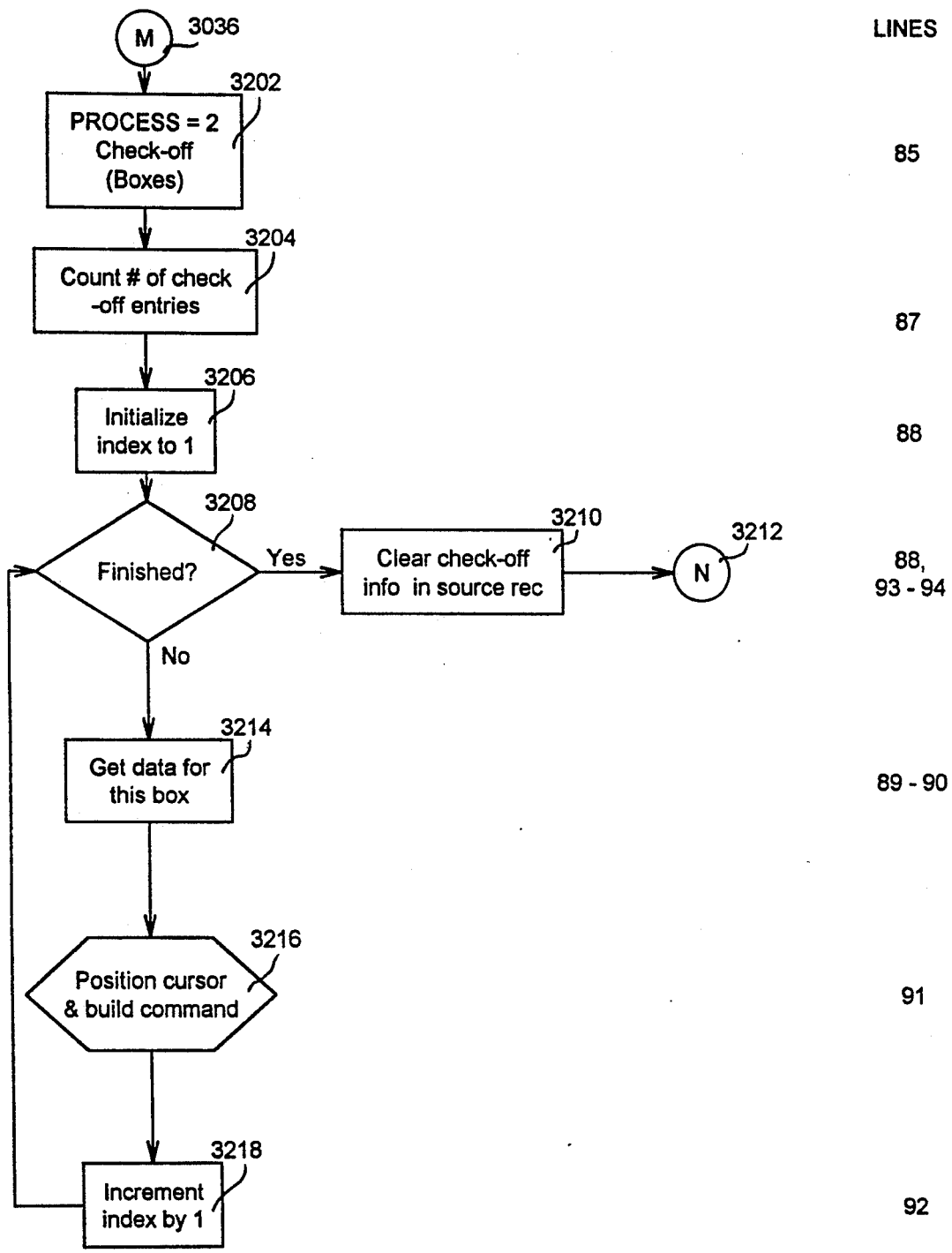
FIG. 32 is a continuation of FIGS. 30A and 30B (main logic flow).
Figure 33:
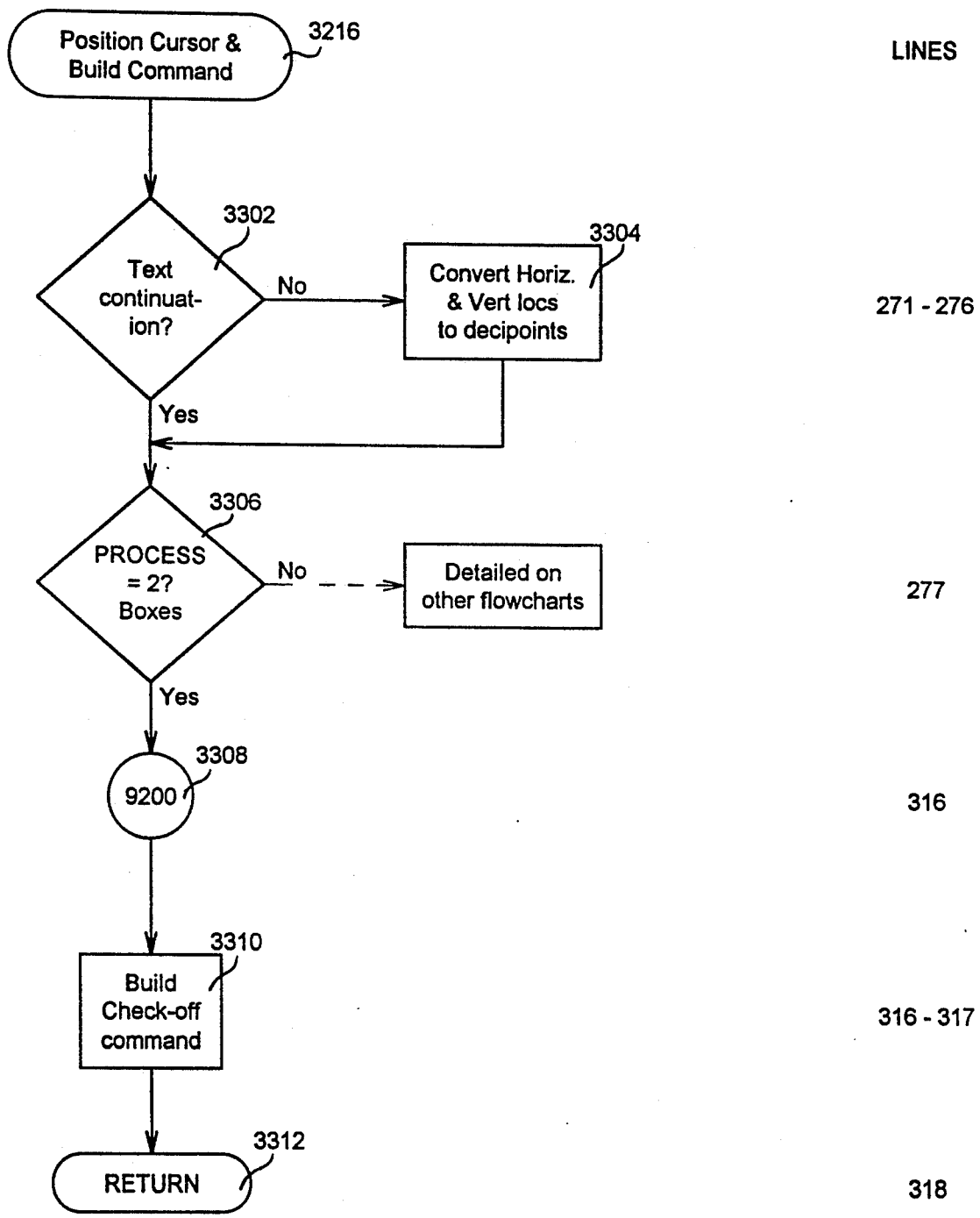
FIG. 33 is a logic diagram showing the Check-Off Box command routine.

Refer to FIG. 32. STD.FORMS.BUILDER Main Logic Flow (Cont.)

Once all lines, boxes, shading, and pattern fills are completed, the program will then set the PROCESS flag to two (2) 3202 to signify that the check-off boxes are being processed. The program counts the number of check-off box entries 3204, and then examines each entry in turn 3206-3218. Once finished 3208, the program clears the check-off data in the source record 3210, and continues 3212 (refer to FIG. 34). As each entry is processed, the data is identified 3214, and the Curser Position and Command Building routine is called 3218. After each entry is processed, the index is incremented 3218 to examine the next check-off box entry.

Once again in the Curser Position and Command Building routine (Tag 9000) 3216, the program checks the horizontal position field to see if it is null 3202, and if so, converts the positions (both horizontal and vertical) to decipoints 3304. The routine continues to Tag 9200 (based on the PROCESS flag) 3308, builds the command 3310 which is composed of the positioning command and the box command built at the beginning of the program 3012, and then returns 3312 to examine the next check-off box entry.

Figure 34A:
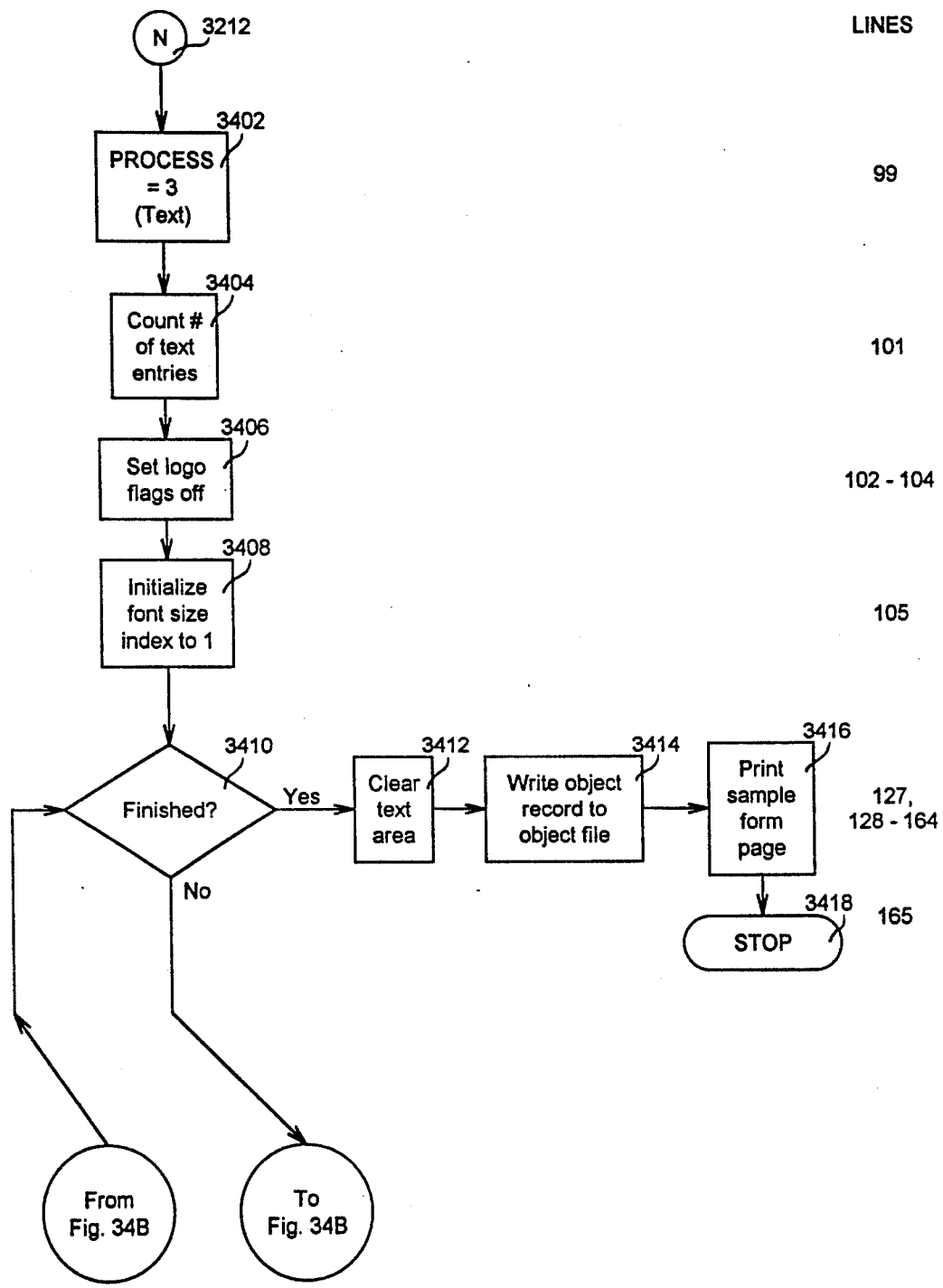
FIGS. 34A and 34B is a continuation of FIGS. 30A and 30B and FIG. 32 completing the main logic diagram and a portion of the Text command routine.
Figure 34B:
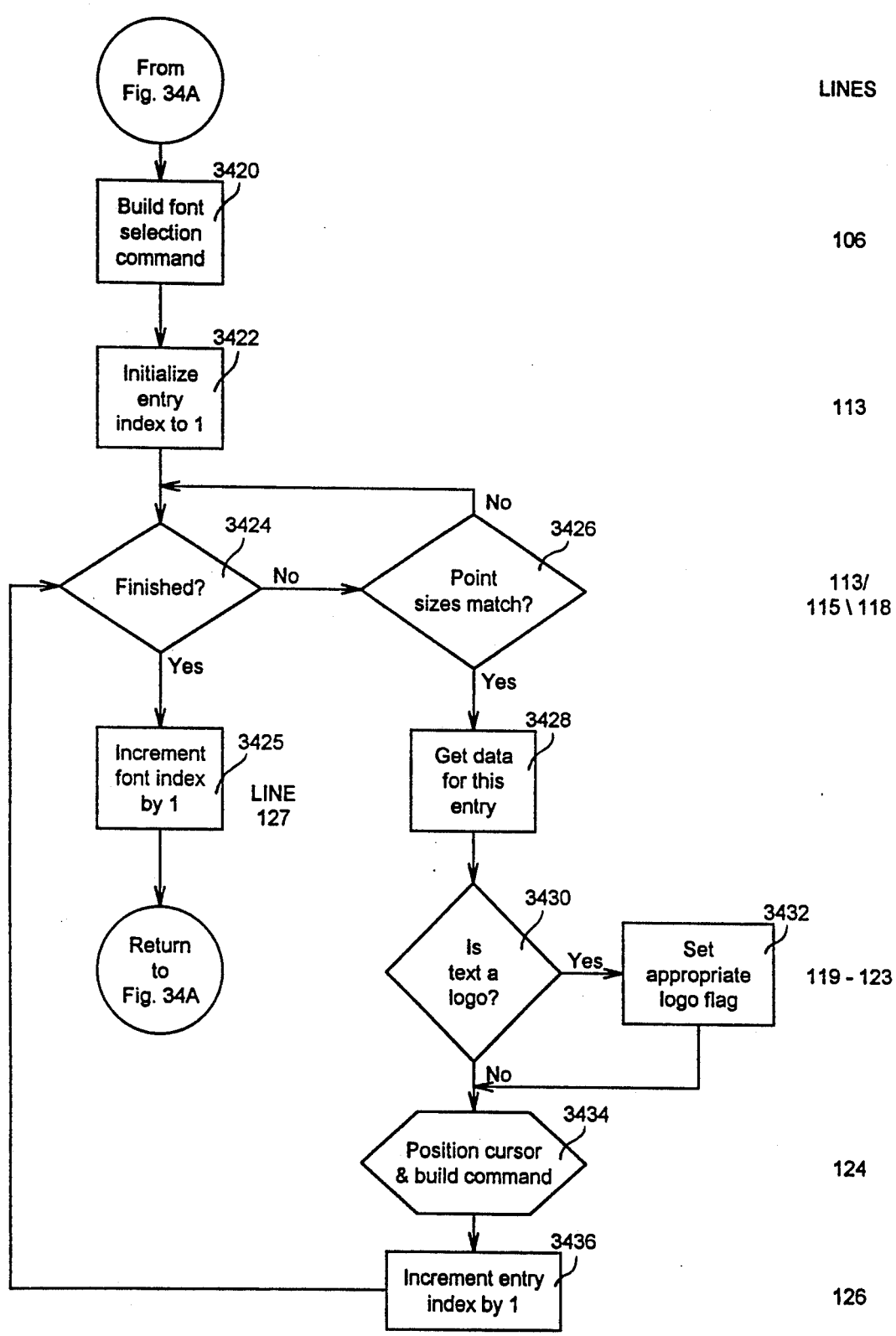

Refer to FIGS. 34A and 34B. STD.FORMS.-BUILDER Main Logic Flow (Cont.)

Once all check-off boxes are processed, the program sets the PROCESS flag to three (3) 3402 to indicate the third and final step in the document generation process, Text. After counting the number of text entries 3404, and setting the three logo flags off 3406, the program examines each font size in turn 3408-3425, searching all of the text entries to group all text for each of the allowable size together. This prevents the program from jumping back and forth between differing font commands since the text is not entered in any font size order. As each font size is processed 3408-3425, each text entry is searched for a match 3422-3436. If the font size matches as to both font point size and strike weight, the data for this entry is identified 3428. If the text for this entry is one of the following words: "CISCO" "ACORD" or "AETNA" 3430, the program sets a specific logo flag 3432 to permit building a special command to print the digitized logos later on. (See below for further description of digitized logos. ) The Curser Position and Command Building routine is called 3434 (again), and then the entry index is incremented to check the next text entry 3436.

Figure 35A:
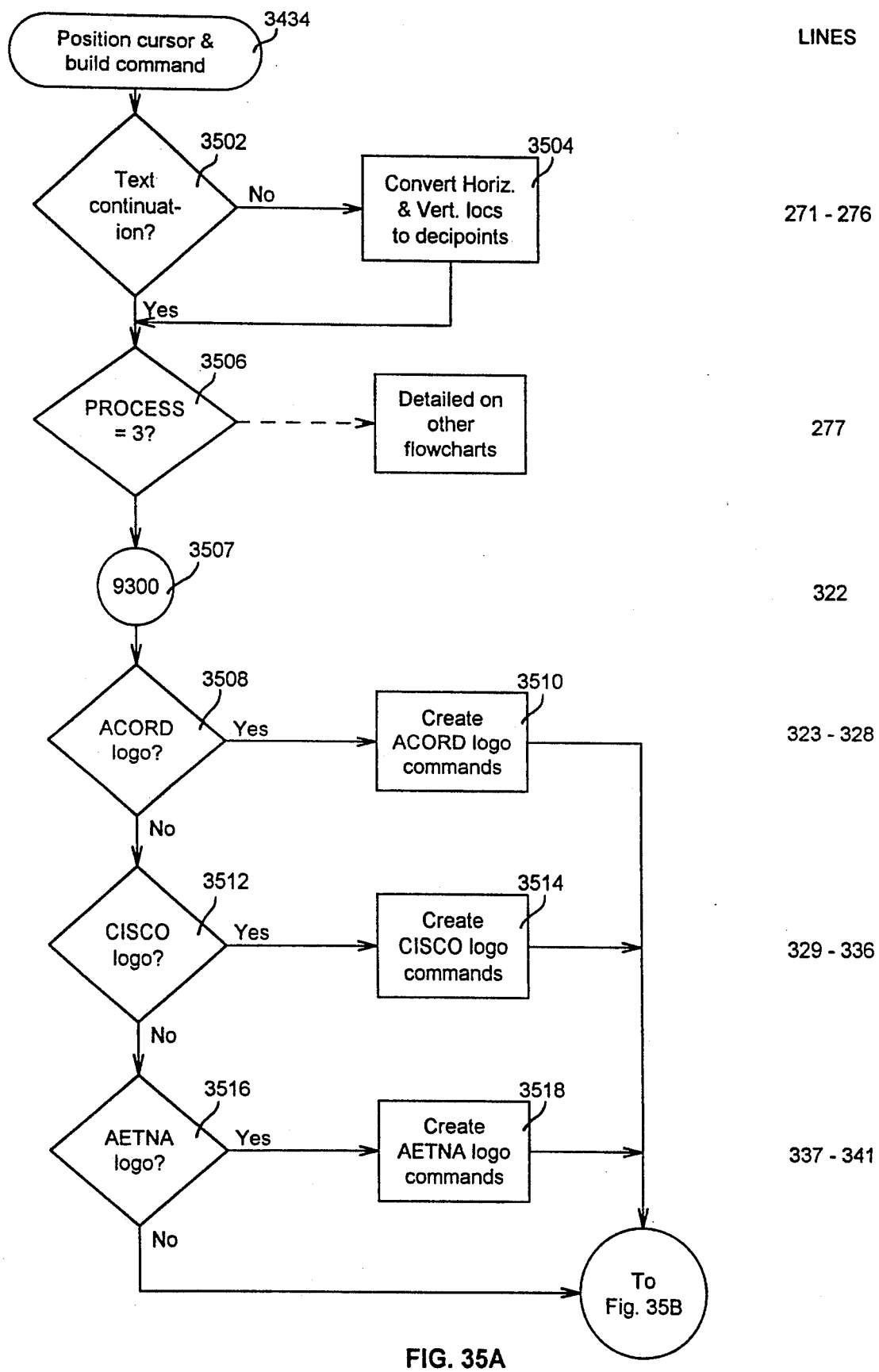
FIGS. 35A and 35B is a logic diagram of the Text command routine.
Figure 35B:
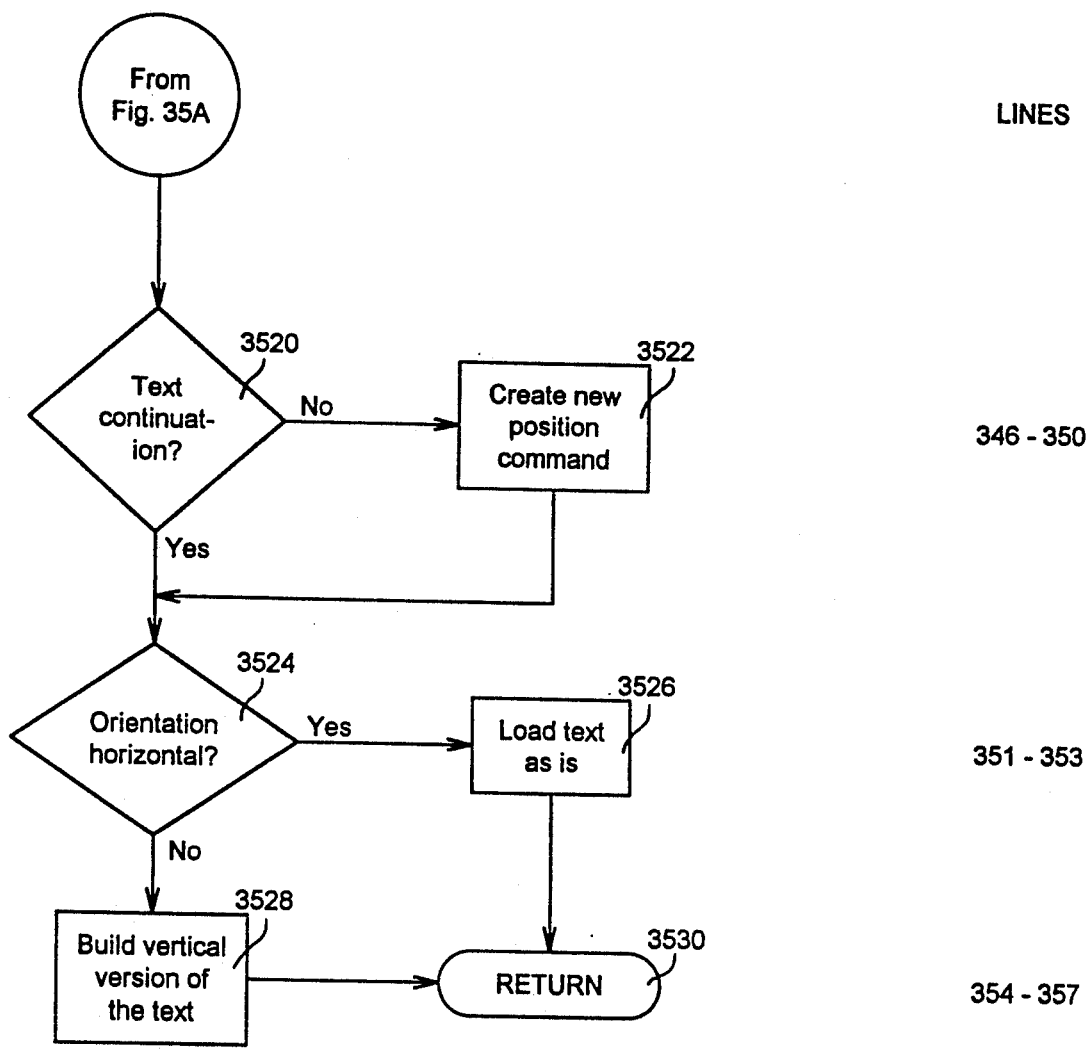

Refer to FIGS. 35A and 35B. STD.FORMS.-BUILDER Text Command

Text continuation 3042, 3302, and 3502. This test has been encountered three times—the Curser Position and Command Building routine is used by all sections of the program: Lines, Check-Off Boxes, and Text. Here is why this test is here. The entry program used to enter all of the image data permits the developer (operator) to enter 53 characters of text. Usually, this is sufficient since in most cases the text is used to label sections of the form. There are places on some forms, however, where large amounts of text (more than 53 characters worth) are required. So, if the operator is entering a second (or third, or fourth, etc) block of fifty-three (53) characters that is a continuation of another block of text, she simply leaves the Horizontal position blank. This will indicate to this program that no new curser position is to be generated, and this additional text will be concatenated to the previous text. So, once again the program tests to see if this is a text continuation 3502, and if not, it converts the positions to decipoints 3504. If is it, then no position conversion is necessary since no positioning command will be issued. The program continues to Tag 9300 3507 to process the text.

The use of digitized logos was mentioned above in connection with the logo flags. The laser printers that are in general use today have the capability to print a digitized graphic image. In the preferred embodiment of the invention, three digitized logos have been created by conventional technique for inclusion on any of the forms generated. These logos are invoked by entering a specific word in the text entry. The program will generate the custom command required to print the logo.

The program tests for the custom logo text 3508, 3512, and 3516. If the flag is set, the appropriate logo command is generated 3210, 3514, or 3518. Once again the text continuation test is executed 3520, and if not, the actual curser positioning command is built. If the text orientation is (H)orizontal 3524, the text (or logo command) is combined with the curser command and placed into the Object record. If the orientation is (V)ertical 3524, then the system will build a series of commands that will print the text

```
l
i
k
e t
h
i
s
```

3528, and load it into the Object record. In either case, the program returns 3530 to process the next text entry. Refer to FIG. 34. STD.FORMS BUILDER Text Command Once all of the text has been processed 3410, the program will clear the text area 3412, write the Object record to the Object file (ACORD.FORMS) 3414, print the generated form 3416 so that the developer can verify that all is well, and stop 3418.

Figure 37:
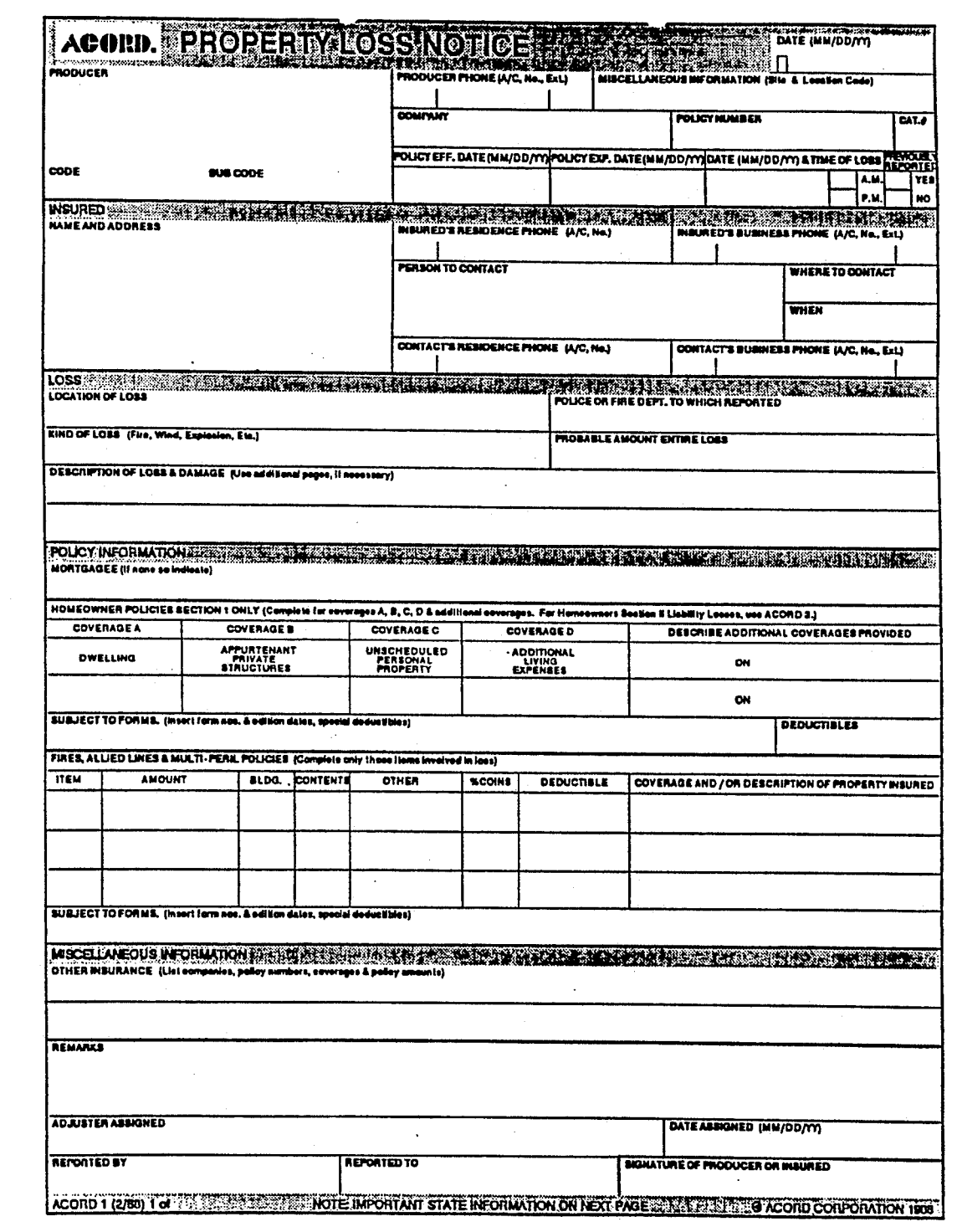

Once the Object file image records are created, they are stored on disk until needed. When an operator requests that a specific document is to be printed, a program will be executed that reads up the Object image record for the desired form, and starting with Attribute 8, loops through all of the commands and outputs them to the printer. Once all of the commands have been processed, a complete background image of the document now resides in the printer. See FIG. 37 for an example of an ACORD Property Loss Notice printed in accordance herewith.

The program will then send the variable information to complete the process. The result is a completed document ready for submission, as shown in FIG. 38.

Both the Audit History and Forms Generation features of the present invention involve printed output. In the case of Audit History, the operator may wish to print images of the historical images for reference. All of the results of the Form Generator are printed by the laser printer. To support the modern office environment, the system of the present invention supports distributed printing as opposed to centralized printing. Because of the myriad of documents generated, centralized printing with one fast line printer is not feasible or practicable. The problem that arises with distributed printing is how to direct the spooler output to the correct printer based on the following guidelines:

1. Most printed output needs to be printed on the printer closest to the operator that generated the print request.
2. Print requests that require that the output be printed on a specific printer (checks, for example) need to be routed to the appropriate printer.

In the preferred embodiment of the Office Automation System, the management of the printers is controlled by a hierarchical decision table utilizing the following information:

FORMS file: This file contains one record for each document printed. Among the information in the record is the specific spooler Queue that is assigned to this output. If the Queue number is null, then the printed output will be sent to the spooler Queue as specified by . . .

TERMINAL file: This file contains one record for each port that has an ASCII terminal attached to it. The port number identifies the physical location of the terminal since all terminals are hard-wired to the host. One field in this record is the Default Spooler Queue for this port. This Queue number will direct the printer scheduler to . . .

QUEUE file: This file contain one record for each spooler Queue required by the system. Many queues are permitted (in some systems 256), and each queue can be thought of as a logical printing device. This logical printing device record has a field that points to a physical printing device in the . . .

DEVICE file: This file contains one record for each physical printing device attached to the computer. Each device record contains the name of the printer assigned to this device number. The printer field in the device then points to . . .

PRINTER file: This file contains one record for each printer supported by the Office Automation System. Information in this record is used to send the correct commands (they differ from printer to printer) to the correct device as specified by the queue assigned to this form or operator.

Whenever printed output is generated, a program is called that examines the current status of the above files and directs the printed output to the correct spooler queue, and insures that the correct printer commands are issued to the correct printer.

While but one embodiment of the present invention has been extensively described and illustrated, it will be apparent to those skilled in the art that changes and modifications may be made therein, which changes and modifications nevertheless will not depart from the spirit and scope of the invention as claimed in the various claims appended hereto.

```
001 SUBROUTINE STD.HISTORY.SUB$8
002 GO TO 9
003 * Program....: STD.HISTORY.SUB
004 * Description: Standard Audit History Update and Display
005 * Revision...: 8.0 - Transaction Code is no longer multi-valued.
006 * Project....: 4.0 - SMRFs fixed since Release 3.2.
007 * Programmer.: David M. Murdock
008 * Copyright..: 1990 Creative Information Systems CO. Ltd.
009 *----------
010 * STD.HISTORY.SUB
011 * David M. Murdock   - 201-429-7733
012 * Creative Information Systems CO. Ltd.
013 * STANDARD HISTORY UPDATE & DISPLAY
014 *----------
015 *
016 * SUBROUTINE SETUP
017 *
018 * PROCESS = 1 TO UPDATE; 2 TO DISPLAY
019 *
020 * ATTR 1 IN HEADER RECORD WILL BE UPDATED WITH OP INIT SVM DATE SVM TIME
021 * SVM MODE SVM CHANGE NUMBER SVM PROGRAM SVM ADDL HIST INFO
022 *
023 *
024 *
025 $INCLUDE EQUATES SYSTEM.COMMON
026 *
027 $INCLUDE EQUATES TERMINAL
028 *
029 $INCLUDE EQUATES CHANGES
030 *
031 EQU DEL TO CHAR(127)
032 *
033 ******************************************************************
034 9    IF DEBUG.FLAG THEN
035         CRT @(0,22):CL:'STD.HISTORY.SUB DEBUG; PROCESS(':PROCESS:')':
036         INPUT DUMMY,1:
037         CRT @(0,22):CL:
038      END
039      IF ACF.SYS.REC(10) THEN RETURN
040      SCREEN.SUB = PGM.NAME:'.BGFG'
041      ON PROCESS GO TO 100,200
042      PRMT.KEY = 'Invalid Process Code (':PROCESS:') passed'
043      RETURN
044 *
045 * UPDATE AN ITEM
046 *
047 100  CHANGE.NO = HDR.REC(CHANGE.HIST)<1,1,5> + 1
048      IF MODE = 'CA' THEN MODE = 'A'
049      IF MODE = 'A' THEN
050         ! CHECK TO SEE IF THIS RECORD WAS PREVIOUSLY DELETED AND REVISE THE
051         ! CHANGE.NO TO ADD AT THE END
052         HIST.EOF = 0
053         LOOP
054            HIST.KEY = INT.HDR.KEY:"*":CHANGE.NO
055            READV DUMMY FROM HIST.FILE,HIST.KEY,1 ELSE HIST.EOF = 1
```

```
056            UNTIL HIST.EOF DO
057              CHANGE.NO = CHANGE.NO + 1
058            REPEAT
059         END ELSE
060            HIST.KEY = INT.HDR.KEY:"*":CHANGE.NO
061         END
062         HIST.INFO = CURR.OP:SVM:DATE():SVM:TIME():SVM:MODE:SVM:CHANGE.NO:SVM:F
    IELD(PGM.NAME,'$',1)
063         !
064         ! ADD ADDITIONAL ATTR INFO IF NECESSARY
065         !
066         IF ADDL.HIST.DATA # '' THEN
067            HIST.INFO<CHANGE.HIST,1,7> = ADDL.HIST.DATA
068            IF ADDL.HIST.DATA<1,1,2> # '' THEN ;* ENDORSEMENT # PRESENT
069               END.FLAG = 1
070               *
071               * OPEN CHANGES FILE AND GET CHANGES RECORD
072               *
073               FL.KEY = 'CHANGES'; GOSUB 9900; CHANGES.FILE = FL.KEY
074               READU CHANGES.REC FROM CHANGES.FILE,CURRENT.END.NO ELSE
075                  CHANGES.REC              = ''
076                  CHANGES.REC<CHG.EFF.DATE> = HIST.INFO<CHANGE.HIST,1,7>
077                  CHANGES.REC<CHG.TRAN>     = CURRENT.TRAN
078               END
079               *
080               * DETERMINE WHICH VALUE TO PLACE THIS CHANGE
081               *
082               CHG.INDX = DCOUNT(CHANGES.REC<5>,VM) + 1
083               *
084               * OPEN DICT LEVEL OF DATA FILE FOR OCONVing DATA FIELDS
085               *
086               FL.KEY = 'DICT ':EXT.HDR.FILE ; GOSUB 9900; DCHG.FILE = FL.KEY
087               *
088               * GET EXCLUSION RECORD FROM ACF FILE FOR THIS DATA FILE
089               *
090               READ EXCL.REC FROM ACF.FILE,EXT.HDR.FILE ELSE EXCL.REC = ''
091            END ELSE
092               END.FLAG = 0
093            END
094         END ELSE
095            END.FLAG = 0
096         END
097         RECORD.CHANGED = 0
098         HIST.REC = HIST.INFO
099         BEGIN CASE
100            CASE MODE = 'A'
101               RECORD.CHANGED = 1
102               IF END.FLAG THEN
103                  CHANGES.REC<CHG.OPER,CHG.INDX>   = HIST.INFO<CHANGE.HIST,1,1>
104                  CHANGES.REC<CHG.DATE,CHG.INDX>   = HIST.INFO<CHANGE.HIST,1,2>
105                  CHANGES.REC<CHG.TIME,CHG.INDX>   = HIST.INFO<CHANGE.HIST,1,3>
106                  CHANGES.REC<CHG.MODE,CHG.INDX>   = HIST.INFO<CHANGE.HIST,1,4>
107                  CHANGES.REC<CHG.NO,CHG.INDX>     = HIST.INFO<CHANGE.HIST,1,5>
108                  CHANGES.REC<CHG.PGM,CHG.INDX>    = HIST.INFO<CHANGE.HIST,1,6>
109                  CHANGES.REC<CHG.FILE,CHG.INDX>   = EXT.HDR.FILE
110                  CHANGES.REC<CHG.KEY,CHG.INDX>    = INT.HDR.KEY
111                  CHANGES.REC<CHG.ATTR,CHG.INDX>   = ''
112                  CHANGES.REC<CHG.VAL,CHG.INDX>    = ''
113                  CHANGES.REC<CHG.SVAL,CHG.INDX>   = ''
114                  CHANGES.REC<CHG.OLD,CHG.INDX>    = ''
115                  CHANGES.REC<CHG.NEW,CHG.INDX>    = HDR.REC(3)<1,1>
116               END
117            CASE MODE = 'C'
118               FOR X = 1 TO MAX.AUDIT
119                  IF X # CHANGE.HIST THEN ;* CHANGE.HIST CONTAINS ATTR # WHERE INF
    O IS STORED
120                     IF HDR.REC(X) # OLD.REC(X) THEN
121                        VALS = COUNT(HDR.REC(X),VM)
122                        O.VALS = COUNT(OLD.REC(X),VM)
123                        IF O.VALS > VALS THEN VALS = O.VALS
124                        FOR Y = 1 TO VALS + 1
125                           IF HDR.REC(X)<1,Y> # OLD.REC(X)<1,Y> THEN
126                              SVALS = COUNT(HDR.REC(X)<1,Y>,SVM)
127                              O.SVALS = COUNT(OLD.REC(X)<1,Y>,SVM)
128                              IF O.SVALS > SVALS THEN SVALS = O.SVALS
129                              FOR Z = 1 TO SVALS + 1
```

```
130                     IF HDR.REC(X)<1,Y,Z> # OLD.REC(X)<1,Y,Z> THEN
131                       HIST.REC<-1> = X:VM:Y:VM:Z
132                       IF OLD.REC(X)<1,Y,Z> = '' THEN
133                         HIST.REC<-1> = DEL
134                       END ELSE
135                         HIST.REC<-1> = OLD.REC(X)<1,Y,Z>
136                       END
137                       RECORD.CHANGED = 1
138                       IF END.FLAG THEN
139                         IF EXCL.REC<1> # 'ALL' THEN
140                           LOCATE(X,EXCL.REC,1;DUMMY) ELSE
141                             *
142                             * THIS ATTR IS NOT ON THE EXCLUSIONARY LIST - UPDATE THE CHANGES RECORD
143                             *
144                             CHANGES.REC<CHG.OPER,CHG.INDX>      = HIST.INFO<CHANGE.HIST,1,1>
145                             CHANGES.REC<CHG.DATE,CHG.INDX>      = HIST.INFO<CHANGE.HIST,1,2>
146                             CHANGES.REC<CHG.TIME,CHG.INDX>      = HIST.INFO<CHANGE.HIST,1,3>
147                             CHANGES.REC<CHG.MODE,CHG.INDX>      = HIST.INFO<CHANGE.HIST,1,4>
148                             CHANGES.REC<CHG.NO,CHG.INDX>        = HIST.INFO<CHANGE.HIST,1,5>
149                             CHANGES.REC<CHG.PGM,CHG.INDX>       = HIST.INFO<CHANGE.HIST,1,6>
150                             CHANGES.REC<CHG.FILE,CHG.INDX>      = EXT.HDR.FILE
151                             CHANGES.REC<CHG.KEY,CHG.INDX>       = INT.HDR.KEY
152                             CHANGES.REC<CHG.ATTR,CHG.INDX>      = X
153                             CHANGES.REC<CHG.VAL,CHG.INDX>       = Y
154                             CHANGES.REC<CHG.SVAL,CHG.INDX>      = Z
155                             READV CNV FROM DCHG.FILE,X,7 ELSE CNV = ''
156                             IF CNV # '' AND CNV # 'MR0' THEN
157                               CHANGES.REC<CHG.OLD,CHG.INDX>     = OCONV(OLD.REC(X)<1,Y,Z>,CNV):SVM:OLD.REC(X)<1,Y,Z>
158                               CHANGES.REC<CHG.NEW,CHG.INDX>     = OCONV(HDR.REC(X)<1,Y,Z>,CNV):SVM:HDR.REC(X)<1,Y,Z>
159                             END ELSE
160                               CHANGES.REC<CHG.OLD,CHG.INDX>     = OLD.REC(X)<1,Y,Z>
161                               CHANGES.REC<CHG.NEW,CHG.INDX>     = HDR.REC(X)<1,Y,Z>
162                             END
163                             CHG.INDX = CHG.INDX + 1
164                           END
165                         END
166                       END
167                     END
168                   NEXT Z
169                 END
170               NEXT Y
171             END
172           END
173         NEXT X
174       CASE MODE = 'D'
175         FOR X = 1 TO MAX.AUDIT
176           IF X # CHANGE.HIST THEN ;* CHANGE.HIST CONTAINS ATTR # WHERE INFO IS STORED
177             VALS = COUNT(HDR.REC(X),VM)
178             FOR Y = 1 TO VALS + 1
179               SVALS = COUNT(HDR.REC(X)<1,Y>,SVM)
180               FOR Z = 1 TO SVALS + 1
181                 HIST.REC<-1> = X:VM:Y:VM:Z
182                 IF HDR.REC(X)<1,Y,Z> = '' THEN
183                   HIST.REC<-1> = DEL
184                 END ELSE
185                   HIST.REC<-1> = HDR.REC(X)<1,Y,Z>
186                 END
187               NEXT Z
188             NEXT Y
189           END
190         NEXT X
```

```
191            RECORD.CHANGED = 1
192         CASE MODE = 'P'
193            RECORD.CHANGED = 1
194         END CASE
195         IF RECORD.CHANGED THEN
196            HDR.REC(CHANGE.HIST) = HIST.INFO
197            WRITE HIST.REC ON HIST.FILE,HIST.KEY
198            IF END.FLAG THEN WRITE CHANGES.REC ON CHANGES.FILE,CURRENT.END.NO
199         END ELSE
200            IF END.FLAG THEN RELEASE CHANGES.FILE,CURRENT.END.NO
201         END
202         RETURN
203  *
204  * DISPLAY HISTORY
205  *
206  200   MAT SAVE.DY.COM = MAT DY.COM            ;* SAVE DYNAMIC VARIABLES
207         LAST.CHANGE.NO = ''
208         GENERIC.PGM = FIELD(PGM.NAME,'$',1)
209         SAVE.LIS.INFO = LIS.INFO              ;* SAVE LIS INFORMATION - IT G
     ETS CHANGED
210         MATWRITE HDR.REC ON WORK.FILE,'SAVED'  ;* SAVE THE CURRENT RECORD
211         FOR X=MAX.AUDIT + 1 TO 100             ;* CLEAR THE WORK AREA
212            HDR.REC(X)=''
213         NEXT X
214         NO.OF.CHANGES = HDR.REC(CHANGE.HIST)<1,1,5>
215  *
216  * GET SEQUENCE DATE FROM OPERATOR
217  *
218         IF ADDL.HIST.DATA GE 1 AND ADDL.HIST.DATA LE 100 THEN
219            PRMT.KEY = 145
220            HELP.KEY = 'STD.HISTORY.200'
221            GOSUB 9210
222            BEGIN CASE
223              CASE ANS = 'P'
224                 SEQ.SVAL = 2
225              CASE 1
226                 SEQ.SVAL = 7
227            END CASE
228         END ELSE
229            SEQ.SVAL = 2
230         END
231  *
232  * SORT AUDIT.RECORDS INTO DATE/TIME ORDER
233  *
234         OTHER.PGMS = 0
235         SEQ.TBL = ''
236         FOR X = 1 TO NO.OF.CHANGES
237            WORK.KEY = INT.HDR.KEY:"*":X
238            READV AUDIT.INFO FROM HIST.FILE,WORK.KEY,1 ELSE AUDIT.INFO = ''
239            SORT.SEQ = AUDIT.INFO<1,1,SEQ.SVAL>'R%5':AUDIT.INFO<1,1,5>'R%4'  ;* S
     ORT SEQ IS DATE, CHANGE#
240            LOCATE(SORT.SEQ,SEQ.TBL,1;INDX;'AR') ELSE
241              SEQ.TBL = INSERT(SEQ.TBL,1,INDX,0,SORT.SEQ)
242              SEQ.TBL = INSERT(SEQ.TBL,2,INDX,0,WORK.KEY)
243            END
244            IF GENERIC.PGM # AUDIT.INFO<1,1,6> THEN OTHER.PGMS = 1
245         NEXT X
246         NO.OF.CHANGES = DCOUNT(SEQ.TBL<1>,VM)
247  *
248  * ASK IF ALL CHANGES OR JUST THIS PROGRAM
249  *
250         ALL = 1
251         IF OTHER.PGMS THEN
252            PRMT.KEY = 405
253            GOSUB 9210
254            BEGIN CASE
255              CASE ANS = 'E'
256                 GO TO 211
257              CASE ANS = 'Y'
258                 ALL = 0
259            END CASE
260         END
261  *
262  * GET DATE
263  *
264  210   PRMT.KEY = 144
```

```
265         HELP.KEY = 'STD.HISTORY.210'
266         LENG = 8
267         GOSUB 9220
268         BEGIN CASE
269            CASE ANS[1,1] = 'E'              ;* RETURN
270  211        MAT DY.COM = MAT SAVE.DY.COM    ;* RESTORE DYNAMIC VARIABLES
271             MATREAD HDR.REC FROM WORK.FILE,'SAVED' ELSE ABORT ;* RESTORE HDR R
     ECORD
272             LIS.INFO = SAVE.LIS.INFO        ;* RESTORE LIS INFORMATION
273             CLEARFILE WORK.FILE             ;* CLEAR HISTORY WORK
274             ACTIVE.REC = ''
275             VISUAL.REC = ''
276             RETURN
277          CASE ANS = ''                      ;* START TODAY
278             START = DATE()'R%5':9999'R%4'
279          CASE 1                             ;* OPERATOR ENTERED A START DATE
280             ANS = OCONV(ANS,'MCN')
281             IF ANS = '' THEN
282                START = DATE()'R%5':9999'R%4'
283             END ELSE
284                EXT.DTE = ANS[1,2]:'/':ANS[3,2]:'/':ANS[5,2]
285                INT.DTE = ICONV(EXT.DTE,'D')
286                IF INT.DTE = '' THEN
287                   PRMT.KEY = 8
288                   GOSUB 9200
289                   GO TO 210
290                END
291                START = INT.DTE'R%5':9999'R%4'
292             END
293          END CASE
294          LOCATE(START,SEQ.TBL,1;CURRENT.CHANGE.NO;'AR') ELSE NULL
295          IF CURRENT.CHANGE.NO > NO.OF.CHANGES THEN
296             CURRENT.CHANGE.NO = NO.OF.CHANGES
297          END ELSE
298             IF CURRENT.CHANGE.NO > 2 THEN
299                CURRENT.CHANGE.NO = CURRENT.CHANGE.NO - 1
300             END
301          END
302          READ ACTIVE.REC FROM HDR.FILE,INT.HDR.KEY ELSE ACTIVE.REC = ''
303       *
304       * REMOVE ALL CHANGES MADE TO THE RECORD
305       *
306          FOR XY = NO.OF.CHANGES TO 1 STEP -1
307             WORK.KEY = INT.HDR.KEY:'*':XY
308             READ HIST.REC FROM HIST.FILE,WORK.KEY ELSE DEBUG
309             GOSUB 1000 ;* REMOVE CHANGES FROM ACTIVE.RECORD
310             WRITE DELTA.REC ON WORK.FILE,WORK.KEY
311          NEXT XY
312       *
313       * REMOVE EXTRA EMPTY LINE ITEMS
314       *
315          FOR X = 1 TO X + 1 UNTIL LIS.ATTR.LIST<X> = ''
316             * LOOKING AT EACH LIS
317             NO.OF.ATTRS = DCOUNT(LIS.ATTR.LIST<X>,VM)
318             MANDITORY.ATTR = LIS.ATTR.LIST<X,1>
319             NO.OF.VALS = DCOUNT(ACTIVE.REC<MANDITORY.ATTR>,VM) ;* COUNT THE MAND
     ITORY FIELD
320             FOR Y = 1 TO NO.OF.VALS
321                THIS.ATTR = LIS.ATTR.LIST<X,1>
322                IF ACTIVE.REC<THIS.ATTR,Y> = '' THEN
323                   * EMPTY LIS - DELETE SET
324                   FOR Z = 1 TO NO.OF.ATTRS
325                      THIS.ATTR = LIS.ATTR.LIST<X,Z>
326                      ACTIVE.REC = DELETE(ACTIVE.REC,THIS.ATTR,Y,0)
327                   NEXT Z
328                   Y = Y - 1
329                   NO.OF.VALS = NO.OF.VALS - 1
330                END
331             NEXT Y
332          NEXT X
333       *
334       * CREATE ORIGINAL VISUAL RECORD
335       *
336          VISUAL.REC = STR(TRM.RESET.NV:AM,MAX.AUDIT)
337          FOR X = 1 TO MAX.AUDIT
338             VALS = DCOUNT(ACTIVE.REC<X>,VM)
```

```
339            IF VALS < 1 THEN VALS = 1
340            FOR Y = 1 TO VALS
341              SVALS = DCOUNT(ACTIVE.REC<X,Y>,SVM)
342              IF SVALS < 1 THEN SVALS = 1
343              FOR Z = 1 TO SVALS
344                VISUAL.REC<X,Y,Z> = TRM.RESET.NV
345              NEXT Z
346            NEXT Y
347          NEXT X
348          WRITE VISUAL.REC ON WORK.FILE,INT.HDR.KEY:"*0*VISUAL"
349        *
350        * NOW APPLY THE DELTAS TO THE ORIGINAL RECORD IN HISTORY DATE ORDER
351        *
352          FOR XY = 1 TO NO.OF.CHANGES
353            WORK.KEY = SEQ.TBL<2,XY>
354            VISUAL.KEY = WORK.KEY:"*VISUAL"
355            READ DELTA.REC FROM WORK.FILE,WORK.KEY ELSE DEBUG
356            * VISUAL.REC = EXCHANGE(VISUAL.REC,'34','74')
357            AA1A.EXCH = VISUAL.REC
358            CONVERT "4" TO "t" IN AA1A.EXCH
359            VISUAL.REC = AA1A.EXCH
360 *$INCLUDE BP.NATIVE STD.HISTORY.SUB.221 ;* VISUAL.REC = EXCHANGE(VISUAL.REC
    ,'34','74')
361            GOSUB 2000 ;* APPLY CHANGES TO ACTIVE.RECORD
362            WRITE ACTIVE.REC ON WORK.FILE,WORK.KEY
363            WRITE VISUAL.REC ON WORK.FILE,VISUAL.KEY
364          NEXT XY
365        *
366        * NOW DISPLAY THE FIRST RECORD
367        *
368          GO TO 256
369 *
370 * FORWARD/BACKWARD PROMPT
371 *
372 250    PRMT.KEY = '58~':CURRENT.CHANGE.NO:' of ':NO.OF.CHANGES
373        REF.FILE = ''
374        HELP.KEY = 'STD.HISTORY.250'
375        LENG = 4
376        GOSUB 9220
377        BEGIN CASE
378          CASE ANS[1,1] = CHAR(10)            ;* GO BACK IN TIME
379            DUMMY = FIELD(ANS,CHAR(10),2)
380            DUMMY = OCONV(DUMMY,'MCN') + 0
381            IF DUMMY > 0 THEN DUMMY = DUMMY - 1
382            CURRENT.CHANGE.NO = CURRENT.CHANGE.NO - DUMMY
383 255        CURRENT.CHANGE.NO = CURRENT.CHANGE.NO - 1
384            IF CURRENT.CHANGE.NO < 1 THEN CURRENT.CHANGE.NO = 1
385 256        WORK.KEY = SEQ.TBL<2,CURRENT.CHANGE.NO>
386            VISUAL.KEY = WORK.KEY:"*VISUAL"
387            READ ACTIVE.REC FROM WORK.FILE,WORK.KEY ELSE ACTIVE.REC = ''
388            READ VISUAL.REC FROM WORK.FILE,VISUAL.KEY ELSE VISUAL.REC = ''
389            IF GENERIC.PGM # ACTIVE.REC<CHANGE.HIST,1,6> AND NOT(ALL) THEN
390              IF CURRENT.CHANGE.NO = 1 THEN
391                * WE HAVE REACHED THE END OF THE CHANGES AND THE LAST CHANGE
392                * WAS NOT MADE BY THIS PROGRAM
393                IF LAST.CHANGE.NO = '' THEN
394                  PRMT.KEY = 399
395                  GOSUB 9200
396                  GO TO 270
397                END
398                CURRENT.CHANGE.NO = LAST.CHANGE.NO + 1
399                GO TO 255
400              END
401              GO TO 255 ;* CHANGED BY ANOTHER PROGRAM - SKIP
402            END
403            GOSUB 9470                        ;* DISPLAY THE HISTORY RECORD
404          CASE ANS[1,1] = CHAR(11)            ;* GO FORWARD IN TIME
405            DUMMY = FIELD(ANS,CHAR(11),2)
406            DUMMY = OCONV(DUMMY,'MCN') + 0
407            IF DUMMY > 0 THEN DUMMY = DUMMY - 1
408            CURRENT.CHANGE.NO = CURRENT.CHANGE.NO + DUMMY
409 265        CURRENT.CHANGE.NO = CURRENT.CHANGE.NO + 1
410            IF CURRENT.CHANGE.NO > NO.OF.CHANGES THEN CURRENT.CHANGE.NO = NO.O
```

F.CHANGES
```
411            WORK.KEY = SEQ.TBL<2,CURRENT.CHANGE.NO>
412            VISUAL.KEY = WORK.KEY:"*VISUAL"
413            READ ACTIVE.REC FROM WORK.FILE,WORK.KEY ELSE ACTIVE.REC = ''
414            READ VISUAL.REC FROM WORK.FILE,VISUAL.KEY ELSE VISUAL.REC = ''
415            IF GENERIC.PGM # ACTIVE.REC<CHANGE.HIST,1,6> AND NOT(ALL) THEN
416              IF NO.OF.CHANGES = CURRENT.CHANGE.NO THEN
417                * WE HAVE REACHED THE END OF THE CHANGES AND THE LAST CHANGE
418                * WAS NOT MADE BY THIS PROGRAM
419                IF LAST.CHANGE.NO = '' THEN
420                   PRMT.KEY = 399
421                   GOSUB 9200
422                   GO TO 270
423                END
424                CURRENT.CHANGE.NO = LAST.CHANGE.NO - 1
425                GO TO 265
426              END
427              GO TO 265 ;* CHANGED BY ANOTHER PROGRAM - SKIP
428            END
429            GOSUB 9470                       ;* DISPLAY THE HISTORY RECORD
430          CASE INDEX(ANS,'+',1)
431            ANS = FIELD(ANS,'+',1)
432            NO.OF.LIS = DCOUNT(LIS.INFO,AM)
433            IF ANS GE 1 AND ANS LE NO.OF.LIS THEN LIS = ANS ELSE LIS = 1
434            LIS.INFO<LIS,1>=LIS.INFO<LIS,1> + 1
435            GOSUB 9440
436          CASE INDEX(ANS,'-',1)
437            ANS = FIELD(ANS,'-',1)
438            NO.OF.LIS = DCOUNT(LIS.INFO,AM)
439            IF ANS GE 1 AND ANS LE NO.OF.LIS THEN LIS = ANS ELSE LIS = 1
440            LIS.INFO<LIS,1>=LIS.INFO<LIS,1> - 1
441            IF LIS.INFO<LIS,1> < 1 THEN LIS.INFO<LIS,1> = 1
442            GOSUB 9440
443          CASE ANS[1,1] = 'E'               ;* RETURN
444 270        MAT DY.COM = MAT SAVE.DY.COM    ;* RESTORE DYNAMIC VARIABLES
445            MATREAD HDR.REC FROM WORK.FILE,'SAVED' ELSE ABORT ;* RESTORE HDR RECORD
446            LIS.INFO = SAVE.LIS.INFO        ;* RESTORE LIS INFORMATION
447            CLEARFILE WORK.FILE             ;* CLEAR HISTORY WORK
448            ACTIVE.REC = ''
449            VISUAL.REC = ''
450            RETURN
451          CASE 1
452            PRMT.KEY = 59
453            GOSUB 9200
454            GO TO 250
455        END CASE
456        GO TO 250
457 *
458 * REMOVE HISTORY RECORD CHANGES FROM ACTIVE RECORD
459 *
460 1000 DELTA.REC = ''
461      DELTA.REC<1> = HIST.REC<1>
462      ACTIVE.REC<CHANGE.HIST> = HIST.REC<1>
463      FOR X = 2 TO X + 2 STEP 2 UNTIL HIST.REC<X> = ''
464        DELTA.REC<X> = HIST.REC<X>
465        HIST.LOC.A = HIST.REC<X,1>
466        HIST.LOC.V = HIST.REC<X,2>
467        HIST.LOC.S = HIST.REC<X,3>
468        HIST.DATA = HIST.REC<X+1>
469        DELTA.REC<X+1> = ACTIVE.REC<HIST.LOC.A,HIST.LOC.V,HIST.LOC.S>
470        IF HIST.DATA = DEL THEN
471          ACTIVE.REC<HIST.LOC.A,HIST.LOC.V,HIST.LOC.S> = ''
472        END ELSE
473          ACTIVE.REC<HIST.LOC.A,HIST.LOC.V,HIST.LOC.S> = HIST.DATA
474        END
475      NEXT X
476      RETURN
477 *
478 * APPLY DELTA RECORD CHANGES TO ACTIVE RECORD
479 *
480 2000 FOR X = 1 TO 7
481        IF DELTA.REC<1,1,X> # ACTIVE.REC<CHANGE.HIST,1,X> THEN
482          ACTIVE.REC<CHANGE.HIST,1,X> = DELTA.REC<1,1,X>
483          VISUAL.REC<CHANGE.HIST,1,X> = TRM.BRV
484        END
```

```
485       NEXT X
486       FOR X = 2 TO X + 2 STEP 2 UNTIL DELTA.REC<X> = ''
487          DELTA.LOC.A = DELTA.REC<X,1>
488          DELTA.LOC.V = DELTA.REC<X,2>
489          DELTA.LOC.S = DELTA.REC<X,3>
490          DELTA.DATA = DELTA.REC<X+1>
491          ACTIVE.REC<DELTA.LOC.A,DELTA.LOC.V,DELTA.LOC.S> = DELTA.DATA
492          VISUAL.REC<DELTA.LOC.A,DELTA.LOC.V,DELTA.LOC.S> = TRM.BRV
493       NEXT X
494       RETURN
495 *
496 * STANDARD CALL ROUTINE
497 *
498 $INCLUDE BP STD.CALL.INCLUDE$1
499 9200 PRINT BELL:
500       SKIP.FLAG = 0
501       LENG = 0
502       GO TO 9220
503 9210 LENG = 2
504 9220 PGMS.KEY = 'STD.MESSAGE' ; GOSUB 8900
505       IF DEBUG.FLAG THEN
506        CRT @(0,22):CL:'STD.HISTORY.SUB DEBUG AFTER STD.MESSAGE':
507        INPUT DUMMY,1:
508        CRT @(0,22):CL:
509       END
510       RETURN
511 9300 PROCESS = 1 ;* DISPLAY BG
512       PGMS.KEY = SCREEN.SUB  ; GOSUB 8900
513       RETURN
514 9400 PROCESS = 2 ;* DISPLAY FG
515 9410 PGMS.KEY = SCREEN.SUB   ; GOSUB 8900
516       RETURN
517 9440 PROCESS = 4:AM:LIS
518       PRINT PROTECT.MODE.OFF:
519       PGMS.KEY = SCREEN.SUB  ; GOSUB 8900
520       PRINT PROTECT.MODE.ON:
521       RETURN
522 9450 PROCESS = 3 ;* CLEAR FG
523       PGMS.KEY = SCREEN.SUB  ; GOSUB 8900
524       RETURN
525 9470 PRINT PROTECT.MODE.OFF:
526       PROCESS = 4                         ;* DISPLAY HISTORY FG
527       LAST.CHANGE.NO = CURRENT.CHANGE.NO ;* SAVE LAST CHANGE DISPLAYED
528       PGMS.KEY = SCREEN.SUB  ; GOSUB 8900
529       PRINT PROTECT.MODE.ON:
530       RETURN
531 9500 * DISPLAY BOTH BG AND FG AFTER SCREEN ESCAPE
532       GOSUB 9300
533       GOSUB 9400
534       RETURN
535 *
536 * STD FILE OPEN ROUTINE
537 *
538 9900 PGMS.KEY = 'STD.OPEN' ; GOSUB 8900
539       IF PRMT.KEY # '' THEN
540          GOSUB 9200
541          ABORT
542       END
543 9999 RETURN
544 END

[405] 1 items listed out of 1 items.
    BANKS$3.MAIN
001 SUBROUTINE BANKS$3.MAIN
002 GO TO 9
003 * Add/Change Bank Codes
004 * BANKS
005 * Program....: BANKS
006 * Revision...: 3.0 - (a) expand routing code field; (b) 'do you want spaces
      in the MICR line?'; (c) field to declare ck#/acct#/transit# order
007 * Project....: BANKS - Option to print MICR coding on checks.
008 * Programmer.: Kenneth Lee Cibelli
009 * Copyright..: 1990 Creative Information Systems CO. Ltd.
```

```
010 ********************************************
011 * Creative Information Systems CO. Ltd.    *
012 *       650 Bloomfield Ave. Suite 202      *
013 *       Bloomfield, New Jersey  07003      *
014 *             (201) 429-7733               *
015 ********************************************
016 *
017 *
018 *
019 *
020 *
021 *
022 *
023 *
024 *
025 $INCLUDE EQUATES SYSTEM.COMMON
026 *
027 $INCLUDE EQUATES TERMINAL
028 *
029 $INCLUDE USER.BP BANKS$3.MAIN.EQUATES.INCLUDE
030 $INCLUDE USER.BP MAIN.DEBUG.INCLUDE
031 9 MODE=''
032 LIS.INFO = ''
033 ALST.KEY=''
034 LAST.INT.KEY=''
035 INT.HDR.KEY=''
036 FIELD.REDISPLAY=0
037 ADDL.HIST.DATA=''
038 HDR.FILE.NAME = "BANKS"
039 PGM.NAME = "BANKS$3"
040 SCREEN.SUB = PGM.NAME:".BGFG"
041 FL.KEY = "BANKS";GOSUB 9900;HDR.FILE = FL.KEY
042 EXT.HDR.FILE = "BANKS"
043 FL.KEY = "BANKS.HISTORY";GOSUB 9900;HIST.FILE = FL.KEY
044 CHANGE.HIST = 1
045 FL.KEY = "COAM";GOSUB 9900;COAM.FILE = FL.KEY
046 FL.KEY = "ZIPS";GOSUB 9900;ZIPS.FILE = FL.KEY
047 FL.KEY = "STATES";GOSUB 9900;STATES.FILE = FL.KEY
048 MAIN.SCREEN = 1
049 LAST.FIELD.NO = 14
050 LAST.TAB.FIELD.NO = 1
051 EXT.INT.KEY = 0
052 MAX.ATTRS = 18
053 MAX.AUDIT = 18
054 ADD.RECORDS = 1
055 CHANGE.RECORDS = 1
056 DELETE.RECORDS = 0
057 SCREEN.PROMPT = "55"
058 SCREEN.PROMPT.LEN = "7"
059 CALLED.SCREENS = ""
060 IF CURRENT.TRAN = 'DIS' THEN
061   * CAN'T ADD OR DELETE RECORDS IN DISPLAY MODE
062   ADD.RECORDS = 0
063   DELETE.RECORDS = 0
064 END
065 * END OF INITIALIZATION SECTION
066 READ FL.REC FROM FL.FILE,EXT.HDR.FILE ELSE NULL
067 IF FL.REC<8> THEN FIELD.XREF = 1 ELSE FIELD.XREF = 0
068 IF ACF.SYS.REC(7) # '' THEN
069   * WRITE AUDIT RECORD INTO SCRIPT FILE
070   AUDIT.STOP = TIME()
071   STD.ARG(1) = PGM.NAME
072   STD.ARG(2) = 'INITIALIZE'
073   PGMS.KEY = 'STD.AUDIT.FLOW' ;GOSUB 8900
074   AUDIT.START = TIME()
075 END
076 GOSUB 8200
077  GOSUB 9300
078 IF DEBUG.FLAG THEN
079   PROCESS = 3
080   GOSUB 8
081 END
082       * MARKER $$25
083 10    * MAIN PROGRAM LOOP FOR DATA ENTRY
084 100   REF.FILE="BANKS";HELP.KEY="BANKS.100";LENG=4;ILEN=0
085       HRZ=11;VRT=3;CON="MCAN":VM:"";PATT='0X';MASK="L#4";MAN="KEY";FIELD.NO=1;DY.TAB=""
```

```
086     IF MODE='' THEN OLDVALUE='' ELSE OLDVALUE=HDR.KEY
087     AMC=0;VMC=0;SVMC=0
088     IF MODE[1,1]="C" THEN
089        SAVE.LENGTH = LENG
090        PRMT.KEY=38
091        GOSUB 9200
092        SKIP.FLAG=1
093        LENG = SAVE.LENGTH
094     END
095     GOSUB 9000 ;***** STD.INPUT
096     IF ENTRY="" THEN PRMT.KEY=5;GOSUB 9200;GO TO 100
097     IF OCONV(ENTRY,"MCU")[1,2]=ESC2:"E" OR OCONV(ENTRY,"MCU")[1,2]=ESC2:"Q
" THEN
098        IF MODE # '' THEN         ;* CAN'T EXIT WHILE IN CHANGE MODE
099           PRMT.KEY=54
100           GOSUB 9200
101           GO TO 100
102        END
103        GO TO 9999
104     END
105     HDR.KEY=ENTRY ;IF MODE = '' THEN INT.HDR.KEY=ENTRY
106     IF MODE='' THEN
107        INT.HDR.KEY=HDR.KEY
108        MATREAD HDR.REC FROM HDR.FILE,INT.HDR.KEY THEN
109           IF CHANGE.HIST THEN MAT OLD.REC=MAT HDR.REC
110           GOSUB 9400 ;***** DISPLAY FOREGROUND
111           MODE="C"
112        END ELSE
113           IF NOT(ADD.RECORDS) THEN PRMT.KEY='109~':ENTRY;GOSUB 9200;GO TO 100
114           MODE="A"
115        END
116        LI.KEY=EXT.HDR.FILE:"*":INT.HDR.KEY
117        PROCESS=1
118        GOSUB 9700
119        IF PRMT.KEY # '' THEN
120           GOSUB 9200
121           MODE='';GOSUB 9450
122           GO TO 100
123        END
124        IF MODE[1,1]="C" THEN GO TO 8000
125     END
126
127 110 REF.FILE="";HELP.KEY="";LENG=3;ILEN=0
128     HRZ=76;VRT=0;CON="MCAN":VM:"";PATT='0X';MASK="L#3";MAN="";FIELD.NO=1;DY.TAB=""
129     OLDVALUE=HDR.REC(1)<1,1,1>
130     AMC=1;VMC=1;SVMC=1
131     CRT @(HRZ,VRT):OLDVALUE MASK:
132     ENTRY=OLDVALUE
133
134 120 REF.FILE="";HELP.KEY="";LENG=8;ILEN=0
135     HRZ=62;VRT=1;CON="D":VM:"D2/";PATT='0N';MASK="R#8";MAN="";FIELD.NO=1;DY.TAB=""
136     OLDVALUE=HDR.REC(1)<1,1,2>
137     AMC=1;VMC=1;SVMC=2
138     CRT @(HRZ,VRT):OCONV(OLDVALUE,CON<1,2>) MASK:
139     ENTRY=OLDVALUE
140
141 130 REF.FILE="";HELP.KEY="";LENG=8;ILEN=0
142     HRZ=71;VRT=1;CON="MTS":VM:"MTS";PATT='2N':"2N":"2N';MASK="R#8";MAN="";FIELD.NO=1;DY.TAB=""
143     OLDVALUE=HDR.REC(1)<1,1,3>
144     AMC=1;VMC=1;SVMC=3
145     CRT @(HRZ,VRT):OCONV(OLDVALUE,CON<1,2>) MASK:
146     ENTRY=OLDVALUE
147
148 140 REF.FILE="";HELP.KEY="BANKS.140";LENG=25;ILEN=0
149     HRZ=11;VRT=4;CON="";PATT='0X';MASK="L#25";MAN="Y";FIELD.NO=2;DY.TAB=1:AM:1
150     OLDVALUE=HDR.REC(3)
151     AMC=3;VMC=0;SVMC=0
152     GOSUB 9000 ;***** STD.INPUT
153     HDR.REC(3)=ENTRY
154
155 150 REF.FILE="COAM";HELP.KEY="BANKS.150";LENG=20;ILEN=0
156     HRZ=11;VRT=5;CON="";PATT='0X';MASK="L#20";MAN="Y";FIELD.NO=3;DY.TAB=1
```

```
157         OLDVALUE=HDR.REC(4)
158         AMC=4;VMC=0;SVMC=0
159         GOSUB 9000 ;***** STD.INPUT
160         IF ENTRY # "" THEN
161            INT.KEY=ENTRY
162            READ COAM.REC FROM COAM.FILE,INT.KEY THEN
163               CRT @(38,5):COAM.REC<1,1,1>"L#25":
164            END ELSE
165               PRMT.KEY=ENTRY:" is not on the COAM file!"
166               GOSUB 9200 ;***** STD.MESSAGE
167               GO TO 150
168            END
169         END ELSE INT.KEY=''
170         HDR.REC(4)=ENTRY
171
172 160     REF.FILE="";HELP.KEY="BANKS.160";LENG=6;ILEN=0
173         HRZ=11;VRT=6;CON="MCN":VM:"MR0";PATT='ON';MASK="R#6";MAN="";FIELD.NO=4
    ;DY.TAB=1
174         OLDVALUE=HDR.REC(8)
175         AMC=8;VMC=0;SVMC=0
176         IF HDR.REC(7)='Y' THEN MAN='Y'
177         GOSUB 9000 ;***** STD.INPUT
178         HDR.REC(8)=ENTRY
179
180 170     REF.FILE="";HELP.KEY="";LENG=6;ILEN=0
181         HRZ=11;VRT=7;CON="MCN":VM:"MR0";PATT='ON';MASK="R#6";MAN="";FIELD.NO=4
    ;DY.TAB=1
182         OLDVALUE=HDR.REC(9)
183         AMC=9;VMC=0;SVMC=0
184         CRT @(HRZ,VRT):OCONV(OLDVALUE,CON<1,2>) MASK:
185         ENTRY=OLDVALUE
186
187 180     REF.FILE="";HELP.KEY="BANKS.180";LENG=39;ILEN=0
188         HRZ=11;VRT=8;CON="";PATT='0X';MASK="L#39";MAN="";FIELD.NO=5;DY.TAB=1
189         OLDVALUE=HDR.REC(10)
190         AMC=10;VMC=0;SVMC=0
191         GOSUB 9000 ;***** STD.INPUT
192         HDR.REC(10)=ENTRY
193
194 190     REF.FILE="ZIPS";HELP.KEY="BANKS.190";LENG=10 ILEN=0
195         HRZ=11;VRT=9;CON="MCAN":VM:"";PATT='0X';MASK="L#10";MAN="";FIELD.NO=6;
    DY.TAB=1
196         OLDVALUE=HDR.REC(13)
197         AMC=13;VMC=0;SVMC=0
198         GOSUB 9000 ;***** STD.INPUT
199         IF ENTRY # "" THEN
200            INT.KEY=ENTRY
201            READ ZIPS.REC FROM ZIPS.FILE,INT.KEY THEN
202               CRT @(29,9):ZIPS.REC<3,1,1>"L#24":
203               CRT @(62,9):ZIPS.REC<4,1,1>"L#2":
204               IF ENTRY # OLDVALUE THEN
205                  HDR.REC(11) = ZIPS.REC<3>
206                  HDR.REC(12) = ZIPS.REC<4>
207               END
208            END ELSE
209               PRMT.KEY=ENTRY:" is not on the ZIPS file!"
210               GOSUB 9200 ;***** STD.MESSAGE
211               GO TO 190
212            END
213         END ELSE INT.KEY=''
214         HDR.REC(13)=ENTRY
215
216 220     REF.FILE="";HELP.KEY="BANKS.220";LENG=15;ILEN=0
217         HRZ=31;VRT=10;CON="";PATT='0X';MASK="L#15";MAN="";FIELD.NO=7;DY.TAB=1
218         OLDVALUE=HDR.REC(15)
219         AMC=15;VMC=0;SVMC=0
220         IF HDR.REC(7)='Y' THEN MAN='Y'
221         GOSUB 9000 ;***** STD.INPUT
222         HDR.REC(15)=ENTRY
223
224 230     REF.FILE="";HELP.KEY="BANKS.230";LENG=1;ILEN=0
225         HRZ=31;VRT=11;CON="MCA":VM:"";PATT='0X';MASK="L#1";MAN="Y";FIELD.NO=8;
    DY.TAB=1
226         OLDVALUE=HDR.REC(7)
227         AMC=7;VMC=0;SVMC=0
228         GOSUB 9000 ;***** STD.INPUT
```

```
229        BEGIN CASE
230           CASE ENTRY="Y"
231           CASE ENTRY="N"
232           CASE ENTRY="y"
233           CASE ENTRY="n"
234           CASE 1
235              PRMT.KEY=67
236              GOSUB 9200 ;***** STD.MESSAGE
237              GO TO 230
238        END CASE
239        HDR.REC(7)=ENTRY
240
241 240    REF.FILE="";HELP.KEY="BANKS.240";LENG=1;ILEN=0
242        HRZ=31;VRT=12;CON="MCA":VM:"";PATT='0X';MASK="L#1";MAN="Y";FIELD.NO=9;
   DY.TAB=1
243        OLDVALUE=HDR.REC(14)
244        AMC=14;VMC=0;SVMC=0
245        GOSUB 9000 ;***** STD.INPUT
246        BEGIN CASE
247           CASE ENTRY="Y"
248           CASE ENTRY="N"
249           CASE ENTRY="y"
250           CASE ENTRY="n"
251           CASE 1
252              PRMT.KEY=67
253              GOSUB 9200 ;***** STD.MESSAGE
254              GO TO 240
255        END CASE
256        HDR.REC(14)=ENTRY
257
258 250    REF.FILE="COAM";HELP.KEY="BANKS.250";LENG=13;ILEN=0
259        HRZ=31;VRT=13;CON="";PATT='0X';MASK="L#13";MAN="";FIELD.NO=10;DY.TAB=1

260        OLDVALUE=HDR.REC(16)
261        AMC=16;VMC=0;SVMC=0
262        IF HDR.REC(7)='Y' THEN MAN='Y'
263        GOSUB 9000 ;***** STD.INPUT
264        IF ENTRY # "" THEN
265           INT.KEY=ENTRY
266           READ COAM.REC FROM COAM.FILE,INT.KEY THEN
267              END ELSE
268                 PRMT.KEY=ENTRY:" is not on the COAM file!"
269                 GOSUB 9200 ;***** STD.MESSAGE
270                 GO TO 250
271              END
272        END ELSE INT.KEY=''
273        HDR.REC(16)=ENTRY
274
275 260    REF.FILE="";HELP.KEY="BANKS.260";LENG=15;ILEN=0
276        HRZ=31;VRT=14;CON="MCN":VM:"MR0";PATT='0N';MASK="R#15";MAN="";FIELD.NO
   =11;DY.TAB=1
277        OLDVALUE=HDR.REC(5)
278        AMC=5;VMC=0;SVMC=0
279        IF HDR.REC(7)='Y' THEN MAN='Y'
280        GOSUB 9000 ;***** STD.INPUT
281        HDR.REC(5)=ENTRY
282
283 270    REF.FILE="";HELP.KEY="BANKS.270";LENG=15;ILEN=0
284        HRZ=31;VRT=15;CON="";PATT='0X';MASK="L#15";MAN="";FIELD.NO=12;DY.TAB=1

285        OLDVALUE=HDR.REC(6)
286        AMC=6;VMC=0;SVMC=0
287        IF HDR.REC(7)='Y' THEN MAN='Y'
288        GOSUB 9000 ;***** STD.INPUT
289        HDR.REC(6)=ENTRY
290
291 280    REF.FILE="";HELP.KEY="BANKS.280";LENG=1;ILEN=0
292        HRZ=31;VRT=16;CON="MCA";VM:"";PATT='0X';MASK="L#1";MAN="Y";FIELD.NO=13
   ;DY.TAB=1
293        OLDVALUE=HDR.REC(17)
294        AMC=17;VMC=0;SVMC=0
295        GOSUB 9000 ;***** STD.INPUT
296        BEGIN CASE
297           CASE ENTRY='Y'
298           CASE ENTRY='N'
```

```
299          CASE 1
300             PRMT.KEY=67
301             GOSUB 9200 ;***** STD.MESSAGE
302             GO TO 280
303          END CASE
304          HDR.REC(17)=ENTRY
305
306 290  REF.FILE="";HELP.KEY="BANKS.290";LENG=3;ILEN=0
307      HRZ=65;VRT=18;CON="MCA":VM:"";PATT='0X';MASK="L#3";MAN="Y";FIELD.NO=14
    ;DY.TAB=1
308      OLDVALUE=HDR.REC(18)
309      AMC=18;VMC=0;SVMC=0
310      GOSUB 9000 ;***** STD.INPUT
311      BEGIN CASE
312         CASE ENTRY='ACT'
313         CASE ENTRY='ATC'
314         CASE ENTRY='CAT'
315         CASE ENTRY='CTA'
316         CASE ENTRY='TAC'
317         CASE ENTRY='TCA'
318         CASE 1
319            PRMT.KEY=67
320            GOSUB 9200 ;***** STD.MESSAGE
321            GO TO 290
322      END CASE
323      HDR.REC(18)=ENTRY
324
325      * END OF KERNELS
326 8000 BEGIN CASE
327         CASE MODE='A' ; MODE='CA'
328         CASE MODE='AC' ; MODE='C'
329      END CASE
330      IF SKIP.FLAG=998 THEN
331         PRE.STORE=INSERT(PRE.STORE,1,1,0,'F')
332         SKIP.FLAG=0
333      END ELSE
334         SKIP.FLAG=0
335      END
336      FIELD.NO=LAST.FIELD.NO
337      MAN=''
338      REF.FILE=''
339      HELP.KEY=FIELD(PGM.NAME,'$',1):'.8000'
340      PRMT.KEY=SCREEN.PROMPT
341      LENG=SCREEN.PROMPT.LEN
342      GOSUB 9220
343      IF ANS[1,1]='.' THEN ANS=ANS[2,99]
344      BEGIN CASE
345 CASE ANS='F'
346    IF HDR.REC(7)='Y' THEN
347 IF HDR.REC(8)='' THEN
348    PRMT.KEY="If printing checks on printer, you must have a 1st check#!"
349    GOSUB 9210
350    GO TO 8000
351 END
352 IF HDR.REC(15)='' THEN
353    PRMT.KEY="If printing checks on printer, you must have a routing code!"
354    GOSUB 9210
355    GO TO 8000
356 END
357 IF HDR.REC(16)='' THEN
358    PRMT.KEY="If printing checks on printer, you must have an adj. GL#!"
359    GOSUB 9210
360    GO TO 8000
361 END
362 IF HDR.REC(5)='' THEN
363    PRMT.KEY="If printing checks on printer, you must have a bank transit#!"
364    GOSUB 9210
365    GO TO 8000
366 END
367 IF HDR.REC(6)='' THEN
368    PRMT.KEY="If printing checks on printer, you must have an account#!"
369    GOSUB 9210
370    GO TO 8000
371 END
372    END
```

```
373          IF (ADD.RECORDS OR CHANGE.RECORDS) THEN
374             GOSUB 8100
375             GOSUB 8200
376             GOSUB 9450
377             GO TO 10
378          END ELSE
379             PRMT.KEY=86
380          GOSUB 9200
381             GO TO 8000
382          END
383        CASE ANS='P'
384          IF (ADD.RECORDS OR CHANGE.RECORDS) THEN
385             GOSUB 8100
386             GOSUB 8200
387             GOSUB 9450
388             GO TO 10
389          END ELSE
390             PRMT.KEY=86
391          GOSUB 9200
392             GO TO 8000
393          END
394        CASE ANS='D'
395          IF (DELETE.RECORDS) THEN
396 8025     PRMT.KEY=42
397          GOSUB 9210
398          BEGIN CASE
399             CASE ANS='Y'
400                GOSUB 8500
401                MODE='D'
402                IF CHANGE.HIST THEN GOSUB 9600;* HISTORY
403                IF FIELD.XREF THEN;* FIELD XREF DELETE
404                   PROCESS='2'
405                   GOSUB 9725
406                END
407                DELETE HDR.FILE,INT.HDR.KEY
408                HDR.KEY=''
409                IF EXT.INT.KEY THEN
410                   PGMS.KEY = 'STD.EXT.INT' ;GOSUB 8900
411                END
412                GOSUB 8200
413                GOSUB 9450
414                GO TO 10
415             CASE ANS='N'
416             CASE ANS=''
417             CASE 1
418                PRMT.KEY=21
419                GOSUB 9200
420                GO TO 8025
421          END CASE
422          END ELSE
423             PRMT.KEY=87
424             GOSUB 9200
425             GO TO 8000
426          END
427        CASE ANS='Q';* QUIT
428          GOSUB 8200
429          GOSUB 9450
430          GO TO 10
431        CASE ANS = 'S' ;* SCREEN CALL
432          HELP.KEY = ''
433          X = 0
434          LOOP
435             X = X + 1
436             SC.HRZ = CALLED.SCREENS<X,2>
437             SC.VRT = CALLED.SCREENS<X,3>
438          UNTIL CALLED.SCREENS<X,1> = '' DO
439             CRT PROTECT.MODE.OFF:@(SC.HRZ+1,SC.VRT):R.BOUNDRY:@(SC.HRZ-1,SC.VRT):L.BOUNDRY:
440             PRMT.KEY = 500
441             GOSUB 9210
442             CRT PROTECT.MODE.OFF:@(SC.HRZ-1,SC.VRT):TRM.RESET.NV:PROTECT.MODE.ON:
443             BEGIN CASE
444                CASE ANS = 'Y'
445                   PGMS.KEY = CALLED.SCREENS<X,1>
446                   GOSUB 8900
```

```
447              GOSUB 9500
448             CASE ANS = 'E'
449              X = 99
450            END CASE
451           REPEAT
452          CASE ANS[1,1] = CHAR(9) AND CURRENT.TRAN = 'DIS'
453           PRMT.KEY = '498~<Tab>'
454           GOSUB 9200
455          CASE ANS[1,1]=CHAR(9);* TAB
456           ENTRY = ANS
457           DY.TAB=1
458           GO TO 9020
459          CASE ANS[1,1] = CHAR(11) AND CURRENT.TRAN = 'DIS'
460           PRMT.KEY = '498~<Up Arrow>'
461           GOSUB 9200
462          CASE ANS[1,1]=CHAR(11);* UP ARROW
463           ENTRY = ANS
464           FIELD.NO=LAST.FIELD.NO - ANS[2,3] + 1
465           GO TO 9010
466          CASE ANS[1,1] = CHAR(10) AND CURRENT.TRAN = 'DIS'
467           PRMT.KEY = '498~<Down Arrow>'
468           GOSUB 9200
469          CASE ANS[1,1]=CHAR(10);* DOWN ARROW
470           ENTRY = ANS
471           DY.TAB=1
472           GO TO 9020
473          CASE ANS[1,1] = CHAR(30) AND CURRENT.TRAN = 'DIS'
474           PRMT.KEY = '498~<Home>'
475           GOSUB 9200
476          CASE ANS[1,1]=CHAR(30);* HOME
477           ENTRY = ANS
478           DY.TAB=1
479           GO TO 9020
480         * MARKER $$35
481          CASE 1
482           PRMT.KEY='13'
483           GOSUB 9200
484         END CASE
485         GO TO 8000
486 8100 * UPDATING ROUTINE
487      IF ACF.SYS.REC(7) # '' AND CURRENT.TRAN # 'DIS' THEN
488         * WRITE AUDIT RECORD INTO SCRIPT FILE
489         AUDIT.STOP = TIME()
490         STD.ARG(1) = PGM.NAME
491         STD.ARG(2) = 'DATA ENTRY'
492         PGMS.KEY = 'STD.AUDIT.FLOW' ;GOSUB 8900
493         AUDIT.START = TIME()
494      END
495      * MARKER $$40
496      IF EXT.INT.KEY THEN
497         PGMS.KEY = 'STD.EXT.INT' ;GOSUB 8900
498         IF PRMT.KEY # '' THEN
499            GOSUB 9200
500            GOSUB 9400
501            RETURN TO 8000
502         END
503      END
504      IF FIELD.XREF THEN
505         * FIELD XREF UPDATE
506         PROCESS='1'
507         GOSUB 9725
508      END
509      FOR X=MAX.AUDIT + 1 TO MAX.ATTRS
510         HDR.REC(X)=''
511      NEXT X
512      IF CHANGE.HIST THEN GOSUB 9600;* HISTORY
513      READVU DUMMY FROM HDR.FILE,INT.HDR.KEY,1 ELSE NULL
514      MATWRITE HDR.REC ON HDR.FILE,INT.HDR.KEY
515      LAST.KEY=HDR.KEY
516      LAST.INT.KEY=INT.HDR.KEY
517      RETURN
518 8200 * RESET ROUTINE
519      MAT HDR.REC=''
520      MAT OLD.REC=''
521      SKIP.FLAG=0
522      MODE=''
```

```
523       HIST.REC=''
524       IF HDR.KEY # '' THEN
525         IF LAST.KEY # HDR.KEY THEN
526           LAST.OPERATION = 'QUIT'
527         END ELSE
528           LAST.OPERATION = 'FILE'
529         END
530       END ELSE
531         LAST.OPERATION = 'QUIT'
532       END
533       IF INT.HDR.KEY # '' THEN
534         LI.KEY=EXT.HDR.FILE:"*":INT.HDR.KEY
535         PROCESS=2
536         GOSUB 9700;* UNLOCK HDR RECORD
537         IF PRMT.KEY # '' THEN
538           GOSUB 9200
539         END
540       END
541       * MARKER $$45
542       * MARKER $$50
543       HDR.KEY=''
544       INT.HDR.KEY=''
545       LIS.RTN=0
546       RETURN
547 8300 * UPDATE RTN UPON PGM EXIT
548       * MARKER $$60
549       RETURN
550 8400 * RTN UPON PGM EXIT
551       * MARKER $$70
552       RETURN
553 8500 * RTN UPON RECORD DELETION
554       * MARKER $$80
555       RETURN
556 8600 * LIS ACTIVE PAGE DETERMINATION AND DISPLAY
557       * MARKER $$85
558       IF LIS.RTN = 3 THEN
559         LIS.RTN = 0
560         RETURN TO 8000
561       END
562       RETURN
563 *
564 * STANDARD CALL ROUTINE
565 *
566 8900 IF DEBUG.FLAG THEN
567       CRT @(0,22):CL:'STD.CALL DEBUG;CALLING(':PGMS.KEY:')':
568       INPUT DUMMY,1:
569       CRT @(0,22):CL:
570       END
571     *
572     * STRIP OFF THE .MAIN OR THE .SUB FOR GENERATED PROGRAMS
573     *
574     SC.MAIN = INDEX(PGMS.KEY,'.MAIN',1)
575     SC.SUB  = INDEX(PGMS.KEY,'.SUB',1)
576     *
577     SC.KEY = PGMS.KEY
578     BEGIN CASE
579       CASE PGMS.KEY[1,4] = 'STD.'
580       CASE PGMS.KEY = 'PROGRAM.MAIN'
581       CASE PGMS.KEY = 'GE.MAIN'
582       CASE SC.MAIN
583         IF PGMS.KEY[SC.MAIN+5,1] = '' THEN
584           SC.KEY = PGMS.KEY[1,SC.MAIN-1]
585         END
586       CASE SC.SUB
587         IF PGMS.KEY[SC.SUB+4,1] = '' THEN
588           SC.KEY = PGMS.KEY[1,SC.SUB-1]
589         END
590     END CASE
591     *
592     * GET PROGRAMS FILE RECORD
593     *
594     READ SC.PGMS.REC FROM PGMS.FILE,SC.KEY THEN
595       *
596       * CHECK TO SEE IF DEVELOPMENT KEY IS ON LIST FOR THIS OPERATOR
597       *
598       SC.PGM = SC.PGMS.REC<5>
```

```
599         IF SC.PGM # '' THEN
600            IF CURR.OP = SC.PGMS.REC<6> THEN
601               * USE DEVELOPMENT VERSION
602            END ELSE
603               * USE PRODUCTION VERSION
604               SC.PGM = SC.PGMS.REC<2>
605            END
606          END ELSE
607            SC.PGM = SC.PGMS.REC<2>
608          END
609          IF SC.PGM = '' THEN SC.PGM = SC.KEY
610        END ELSE
611          SC.PGM = SC.KEY
612        END
613        *
614        CALL @SC.PGM
615        *
616        RETURN
617 *
618 * STANDARD EXECUTE ROUTINE
619 *
620 8950 IF DEBUG.FLAG THEN
621        CRT @(0,22):CL:'STD.EXECUTE DEBUG;EXECUTING(':PGMS.KEY:')':
622        INPUT DUMMY,1:
623        CRT @(0,22):CL:
624      END
625      *
626      * STRIP OFF THE .MAIN OR THE .SUB FOR GENERATED PROGRAMS
627      *
628      SC.MAIN = INDEX(PGMS.KEY,'.MAIN',1)
629      SC.SUB  = INDEX(PGMS.KEY,'.SUB',1)
630      *
631      SC.KEY = PGMS.KEY
632      BEGIN CASE
633        CASE PGMS.KEY[1,4] = 'STD.'
634        CASE PGMS.KEY = 'PROGRAM.MAIN'
635        CASE PGMS.KEY = 'GE.MAIN'
636        CASE SC.MAIN
637          IF PGMS.KEY[SC.MAIN+5,1] = '' THEN
638            SC.KEY = PGMS.KEY[1,SC.MAIN-1]
639          END
640        CASE SC.SUB
641          IF PGMS.KEY[SC.SUB+4,1] = '' THEN
642            SC.KEY = PGMS.KEY[1,SC.SUB-1]
643          END
644      END CASE
645      *
646      * GET PROGRAMS FILE RECORD
647      *
648      READ SC.PGMS.REC FROM PGMS.FILE,SC.KEY THEN
649        *
650        * CHECK TO SEE IF DEVELOPMENT KEY IS ON LIST FOR THIS OPERATOR
651        *
652        SC.PGM = SC.PGMS.REC<5>
653        IF SC.PGM # '' THEN
654          IF CURR.OP = SC.PGMS.REC<6> THEN
655             * USE DEVELOPMENT VERSION
656          END ELSE
657             * USE PRODUCTION VERSION
658             SC.PGM = SC.PGMS.REC<2>
659          END
660        END ELSE
661          SC.PGM = SC.PGMS.REC<2>
662        END
663        IF SC.PGM = '' THEN SC.PGM = SC.KEY
664      END ELSE
665        SC.PGM = SC.KEY
666      END
667      *
668      EXECUTE SC.PGM
669      *
670      RETURN
671 *
672 9000 PGMS.KEY = 'STD.INPUT' ;GOSUB 8900
```

```
673        IF DEBUG.FLAG THEN
674          PROCESS = 1
675          GOSUB 8
676        END
677        BEGIN CASE
678          CASE ENTRY[1,1]=CHAR(11) ;* UP ARROW
679            IF DY.TAB<2>=2 THEN;* THIS IS A LIS FIELD
680              IF LIS.INFO<LIS,3> > 1 THEN;* MOVE UP A LINE
681                LIS.INFO<LIS,3>=LIS.INFO<LIS,3> - ENTRY[2,3]
682                RETURN TO 9010
683              END ELSE;* JUMP UP OUT OF LIS SET
684                NULL
685              END
686            END
687            FIELD.NO=FIELD.NO - ENTRY[2,3]
688            IF FIELD.NO < 1 THEN FIELD.NO=1
689            IF FIELD.NO=1 AND MAIN.SCREEN THEN
690              IF EXT.INT.KEY AND MODE='C' THEN
691                NULL
692              END ELSE
693                PRMT.KEY = "4"
694                GOSUB 9210
695                IF ANS = "Y" THEN
696                  GOSUB 8200
697                  GOSUB 9450
698                END ELSE
699                  FIELD.NO=2
700                END
701              END
702            END
703            RETURN TO 9010
704          CASE ENTRY[1,1]=CHAR(10) ;* DOWN ARROW
705            IF DY.TAB<2>=2 THEN;* THIS IS A LIS FIELD
706              LIS.INFO<LIS,3>=LIS.INFO<LIS,3> + ENTRY[2,3]
707              RETURN TO 9010
708            END
709            FIELD.NO=FIELD.NO + ENTRY[2,3]
710            RETURN TO 9010
711          CASE ENTRY[1,1]=CHAR(30);*HOME
712            DY.TAB=1
713            RETURN TO 9020
714          CASE ENTRY[1,1]=CHAR(9);*UP OR DOWN TAB
715            BEGIN CASE
716              CASE MODE[1,1]='C' AND ENTRY[2,5] > 0
717                DY.TAB=DY.TAB<1> + 1
718              CASE 1
719                IF DY.TAB<2> # '' THEN
720                  DY.TAB=DY.TAB<1> - 1
721                  IF DY.TAB < 1 THEN DY.TAB=1
722                END
723            END CASE
724            RETURN TO 9020
725          CASE ENTRY[1,2]=ESC2:"Q" ;* QUIT THIS TRANSACTION
726            PRE.STORE=INSERT(PRE.STORE,1,1,0,'Q')
727            RETURN TO 8000
728          CASE ENTRY[1,2]=ESC2:"F" AND MODE[1,1]='C';* FILE THIS TRANSACTION
729            PRE.STORE=INSERT(PRE.STORE,1,1,0,'F')
730            RETURN TO 8000
731          CASE ENTRY[1,2]=ESC2:"N" AND MODE[1,1]='C';* GO TO ACCEPTANCE PROMPT
732            RETURN TO 8000
733          CASE 1
734        END CASE
735        RETURN
736 9010   ON FIELD.NO GO TO 100,140,150,160,180,190,220,230,240,250,260,270,
    280,290
737        GO TO 8000
738 9020     ON DY.TAB GO TO 140
739        GO TO 8000
740 9200 CRT BELL:
741      SKIP.FLAG=0
742      LENG=0
743      GO TO 9220
744 9210 LENG=2
745 9220 PGMS.KEY = 'STD.MESSAGE' ;GOSUB 8900
```

```
746      IF DEBUG.FLAG THEN
747        PROCESS = 2
748        GOSUB 8
749      END
750      RETURN
751 9300 PROCESS=1;* DISPLAY BG
752      PGMS.KEY = SCREEN.SUB ;GOSUB 8900
753      RETURN
754 9400 PROCESS=2;* DISPLAY FG
755 9410 PGMS.KEY = SCREEN.SUB ;GOSUB 8900
756      RETURN
757 9450 PROCESS=3;* CLEAR FG
758      PGMS.KEY = SCREEN.SUB ;GOSUB 8900
759      RETURN
760 9500 * DISPLAY BG & FG
761      GOSUB 9300
762      GOSUB 9400
763      RETURN
764 9600 * GENERATE HISTORY RECORD
765      PROCESS = 1
766      PGMS.KEY = "STD.HISTORY.SUB" ; GOSUB 8900
767      RETURN
768 *
769 9700 PGMS.KEY = 'STD.LOCK' ;GOSUB 8900
770      RETURN
771 *
772 9725 *
773      * MARKER $$102
774      RETURN
775 *
776 9900 PGMS.KEY = 'STD.OPEN' ;GOSUB 8900
777      IF PRMT.KEY # '' THEN
778        GOSUB 9200
779        ABORT
780      END
781      RETURN
782 *
783 9999 IF DEBUG.FLAG THEN
784        PROCESS = 4
785        GOSUB 8
786      END
787      RETURN
788 *
789      * MARKER $$90
790 END
```

[405] 1 items listed out of 1 items.

```
    BANKS$3.BGFG
001 SUBROUTINE BANKS$3.BGFG
002 GO TO 9
003 ****************************************************
004 * Creative Information Systems CO. Inc.            *
005 * Copyright 1989 Creative Information Systems CO. Ltd*
006 ****************************************************
007 *
008 *
009 *
010 *
011 *
012 *
013 *
014 *
015 *
016 *
017 *
018 *
019 *
020 *
021 *
022 *
023 *
024 *
025 $INCLUDE EQUATES SYSTEM.COMMON
026 *
```

```
027 $INCLUDE EQUATES TERMINAL
028 *
029 $INCLUDE USER.BP BANKS$3.MAIN.EQUATES.INCLUDE
030 9      IF DEBUG.FLAG THEN
031           CRT @(0,22):CL:PGM.NAME:'.BGFG DEBUG':
032           INPUT DUMMY,1:
033           CRT @(0,22):CL:
034        END
035        ON PROCESS<1> GO TO 100,200,300,400
036        ABORT
037 100 * BACKGROUND TEXT STRING
038        PRINT CLR:PROTECT.MODE.ON:START.BG:@(0,0):\Ref: BANKS$3\:@(23,0):CRT.L
    OGO:@(62,0):\Last Changed:\:
039        PRINT @(29,1):\Add/Change Bank Codes\:
040        PRINT @(0,3):\Bank Code:\:
041        PRINT @(0,4):\Bank Name:\:
042        PRINT @(0,5):\Bank G/L#:\:
043        PRINT @(0,6):\1st Chk #:\:
044        PRINT @(0,7):\Last Chk#:\:
045        PRINT @(0,8):\Address  :\:
046        PRINT @(0,9):\Zip Code :\:@(23,9):\City:\:@(55,9):\State:\:
047        PRINT @(0,10):\Routing Code\:@(29,10):\:\:
048        PRINT @(0,11):\Print Checks on Printer (Y/N)\:
049        PRINT @(0,12):\Print Check Stubs (Y/N)\:@(29,12):\:\:
050        PRINT @(0,13):\Adjustment G/L Number\:@(29,13):\:\:
051        PRINT @(0,14):\Bank Transit Number\:@(29,14):\:\:
052        PRINT @(0,15):\Account Number\:@(29,15):\:\:
053        PRINT @(0,16):\Spaces in MICR Line (Y/N)\:@(29,16):\:\:
054        PRINT @(0,18):\Order of (C)heck#-(T)ransit#-(A)ccount# MICR Output (e.
    g., TCA):\:
055        PRINT END.BG:
056     * END OF BG LINES
057        RETURN
058 200 * DISPLAY THE RECORD
059        CRT @(76,0):HDR.REC(1)<1,1,1>'L#3':
060        CRT @(62,1):OCONV(HDR.REC(1)<1,1,2>,'D2/')'R#8':
061        CRT @(71,1):OCONV(HDR.REC(1)<1,1,3>,'MTS')'R#8':
062        CRT @(11,3):FIELD(HDR.KEY,"*",1)'L#4':
063        CRT @(11,4):HDR.REC(3)'L#25':
064        CRT @(11,5):HDR.REC(4)'L#20':
065        READ COAM.REC FROM COAM.FILE,HDR.REC(4) ELSE COAM.REC = ""
066        CRT @(38,5):COAM.REC<1,1,1>'L#25':
067        CRT @(11,6):OCONV(HDR.REC(8),'MR0')'R#6':
068        CRT @(11,7):OCONV(HDR.REC(9),'MR0')'R#6':
069        CRT @(11,8):HDR.REC(10)'L#39':
070        CRT @(11,9):HDR.REC(13)'L#10':
071        READ ZIPS.REC FROM ZIPS.FILE,HDR.REC(13) ELSE ZIPS.REC = ""
072        CRT @(29,9):ZIPS.REC<3,1,1>'L#24':
073        CRT @(62,9):ZIPS.REC<4,1,1>'L#2':
074        CRT @(31,10):HDR.REC(15)'L#15':
075        CRT @(31,11):HDR.REC(7)'L#1':
076        CRT @(31,12):HDR.REC(14)'L#1':
077        CRT @(31,13):HDR.REC(16)'L#13':
078        CRT @(31,14):OCONV(HDR.REC(5),'MR0')'R#15':
079        CRT @(31,15):HDR.REC(6)'L#15':
080        CRT @(31,16):HDR.REC(17)'L#1':
081        CRT @(65,18):HDR.REC(18)'L#3':
082     * END OF FG LINES
083        RETURN
084 300 * CLEAR THE FOREGROUND
085        IF TRM.LEVEL THEN PRINT CLR.FG:; RETURN
086        CRT @(76,0):SPACE(4):
087        CRT @(62,1):SPACE(9):
088        CRT @(71,1):SPACE(9):
089        CRT @(11,3):SPACE(5):
090        CRT @(11,4):SPACE(26):
091        CRT @(11,5):SPACE(21):
092        CRT @(38,5):SPACE(26):
093        CRT @(11,6):SPACE(7):
094        CRT @(11,7):SPACE(7):
095        CRT @(11,8):SPACE(40):
096        CRT @(11,9):SPACE(11):
097        CRT @(29,9):SPACE(25):
098        CRT @(62,9):SPACE(3):
099        CRT @(31,10):SPACE(16):
100        CRT @(31,11):SPACE(2):
```

```
101       CRT @(31,12):SPACE(2):
102       CRT @(31,13):SPACE(14):
103       CRT @(31,14):SPACE(16):
104       CRT @(31,15):SPACE(16):
105       CRT @(31,16):SPACE(2):
106       CRT @(65,18):SPACE(4):
107     * END OF FG CLEAR LINES
108       RETURN
109 400 * DISPLAY THE ACTIVE HISTORY RECORD
110       CRT @(79,0):TRM.NV:@(75,0):VISUAL.REC<1,1,1>:@(76,0):ACTIVE.REC<1,1,1>
    'L#3':
111       CRT @(70,1):TRM.NV:@(61,1):VISUAL.REC<1,1,2>:@(62,1):OCONV(ACTIVE.REC<
    1,1,2>,'D2/')'R#8':
112       CRT @(79,1):TRM.NV:@(70,1):VISUAL.REC<1,1,3>:@(71,1):OCONV(ACTIVE.REC<
    1,1,3>,'MTS')'R#8':
113       CRT @(15,3):TRM.NV:@(10,3):" ":@(11,3):FIELD(HDR.KEY,"*",1)'L#4':
114       CRT @(36,4):TRM.NV:@(10,4):VISUAL.REC<3>:@(11,4):ACTIVE.REC<3>'L#25':
115       CRT @(31,5):TRM.NV:@(10,5):VISUAL.REC<4>:@(11,5):ACTIVE.REC<4>'L#20':
116       READ COAM.REC FROM COAM.FILE,ACTIVE.REC<4> ELSE COAM.REC = ""
117       CRT @(37,5):VISUAL.REC<4>:COAM.REC<1,1,1>'L#25':
118       CRT @(17,6):TRM.NV:@(10,6):VISUAL.REC<8>:@(11,6):OCONV(ACTIVE.REC<8>,'
    MR0')'R#6':
119       CRT @(17,7):TRM.NV:@(10,7):VISUAL.REC<9>:@(11,7):OCONV(ACTIVE.REC<9>,'
    MR0')'R#6':
120       CRT @(50,8):TRM.NV:@(10,8):VISUAL.REC<10>:@(11,8):ACTIVE.REC<10>'L#39'
    :
121       CRT @(21,9):TRM.NV:@(10,9):VISUAL.REC<13>:@(11,9):ACTIVE.REC<13>'L#10'
    :
122       READ ZIPS.REC FROM ZIPS.FILE,ACTIVE.REC<13> ELSE ZIPS.REC = ""
123       CRT @(28,9):VISUAL.REC<13>:ZIPS.REC<3,1,1>'L#24':
124       CRT @(61,9):VISUAL.REC<13>:ZIPS.REC<4,1,1>'L#2':
125       CRT @(46,10):TRM.NV:@(30,10):VISUAL.REC<15>:@(31,10):ACTIVE.REC<15>'L#
    15':
126       CRT @(32,11):TRM.NV:@(30,11):VISUAL.REC<7>:@(31,11):ACTIVE.REC<7>'L#1'
    :
127       CRT @(32,12):TRM.NV:@(30,12):VISUAL.REC<14>:@(31,12):ACTIVE.REC<14>'L#
    1':
128       CRT @(44,13):TRM.NV:@(30,13):VISUAL.REC<16>:@(31,13):ACTIVE.REC<16>'L#
    13':
129       CRT @(46,14):TRM.NV:@(30,14):VISUAL.REC<5>:@(31,14):OCONV(ACTIVE.REC<5
    >,'MR0')'R#15':
130       CRT @(46,15):TRM.NV:@(30,15):VISUAL.REC<6>:@(31,15):ACTIVE.REC<6>'L#15
    ':
131       CRT @(32,16):TRM.NV:@(30,16):VISUAL.REC<17>:@(31,16):ACTIVE.REC<17>'L#
    1':
132       CRT @(68,18):TRM.NV:@(64,18):VISUAL.REC<18>:@(65,18):ACTIVE.REC<18>'L#
    3':
133     * END OF STORY FG LINES
134       RETURN
135 END
```

[405] 1 items listed out of 1 items.

```
    STD.MESSAGE$17
001 SUBROUTINE STD.MESSAGE$17
002 GO TO 9
003 * Program....: STD.MESSAGE
004 * Description: Routine to display message and get a response from Oper
005 * Revision...: 17.0 - Add the ability to pass more than one insert to a mes
    sage.
006 * Project....: 4.0 - Next Release After 3.0B
007 * Programmer.: David M. Murdock
008 * Copyright..: 1990 Creative Information Systems CO. Ltd.
009 ******************************************************************
010 * This program will operate as follows:
011 * 1. If PRMT.KEY is in the form "##[~Data][~Data]" where ## is the key of
012 *    a PROMPT file record.  If desired, user supplied data may be inserted
013 *    into the message by including the "~Data" and putting a tilda (~) in
014 *    the message.  There must be the same number if tildas in the message
015 *    as there are in PRMT.KEY.
016 * 2. If PRMT.KEY is not in the above form, then it is taken to be the
017 *    message to be displayed.
018 * 3. If the LENGth of the response is zero, then the message is processed
019 *    as an error.  The message is displayed for 2 seconds and the bell
020 *    is sounded twice.
```

```
021 ************************************************************************
022 *
023 *
024 *
025 $INCLUDE EQUATES SYSTEM.COMMON
026 *
027 $INCLUDE EQUATES TERMINAL
028 *
029 $INCLUDE EQUATES ACF.SYS
030 *
031 ******************* STANDARD MESSAGE ROUTINE *******************
032 *
033 9 PROMPT.ID = 0
034       IF PROCESS = 'MCU' THEN CAPS = 0 ELSE CAPS = 1
035       READV DUMMY FROM TRM.FILE,THIS.PORT,17 ELSE DUMMY = ''
036       X = ''
037       IF DUMMY<1,1> = 1 THEN X = 'T'
038       IF DUMMY<1,1> = 2 THEN X = 'P'
039       IF TRM.LEVEL THEN
040          DUMMY = 'Operator: ':CURR.OP:'; Port: ':THIS.PORT:'; Queue: ':DEFAUL
    T.QUEUE:'; Level: ':WINDOW.NO:' ':X
041          CRT START.HOST.MSG:DUMMY'L#46':END.HOST.MSG:
042          IF TRM.MSG.DISP.FLAG = 2 THEN
043             DUMMY = 'Client: ':CURRENT.CLIENT<1,1,2>
044             DUMMY = DUMMY:'; Pol Seq: ':CURRENT.POLICY<1,1,2>:'; Eff Date: ':C
    URRENT.EFF.DATE
045             DUMMY = DUMMY:'; Loss Seq: ':CURRENT.LOSS<1,1,2>:'; End No: ':CURR
    ENT.END.NO
046             DUMMY = DUMMY:'; Trans: ':CURRENT.TRAN
047             CRT @(0,22):DUMMY'L#80':CS:
048          END
049       END
050       IF INDEX(PRMT.KEY,"~",1) THEN PROMPT.ID = FIELD(PRMT.KEY,'~',1)
051       IF NUM(PRMT.KEY) THEN PROMPT.ID = PRMT.KEY
052       ***** GET MESSAGE FROM THE PROGRAM.ERROR FILE
053       IF PROMPT.ID THEN
054          READV ERROR.MSG FROM PRMT.FILE, PROMPT.ID, 1 ELSE
055             ERROR.MSG = "Program Error Message ":PROMPT.ID:" not on file"
056          END
057          TILDAS = COUNT(ERROR.MSG,'~')
058          FOR X = 1 TO TILDAS
059             TILDA = INDEX(ERROR.MSG,"~",1)
060             IF TILDA THEN
061                ERROR.MSG = ERROR.MSG[1,TILDA-1]:FIELD(PRMT.KEY,"~",X+1):ERROR.M
    SG[TILDA+1,99]
062             END
063          NEXT X
064          PRMT.KEY = "(":PROMPT.ID:") ":ERROR.MSG
065       END
066       PRMT.KEY = PRMT.KEY[1,78]
067       PRMT.KEY.LEN = LEN(PRMT.KEY)
068       VRT = 23
069       GOSUB 8000    ;* DISPLAY THE MESSAGE
070 20    CRT PROTECT.MODE.OFF:@(HRZ+LENG,VRT):R.BOUNDRY:@(HRZ-1,VRT):L.BOUNDRY:
071       ANS = ''
072       IF LENG > 0 THEN
073          * GET ANY PRE-STORED INPUT OR GET INPUT FROM KEYBOARD
074          IF PRE.STORE = '' THEN PRE.STORE = 'ZZ9Z'
075          IF PRE.STORE<1,1> # 'ZZ9Z' THEN
076             ANS = PRE.STORE<1,1>
077             PRE.STORE = DELETE(PRE.STORE,1,1,0)
078          END ELSE
079             PGMS.KEY = 'STD.WP' ; GOSUB 8900
080          END
081       END ELSE
082          LOOP
083             Y = SYSTEM(14)
084          UNTIL Y = 0 DO
085             INPUT DUMMY,Y:
086          REPEAT
087          IF TRM.ERROR.TIME = '' THEN TRM.ERROR.TIME = 2
088          SLEEP TRM.ERROR.TIME
089          ANS = CHAR(13)
090       END
```

```
091         IF DEBUG.FLAG THEN
092            IF ANS[1,2] # '.$' THEN
093               CRT @(0,22):CL:'STD.MESSAGE AFTER WP DEBUG ;ANS=(':ANS:")":
094               INPUT DUMMY,1:
095               CRT @(0,22):CL:
096            END
097         END
098 30   CRT @(HRZ-1,VRT):TRM.RESET.NV:
099      ECHO ON
100 40   CRT @(0,22):CS:PROTECT.MODE.ON:
101      IF CAPS THEN ANS = OCONV(ANS,'MCU')
102      T.ANS = OCONV(ANS,'MCU')                    ;* SET UP T.ANS FOR COMMAND TESTING
103      BEGIN CASE
104         CASE ANS[1,1] = CHAR(11)                 ;* OPERATOR ENTERED "<UP ARROW>" - BACK UP
105            RETURN
106         CASE ANS[1,1] = CHAR(10)                 ;* OPERATOR ENTERED "<DOWN ARROW>" - GO DOWN
107            RETURN
108         CASE ANS[1,1] = CHAR(9)                  ;* OPERATOR ENTERED "<TAB>" - GO UP OR DOWN
109            RETURN
110         CASE ANS[1,1] = CHAR(30)                 ;* OPERATOR ENTERED "<HOME>" - GO UP TO FIRST FIELD
111            RETURN
112 50      CASE ANS[1,1] = ESC2                     ;* OPERATOR ENTER AN ESCAPE SEQUENCE
113            BEGIN CASE
114               CASE T.ANS[2,1] = 'H' ; GOSUB 1000  ;* FIELD HELP
115               CASE T.ANS[2,1] = '?' ; GOSUB 1100  ;* COMMAND HELP
116               CASE T.ANS[2,1] = 'I' ; GOSUB 1150  ;* HELP ABOUT PROCEDURES
117               CASE T.ANS[2,1] = 'A' ; GOSUB 1300  ;* ADD A PROMPT RECORD - FILE MAINTENANCE PGM
118               CASE T.ANS[2,1] = 'M' ; GOSUB 1400  ;* MENU
119               CASE T.ANS[2,1] = 'Y' ; GOSUB 1425  ;* ACCESS
120               CASE T.ANS[2,1] = 'Z' ; GOSUB 1450  ;* CLIENT INQUIRY
121               CASE T.ANS[2,2] = 'PP'; GOSUB 1550  ;* PRINT REPORT
122               CASE T.ANS[2,1] = 'P' ; GOSUB 1500  ;* PRINT SCREEN
123               CASE T.ANS[2,2] = '$$'; GOSUB 1650  ;* DEBUG MODE TO CHANGE THE TERMINAL RECORD
124               CASE T.ANS[2,1] = '$' ; GOSUB 1600  ;* DEBUG MODE
125               CASE T.ANS[2,1] = 'U' ; GOSUB 1700  ;* USER HELP ENTRY
126               CASE T.ANS[2,1] = 'V' ; GOSUB 1701  ;* CISCO PROCEDURES ENTRY
127               CASE T.ANS[2,2] = 'WW'; GOSUB 1703  ;* CISCO COMMAND HELP ENTRY
128               CASE T.ANS[2,1] = 'W' ; GOSUB 1702  ;* CISCO HELP ENTRY
129               CASE T.ANS[2,1] = 'R' ; GOSUB 2100  ;* HISTORY DISPLAY
130               CASE T.ANS[2,1] = 'C' ; GOSUB 2200  ;* REFRESH THE SCREEN
131               CASE T.ANS[2,1] = 'B' ; GOSUB 2300  ;* SEND A PORT MESSAGE
132               CASE T.ANS[2,1] = 'F'               ;* STRIP "." AND RETURN
133                  ANS = T.ANS[2,1]
134                  RETURN
135               CASE T.ANS[2,1] = 'Q'               ;* STRIP "." AND RETURN
136                  ANS = T.ANS[2,1]
137                  RETURN
138               CASE T.ANS[2,1] = 'E'               ;* STRIP "." AND RETURN
139                  ANS = T.ANS[2,1]
140                  RETURN
141               CASE 1                              ;* USER ENTERED INVALID
142                  THE.PROMPT = '64'
143                  THE.HELP = ''
144                  GOSUB 9200
145            END CASE
146            GO TO 9
147      END CASE
148 99   RETURN
149 *
150 ***** HELP ROUTINE (.H)
151 *
152 1000 IF HELP.KEY # '' THEN
153         GOSUB 9000                                ;* SAVE COMMON VARIABLES
154         PGMS.KEY = 'STD.HELP' ; GOSUB 8900
155         GOSUB 9050                                ;* RESTORE COMMON VARIABLE
```

```
156         GOSUB 9500                                          ;* REFRESH THE SCREEN
157         IF TOTAL.WIDTH THEN
158           * HELP WAS DISPLAYED WHILE ANOTHER BOX WAS ON THE SCREEN
159           PRE.STORE = INSERT(PRE.STORE,1,1,0,'+-')
160         END
161       END ELSE
162         THE.PROMPT = '3'
163         THE.HELP = ''
164         GOSUB 9200
165       END
166       RETURN
167 *
168 ***** HELP WITH COMMANDS (.?)
169 *
170 1100 GOSUB 9000                                              ;* SAVE COMMON VARIABLES
171      HELP.KEY = 'STD.COMMANDS'
172      PGMS.KEY = 'STD.HELP' ; GOSUB 8900
173      GOSUB 9050                                              ;* RESTORE COMMON VARIABLES
174      GOSUB 9500                                              ;* REFRESH THE SCREEN
175      RETURN
176 *
177 * HELP WITH PROCEDURES (.I)
178 *
179 1150 GOSUB 9000                                              ;* SAVE COMMON VARIABLES
180      BEGIN CASE
181        CASE PGM.NAME # ''
182          HELP.KEY = FIELD(PGM.NAME,"$",1):'.PROCEDURES'
183          PGMS.KEY = 'STD.HELP' ; GOSUB 8900
184          GOSUB 9050                                          ;* RESTORE COMMON VARIABLES
185          GOSUB 9500                                          ;* REFRESH THE SCREEN
186        CASE 1
187          HELP.KEY = 'STD.FIELD'
188          THE.PROMPT = '382'
189          THE.HELP = ''
190          GOSUB 9200
191      END CASE
192      RETURN TO 9
193 *
194 * ADD A PROMPT RECORD - FILE MAINTENANCE (.A)
195 *
196 1300 REF.FILE = 'PROMPT'
197      READV NEXT.PROGRAM FROM FL.FILE,REF.FILE,10 ELSE NEXT.PROGRAM = ''
198      IF NEXT.PROGRAM = '' THEN NEXT.PROGRAM = REF.FILE:".MAIN"
199      MAIN.LOC = INDEX(NEXT.PROGRAM,'.MAIN',1)
200      PGMS.KEY = NEXT.PROGRAM[1,MAIN.LOC-1]
201      READV ID FROM PGMS.FILE,PGMS.KEY,2 ELSE ID = NEXT.PROGRAM
202      IF ID = '' THEN ID = NEXT.PROGRAM
203      IF OCONV(ID,'TMD;X;1;1') # '' THEN ;* THERE IS A CATALOGED PROGRAM
204        IF PROMPT.ID THEN
205          NEXT.COM.AREA = PROMPT.ID
206        END ELSE
207          NEXT.COM.AREA = 'ZZ8Z' ;* FIELD EMPTY - GET KEY IN FILE MAINTENANCE PGM
208        END
209        PGMS.KEY = 'STD.EXECUTE' ; GOSUB 8900
210        GOSUB 9600                                            ;* REFRESH THE SCREEN
211        IF PRE.STORE<1,1> # 'ZZ9Z' THEN PRE.STORE = DELETE(PRE.STORE,1,1,0)
212      END ELSE                                                ;* THERE IS NO FM PROGRAM
213        THE.PROMPT = '33'
214        THE.HELP = ''
215        GOSUB 9200
216      END
217      RETURN
218 *
219 ***** INQUIRY MENU (.M)
220 *
221 1400 NEXT.PROGRAM = 'MENU.DRIVER'
222      NEXT.COM.AREA = ''
223      PGMS.KEY = 'STD.EXECUTE' ; GOSUB 8900
224      GOSUB 9500                                              ;* REFRESH THE SCREEN
225      RETURN
226 *
```

```
227 ***** ACCESS (.Y)
228 *
229 1425 NEXT.PROGRAM = 'RB.100.MAIN'
230      PGMS.KEY = 'STD.EXECUTE' ; GOSUB 8900
231      GOSUB 9500                                        ;* REFRESH THE SCREEN
232      RETURN
233 *
234 ***** CLIENT INQUIRY (.Z)
235 *
236 1450 NEXT.PROGRAM = 'AR.200.MAIN'
237      IF CURRENT.CLIENT # '' THEN
238        NEXT.COM.AREA = CURRENT.CLIENT<1,1,1>
239       END ELSE
240        NEXT.COM.AREA = 'ZZ9Z'
241      END
242      PGMS.KEY = 'STD.EXECUTE' ; GOSUB 8900
243      GOSUB 9500                                        ;* REFRESH THE SCREEN
244      RETURN
245 *
246 ***** PRINT THE SCREEN (.P)
247 *
248 1500 IF PROCESS = 'STD.PRINTER.ASSIGN' THEN
249         * CAN'T DO THIS FROM STD.PRINTER.ASSIGN
250         NULL
251       END ELSE
252         SAVE.PRMT.KEY=PRMT.KEY
253         PROCESS = ''
254         STD.ARG(1) = 'STD.SCREEN.PRINT'
255         STD.ARG(2) = 1
256         PGMS.KEY = 'STD.PRINTER.ASSIGN' ; GOSUB 8900
257         PGMS.KEY = 'STD.SCREEN.PRINT' ; GOSUB 8900
258         PGMS.KEY = 'STD.PRINTER.RESET' ; GOSUB 8900
259         PRMT.KEY=SAVE.PRMT.KEY
260 *       GOSUB 9450                                      ;* CLEAR FG
261 *       GOSUB 9400                                      ;* DISPLAY FG DATA
262      END
263      RETURN
264 *
265 ***** PRINT THE REPORT (.PP)
266 *
267 1550 NEXT.PROGRAM = FIELD(PGM.NAME,'$',1):'.PROC'
268      PGMS.KEY = NEXT.PROGRAM
269      READV ID FROM PGMS.FILE,PGMS.KEY,2 ELSE ID = NEXT.PROGRAM
270      IF ID = '' THEN ID = NEXT.PROGRAM
271      IF OCONV(ID,'TMD;X;1;1') # '' THEN    ;* THERE IS A CATALOGED REPORT PROGRAM
272        NEXT.COM.AREA = INT.HDR.KEY
273        PGMS.KEY = 'STD.EXECUTE' ; GOSUB 8900
274        GOSUB 9500                                      ;* REFRESH THE SCREEN
275      END ELSE                                          ;* THERE IS NO FM PROGRAM
276        THE.PROMPT = '148'
277        THE.HELP = ''
278        GOSUB 9200
279      END
280      RETURN
281 *
282 ***** TOGGLE IN AND OUT OF DEBUG MODE
283 *
284 1600 IF DEBUG.FLAG THEN
285        DEBUG.FLAG = 0
286        CRT @(0,23):CL:'DEBUG.FLAG OFF':
287      END ELSE
288        DEBUG.FLAG = 1
289        CRT @(0,23):CL:'DEBUG.FLAG ON':
290      END
291      RETURN
292 *
293 ***** MODIFY THE TERMINAL FILE RECORD (.$$)
294 *
295 1650 THE.PROMPT = '294'
296      THE.HELP = ''
297      GOSUB 9210
298      BEGIN CASE
299        CASE ANS = 'E'
300        CASE ANS = ''
```

```
301            CASE NUM(ANS)
302               OPEN 'DICT','TERMINAL' TO DT.FILE ELSE DEBUG
303               T.ATTR = ANS
304               READV DESC FROM DT.FILE,T.ATTR,3 ELSE DESC = 'UNKNOWN'
305               READVU T.DATA FROM TRM.FILE,THIS.PORT,T.ATTR THEN
306                  THE.PROMPT = 'Old ':DESC:' (':T.DATA:')'
307                  THE.HELP = ''
308                  GOSUB 9200
309                  THE.PROMPT = 'New ':DESC:': '
310                  THE.HELP = ''
311                  THE.LENG = 40
312                  GOSUB 9220
313                  IF ANS # 'E' THEN
314                     WRITEV ANS ON TRM.FILE,THIS.PORT,T.ATTR
315                     TRM.REC(T.ATTR) = ANS
316                  END ELSE
317                     RELEASE TRM.FILE,THIS.PORT
318                  END
319               END
320            END CASE
321            LENG = SAVE.LENG
322            RETURN
323 *
324 * OPERATOR WANTS TO ENTER SOME HELP TEXT (.U)/(.W)/(.V)/(.WW)
325 *
326 1700 H.KEY = HELP.KEY:"*USER"                    ;* USER HELP ENTRY POINT
327      GO TO 1704
328 1701 H.KEY = FIELD(PGM.NAME,"$",1):".PROCEDURES" ;* USER PROCEDURES HELP ENTRY POINT
329      GO TO 1704
330 1702 H.KEY = HELP.KEY                            ;* CISCO HELP ENTRY POINT
331      GO TO 1704
332 1703 H.KEY = 'STD.COMMANDS'                      ;* CISCO COMMAND HELP ENTRY POINT
333 1704 IF WINDOW.NO GE 12 THEN                     ;* OPERATOR IS TOO DEEP
334         THE.PROMPT = '65'
335         THE.HELP = ''
336         GOSUB 9200
337      END ELSE
338         IF HELP.KEY # '' THEN
339            OPEN '','DELETED.ITEMS' TO DELETED.ITEMS.FILE ELSE DEBUG
340            READV HELP.HEADING FROM HELP.FILE,'HELP.HEADING',1 ELSE HELP.HEADING = '\* HELP.HEADING record missing from the HELP file.'
341            IF HELP.HEADING[1,6] # '\RULER' THEN
342               READV HELP.HEADING FROM HELP.FILE,'HELP.HEADING',2 ELSE HELP.HEADING = '\* HELP.HEADING record missing from the HELP file.'
343               IF HELP.HEADING[1,6] # '\RULER' THEN
344                  HELP.HEADING = 'HELP.HEADING record in HELP file is corrupted. No RULER in ATTR 1 or 2.'
345               END
346            END
347            READVU DUMMY FROM HELP.FILE,H.KEY,1 THEN
348               RELEASE HELP.FILE,H.KEY
349            END ELSE
350               * CREATE JET POINTER TO TEXT FILE
351               DUMMY    = '\* Update ':OCONV(DATE(),'D2/')
352               DUMMY<-1> = '\READ TEXT ':H.KEY
353               WRITE DUMMY ON HELP.FILE,H.KEY
354               READVU DUMMY FROM FL.FILE,'HELP',28 ELSE DUMMY = ''
355               DUMMY<1,2> = DATE()
356               WRITEV DUMMY ON FL.FILE,'HELP',28
357               *
358               * DELETE DELETED.ITEMS RECORD IF THERE
359               *
360               DI.KEY = "HELP*":H.KEY
361               DELETE DELETED.ITEMS.FILE,DI.KEY
362            END
363            *
364            * PROCESS THE TEXT FILE RECORD
365            *
366            READ DUMMY FROM TXT.FILE,H.KEY THEN
367               IF DUMMY<1>[1,10] # '\* Update ' THEN
368                  HELP.HEADING = '\* Update ':OCONV(DATE(),'D2/'):AM:HELP.HEADING
369               END
370               DUMMY = INSERT(DUMMY,1,0,0,HELP.HEADING)
```

```
371             WRITE DUMMY ON WORK.FILE,H.KEY
372           END ELSE
373             DUMMY     = '\* Update ':OCONV(DATE(),'D2/')
374             DUMMY<-1> = HELP.HEADING
375             WRITE DUMMY ON WORK.FILE,H.KEY
376           END
377           CRT @(0,22):CL:'Loading Function Keys':
378           PROCESS = 1
379           FUN.KEY = 'JET-IN'
380           SAVE.LABELS = FUNCT.LABEL
381           SAVE.COMMANDS = FUNCT.COMMAND
382           PGMS.KEY = 'STD.FUNCTION.KEYS' ; GOSUB 8900
383           CRT PROTECT.MODE.OFF:
384           EXECUTE 'JET-IN WORK.':THIS.PORT:' ':H.KEY
385           CRT PROTECT.MODE.ON:
386           PROCESS = 3
387           FUNCT.LABEL = SAVE.LABELS
388           FUNCT.COMMAND = SAVE.COMMANDS
389           PGMS.KEY = 'STD.FUNCTION.KEYS' ; GOSUB 8900
390           READ DUMMY FROM WORK.FILE,H.KEY THEN
391             FOR AA = 1 TO 2
392               IF DUMMY<AA>[1,6] = '\RULER' THEN
393                 DUMMY = DELETE(DUMMY,AA,0,0,
394               END
395             NEXT AA
396             WRITE DUMMY ON TXT.FILE,H.KEY
397             DELETE WORK.FILE,H.KEY
398             READVU DUMMY FROM FL.FILE,'TEXT',28 ELSE DUMMY = ''
399             DUMMY<1,2> = DATE()
400             WRITEV DUMMY ON FL.FILE,'TEXT',28
401             *
402             * DELETE DELETED.ITEMS RECORD IF THERE
403             *
404             DI.KEY = "TEXT*":H.KEY
405             DELETE DELETED.ITEMS.FILE,DI.KEY
406           END ELSE
407             * TEXT FILE DELETED - DELETE HELP FILE POINTER
408             DELETE HELP.FILE,H.KEY
409             DELETE TXT.FILE,H.KEY
410             *
411             * PLACE RECORD INTO DELETED.ITEMS FILE FOR UPGRADE
412             *
413             DI.KEY = "HELP*":H.KEY
414             WRITE '' ON DELETED.ITEMS.FILE,DI.KEY
415             DI.KEY = "TEXT*":H.KEY
416             WRITE '' ON DELETED.ITEMS.FILE,DI.KEY
417           END
418           GOSUB 9500                              ;* REFRESH THE SCREEN
419         END ELSE
420           THE.PROMPT = '3'
421           THE.HELP = ''
422           GOSUB 9200
423         END
424       END
425       RETURN
426 *
427 * HISTORY DISPLAY ROUTINE (.R)
428 *
429 2100 SCREEN.SUB = PGM.NAME:'.BGFG'
430      IF OCONV(SCREEN.SUB,'TMD;X;1;1') # '' THEN   ;* THERE IS A CATALOGED PROGRAM
431         PROCESS = 2
432         PGMS.KEY = 'STD.HISTORY.SUB' ; GOSUB 8900
433 2200    GOSUB 9500                                ;* REFRESH BG & FG
434      END
435      RETURN
436 *
437 * SEND A MESSAGE TO A PORT (.B)
438 *
439 2300 THE.PROMPT = '305'
440      THE.HELP = ''
441      THE.LENG = 3
442      GOSUB 9220
443      BEGIN CASE
444        CASE ANS = 'E'
445          RETURN
```

```
446          CASE ANS = ''
447            RETURN
448          CASE NUM(ANS)
449            * OPERATOR ENTERED A PORT NUMBER
450            PORT.NO = ANS
451          CASE 1
452            * OPERATOR ENTERED INITIALS
453            PORT.NO = ''
454            EXECUTE 'LISTU' CAPTURING RESPONSE
455            BEGIN CASE
456              CASE OS.TYPE = 'RT'
457                FIRST = 5
458                SECTION = 2
459              CASE OS.TYPE = 'GA'
460                FIRST = 4
461                SECTION = 3
462            END CASE
463            *
464            FOR X = FIRST TO X + 1 UNTIL RESPONSE<X> = ''
465              * NO TRANSLATION REQUIRED
466              LINE = TRIM(RESPONSE<X>)
467 *$INCLUDE BP.NATIVE STD.MESSAGE.397 ;* LINE = TRIM(RESPONSE<X>)
468              IF ANS = "*" THEN
469                PORT.NO<-1> = OCONV(FIELD(LINE,' ',1),'MCN')
470              END ELSE
471                IF FIELD(LINE,' ',SECTION) = ANS THEN
472                  PORT.NO<-1> = OCONV(FIELD(LINE,' ',1),'MCN')
473                END
474              END
475            NEXT X
476        END CASE
477        THE.PROMPT = '306'
478        THE.HELP = ''
479        THE.LENG = 46
480        GOSUB 9220
481        BEGIN CASE
482          CASE ANS = 'E'
483            RETURN
484          CASE ANS = ''
485            RETURN
486          CASE 1
487            PORTS = DCOUNT(PORT.NO,AM)
488            DUMMY = BELL:START.HOST.MSG:ANS'L#46':END.HOST.MSG
489            ANS = ''
490            FOR X = 1 TO PORTS
491              PORT = PORT.NO<X>
492              IF PORT # THIS.PORT THEN
493                EXECUTE 'SEND-MSG ':PORT:',':DUMMY CAPTURING RESPONSE
494                IF RESPONSE # '' THEN
495                  THE.PROMPT = RESPONSE
496                  THE.HELP = ''
497                  GOSUB 9200
498                END
499              END
500            NEXT X
501        END CASE
502        RETURN
503 *
504 ***** DISPLAY THE MESSAGE
505 *
506 8000 IF INT(39 - PRMT.KEY.LEN / 2) + PRMT.KEY.LEN + LENG > 77 THEN
507        CRT @(0,VRT):CL:PRMT.KEY:" ":
508        HRZ = PRMT.KEY.LEN + 1
509      END ELSE
510        HORIZONTAL = INT(39 - PRMT.KEY.LEN / 2)
511        CRT @(0,VRT):CL: @(HORIZONTAL,VRT):PRMT.KEY:" ":
512        HRZ = HORIZONTAL + PRMT.KEY.LEN + 1
513      END
514      RETURN
515 *
516 * STANDARD CALL ROUTINE
517 *
518 $INCLUDE BP STD.CALL.INCLUDE$1
519 *
520 ***** SAVE DY.COM VARIABLES
521 *
```

```
522 9000 MAT SAVE.DY.COM = MAT DY.COM
523      RETURN
524 *
525 ***** RESTORE DY.COM VARIABLES
526 *
527 9050 MAT DY.COM = MAT SAVE.DY.COM
528      RETURN
529 *
530 * STANDARD MESSAGE ROUTINE
531 *
532 9200 PRINT BELL:
533      SAVE.LENG = LENG
534      SAVE.KEY = HELP.KEY
535      GOSUB 9000                                   ;* SAVE COMMON VARIABLES
536      LENG     = 0
537      HELP.KEY = THE.HELP
538      PRMT.KEY = THE.PROMPT
539      GO TO 9230
540 9210 SAVE.LENG = LENG
541      SAVE.KEY = HELP.KEY
542      GOSUB 9000                                   ;* SAVE COMMON VARIABLES
543      LENG     = 2
544      HELP.KEY = THE.HELP
545      PRMT.KEY = THE.PROMPT
546      GO TO 9230
547 9220 SAVE.LENG = LENG
548      SAVE.KEY = HELP.KEY
549      GOSUB 9000                                   ;* SAVE COMMON VARIABLES
550      LENG     = THE.LENG
551      HELP.KEY = THE.HELP
552      PRMT.KEY = THE.PROMPT
553 9230 PGMS.KEY = 'STD.MESSAGE' ; GOSUB 8900
554      GOSUB 9050                                   ;* RESTORE COMMON VARIABLES
555      IF DEBUG.FLAG THEN
556        CRT @(0,22):'STD.MESSAGE DEBUG POINT':
557        INPUT DUMMY:
558        CRT @(0,22):CL:
559      END
560      HELP.KEY = SAVE.KEY
561      SAVE.KEY = ''
562      LENG = SAVE.LENG
563      SAVE.LENG = ''
564      RETURN
565 *
566 * DISPLAY BG
567 *
568 9300 PROCESS=1                                    ;* DISPLAY BG
569      SCREEN.SUB = PGM.NAME:'.BGFG'
570      IF OCONV(SCREEN.SUB,'TMD;X;1;1') # '' THEN   ;* THERE IS A CATALOGED PROGRAM
571        PGMS.KEY = SCREEN.SUB ; GOSUB 8900
572        IF ACTIVE.REC # '' THEN
573          PROCESS = 4
574          PGMS.KEY = SCREEN.SUB ; GOSUB 8900
575        END
576      END
577      RETURN
578 *
579 * DISPLAY FG
580 *
581 9400 IF ACTIVE.REC = '' THEN
582        PROCESS=2                                  ;* DISPLAY DATA FG
583      END ELSE
584        PROCESS=4                                  ;* DISPLAY HISTORY FG
585      END
586      SCREEN.SUB = PGM.NAME:'.BGFG'
587      IF OCONV(SCREEN.SUB,'TMD;X;1;1') # '' THEN   ;* THERE IS A CATALOGED PROGRAM
588        CRT PROTECT.MODE.OFF:
589        PGMS.KEY = SCREEN.SUB ; GOSUB 8900
590        CRT PROTECT.MODE.ON:
591      END
592      IF ORIG.FIELD.LOC # '' THEN
593        CRT PROTECT.MODE.OFF:@(ORIG.FIELD.LOC<2>+ORIG.FIELD.LOC<3>,ORIG.FIELD.LOC<1>):R.BOUNDRY:@(ORIG.FIELD.LOC<2>-1,ORIG.FIELD.LOC<1>):L.BOUNDRY:
594      END
```

```
595       RETURN
596 *
597 * CLEAR FG
598 *
599 9450 PROCESS=3                                              ;* CLEAR FG
600       SCREEN.SUB = PGM.NAME:'.BGFG'
601       IF OCONV(SCREEN.SUB,'TMD;X;1;1') # '' THEN   ;* THERE IS A CATALOGED PR
    OGRAM
602          PGMS.KEY = SCREEN.SUB ; GOSUB 8900
603       END
604       RETURN
605 *
606 * DISPLAY BG & FG WITHOUT RESTORING KEY DEFINITIONS
607 *
608 9500 SCREEN.SUB = PGM.NAME:'.BGFG'
609       GOSUB 9300
610       GOSUB 9400
611       RETURN
612 *
613 * DISPLAY BG & FG
614 *
615 9600 SCREEN.SUB = PGM.NAME:'.BGFG'
616       PGMS.KEY = 'STD.SCREEN' ; GOSUB 8900
617       PROCESS = 4
618       PGMS.KEY = 'STD.FUNCTION.KEYS' ; GOSUB 8900
619       GOSUB 9300
620       GOSUB 9400
621 9999 RETURN
622 END

001 SUBROUTINE STD.INPUT$18
002 GO TO 9
003 * Program....: STD.INPUT
004 * Description: Standard Data Field Input Routine w/ editing
005 * Revision...: 18.0 - Change logic for display of data in local ter- minal
    area.
006 * Project....: 4.0 - SMRFs fixed since Release 3.2.
007 * Programmer.: David M. Murdock
008 * Copyright..: 1990 Creative Information Systems CO. Ltd.
009 *-----------
010 * STD.INPUT
011 * DAVID MURDOCK   - 201-265-2812
012 * CREATIVE INFORMATION SYSTEMS
013 * STANDARD FIELD INPUT ROUTINE
014 *-----------
015 *
016 *
017 *
018 *
019 *
020 *
021 *
022 *
023 *
024 *
025 $INCLUDE EQUATES SYSTEM.COMMON
026 *
027 $INCLUDE EQUATES TERMINAL
028 *
029 * SYSTEM ACF RECORD FIELDS
030 *
031       EQUATE OS.TYPE            TO ACF.SYS.REC(23)
032 **********************************************************************
033 9   IF DEBUG.FLAG THEN
034       CRT @(0,22):CL:'STD.INPUT DEBUG; FIELD.NO=(':FIELD.NO:');OLDVALUE=('
    :OLDVALUE:');PRE-LOADED INPUT=(':PRE.STORE:')':
035       INPUT DUMMY,1:
036       CRT @(0,22):CL:
037     END
038     READV DUMMY FROM TRM.FILE,THIS.PORT,17 ELSE DUMMY = ''
039     X = ''
040     IF DUMMY<1,1> = 1 THEN X = 'T'
041     IF DUMMY<1,1> = 2 THEN X = 'P'
042     IF TRM.LEVEL THEN
```

```
043         DUMMY = 'Operator: ':CURR.OP:'; Port: ':THIS.PORT:'; Queue: ':DEFAUL
    T.QUEUE:'; Level: ':WINDOW.NO:' ':X
044         CRT START.HOST.MSG:DUMMY'L#46':END.HOST.MSG:
045         IF TRM.MSG.DISP.FLAG = 2 THEN
046           DUMMY = 'Client: ':CURRENT.CLIENT<1,1,2>
047           DUMMY = DUMMY:'; Pol Seq: ':CURRENT.POLICY<1,1,2>:'; Eff Date: ':C
    URRENT.EFF.DATE
048           DUMMY = DUMMY:'; Loss Seq: ':CURRENT.LOSS<1,1,2>:'; End No: ':CURR
    ENT.END.NO
049           DUMMY = DUMMY:'; Trans: ':CURRENT.TRAN
050           CRT @(0,22):DUMMY'L#80':CS:
051         END
052       END
053       INT.DATA = OLDVALUE
054       GOSUB 7080                                    ;* CONVERT DATA TO EXTERN
    AL FORM
055       GOSUB 7090                                    ;* DISPLAY DATA
056       IF SKIP.FLAG THEN
057         * THIS FIELD WILL BE DEFAULTED AND SKIPPED IF IT IS NOT MANDITORY
058         GO TO 55
059       END
060       * GET ANY PRE-STORED INPUT OR GET INPUT FROM KEYBOARD
061 20    IF PRE.STORE = '' THEN PRE.STORE = 'ZZ9Z'
062       IF PRE.STORE<1,1> # 'ZZ9Z' THEN
063         ANS = PRE.STORE<1,1>
064         IF ANS = '' THEN ANS = OLDVALUE
065         PRE.STORE = DELETE(PRE.STORE,1,1,0)
066       END ELSE
067         CRT PROTECT.MODE.OFF:@(HRZ+LENG,VRT):R.BOUNDRY:SPACE(ILEN-1):@(HRZ-1
    ,VRT):L.BOUNDRY:
068         ANS = ENTRY
069         PGMS.KEY = 'STD.WP' ; GOSUB 8900
070         CRT @(HRZ-1,VRT):TRM.RESET.NV:PROTECT.MODE.ON:
071       END
072       ENTRY = ANS
073       IF DEBUG.FLAG THEN
074         IF ENTRY[1,2] # '.$' THEN
075           CRT @(0,22):CL:'STD.INPUT AFTER WP DEBUG ;ENTRY=(':ENTRY:')':
076           INPUT DUMMY,1:
077           CRT @(0,22):CL:
078         END
079       END
080       ECHO ON
081 40    IF ESC.REDISPLAY THEN
082         IF MODE = '' THEN
083           IF OCONV(ENTRY,'MCU') = '.E' THEN
084             NULL
085           END ELSE
086             GOSUB 9500                              ;* REFRESH THE SCREEN
087           END
088         END ELSE
089           GOSUB 9500                                ;* REFRESH THE SCREEN
090         END
091         ESC.REDISPLAY = 0
092       END
093       BEGIN CASE
094         CASE ENTRY[1,1] = CHAR(11)     ;* OPERATOR ENTERED "<UP ARROW>" -
    BACK UP
095           DISP.DATA = INT.DATA
096           GOSUB 200
097           GO TO 99
098         CASE ENTRY[1,1] = CHAR(30)     ;* OPERATOR ENTERED "<HOME>" - BAC
    K UP TO FIRST FIELD
099           DISP.DATA = INT.DATA
100           GOSUB 200
101           GO TO 99
102         CASE ENTRY[1,1] = CHAR(10)     ;* OPERATOR ENTERED "<DOWN ARROW>"
    - GO DOWN
103           IF MODE[1,1] = 'A' THEN
104             SKIP.FLAG = ENTRY[2,3]
105             DISP.DATA = OLDVALUE
106             GOSUB 200
107             GO TO 55
108           END ELSE
109             DISP.DATA = INT.DATA
110             GOSUB 200
```

```
111                GO TO 99
112              END
113            CASE ENTRY[1,1] = CHAR(9)            ;* OPERATOR ENTERED "<TAB>" - GO UP OR DOWN
114              IF MODE[1,1] = 'A' AND ENTRY[2,5] > 0 THEN ;* DOWN IN ADD MODE - CHECK THE FIELDS
115                SKIP.FLAG = 999
116                DY.TAB = DY.TAB<1>
117                GO TO 55
118              END ELSE                           ;* CHANGE MODE - LOGIC IN CALLING PGM
119                DISP.DATA = INT.DATA
120                GOSUB 200
121                GO TO 99
122              END
123 50         CASE ENTRY[1,1] = ESC2               ;* OPERATOR ENTER A COMMAND
124              ENTRY = OCONV(ENTRY,'MCU')
125              BEGIN CASE
126                CASE ENTRY[2,1] = 'H' ; GOSUB 1000   ;* HELP ABOUT THE FIELD
127                CASE ENTRY[2,1] = '?' ; GOSUB 1100   ;* HELP ABOUT THE COMMANDS
128                CASE ENTRY[2,1] = 'I' ; GOSUB 1150   ;* HELP ABOUT PROCEDURES
129                CASE ENTRY[2,1] = 'S' ; GOSUB 1200   ;* SEARCH AND LIST
130                CASE ENTRY[2,1] = 'A' ; GOSUB 1300   ;* ADD A RECORD - FILE MAINTENANCE PGM
131                CASE ENTRY[2,1] = 'M' ; GOSUB 1400   ;* MENU
132                CASE ENTRY[2,1] = 'Y' ; GOSUB 1425   ;* PROMPT-R
133                CASE ENTRY[2,1] = 'Z' ; GOSUB 1450   ;* CLIENT INQUIRY
134                CASE ENTRY[2,2] = 'PP'; GOSUB 1550   ;* PRINT REPORT
135                CASE ENTRY[2,1] = 'P'; GOSUB 1500    ;* PRINT SCREEN
136                CASE ENTRY[2,2] = '$$'; GOSUB 1650   ;* DEBUG MODE TO CHANGE THE TERMINAL RECORD
137                CASE ENTRY[2,1] = '$' ; GOSUB 1600   ;* DEBUG MODE
138                CASE ENTRY[2,1] = 'U' ; GOSUB 1700   ;* USER HELP ENTRY
139                CASE ENTRY[2,1] = 'V' ; GOSUB 1701   ;* CISCO PROCEDURES ENTRY
140                CASE ENTRY[2,2] = 'WW'; GOSUB 1703   ;* CISCO COMMAND HELP ENTRY
141                CASE ENTRY[2,1] = 'W' ; GOSUB 1702   ;* CISCO HELP ENTRY
142                CASE ENTRY[2,1] = '.' ; GOSUB 1800   ;* USER WANTS SAME FIELD FROM LAST REC
143                CASE ENTRY[2,2] = '..'; GOSUB 1850   ;* USER WANTS SAME RECORD FROM LAST REC FILED
144                CASE ENTRY[2,1] = '#' ; GOSUB 1900   ;* GET NEXT SEQUENCE NUMBER
145                CASE ENTRY[2,1] = 'X' ; GOSUB 2000   ;* FILE CROSS REFERENCE DISPLAY
146                CASE ENTRY[2,1] = 'C' ; GOSUB 2200   ;* REFRESH THE SCREEN
147                CASE ENTRY[2,1] = 'B' ; GOSUB 2300   ;* SEND A PORT MESSAGE
148                CASE ENTRY[2,1] = 'T' ; GOSUB 2400   ;* TUTORIAL MODE
149                CASE ENTRY[2,1] = 'Q'                ;* OPERATOR WANTS TO QUIT THIS TRANSACTION
150                  PRMT.KEY = "4"
151                  GOSUB 9210
152                  IF ANS = "Y" THEN GO TO 99
153                  GO TO 9
154                CASE ENTRY[2,1] = 'E'                ;* OPERATOR WANTS TO EXIT LIS OR PROGRAM
155                  BEGIN CASE
156                    CASE MAN = 'KEY'
157                    CASE MAN = 'LINE'
158                    CASE 1
159                      PRMT.KEY = 49
160                      GOSUB 9200
161                      GO TO 9
162                  END CASE
163                  GO TO 99
164                CASE ENTRY[2,1] = 'F'                ;* OPERATOR WANTS TO FINISH THE SCREEN AND FILE THE RECORD
165                  GO TO 55
166                CASE ENTRY[2,1] = 'N'                ;* OPERATOR WANTS TO FINISH THE SCREEN BUT NOT FILE THE RECORD
167 55             BEGIN CASE
168                  CASE MODE = ''                     ;* ENTERED .N OR .F IN KEY
```

FIELD - NG
```
169                    PRMT.KEY = 176
170                    GOSUB 9200
171                    GO TO 9
172                 CASE MODE[1,1] = 'C'              ;* CHANGE MODE - RETURN
173                    DISP.DATA = OLDVALUE           ;* RESISPLAY OLDVALUE
174                    GOSUB 200
175                    IF SKIP.FLAG < 998 THEN SKIP.FLAG = SKIP.FLAG - 1
176                    GO TO 99
177                 CASE 1                            ;* ADD MODE
178                    IF SKIP.FLAG = 999 THEN        ;* THIS IS A TAB - SHOULD WE STOP?
179                       IF DY.TAB<2> # '' THEN      ;* YES - THIS IS THE TAB FIELD
180                          SKIP.FLAG = 0
181                          GO TO 9
182                       END
183                    END
184                 END CASE
185                 IF MAN = "Y" AND OLDVALUE = "" THEN  ;* CAN'T SKIP A MANDITORY FIELD
186                    PRMT.KEY = 5
187                    GOSUB 9200
188                    GO TO 9
189                 END
190                 IF SKIP.FLAG THEN                 ;* WE ARE IN SKIP MODE
191                    IF SKIP.FLAG < 998 THEN SKIP.FLAG = SKIP.FLAG - 1
192                 END ELSE
193                    IF ENTRY[2,1] = 'N' THEN       ;* THIS IS THE FIELD THAT THE OP ENTERED '.N' - SET THE SKIP.FLAG TO 997
194                       SKIP.FLAG = 997
195                    END ELSE                       ;* THIS IS THE FIELD THAT THE OP ENTERED '.F' - SET THE SKIP.FLAG TO 998
196                       SKIP.FLAG = 998
197                    END
198                 END
199                 IF MAN = "KEY" OR MAN = "LINE" THEN ;* FOR "KEY" OR "LINE" FIELDS, THERE IS NO DEFAULTING TO DO
200                    IF SKIP.FLAG THEN
201                       IF SKIP.FLAG < 998 THEN SKIP.FLAG = SKIP.FLAG - 1
202                       ENTRY = ESC2:'N'
203                    END
204                    GO TO 99
205                 END
206                 ENTRY = OLDVALUE                  ;* PLACE ICONV OF DATA INTO ENTRY
207                 GO TO 60                          ;* GO TO PRINT
208              CASE NUM(ENTRY[2,1])                 ;* OPERATOR ENTERED DECIMALS ONLY
209                 GO TO 58
210              CASE 1                               ;* OPERATOR ENTERED AN INVALID ESCAPE COMMAND
211                 PRMT.KEY = '64'
212                 GOSUB 9200
213                 GO TO 9
214           END CASE                                ;* END OF COMMAND LOGIC
215        CASE ENTRY[1,1] = ' ' AND ENTRY[2,1] # ' ' ;* OPERATOR WANTS TO CLEAR THE FIELD
216 57     IF MAN = "Y" THEN                          ;* THIS IS A MANDITORY FIELD AND MAY NOT BE NULLED
217           PRMT.KEY = 5
218           GOSUB 9200
219           GO TO 9
220        END
221        CRT @(HRZ,VRT): SPACE(LENG+ILEN):
222        ENTRY = ""                                 ;* SET FIELD TO NULL AND GO TO PRINT
223     CASE 1
224 58  IF ENTRY = '' THEN                            ;* OPERATOR ENTERED A <RETURN> ONLY AFTER DELETING FIELD
225        GO TO 57                                   ;* OR ENTRY AND OLDVALUE ARE NULL
226     END
227     IF PATT # '' THEN                             ;* ARE THERE PATTERNS TO
```

```
         CHECK
228                   IF CON<1,1>[1,2] = 'MT' THEN           ;* OPERATOR ENTERED A TIM
     E
229                     ENTRY = ICONV(ENTRY,'MCU')           ;* MAKE SURE THAT "AM" OR
     "PM" ARE IN CAPS
230                   END
231                   BEGIN CASE
232                     CASE PATT = 'OX'
233                     CASE PATT = 'ON'                     ;* IGNORE STANDARD PATTER
     NS GENERATED BY EDIT GEN
234                     CASE 1                               ;* YES - CHECK IT
235                       IF ENTRY # '' THEN
236                         IF NOT(ENTRY MATCHES PATT) THEN  ;* DATA NG
237                           PRMT.KEY = "7"
238                           GOSUB 9200
239                           GO TO 9
240                         END
241                       END
242                   END CASE
243                 END
244                 BEGIN CASE
245                   CASE CON<1,1>    = ''                  ;* NO CONVERSION - GO TO PR
     INT
246                     GO TO 60
247                   CASE CON<1,1>[1,1] = 'D'               ;* OPERATOR ENTERED A DATE
     IN FORMAT MMDDYY
248                     IF ENTRY = '' THEN GO TO 60
249                     IF INDEX(ENTRY,'/',1) THEN NULL ELSE
250                       ENTRY = OCONV(ENTRY,'MCN')
251                       ENTRY = ENTRY[1,2]:"/":ENTRY[3,2]:"/":ENTRY[5,2]
252                     END
253                     ENTRY = ICONV(ENTRY,CON<1,1>)
254                     IF ENTRY = '' THEN                   ;* DATE IS INVALID
255                       PRMT.KEY = 8
256                       GOSUB 9200
257                       GO TO 9
258                     END
259                     GO TO 60                             ;* GO TO PRINT
260                   CASE CON<1,1> = 'MCN' AND DY.TAB<2>=2   ;* OPERATOR ENTERED A LIS
     COMMAND
261                     ENTRY = ICONV(ENTRY,'MCU')           ;* MAKE SURE COMMAND IS U
     PPER CASE
262                     GO TO 60
263                   CASE CON<1,1> = 'MCN'                  ;* OPERATOR ENTERED A NUM
     ERIC FIELD - STRIP SPECIAL CHARS
264                   CASE CON<1,1>[1,2] = 'MR'              ;* OPERATOR ENTERED A NUM
     ERIC FIELD - STRIP SPECIAL CHARS
265                   CASE CON<1,1>[1,2] = 'MT'              ;* OPERATOR ENTERED A TIM
     E
266                     IF ENTRY = '' THEN GO TO 60          ;* NULL ENTERED - SKIP IC
     ONV
267                     ENTRY = ICONV(ENTRY,CON<1,1>)
268                     IF ENTRY = '' THEN                   ;* TIME IS INVALID
269                       PRMT.KEY = 8
270                       GOSUB 9200
271                       GO TO 9
272                     END
273                     GO TO 60
274                   CASE 1                                 ;* FIELD HAS SOME OTHER I
     NPUT CONVERSION
275                     ENTRY = ICONV(ENTRY,'MCU')
276                     BEGIN CASE
277                       CASE OS.TYPE = 'RT' AND CON<1,1> = 'MCAN'
278                         * NO MCAN ON IBM RT - CALL PROGRAM
279                         PGMS.KEY = 'STD.MCAN' ; GOSUB 8900
280                       CASE OS.TYPE = 'RT' AND CON<1,1> = 'MCT'
281                         * NO MCT ON IBM RT - CALL PROGRAM
282                         PGMS.KEY = 'STD.MCT' ; GOSUB 8900
283                       CASE 1
284                         ENTRY = ICONV(ENTRY,CON<1,1>)
285                     END CASE
286                 IF MAN = 'KEY' THEN                      ;* THIS IS A KEY FIELD
287                   IF MODE # '' THEN                      ;* PROGRAM IS IN CHANGE M
     ODE
288                     IF OLDVALUE # ENTRY THEN             ;* OPERATOR IS CHANGING T
     HE KEY FIELD
```

```
289                        PRMT.KEY = 88
290                        GOSUB 9210
291                        BEGIN CASE
292                           CASE ANS = 'Y'              ;* OK - CONTINUE
293                           CASE 1          ;GO TO 9    ;* GO BACK TO ENTRY
294                        END CASE
295                     END
296                  END
297               END
298               IF ENTRY = "" THEN                      ;* THE FINAL DEFAULTED EN
    TRY IS STILL NULL
299                  BEGIN CASE
300                     CASE MAN = 'LINE'                 ;* LIS KEY FIELD - PROCEE
    D WITH FIRST DATA FIELD
301                     CASE MAN = 'KEY'  ; GO TO 99      ;* KEY FIELD - ANY TESTIN
    G IS IN THE CALLING PGM
302                     CASE MAN = ''                     ;* NON-MANDITORY FIELD
303                     CASE 1                            ;* THIS MUST BE A MANDATO
    RY FIELD
304                        PRMT.KEY = '168'
305                        GOSUB 9200
306                        GOTO 9
307                  END CASE
308               END
309            GO TO 60                                   ;* GO TO PRINT
310         END CASE
311         *
312         * AT THIS POINT, WE ARE DEALING WITH A NUMBER
313         *
314         * ENTRY = EXCHANGE(ENTRY,'24','FF')           ;* STRIP ANY $
315         AA1A.EXCH = ENTRY
316         CONVERT "$" TO CHAR(255) IN AA1A.EXCH
317         ENTRY = AA1A.EXCH
318  *$INCLUDE BP.NATIVE STD.INPUT.305 ;* ENTRY = EXCHANGE(ENTRY,'24','FF') ;* S
    TRIP ANY $
319         * ENTRY = EXCHANGE(ENTRY,'2B','FF')           ;* STRIP ANY +
320         AA1A.EXCH = ENTRY
321         CONVERT "+" TO CHAR(255) IN AA1A.EXCH
322         ENTRY = AA1A.EXCH
323  *$INCLUDE BP.NATIVE STD.INPUT.306 ;* ENTRY = EXCHANGE(ENTRY,'2B','FF') ;* S
    TRIP ANY +
324         * ENTRY = EXCHANGE(ENTRY,'2C','FF')           ;* STRIP ANY ,
325         AA1A.EXCH = ENTRY
326         CONVERT "," TO CHAR(255) IN AA1A.EXCH
327         ENTRY = AA1A.EXCH
328  *$INCLUDE BP.NATIVE STD.INPUT.307 ;* ENTRY = EXCHANGE(ENTRY,'2C','FF') ;* S
    TRIP ANY ,
329         IF NOT(NUM(ENTRY)) THEN                       ;* STILL FAILED NUMERIC TES
    T
330            PRMT.KEY = "9"
331            GOSUB 9200
332            GO TO 9
333         END
334         IF INDEX(ENTRY,'.',1) # 0 THEN                ;* ENTRY CONTAINS DECIMAL
    PLACES - VERIFY NUMBER ENTERED
335            NO.OF.DEC = CON<1,1>[3,1]
336            IF NUM(NO.OF.DEC) THEN                     ;* STD "MR#" CONVERSION -
    SKIP TEST
337               IF LEN(FIELD(ENTRY,'.',2)) > NO.OF.DEC THEN
338                  PRMT.KEY = '181~':NO.OF.DEC
339                  GOSUB 9200
340                  GO TO 9
341               END
342            END
343         END
344         ENTRY=ICONV(ENTRY,CON<1,1>)
345         OCONV.ENTRY = OCONV(ENTRY,CON<1,2>)
346         OCONV.LEN = LEN(OCONV.ENTRY)
347         IF CON<1,3> AND OCONV.LEN = LENG AND OCONV.ENTRY[1,1] # '-' THEN
348            * THIS IS A "MONY" TYPE FIELD
349            * DATA ENTERED IS EQUAL TO FIELD LENGTH
350            * MOST SIGNIFICANT CHARACTER IS NOT A "-"
351            PRMT.KEY = 10
352            GOSUB 9200
353            GO TO 9
354         END ELSE
```

```
355                 IF OCONV.LEN > LENG THEN
356                    PRMT.KEY = 10
357                    GOSUB 9200
358                    GO TO 9
359                 END
360              END
361           END CASE
362  60   DISP.DATA = ENTRY
363       GOSUB 200                                        ;* DISPLAY THE FIELD
364  99   EXT.INT.DEF = ''
365       RETURN
366  *
367  * DISPLAY THE DATA
368  *
369  200  IF CON<1,2> = '' THEN
370          CRT @(HRZ,VRT):DISP.DATA MASK:
371        END ELSE
372          CRT @(HRZ,VRT):OCONV(DISP.DATA,CON<1,2>) MASK:
373        END
374        RETURN
375  *
376  * HELP ROUTINE (.H)
377  *
378  1000 IF HELP.KEY # '' THEN
379          GOSUB 9000                                    ;* SAVE COMMON VARIABLES
380          PGMS.KEY = 'STD.HELP' ; GOSUB 8900
381          GOSUB 9050                                    ;* RESTORE COMMON VARIABLES
382          ESC.REDISPLAY = 1
383          CRT PROTECT.MODE.OFF:@(HRZ,VRT):SPACE(LENG):PROTECT.MODE.ON:
384          RETURN TO 9                                   ;* VALIDATE THE ENTERED DATA
385        END ELSE
386          PRMT.KEY = '3'
387          GOSUB 9200
388        END
389        RETURN TO 9
390  *
391  * HELP WITH COMMANDS (.?)
392  *
393  1100 GOSUB 9000                                       ;* SAVE COMMON VARIABLES
394       BEGIN CASE
395          CASE MAN = 'KEY'    ; HELP.KEY = 'STD.KEY'
396          CASE MAN = 'LINE'   ; HELP.KEY = 'STD.LIS'
397          CASE 1              ; HELP.KEY = 'STD.FIELD'
398       END CASE
399       PGMS.KEY = 'STD.HELP' ; GOSUB 8900
400       GOSUB 9050                                       ;* RESTORE COMMON VARIABLES
401       GOSUB 9500                                       ;* REFRESH THE SCREEN
402       RETURN TO 9
403  *
404  * HELP WITH PROCEDURES (.I)
405  *
406  1150 GOSUB 9000                                       ;* SAVE COMMON VARIABLES
407       BEGIN CASE
408          CASE PGM.NAME # ''
409             HELP.KEY = FIELD(PGM.NAME,"$",1):'.PROCEDURES'
410             PGMS.KEY = 'STD.HELP' ; GOSUB 8900
411             GOSUB 9050                                 ;* RESTORE COMMON VARIABLES
412             GOSUB 9500                                 ;* REFRESH THE SCREEN
413          CASE 1              ; HELP.KEY = 'STD.FIELD'
414             PRMT.KEY = 382
415             GOSUB 9200
416       END CASE
417       RETURN TO 9
418  *
419  * FILE LISTING (.S)
420  *
421  1200 BEGIN CASE
422          CASE MAN = 'LINE'
423             PRMT.KEY = 80
424             GOSUB 9200
```

```
425            CASE REF.FILE = ''
426               PRMT.KEY = '32'
427               GOSUB 9200
428            CASE 1
429               GOSUB 9000                                    ;* SAVE COMMON VARIABLES
430               ORIG.FIELD.LOC = VRT:AM:HRZ:AM:LENG           ;* SAVE ORIGINAL FIELD LOCATION
431               PGMS.KEY = 'STD.LIST' ; GOSUB 8900
432               GOSUB 9050                                    ;* RESTORE COMMON VARIABLES
433               ORIG.FIELD.LOC = ''
434               ESC.REDISPLAY = 1
435               CRT PROTECT.MODE.OFF:@(HRZ,VRT):SPACE(LENG):PROTECT.MODE.ON:
436         END CASE
437         RETURN TO 9
438 *
439 * ADD A RECORD - FILE MAINTENANCE (.A)
440 *
441 1300 BEGIN CASE
442         CASE REF.FILE = ''                                  ;* THERE IS NO REFERENCE FILE
443            PRMT.KEY = '32'
444            GOSUB 9200
445         CASE MAN = 'LINE'
446            PRMT.KEY = 81
447            GOSUB 9200
448         CASE MAN = 'KEY'
449            PRMT.KEY = 82
450            GOSUB 9200
451         CASE 1
452            READV NEXT.PROGRAM FROM FL.FILE,REF.FILE,10 ELSE NEXT.PROGRAM = ''
453            IF NEXT.PROGRAM = '' THEN NEXT.PROGRAM = REF.FILE:".MAIN"
454            MAIN.LOC = INDEX(NEXT.PROGRAM,'.MAIN',1)
455            PGMS.KEY = NEXT.PROGRAM[1,MAIN.LOC-1]
456            READV ID FROM PGMS.FILE,PGMS.KEY,2 ELSE ID = NEXT.PROGRAM
457            IF ID = '' THEN ID = NEXT.PROGRAM
458            IF OCONV(ID,'TMD;X;1;1') # '' THEN ;* THERE IS A CATALOGED PROGRAM
459               IF OLDVALUE # '' THEN
460                  IF EXT.INT.DEF THEN
461                     * PASS INTERNAL KEY
462                     NEXT.COM.AREA = HDR.REC(AMC)<1,VMC,SVMC>
463                  END ELSE
464                     * PASS EXTERNAL KEY
465                     NEXT.COM.AREA = OLDVALUE
466                  END
467               END ELSE
468                  NEXT.COM.AREA = 'ZZ8Z' ;* FIELD EMPTY - GET KEY IN FILE MAINTENANCE PGM
469               END
470               PGMS.KEY = 'STD.EXECUTE' ; GOSUB 8900
471               GOSUB 9500                                    ;* REFRESH THE SCREEN
472            END ELSE                                         ;* THERE IS NO FM PROGRAM
473               PRMT.KEY = '33'
474               GOSUB 9200
475            END
476         END CASE
477         RETURN TO 9
478 *
479 * MENU (.M)
480 *
481 1400 NEXT.PROGRAM = 'MENU.DRIVER'
482      NEXT.COM.AREA = ''
483      PGMS.KEY = 'STD.EXECUTE' ; GOSUB 8900
484      GOSUB 9500                                             ;* REFRESH THE SCREEN
485      RETURN TO 9
486 *
487 * ACCESS (.Y)
488 *
489 1425 NEXT.PROGRAM = 'RB.100.MAIN'
490      PGMS.KEY = 'STD.EXECUTE' ; GOSUB 8900
491      GOSUB 9500                                             ;* REFRESH THE SCREEN
492      RETURN TO 9
```

```
493 *
494 * CLIENT INQUIRY (.Z)
495 *
496 1450 NEXT.PROGRAM = 'AR.200.MAIN'
497       IF CURRENT.CLIENT # '' THEN
498          NEXT.COM.AREA = CURRENT.CLIENT<1,1,1>
499       END ELSE
500          NEXT.COM.AREA = 'ZZ9Z'
501       END
502       PGMS.KEY = 'STD.EXECUTE' ; GOSUB 8900
503       GOSUB 9500                                           ;* REFRESH THE SCREEN
504       RETURN TO 9
505 *
506 * PRINT THE SCREEN (.P)
507 *
508 1500 INT.DATA = OLDVALUE
509       GOSUB 7080                                           ;* CONVERT DATA TO EXTERN
    AL FORM
510       GOSUB 7090                                           ;* DISPLAY DATA
511       SAVE.PRMT.KEY=PRMT.KEY
512       PROCESS = ''
513       STD.ARG(1) = 'STD.SCREEN.PRINT'
514       STD.ARG(2) = 1
515       PGMS.KEY = 'STD.PRINTER.ASSIGN' ; GOSUB 8900
516       PGMS.KEY = 'STD.SCREEN.PRINT' ; GOSUB 8900
517       PGMS.KEY = 'STD.PRINTER.RESET' ; GOSUB 8900
518       PRMT.KEY=SAVE.PRMT.KEY
519       RETURN TO 9
520 *
521 * PRINT THE REPORT (.PP)
522 *
523 1550 NEXT.PROGRAM = PGM.NAME:'.PROC'
524       PGMS.KEY = NEXT.PROGRAM
525       READV ID FROM PGMS.FILE,PGMS.KEY,2 ELSE ID = NEXT.PROGRAM
526       IF ID = '' THEN ID = NEXT.PROGRAM
527       IF OCONV(ID,'TMD;X;1;1') # '' THEN        ;* THERE IS A CATALOGED REPORT PR
    OGRAM
528          NEXT.COM.AREA = INT.HDR.KEY
529          PGMS.KEY = 'STD.EXECUTE' ; GOSUB 8900
530          GOSUB 9500                                        ;* REFRESH THE SCREEN
531       END ELSE                                             ;* THERE IS NO FM PROGRAM
532          PRMT.KEY = 148
533          GOSUB 9200
534       END
535       RETURN TO 9
536 *
537 * TOGGLE IN AND OUT OF DEBUG MODE (.$)
538 *
539 1600 IF DEBUG.FLAG THEN
540          DEBUG.FLAG = 0
541          CRT @(0,23):CL:'DEBUG.FLAG OFF':
542       END ELSE
543          DEBUG.FLAG = 1
544          CRT @(0,23):CL:'DEBUG.FLAG ON':
545       END
546       ENTRY = ''
547       INT.DATA = OLDVALUE
548       GOSUB 7080                                           ;* CONVERT DATA TO EXTERN
    AL FORM
549       GOSUB 7090                                           ;* DISPLAY DATA
550       RETURN TO 20
551 *
552 * MODIFY THE TERMINAL FILE RECORD (.$$)
553 *
554 1650 PRMT.KEY = 294
555       SAVE.LENG = LENG
556       GOSUB 9210
557       BEGIN CASE
558          CASE ANS = 'E'
559          CASE ANS = ''
560          CASE NUM(ANS)
561             OPEN 'DICT','TERMINAL' TO DT.FILE ELSE DEBUG
562             T.ATTR = ANS
563             READV DESC FROM DT.FILE,T.ATTR,3 ELSE DESC = 'UNKNOWN'
564             READVU T.DATA FROM TRM.FILE,THIS.PORT,T.ATTR THEN
```

```
565             PRMT.KEY = 'Old ':DESC:' (':T.DATA:')'
566             GOSUB 9200
567             PRMT.KEY = 'New ':DESC:': '
568             LENG = 40
569             GOSUB 9220
570             IF ANS # 'E' THEN
571               WRITEV ANS ON TRM.FILE,THIS.PORT,T.ATTR
572               TRM.REC(T.ATTR) = ANS
573             END ELSE
574               RELEASE TRM.FILE,THIS.PORT
575             END
576           END
577       END CASE
578       ENTRY = ''
579       LENG = SAVE.LENG
580       INT.DATA = OLDVALUE
581       GOSUB 7080                                    ;* CONVERT DATA TO EXTERNAL FORM
582       GOSUB 7090
583       RETURN TO 9                                   ;* DISPLAY DATA
584 *
585 * OPERATOR WANTS TO ENTER SOME HELP TEXT (.U)/(.W)/(.V)/(.WW)
586 *
587 1700 H.KEY = HELP.KEY:"*USER"                       ;* USER HELP ENTRY POINT
588      GO TO 1704
589 1701 H.KEY = FIELD(PGM.NAME,"$",1):".PROCEDURES"    ;* USER PROCEDURES HELP ENTRY POINT
590      GO TO 1704
591 1702 H.KEY = HELP.KEY                               ;* CISCO HELP ENTRY POINT
592      GO TO 1704
593 1703 BEGIN CASE
594        CASE MAN = 'KEY'      ; H.KEY = 'STD.KEY'
595        CASE MAN = 'LINE'     ; H.KEY = 'STD.LIS'
596        CASE 1                ; H.KEY = 'STD.FIELD'
597      END CASE
598 1704 IF WINDOW.NO GE 12 THEN                        ;* OPERATOR IS TOO DEEP
599        PRMT.KEY = '65'
600        GOSUB 9200
601      END ELSE
602        IF HELP.KEY # '' THEN
603          OPEN '','DELETED.ITEMS' TO DELETED.ITEMS.FILE ELSE DEBUG
604          READV HELP.HEADING FROM HELP.FILE,'HELP.HEADING',1 ELSE HELP.HEADING = '\* HELP.HEADING record missing from the HELP file.'
605          IF HELP.HEADING[1,6] # '\RULER' THEN
606            READV HELP.HEADING FROM HELP.FILE,'HELP.HEADING',2 ELSE HELP.HEADING = '\* HELP.HEADING record missing from the HELP file.'
607            IF HELP.HEADING[1,6] # '\RULER' THEN
608              HELP.HEADING = 'HELP.HEADING record in HELP file is corrupted. No RULER in ATTR 1 or 2.'
609            END
610          END
611          READVU DUMMY FROM HELP.FILE,H.KEY,1 THEN
612            RELEASE HELP.FILE,H.KEY
613          END ELSE
614            * CREATE JET POINTER TO TEXT FILE
615            DUMMY     = '\* Update ':OCONV(DATE(),'D2/')
616            DUMMY<-1> = '\READ TEXT ':H.KEY
617            WRITE DUMMY ON HELP.FILE,H.KEY
618            READVU DUMMY FROM FL.FILE,'HELP',28 ELSE DUMMY = ''
619            DUMMY<1,2> = DATE()
620            WRITEV DUMMY ON FL.FILE,'HELP',28
621            *
622            * DELETE DELETED.ITEMS RECORD IF THERE
623            *
624            DI.KEY = "HELP*":H.KEY
625            DELETE DELETED.ITEMS.FILE,DI.KEY
626          END
627          *
628          * PROCESS THE TEXT FILE RECORD
629          *
630          READ DUMMY FROM TXT.FILE,H.KEY THEN
631            IF DUMMY<1>[1,10] # '\* Update ' THEN
632              HELP.HEADING = '\* Update ':OCONV(DATE(),'D2/'):AM:HELP.HEADING
633            END
634            DUMMY = INSERT(DUMMY,1,0,0,HELP.HEADING)
```

```
635                    WRITE DUMMY ON WORK.FILE,H.KEY
636                 END ELSE
637                    DUMMY     = '\* Update ':OCONV(DATE(),'D2/')
638                    DUMMY<-1> = HELP.HEADING
639                    WRITE DUMMY ON WORK.FILE,H.KEY
640                 END
641                 CRT @(0,22):CL:'Loading Function Keys':
642                 PROCESS = 1
643                 FUN.KEY = 'JET-IN'
644                 SAVE.LABELS = FUNCT.LABEL
645                 SAVE.COMMANDS = FUNCT.COMMAND
646                 PGMS.KEY = 'STD.FUNCTION.KEYS' ; GOSUB 8900
647                 CRT PROTECT.MODE.OFF:
648                 EXECUTE 'JET-IN WORK.':THIS.PORT:' ':H.KEY
649                 CRT PROTECT.MODE.ON:
650                 PROCESS = 3
651                 FUNCT.LABEL = SAVE.LABELS
652                 FUNCT.COMMAND = SAVE.COMMANDS
653                 PGMS.KEY = 'STD.FUNCTION.KEYS' ; GOSUB 8900
654                 READ DUMMY FROM WORK.FILE,H.KEY THEN
655                    FOR AA = 1 TO 2
656                       IF DUMMY<AA>[1,6] = '\RULER' THEN
657                          DUMMY = DELETE(DUMMY,AA,0,0)
658                       END
659                    NEXT AA
660                    WRITE DUMMY ON TXT.FILE,H.KEY
661                    DELETE WORK.FILE,H.KEY
662                    READVU DUMMY FROM FL.FILE,'TEXT',28 ELSE DUMMY = ''
663                    DUMMY<1,2> = DATE()
664                    WRITEV DUMMY ON FL.FILE,'TEXT',28
665                    *
666                    * DELETE DELETED.ITEMS RECORD IF THERE
667                    *
668                    DI.KEY = "TEXT*":H.KEY
669                    DELETE DELETED.ITEMS.FILE,DI.KEY
670                 END ELSE
671                    * TEXT FILE DELETED - DELETE HELP FILE POINTER
672                    DELETE TXT.FILE,H.KEY
673                    DELETE HELP.FILE,H.KEY
674                    *
675                    * PLACE RECORD INTO DELETED.ITEMS FILE FOR UPGRADE
676                    *
677                    DI.KEY = "HELP*":H.KEY
678                    WRITE '' ON DELETED.ITEMS.FILE,DI.KEY
679                    DI.KEY = "TEXT*":H.KEY
680                    WRITE '' ON DELETED.ITEMS.FILE,DI.KEY
681                 END
682                 GOSUB 9500
683              END ELSE
684                 PRMT.KEY = '3'
685                 GOSUB 9200
686              END
687           END
688           RETURN TO 9
689 *
690 * GET PREVIOUS ENTRY (.)
691 *
692 1800    BEGIN CASE
693            CASE MAN = 'LINE'
694               PRMT.KEY = 83
695               GOSUB 9200
696               RETURN TO 9
697            CASE LAST.KEY = ''                            ;* THERE WAS NO LAST ENTRY
698               PRMT.KEY = 133
699               GOSUB 9200
700               RETURN TO 9
701            CASE 1
702               IF AMC = 0 THEN                            ;* GET LAST KEY ENTERED
703                  READV EXT.INT.KEY FROM FL.FILE,EXT.HDR.FILE,7 ELSE EXT.INT.KEY = 0
704                  IF EXT.INT.KEY THEN                     ;* EXTERNAL/INTERNAL FILE - GET EXTERNAL KEY
705                     INT.DATA = LAST.KEY
706                  END ELSE                                ;* GET INTERNAL KEY
707                     INT.DATA = LAST.INT.KEY
```

```
708             END
709           END ELSE                              ;* GET CONTENTS OF THE DE
     SIRED ATTRIBUTE
710           READV INT.DATA FROM HDR.FILE,LAST.INT.KEY,AMC ELSE INT.DATA =
     ''
711         END
712         IF SVMC = 0 THEN SVMC = 1
713         IF VMC  = 0 THEN VMC  = 1
714         INT.DATA = INT.DATA<1,VMC,SVMC>         ;* GET THE DESIRED VALUE
     & SUB-VALUE
715         GOSUB 7080                              ;* CONVERT DATA TO EXTERN
     AL FORM IF NECESSARY
716       END CASE
717       RETURN TO 40
718 *
719 * GET PREVIOUS RECORD (...)
720 *
721 1850   BEGIN CASE
722         CASE MAN = 'KEY'
723           PRMT.KEY = 211
724           GOSUB 9200
725         CASE MAN = 'LINE'
726           PRMT.KEY = 83
727           GOSUB 9200
728         CASE LAST.KEY = ''                      ;* THERE WAS NO LAST ENTR
     Y
729           PRMT.KEY = 133
730           GOSUB 9200
731         CASE 1
732           IF AMC = 0 THEN                       ;* GET LAST EXTERNAL KEY
     ENTERED
733             INT.DATA = LAST.KEY
734           END ELSE                              ;* GET CONTENTS OF THE DE
     SIRED ATTRIBUTE
735             READ DUMMY FROM FL.FILE,HDR.FILE.NAME ELSE DUMMY = ''
736             IF (DUMMY<7> + 0) THEN EI.KEY = 1 ELSE EI.KEY = 0 ;* INTERNAL/
     EXTERNAL KEY
737             IF (DUMMY<19> + 0) THEN AH.LOC = DUMMY<19> ELSE AH.LOC = 0 ;*
     LOCATION OF AUDIT HISTORY
738             IF EI.KEY THEN SAVE1 = HDR.REC(2)
739             MATREAD HDR.REC FROM HDR.FILE,LAST.INT.KEY ELSE MAT HDR.REC =
     ''
740             IF AH.LOC THEN HDR.REC(AH.LOC) = '' ;* CLEAR AUDIT ATTRIBUTE
741             IF EI.KEY THEN HDR.REC(2) = SAVE1
742           END
743           GOSUB 9400                            ;* DISPLAY
744           OLDVALUE = HDR.REC(AMC)<1,VMC,SVMC>
745       END CASE
746       RETURN TO 9
747 *
748 * GET THE NEXT SEQUENCE NUMBER FOR THIS FIELD (.#)
749 *
750 1900 BEGIN CASE
751       CASE MAN # 'KEY'                          ;* OK SO FAR
752         PRMT.KEY = 52
753         GOSUB 9200
754       CASE REF.FILE = ''                        ;* THIS IS THE NAME OF TH
     E PRIMARY FILE
755         PRMT.KEY = 53
756         GOSUB 9200
757       CASE 1
758         *
759         * 17.0 - VERIFY THAT NEW NUMBER IS UNUSED
760         *
761         IF REF.FILE # '' THEN                   ;* 17.0
762           OPEN '',REF.FILE TO REFER.FILE THEN   ;* 17.0
763             FILE.THERE = 1                      ;* 17.0
764           END ELSE                              ;* 17.0
765             FILE.THERE = 0                      ;* 17.0
766           END                                   ;* 17.0
767         END ELSE                                ;* 17.0
768           FILE.THERE = 0                        ;* 17.0
769         END                                     ;* 17.0
770         XREF.KEY = REF.FILE:"*":AMC
771         OK = 0                                  ;* 17.0
772         *
```

```
773         LOOP                                                    ;* 17.0
774           READVU ENTRY FROM ACF.FILE,XREF.KEY,1 ELSE ENTRY = 1
775           NEXT.NO = ENTRY + 1
776           WRITEV NEXT.NO ON ACF.FILE,XREF.KEY,1
777           IF FILE.THERE THEN                                    ;* 17.0
778             READV DUMMY FROM REFER.FILE,ENTRY,1 ELSE OK = 1 ;* 17.0
779           END ELSE                                              ;* 17.0
780             OK = 1                                              ;* 17.0
781           END                                                   ;* 17.0
782         UNTIL OK DO                                             ;* 17.0
783         REPEAT                                                  ;* 17.0
784         RETURN TO 99
785       END CASE
786       RETURN TO 9
787 *
788 * FILE XREF ROUTINE (.X)
789 *
790 2000 BEGIN CASE
791       CASE REF.FILE = ''                                        ;* THERE MUST BE A REF FILE
792         PRMT.KEY = '32'
793         GOSUB 9200
794       CASE MAN = 'KEY' AND MODE # ''                            ;* OPERATIONAL ONLY WHEN THERE IS NO ACTIVE RECORD
795         PRMT.KEY = 107
796         GOSUB 9200
797         PRMT.KEY = 108
798         GOSUB 9200
799       CASE MAN = 'KEY' AND MODE = ''                            ;* OK - HANDLE HERE
800         ORIG.FIELD.LOC = VRT:AM:HRZ:AM:LENG                     ;* SAVE ORIGINAL FIELD LOCATION
801         PROCESS = 3
802         PGMS.KEY = 'STD.XREF.SUB' ; GOSUB 8900
803         ORIG.FIELD.LOC = ''
804         GOSUB 9500                                              ;* REFRESH BG & FG
805       CASE 1                                                    ;* MUST DO A ".A" THEN A ".X"
806         PRMT.KEY = 84
807         GOSUB 9200
808         PRMT.KEY = 85
809         GOSUB 9200
810       END CASE
811       RETURN TO 9
812 *
813 * REFRESH THE SCREEN (.C)
814 *
815 2200 GOSUB 9600
816      RETURN TO 9
817 *
818 * SEND A MESSAGE TO A PORT (.B)
819 *
820 2300 PRMT.KEY = 305
821      SAVE.LENG = LENG
822      LENG = 3
823      GOSUB 9220
824      LENG = SAVE.LENG
825      BEGIN CASE
826        CASE ANS = 'E'
827          RETURN TO 9
828        CASE ANS = ''
829          RETURN TO 9
830        CASE NUM(ANS)
831          * OPERATOR ENTERED A PORT NUMBER
832          PORT.NO = ANS
833        CASE 1
834          * OPERATOR ENTERED INITIALS
835          PORT.NO = ''
836          EXECUTE 'LISTU' CAPTURING RESPONSE
837          BEGIN CASE
838            CASE OS.TYPE = 'RT'
839              FIRST = 5
840              SECTION = 2
841            CASE OS.TYPE = 'GA'
842              FIRST = 4
843              SECTION = 3
844          END CASE
```

```
845         *
846             FOR X = FIRST TO X + 1 UNTIL RESPONSE<X> = ''
847               * NO TRANSLATION REQUIRED
848               LINE = TRIM(RESPONSE<X>)
849 *$INCLUDE BP.NATIVE STD.INPUT.697 ;* LINE = TRIM(RESPONSE<X>)
850               IF ANS = '*' THEN
851                 PORT.NO<-1> = OCONV(FIELD(LINE,' ',1),'MCN')
852               END ELSE
853                 IF FIELD(LINE,' ',SECT.NO) = ANS THEN
854                   PORT.NO<-1> = OCONV(FIELD(LINE,' ',1),'MCN')
855                 END
856               END
857             NEXT X
858         END CASE
859         PRMT.KEY = 306
860         SAVE.LENG = LENG
861         LENG = 46
862         GOSUB 9220
863         LENG = SAVE.LENG
864         BEGIN CASE
865           CASE ANS = 'E'
866             RETURN TO 9
867           CASE ANS = ''
868             RETURN TO 9
869           CASE 1
870             PORTS = DCOUNT(PORT.NO,AM)
871             DUMMY = BELL:START.HOST.MSG:ANS'L#46':END.HOST.MSG
872             ANS = ''
873             FOR X = 1 TO PORTS
874               PORT = PORT.NO<X>
875               IF PORT # THIS.PORT THEN
876                 EXECUTE 'SEND-MSG ':PORT:',':DUMMY CAPTURING RESPONSE
877                 IF RESPONSE # '' THEN
878                   PRMT.KEY = RESPONSE
879                   GOSUB 9200
880                 END
881               END
882             NEXT X
883         END CASE
884         RETURN TO 9
885 *
886 * TUTORIAL MODE (.T)
887 *
888 2400 IF PGM.NAME # 'MENU.DRIVER' THEN
889         PRMT.KEY = 319
890         GOSUB 9200
891         RETURN TO 9
892     END
893     PRMT.KEY = 320
894     GOSUB 9210
895     BEGIN CASE
896       CASE ANS = 'T'              ;* TRAP MODE
897         TUTORIAL = 1
898       CASE ANS = 'P'              ;* PLAYBACK MODE
899         TUTORIAL = 2
900       CASE ANS = 'E'
901         IF TUTORIAL.INFO # '' THEN
902           ELAPSED = TIME() - TUTORIAL.INFO<1,4>
903           CRT @(0,22):OCONV(ELAPSED,'MTS'):
904     OPEN "BENCHMARK.STATUS" TO B.STAT.FILE ELSE EXECUTE " MSG 10  CALL CFH:
    CAN NOT OPEN FILE BENCHAMRK.STATUS!"
905       B.TEXT = 'MSG 10 Script(':TUTORIAL.INFO<1,2>:') completed in ':ELAPSED
    :' seconds.'
906       WRITE B.TEXT ON B.STAT.FILE, THIS.PORT
907           EXECUTE 'MSG 10 Script(':TUTORIAL.INFO<1,2>:') completed in ':EL
    APSED:' seconds.'
908           WRITEV '' ON TRM.FILE,THIS.PORT,17
909         END ELSE
910           RELEASE TRM.FILE,THIS.PORT
911         END
912         RETURN TO 9
913       CASE 1
914         GO TO 2400
915     END CASE
```

```
916        *
917        * GET SCRIPT KEY
918        *
919 2410   PRMT.KEY = 321
920        SAVE.LENG = LENG
921        LENG = 20
922        GOSUB 9220
923        IF ANS = 'E' THEN
924           LENG = SAVE.LENG
925           RETURN TO 9
926        END
927        *
928        TUTORIAL<1,2> = ANS
929        TUTORIAL<1,3> = 1
930        TUTORIAL<1,4> = TIME()
931        *
932        * IF IN PLAYBACK MODE - CHECK FOR SCRIPT RECORD
933        *
934        BEGIN CASE
935           CASE TUTORIAL<1,1> = 1
936              DELETE SCR.FILE,TUTORIAL<1,2>
937           CASE TUTORIAL<1,1> = 2
938              READV DUMMY FROM SCR.FILE,TUTORIAL<1,2>,1 ELSE
939                 PRMT.KEY = '322~':TUTORIAL<1,2>
940                 GOSUB 9200
941                 GO TO 2410
942              END
943        END CASE
944        *
945        * UPDATE TERMINAL FILE
946        *
947        READVU DUMMY FROM TRM.FILE,THIS.PORT,1 ELSE NULL
948        WRITEV TUTORIAL ON TRM.FILE,THIS.PORT,17
949        TUTORIAL.INFO = TUTORIAL
950        RETURN TO 9
951 *
952 * DISPLAY THE CURRENT FIELD AND SETUP FOR DATA ENTRY
953 *
954 7080 IF INT.DATA # '' THEN
955         IF CON<1,1> = '' THEN
956            ENTRY = INT.DATA
957         END ELSE
958            IF CON<1,2> # '' THEN
959               IF CON<1,1> = 'D' THEN
960                  ENTRY = OCONV(INT.DATA,CON<1,2>)
961               END ELSE
962                  ENTRY = OCONV(INT.DATA,CON<1,1>)
963               END
964               BEGIN CASE
965                  CASE CON<1,1>[1,2] = 'MT'
966                  CASE CON<1,1> MATCHES "'MR'1N"
967                  CASE 1
968                     ENTRY = OCONV(ENTRY,'MCN')
969               END CASE
970            END ELSE
971               ENTRY = INT.DATA
972            END
973         END
974      END ELSE
975         ENTRY = ''
976      END
977      RETURN
978 *
979 * DISPLAY DATA IN BOX
980 *
981 7090 TMSK = 'L#':LENG
982      CRT @(HRZ,VRT):ENTRY TMSK:
983      RETURN
984 *
985 * STANDARD CALL ROUTINE
986 *
987 $INCLUDE BP STD.CALL.INCLUDE$1
988 *
989 * SAVE DY.COM VARIABLES
990 *
991 9000 MAT SAVE.DY.COM = MAT DY.COM
```

```
992       RETURN
993 *
994 * RESTORE DY.COM VARIABLES
995 *
996 9050 MAT DY.COM = MAT SAVE.DY.COM
997       RETURN
998 *
999 * STANDARD MESSAGE ROUTINE
1000 *
1001 9200 PRINT BELL:
1002      SKIP.FLAG = 0                                  ;* RESET SKIP.FLAG DUE TO ERROR
1003      GOSUB 9000                                     ;* SAVE COMMON VARIABLES
1004      LENG = 0
1005      SAVE.KEY = HELP.KEY
1006      GO TO 9230
1007 9210 SKIP.FLAG = 0                                  ;* RESET SKIP.FLAG DUE TO ERROR
1008      GOSUB 9000                                     ;* SAVE COMMON VARIABLES
1009      LENG = 2
1010      SAVE.KEY = HELP.KEY
1011      GO TO 9230
1012 9220 GOSUB 9000                                     ;* SAVE COMMON VARIABLES
1013      SAVE.KEY = HELP.KEY
1014 9230 PGMS.KEY = 'STD.MESSAGE' ; GOSUB 8900
1015      GOSUB 9050                                     ;* RESTORE COMMON VARIABLES
1016      IF DEBUG.FLAG THEN
1017         CRT @(0,22):'STD.INPUT DEBUG POINT':
1018         INPUT DUMMY:
1019         CRT @(0,22):CL:
1020      END
1021      HELP.KEY = SAVE.KEY
1022      SAVE.KEY = ''
1023      RETURN
1024 *
1025 * DISPLAY BG
1026 *
1027 9300 PROCESS=1
1028      SCREEN.SUB = PGM.NAME:'.BGFG'                  ;* DISPLAY BG
1029      IF OCONV(SCREEN.SUB,'TMD;X;1;1') # '' THEN ;* THERE IS A CATALOGED PROGRAM
1030         PGMS.KEY = SCREEN.SUB ; GOSUB 8900
1031      END
1032      RETURN
1033 *
1034 * DISPLAY FG
1035 *
1036 9400 PROCESS=2
1037      SCREEN.SUB = PGM.NAME:'.BGFG'                  ;* DISPLAY FG
1038      IF OCONV(SCREEN.SUB,'TMD;X;1;1') # '' THEN ;* THERE IS A CATALOGED PROGRAM
1039         *
1040         * ENTER HERE TO DISPLAY ONE PAGE OF LINE ITEMS
1041         *
1042 9410    PGMS.KEY = SCREEN.SUB ; GOSUB 8900
1043      END
1044      RETURN
1045 *
1046 * CLEAR FG
1047 *
1048 9450 PROCESS=3
1049      SCREEN.SUB = PGM.NAME:'.BGFG'                  ;* CLEAR FG
1050      IF OCONV(SCREEN.SUB,'TMD;X;1;1') # '' THEN ;* THERE IS A CATALOGED PROGRAM
1051         PGMS.KEY = SCREEN.SUB ; GOSUB 8900
1052      END
1053      RETURN
1054 *
1055 * DISPLAY BG & FG WITHOUT RESTORING KEY DEFINITIONS
1056 *
1057 9500 SCREEN.SUB = PGM.NAME:'.BGFG'
1058      GOSUB 9300
```

```
1059        GOSUB 9400
1060        RETURN
1061 *
1062 * DISPLAY BG & FG AND RESTORING KEY DEFINITIONS
1063 *
1064 9600 SCREEN.SUB = PGM.NAME:'.BGFG'
1065        PGMS.KEY = 'STD.SCREEN' ; GOSUB 8900
1066        PROCESS = 4
1067        PGMS.KEY = 'STD.FUNCTION.KEYS' ; GOSUB 8900
1068        GOSUB 9300
1069        GOSUB 9400
1070 9999 RETURN
1071 END
```

[405] 1 items listed out of 1 items.

Appendix D

```
    STD.EXECUTE$4
001 SUBROUTINE STD.EXECUTE$4
002 GO TO 9
003 * Program....: STD.EXECUTE
004 * Description: Execute a CISCO compatable program
005 * Revision...: 4.0 - Fix bug where the wrong number of parameters was being
      passed when performing ".M" command.
006 * Project....: 1.0 - PROJECTS record not on file.
007 * Programmer.: David M. Murdock
008 * Copyright..: 1989 Creative Information Systems CO. Ltd.
009 *----------
010 * STD.EXECUTE
011 * David M. Murdock  - 201-429-7733
012 * Creative Information Systems CO. Ltd.
013 * STANDARD EXECUTE OF THE NEXT PROGRAM LEVEL
014 *----------
015 * ------------------ VARIABLES USED
016 * NEXT.COM.AREA = MULTI-VALUED INFO TO PASS TO NEXT LEVEL.  VALUE ONE IS
017 *                 ALWAYS MULTI-SUBVALUED PRE-STORED RESPONSES
018 * NEXT.PROGRAM = CATALOGED PROGRAM NAME TO CALL
019 * MODE - IF MODE IS NULL THEN RETURNING PROGRAM WILL LOAD LAST.KEY FROM
020 *        THIS LEVEL IN PRE-STORE ELSE LAST.KEY FROM THE OTHER LEVEL
021 * THIS PROGRAM WILL INSERT IN FRONT OF THE COMMUNICATIONS FIELDS SUPPLIED
022 * BY THE OPERATOR (NEXT.COM.AREA) AND PLACE IN TRM.COM.AREA THE FOLLOWING:
023 *
024 * VALUE 1 - FIELD(PGM.NAME,'$',1)
025 * VALUE 2 - DEBUG.FLAG
026 * VALUE 3 - THIS.RETURNING.KEY
027 * VALUE 4 - CURRENT.CLIENT (EXT:SVM:INT)
028 * VALUE 5 - CURRENT.POLICY (EXT:SVM:INT)
029 * VALUE 6 - CURRENT.LOSS   (EXT:SVM:INT)
030 * VALUE 7 - CURRENT.EFF.DATE
031 * VALUE 8 - CURRENT.END.NO
032 * VALUE 9 - CURRENT.TRAN
033 * VALUE 10 AND UP - NEXT.COM.AREA
034 *
035 $INCLUDE EQUATES SYSTEM.COMMON
036 *
037 $INCLUDE EQUATES TERMINAL
038 *
039 $INCLUDE EQUATES ACF.SYS
040 *
041 ***********************************************************************
042 9    IF DEBUG.FLAG THEN
043        CRT @(0,22):CL:'STD.EXECUTE DEBUG;CALLING(':NEXT.PROGRAM:');NEXT.COM
     .AREA(':NEXT.COM.AREA:')':
044        INPUT DUMMY,1:
045        CRT @(0,22):CL:
046      END
047      IF WINDOW.NO GE 12 THEN          ;! MAKE SURE THAT WE AREN'T TOO DEEP
048        PRMT.KEY = 65
049        GOSUB 9200
050        RETURN
051      END
```

Appendix E

```
052 *      IF OCONV(NEXT.PROGRAM,'TMD;X;1;1') # '' THEN ;* THERE IS A CATALOGED
     PROGRAM
053 *         NULL
054 *      END ELSE
055 *         PRMT.KEY = '33'                      ;* THERE IS NO PM PROGRAM
056 *         GOSUB 9200
057 *         RETURN
058 *      END
059        CRT @(0,22):CL:'Initializing Level No. ':WINDOW.NO + 1:
060        IF MODE # '' THEN THIS.RETURNING.KEY = '' ELSE THIS.RETURNING.KEY = LA
     ST.KEY
061        READVU DUMMY FROM TRM.FILE,THIS.PORT,1 ELSE NULL
062        IF NEXT.PROGRAM = 'MENU.DRIVER' THEN ;* DON'T PASS CLIENT/POLICY INFO
063           TRM.COM.AREA = FIELD(PGM.NAME,'$',1):VM:DEBUG.FLAG:VM:VM:VM:VM:VM:VM
     :VM:VM:NEXT.COM.AREA         ;! PASS THIS PROGRAM NAME ALONG WITH COMMUNICAT
     IONS AREA
064        END ELSE
065           TRM.COM.AREA = FIELD(PGM.NAME,'$',1):VM:DEBUG.FLAG:VM:THIS.RETURNING
     .KEY:VM:CURRENT.CLIENT:VM:CURRENT.POLICY:VM:CURRENT.LOSS:VM:CURRENT.EFF.DAT
     E:VM:CURRENT.END.NO:VM:CURRENT.TRAN:VM:NEXT.COM.AREA        ;! PASS THIS PR
     OGRAM NAME ALONG WITH COMMUNICATIONS AREA
066        END
067        IF DEBUG.FLAG THEN
068           CRT @(0,22):CL:'STD.EXECUTE DEBUG;CALLING(':NEXT.PROGRAM:')';TRM.COM.
     AREA(':TRM.COM.AREA:')':
069           INPUT DUMMY,1:
070           CRT @(0,22):CL:
071        END
072        WRITEVU TRM.COM.AREA ON TRM.FILE,THIS.PORT,14
073        WRITEV WINDOW.NO + 1 ON TRM.FILE,THIS.PORT,15
074        IF AUDIT.FLOW THEN
075           AUDIT.STOP = TIME()
076           STD.ARG(1) = FIELD(PGM.NAME,'$',1)
077           STD.ARG(2) = 'NEXT LEVEL'
078           PGMS.KEY = 'STD.AUDIT.FLOW' ; GOSUB 8900
079        END
080        DATA NEXT.PROGRAM
081        EXECUTE 'PROGRAM.MAIN (E)'
082        AUDIT.START = TIME()
083        * CHECK FOR RETURNED DATA
084        READVU TRM.COM.AREA FROM TRM.FILE,THIS.PORT,14 ELSE NULL
085        DEBUG.FLAG = TRM.COM.AREA<1,2>
086        IF DEBUG.FLAG THEN
087           CRT @(0,22):CL:'STD.EXECUTE DEBUG;RETURNING FROM(':NEXT.PROGRAM:')';T
     RM.COM.AREA(':TRM.COM.AREA:')':
088           INPUT DUMMY,1:
089           CRT @(0,22):CL:
090        END
091        IF NEXT.PROGRAM = 'MENU.DRIVER' THEN ;* DON'T RESTORE AND CLIENT/POLIC
     Y INFO
092           TRM.COM.AREA    = DELETE(TRM.COM.AREA,1,1,0)  ;* STRIP RETURNING NULL
093           TRM.COM.AREA    = DELETE(TRM.COM.AREA,1,1,0)  ;* STRIP DEBUG.FLAG
094           TRM.COM.AREA    = DELETE(TRM.COM.AREA,1,1,0)  ;* STRIP LAST.KEY
095           TRM.COM.AREA    = DELETE(TRM.COM.AREA,1,1,0)  ;* STRIP CURRENT.CLIENT
096           TRM.COM.AREA    = DELETE(TRM.COM.AREA,1,1,0)  ;* STRIP CURRENT.POLICY
097           TRM.COM.AREA    = DELETE(TRM.COM.AREA,1,1,0)  ;* STRIP CURRENT.LOSS
098           TRM.COM.AREA    = DELETE(TRM.COM.AREA,1,1,0)  ;* STRIP CURRENT.EFF.DAT
     E
099           TRM.COM.AREA    = DELETE(TRM.COM.AREA,1,1,0)  ;* STRIP CURRENT.END.NO
100           TRM.COM.AREA    = DELETE(TRM.COM.AREA,1,1,0)  ;* STRIP CURRENT.TRAN
101        END ELSE
102           TRM.COM.AREA    = DELETE(TRM.COM.AREA,1,1,0)  ;* STRIP RETURNING NULL
103           TRM.COM.AREA    = DELETE(TRM.COM.AREA,1,1,0)  ;* STRIP DEBUG.FLAG
104           LAST.KEY        = TRM.COM.AREA<1,1>           ;* RESTORE LAST.KEY
105           TRM.COM.AREA    = DELETE(TRM.COM.AREA,1,1,0)  ;* STRIP LAST.KEY
106           CURRENT.CLIENT  = TRM.COM.AREA<1,1>           ;* RESTORE CURRENT.CLIEN
     T
107           TRM.COM.AREA    = DELETE(TRM.COM.AREA,1,1,0)  ;* STRIP CURRENT.CLIENT
108           CURRENT.POLICY  = TRM.COM.AREA<1,1>           ;* RESTORE CURRENT.POLIC
     Y
109           TRM.COM.AREA    = DELETE(TRM.COM.AREA,1,1,0)  ;* STRIP CURRENT.POLICY
110           CURRENT.LOSS    = TRM.COM.AREA<1,1>           ;* RESTORE CURRENT.LOSS
```

```
111      TRM.COM.AREA    = DELETE(TRM.COM.AREA,1,1,0) ;* STRIP CURRENT.LOSS
112      CURRENT.EFF.DATE = TRM.COM.AREA<1,1>          ;* RESTORE CURRENT.EFF.DATE
113      TRM.COM.AREA    = DELETE(TRM.COM.AREA,1,1,0) ;* STRIP CURRENT.EFF.DATE
114      CURRENT.END.NO  = TRM.COM.AREA<1,1>          ;* RESTORE CURRENT.END.NO
115      TRM.COM.AREA    = DELETE(TRM.COM.AREA,1,1,0) ;* STRIP CURRENT.END.NO
116      CURRENT.TRAN    = TRM.COM.AREA<1,1>          ;* RESTORE CURRENT.TRAN
117      TRM.COM.AREA    = DELETE(TRM.COM.AREA,1,1,0) ;* STRIP CURRENT.TRAN
118    END
119    NEXT.COM.AREA = TRM.COM.AREA
120    BEGIN CASE
121       CASE NEXT.COM.AREA = ''                     ;! NOTHING PASSED
122       CASE NEXT.COM.AREA = 'ZZ9Z'                 ;! NULL PASSED - GO TO KEY FIELD
123       CASE 1                                      ;! CODE PASSED - LOAD INTO PRE-STORE
124        * DUMMY = EXCHANGE(TRM.COM.AREA<1,1>,'FC','FD')
125        AA1A.EXCH = TRM.COM.AREA<1,1>
126        CONVERT CHAR(252) TO CHAR(253) IN AA1A.EXCH
127        DUMMY = AA1A.EXCH
128 *$INCLUDE BP.NATIVE STD.EXECUTE.112 ;* DUMMY = EXCHANGE(TRM.COM.AREA<1,1>,'FC','FD')
129        PRE.STORE = INSERT(PRE.STORE,1,1,0,DUMMY)
130    END CASE
131    LAST.OPERATION = 'QUIT'
132    NEXT.COM.AREA = ''
133    WRITEVU NEXT.COM.AREA ON TRM.FILE,THIS.PORT,14
134    WRITEV WINDOW.NO ON TRM.FILE,THIS.PORT,15
135    IF TRM.LEVEL THEN
136       PROCESS = 2
137       PGMS.KEY = 'STD.FUNCTION.KEYS' ; GOSUB 8900
138       *
139       * REDEFINE THE BACK SPACE/DELETE KEYS
140       *
141       IF TRM.LEVEL GE 4 AND TRM.WINDOW.NO + 0 = 0 THEN ;* DEFINE BS/DEL KEYS
142          CRT TRM.BS.DEL.DEFINE:
143       END
144    END
145    RETURN
146 *
147 * STANDARD CALL ROUTINE
148 *
149 $INCLUDE BP STD.CALL.INCLUDE$1
150 *
151 * STD MESSAGE
152 *
153 9200 PRINT BELL:
154      SKIP.FLAG = 0
155      LENG = 0
156      GO TO 9220
157 9210 LENG = 2
158 9220 PGMS.KEY = 'STD.MESSAGE' ; GOSUB 8900
159      IF DEBUG.FLAG THEN
160         CRT @(0,22):CL:PGM.NAME:'.MAIN DEBUG':
161         INPUT DUMMY,1:
162         CRT @(0,22):CL:
163      END
164 9999 RETURN
165 END
```

[405] 1 items listed out of 1 items.

Appendix E - Page 4
    PROGRAM.MAIN$4
001 GO TO 9
002 * Program....: PROGRAM.MAIN
003 * Description: Program Initialization/Housekeeping program
004 * Revision...: 4.0 - Added PRECISION 2 statement.

```
005 * Project....: 1.0 - PROJECTS record not on file.
006 * Programmer.: David M. Murdock
007 * Copyright..: 1990 Creative Information Systems CO. Ltd.
008 **************************************
009 * PROGRAM.MAIN - MAIN CALLING PGM        *
010 * Creative Information Systems Inc.      *
011 * David M. Murdock  - 201-265-2812       *
012 ************************************************************
013 * THIS PROGRAM USES THE "ENTRY.SHELL" AND IS USED TO CALL ALL ENTRY *
014 * PROGRAMS.  THIS MAIN CALLING ROUTINE WILL ESTABLISH THE STANDARD  *
015 * COMMONS AREA AND OPEN THE STANDARD FILES                         *
016 ************************************************************
017 *
018 *
019 *
020 *
021 *
022 *
023 *
024 *
025 *
026 *
027 *
028 *
029 *
030 *
031 $INCLUDE EQUATES SYSTEM.COMMON
032 *
033 $INCLUDE EQUATES TERMINAL
034 *
035 $INCLUDE EQUATES ACF.SYS
036        *
037        * INITIALIZE
038        *
039 9    MAT ST.COM = ''
040      MAT DY.COM = ''
041      MAT STD.ARG = ''
042      *
043      DUMMY = OCONV(0,'U50BB')
044      THIS.PORT = FIELD(DUMMY,' ',1)
045      THIS.ACCT = FIELD(DUMMY,' ',2)
046      *
047      IF THIS.PORT = 0 THEN
048         CRT
049         CRT
050         CRT 'Port 0 - aborting to TCL'
051         ABORT
052      END
053      AUDIT.START = TIME()   ;* SAVE PROGRAM START TIME
054      PRE.STORE = 'ZZ9Z'
055      ESC.REDISPLAY = 0
056      SC.STAF.REC = ''
057      *
058      * SET UP CONSTANTS
059      *
060      BELL = CHAR(7)
061      ESC1 = CHAR(27)
062      ESC2 = '.'
063      AM   = CHAR(254)
064      VM   = CHAR(253)
065      SVM  = CHAR(252)
066      SKIP.FLAG = 0
067      PROMPT ''
068      XREF.ORDER = 0
069      WP.LIST = CHAR(24):AM:CHAR(9):AM:CHAR(10):AM:CHAR(11):AM:CHAR(30):AM:CHAR(27):AM:CHAR(8):AM:CHAR(12):AM:CHAR(29):AM:CHAR(127)
070      ***** GET NAME OF DATA FILE
071      INPUT PROGRAM.NAME
072      *****
073      CURR.OP = OCONV(THIS.PORT,'TTERMINAL;X;10;10')
074      OPEN '','PROGRAMS' TO PGMS.FILE ELSE DEBUG
075      OPEN '','STAFF' TO STAF.FILE ELSE DEBUG
076      ***** OPEN STANDARD FILES
077      FL.KEY = "FILES"       ;GOSUB 9900 ; FL.FILE = FL.KEY
078      FL.KEY = "PROMPT"      ;GOSUB 9900 ; PRMT.FILE = FL.KEY
079      FL.KEY = "HELP"        ;GOSUB 9900 ; HELP.FILE = FL.KEY
```

```
080        FL.KEY = "TERMINAL"  ;GOSUB 9900 ; TRM.FILE = FL.KEY
081        ***** GET TERMINAL RECORD
082        MATREADU TRM.REC FROM TRM.FILE,THIS.PORT ELSE
083          IF FIELD(PROGRAM.NAME,'$',1) = 'STD.TERMINAL' THEN
084            MAT TRM.REC = ''
085          END ELSE
086            PRMT.KEY = "11"
087            GOSUB 9200
088            STOP
089          END
090        END
091        IF (TRM.WINDOW.NO + 0) THEN
092          IF TRM.COM.AREA<1,2> THEN
093            CRT START.MSG.LINE:'PROGRAM.MAIN ENTRY DEBUG ;TRM.COM.AREA=(':TRM.COM.AREA:')':
094            INPUT DUMMY,1:
095            IF DUMMY = 'Q' THEN DEBUG.FLAG = 2
096            IF DUMMY = 'F' THEN DEBUG.FLAG = 3
097            CRT CLEAR.MSG.LINE:
098          END
099          LAST.PROGRAM        = TRM.COM.AREA<1,1>
100          TRM.COM.AREA        = DELETE(TRM.COM.AREA,1,1,0) ;* STRIP LAST.PROGRAM
101          DEBUG.FLAG          = TRM.COM.AREA<1,1>
102          TRM.COM.AREA        = DELETE(TRM.COM.AREA,1,1,0) ;* STRIP DEBUG.FLAG

103          LAST.RETURNING.KEY  = TRM.COM.AREA<1,1>           ;* RESTORE LAST.KEY
104          TRM.COM.AREA        = DELETE(TRM.COM.AREA,1,1,0) ;* STRIP LAST.KEY
105          CURRENT.CLIENT      = TRM.COM.AREA<1,1>           ;* RESTORE CURRENT.CLIENT
106          TRM.COM.AREA        = DELETE(TRM.COM.AREA,1,1,0) ;* STRIP CURRENT.CLIENT
107          CURRENT.POLICY      = TRM.COM.AREA<1,1>           ;* RESTORE CURRENT.POLICY
108          TRM.COM.AREA        = DELETE(TRM.COM.AREA,1,1,0) ;* STRIP CURRENT.POLICY
109          CURRENT.LOSS        = TRM.COM.AREA<1,1>           ;* RESTORE CURRENT.LOSS
110          TRM.COM.AREA        = DELETE(TRM.COM.AREA,1,1,0) ;* STRIP CURRENT.LOSS
111          CURRENT.EFF.DATE    = TRM.COM.AREA<1,1>           ;* RESTORE CURRENT.EFF.DATE
112          TRM.COM.AREA        = DELETE(TRM.COM.AREA,1,1,0) ;* STRIP CURRENT.EFF.DATE
113          CURRENT.END.NO      = TRM.COM.AREA<1,1>           ;* RESTORE CURRENT.END.NO
114          TRM.COM.AREA        = DELETE(TRM.COM.AREA,1,1,0) ;* STRIP CURRENT.END.NO
115          CURRENT.TRAN        = TRM.COM.AREA<1,1>           ;* RESTORE CURRENT.TRAN
116          TRM.COM.AREA        = DELETE(TRM.COM.AREA,1,1,0) ;* STRIP CURRENT.TRAN
117          BEGIN CASE
118            CASE TRM.COM.AREA=''              ;* NOTHING PASSED - PROGRAM CALLED FROM A MENU
119              A.CALL=0
120            CASE TRM.COM.AREA='ZZ9Z'           ;* NULL PASSED - LOAD INTO PRE-STORE
121              A.CALL=1
122              PRE.STORE = INSERT(PRE.STORE,1,1,0,'')
123            CASE TRM.COM.AREA='ZZ8Z'           ;* NOTHING PASSED - PROGRAM CALLED FROM ANOTHER PROGRAM VIA STD.INPUT
124              A.CALL=1
125            CASE 1
126              A.CALL=1                        ;* CODE PASSED - LOAD INTO PRE-STORE
127        *      DUMMY = EXCHANGE(TRM.COM.AREA<1,1>,'FC','FD') ;* CONVERT SVMs INTO VMs
128              AA1A.EXCH = TRM.COM.AREA<1,1>
129              CONVERT CHAR(252) TO CHAR(253) IN AA1A.EXCH
130              DUMMY = AA1A.EXCH
131  *$INCLUDE BP.NATIVE PROGRAM.MAIN.105 ;* DUMMY = EXCHANGE(TRM.COM.AREA<1,1>,'FC','FD') ;* CONVERT SVMs INTO VMs
132              PRE.STORE = INSERT(PRE.STORE,1,1,0,DUMMY)
133          END CASE
```

```
134         LAST.COM.AREA = TRM.COM.AREA
135         TRM.COM.AREA = ''
136         NEXT.COM.AREA = ''
137         WRITEV TRM.COM.AREA ON TRM.FILE,THIS.PORT,14
138         WINDOW.NO = TRM.WINDOW.NO
139       END ELSE
140         RELEASE TRM.FILE,THIS.PORT
141         WINDOW.NO = 0
142         A.CALL = 0
143       END
144       FL.KEY = "FUNCTIONS" ;GOSUB 9900 ; FUN.FILE = FL.KEY
145       IF TRM.LEVEL THEN
146         *
147         * CALL FUNCTION KEY SUBROUTINE
148         *
149 *---
150 *DEBUG
151 *
152         PROCESS = 1
153         FUN.KEY = FIELD(PROGRAM.NAME,'$',1)
154         PGMS.KEY = 'STD.FUNCTION.KEYS' ; GOSUB 8900
155         *
156         * REDEFINE THE BACK SPACE/DELETE KEYS
157         *
158         IF TRM.LEVEL GE 4 AND TRM.WINDOW.NO + 0 = 0 THEN ;* DEFINE BS/DEL KE
    YS
159           CRT TRM.BS.DEL.DEFINE:
160         END
161       END
162       FL.KEY = "ACF"          ;GOSUB 9900 ; ACF.FILE = FL.KEY
163       *
164       IF TRM.CONVERSION # '' THEN
165         * GET CONVERSION RECORD FROM ACF FILE
166         READ TRM.CONVERSION FROM ACF.FILE,TRM.CONVERSION ELSE TRM.CONVERSION
    = ''
167       END
168       *
169       FL.KEY = "TEXT"         ;GOSUB 9900 ; TXT.FILE = FL.KEY
170       FL.KEY = "SCRIPT"       ;GOSUB 9900 ; SCR.FILE = FL.KEY
171       FL.KEY = "LOCKED.ITEM"  ;GOSUB 9900 ; LI.FILE = FL.KEY
172       FL.KEY = "WORK.":THIS.PORT
173       OPEN '','MD' TO MD.FILE ELSE ABORT
174       READV DUMMY FROM MD.FILE,FL.KEY,1 ELSE
175         *** FILE DOESN'T EXIST - CREATE IT
176         EXECUTE "CREATE-FILE ":FL.KEY:" 1,1 11,1" CAPTURING DUMMY
177         WRITE AM:AM:'Work file for port ':THIS.PORT ON FL.FILE,FL.KEY
178         READVU DUMMY FROM MD.FILE,FL.KEY,1 THEN
179           WRITEV 'DX' ON MD.FILE,FL.KEY,1
180         END ELSE
181           ABORT
182         END
183       END
184       GOSUB 9900 ; WORK.FILE = FL.KEY
185       ***** GET SYSTEM ACF RECORD
186       MATREAD ACF.SYS.REC FROM ACF.FILE,'SYS' ELSE
187         PRMT.KEY = "12~SYSTEM"
188         GOSUB 9200
189         STOP
190       END
191       ***** GET MASTHEAD FROM COMPANY MASTER RECORD
192       * NO TRANSLATION REQUIRED
193       DUMMY = TRIM(OCONV(CURR.CO,'TCOMPANY.MASTER;X;1;1'))
194 *$INCLUDE BP.NATIVE PROGRAM.MAIN.163 ;* DUMMY = TRIM(OCONV(CURR.CO,'TCOMPAN
    Y.MASTER;X;1;1'))
195       PAD = INT((40-LEN(DUMMY))/2)
196       IF DUMMY # '' THEN CRT.LOGO = (SPACE(PAD):DUMMY)'L#40'
197       ***** GET XREF THROW-AWAY WORDS RECORD
198       READ TOSS.WORDS FROM ACF.FILE,'TOSS' ELSE TOSS.WORDS = ''
199       ***** GET AND SAVE ANY STACKED INPUT
200 *     LOOP
201 *       CHARS = SYSTEM(14)
202 *     UNTIL CHARS = 0 DO
203 *       INPUT ANS:
204 *       PRE.STORE<1,-1> = ANS
205 *     REPEAT
206       *
```

```
207        * CALL SUBROUTINE
208        *
209        RELEASE
210        BEGIN CASE
211          CASE DEBUG.FLAG < 2
212            PGMS.KEY = PROGRAM.NAME ; GOSUB 8900
213          CASE DEBUG.FLAG = 2
214            LAST.OPERATION = 'QUIT'
215          CASE DEBUG.FLAG = 3
216            LAST.OPERATION = 'FILE'
217        END CASE
218        *
219        * SET UP RETURNING.COM.AREA
220        *
221        IF DEBUG.FLAG THEN
222           CRT START.MSG.LINE:'PROGRAM.MAIN DEBUG ;RETURNING.COM.AREA=(':RETURNING.COM.AREA:')':
223           INPUT DUMMY,1:
224           CRT CLEAR.MSG.LINE:-
225        END
226        IF A.CALL THEN
227           READVU DUMMY FROM TRM.FILE,THIS.PORT,1 ELSE NULL
228           BEGIN CASE
229             CASE RETURNING.COM.AREA # ''           ;* COMMUNICATIONS AREA SET BY USER
230             CASE PRE.STORE # 'ZZ9Z'                ;* ACTIVE PRESTORE - PLACE IN INTER-LEVEL COMMUNICATIONS AREA
231               RETURNING.COM.AREA = ''              ;* CONVERT VALUES INTO SUB-VALUES AND STORE IN THE RETURNING.COM.AREA
232               FOR X = 1 TO X + 1 UNTIL PRE.STORE<1,X> = 'ZZ9Z'
233                 RETURNING.COM.AREA<1,1,X> = PRE.STORE<1,X>
234               NEXT X
235             CASE 1                                  ;* STANDARD A.CALL COMMUNICATION AREA IS SET HERE
236               BEGIN CASE
237                 CASE LAST.OPERATION = 'FILE'        ;* LAST OPERATION WAS FILES - SOME SORT OF KEY WILL BE PASSED BACK
238                   IF LAST.RETURNING.KEY # '' THEN   ;* CALLED BY CUSTOM.COMMANDS - PASS BACK KEY TO LAST LEVEL
239                     RETURNING.COM.AREA = LAST.RETURNING.KEY
240                   END ELSE                          ;* CALLED TO PROCESS CODE FIELD - PASS BACK KEY TO THIS LEVEL
241                     RETURNING.COM.AREA = LAST.KEY
242                   END
243                 CASE 1                              ;* LAST OPERATION WAS NOT FILED - NO KEY GETS PASSED BACK
244                   RETURNING.COM.AREA = 'ZZ9Z'
245               END CASE
246           END CASE
247           PGM.NAME = ''
248           LAST.RETURNING.KEY = ''
249           TRM.COM.AREA = FIELD(PROGRAM.NAME,'$',1):VM:DEBUG.FLAG:VM:LAST.RETURNING.KEY:VM:CURRENT.CLIENT:VM:CURRENT.POLICY:VM:CURRENT.LOSS:VM:CURRENT.EFF.DATE:VM:CURRENT.END.NO:VM:CURRENT.TRAN:VM:RETURNING.COM.AREA
250           IF DEBUG.FLAG THEN
251             CRT START.MSG.LINE:'PROGRAM.MAIN DEBUG ;TRM.COM.AREA=(':TRM.COM.AREA:')':
252             INPUT DUMMY,1:
253             CRT CLEAR.MSG.LINE:
254           END
255           WRITEV TRM.COM.AREA ON TRM.FILE,THIS.PORT,14
256        END
257        CRT PROTECT.MODE.OFF:  ;* PROTECT MODE OFF
258        IF TRM.LEVEL GE 4 AND TRM.WINDOW.NO + 0 = 0 THEN ;* RESET TERMINAL
259           CRT TRM.BS.DEL.RESET:
260        END
261        IF AUDIT.FLOW # '' THEN
262           * WRITE AUDIT RECORD INTO SCRIPT FILE
263           AUDIT.STOP = TIME()
264           STD.ARG(1) = FIELD(PROGRAM.NAME,'$',1)
265           STD.ARG(2) = 'EXIT'
266           PGMS.KEY = 'STD.AUDIT.FLOW' ; GOSUB 8900
267        END
268        STOP
269 $INCLUDE BP STD.CALL.INCLUDE$1
270 *
```

```
271 * STANDARD MESSAGE ROUTINE
272 *
273 9200 CRT BELL:
274      LENG = 0
275      PGMS.KEY = 'STD.MESSAGE' ; GOSUB 8900
276      RETURN
277 *
278 * STD FILE OPEN ROUTINE
279 *
280 9900 PGMS.KEY = 'STD.OPEN' ; GOSUB 8900
281      IF PRMT.KEY # '' THEN
282         GOSUB 9200
283         ABORT
284      END
285      RETURN
286 END
```

[405] 1 items listed out of 1 items.

```
     STD.FORMS.BUILDER$2
001 * Program....: STD.FORMS.BUILDER
002 * Description: Compile ACORD Source code entered via ACORD.FORMS.MAIN
003 * Revision...: 2.0 - Change program to use the Data Products AEtna logo car
      d instead of the BSI card.
004 * Project....: AETNA.LOGO - Convert programs to utilize the new AEtna Logo
      card from Data
005 * Programmer.: David M. Murdock
006 * Copyright..: 1990 Creative Information Systems CO. Ltd.
007 ******************************
008      STARTING.TIME = TIME() ;* GCR
009      OPEN '','ACORD.FORMS.BG' TO HDR.FILE ELSE DEBUG
010      OPEN '','ACORD.FORMS' TO AF.FILE ELSE DEBUG
011      OPEN '','TERMINAL' TO TRM.FILE ELSE DEBUG
012      INPUT INT.HDR.KEY
013      EXECUTE 'WHO' CAPTURING MSG
014      THIS.PORT = FIELD(MSG,' ',1)
015      READV DEFAULT.QUEUE FROM TRM.FILE,THIS.PORT,11 ELSE DEFAULT.QUEUE = 0
016      READ HDR.REC FROM HDR.FILE,INT.HDR.KEY ELSE STOP
017      DIM AF.ARRAY(3000)
018      AM = CHAR(254)
019      ESC = CHAR(27)
020      LF  = CHAR(10)
021      *
022      FONT.POINT = 18 :AM:16 :AM:14 :AM:12 :AM:10 :AM:10 :AM: 9 :AM: 9 :AM:
      8 :AM: 8 :AM: 7 :AM: 7 :AM: 6 :AM: 6 :AM: 4 :AM: 4
023      FONT.STROKE= 'B':AM:'B':AM:'B':AM:'B':AM:'B':AM:'M':AM:'B':AM:'M':AM:'
      B':AM:'M':AM:'B':AM:'M':AM:'B':AM:'M':AM:'B':AM:'M'
024      FONTS = 16
025      A.BOX =         ESC:'&a+06h-100V':ESC:'*c60h001v0p1h100v0P'
026      A.BOX = A.BOX:ESC:'&a+00h+100V':ESC:'*c60h001v0P'
027      A.BOX = A.BOX:ESC:'&a+60h-100V':ESC:'*c01h100v0P'
028      *
029      * ACF RECORD CONTAINS THE OFFSETS FOR FINE TUNING PLACEMENT
030      *
031      * ATTR 1 = HORIZONTAL OFFSET - IN FRACTIONS OF A SPACE
032      * ATTR 2 = VERTICAL OFFSET - IN FRACTIONS OF A LINE
033      READ AF.REC FROM AF.FILE,INT.HDR.KEY ELSE AF.REC = ''
         H.OFFSET = AF.REC<4> * 72
         V.OFFSET = AF.REC<5> * 120
         CRT H.OFFSET
         CRT V.OFFSET
         *
         * BUILD THE PRINT IMAGE VERSION
         *
         SAVE.REC = ''
         FOR X = 1 TO 7
            SAVE.REC<X> = AF.REC<X>
         NEXT X
         AF.REC = SAVE.REC
         PI = ''
         PI<-1> = ESC:'&l0e'                 ;* SKIP NO LINES AT THE TOP OF PAGE

PI<-1> =      '66F'                 ;* 66 LINES PER PAGE
```

```
049      BEGIN CASE
050        CASE HDR.REC<2> = ''              ;* PORTRAIT
051          PI<-1> = ESC:'&l00'
052        CASE HDR.REC<2> = 'P'             ;* PORTRAIT
053          PI<-1> = ESC:'&l00'
054        CASE HDR.REC<2> = 'L'             ;* LANDSCAPE
055          PI<-1> = ESC:'&l10'
056      END CASE
057      *
058      * LINES FIRST
059      *
060      CRT 'Building Lines and Blocks'
061      PROCESS = 1
062      GOSUB 8000
063      *
064      TL = 0
065      BR = 0
066      CNT = DCOUNT(HDR.REC<4>,CHAR(253))
067      FOR XX = 1 TO CNT
068        HRZ = OCONV(HDR.REC<4,XX>,'MR2')
069        VRT = OCONV(HDR.REC<5,XX>,'MR2')
070        HT  = OCONV(HDR.REC<6,XX>,'MR2')
071        WID = OCONV(HDR.REC<7,XX>,'MR2')
072        WEIGHT = HDR.REC<8,XX>
073        TYPE = HDR.REC<9,XX>
074        PATT = HDR.REC<10,XX>
075        GOSUB 9000
076      NEXT XX
077      HDR.REC<4> = ''
078      HDR.REC<5> = ''
079      HDR.REC<6> = ''
080      HDR.REC<7> = ''
081      *
082      * CHECK-OFF BOXES NEXT
083      *
084      CRT 'Building Boxes'
085      PROCESS = 2
086      *
087      CNT = DCOUNT(HDR.REC<11>,CHAR(253))
088      FOR XX = 1 TO CNT
089        HRZ = OCONV(HDR.REC<11,XX>,'MR2')
090        VRT = OCONV(HDR.REC<12,XX>,'MR2')
091        GOSUB 9000
092      NEXT XX
093      HDR.REC<11> = ''
094      HDR.REC<12> = ''
095      *
096      * TEXT LAST
097      *
098      CRT 'Entering Text'
099      PROCESS = 3
100      *
101      CNT = DCOUNT(HDR.REC<14>,CHAR(253))
102      ACORD = 0
103      CISCO = 0
104      AETNA = 0
105      FOR YY = 1 TO FONTS
106         * LOOK FOR EACH OF THE FONTS AND GROUP THE PRINTING OF LIKE FONTS TOGETHER
107         THIS.POINT = FONT.POINT<YY>
108         THIS.STROKE = FONT.STROKE<YY>
109         IF THIS.STROKE = 'B' THEN STROKE = 1 ELSE STROKE = 0
110         CRT @(-4):'Point size: ':THIS.POINT:CHAR(13):
111         FONT.COMMAND = ESC:'(8U':ESC:'(s1p':THIS.POINT:'v':STROKE:'b0s4T'
112         PI<-1> = FONT.COMMAND
113         FOR XX = 1 TO CNT
114           IF THIS.POINT = HDR.REC<17,XX> AND THIS.STROKE = HDR.REC<18,XX> THEN
115             HRZ = OCONV(HDR.REC<13,XX>,'MR2')
116             VRT = OCONV(HDR.REC<14,XX>,'MR2')
117             HV  = HDR.REC<16,XX>
118             TEXT= HDR.REC<15,XX>
119             BEGIN CASE
120                CASE TEXT = 'ACORD'    ;ACORD = 1
121                CASE TEXT = 'CISCO'    ;CISCO = 1
122                CASE TEXT = 'AETNA'    ;AETNA = 1
```

```
123            END CASE
124            GOSUB 9000
125          END
126        NEXT XX
127      NEXT YY
128      HDR.REC<13> = ''
129      HDR.REC<14> = ''
130      HDR.REC<15> = ''
131      HDR.REC<16> = ''
132      *
133      * RESET THE PRINTER AND EXIT
134      *
135      PI<-1> = ESC:'&l3e'              ;* SKIP 3 LINES AT THE TOP OF PAGE
136      PI<-1> =      '60F'              ;* 60 LINES PER PAGE
137      GOSUB 8000
138      AF.REC<8> = PI
139      PI = ''
140      AF.REC<3> = HDR.REC<3>
141      WRITE AF.REC ON AF.FILE,INT.HDR.KEY
142      MATREAD AF.ARRAY FROM AF.FILE,INT.HDR.KEY ELSE STOP
143      EXECUTE 'SP-ASSIGN OIF':DEFAULT.QUEUE
144      EXECUTE 'LZR1230.PORTRAIT'
145      BEGIN CASE
146         CASE HDR.REC<2> = ''          ;* PORTRAIT
147            EXECUTE 'LZR1230.PORTRAIT'
148         CASE HDR.REC<2> = 'P'         ;* PORTRAIT
149            EXECUTE 'LZR1230.PORTRAIT'
150         CASE HDR.REC<2> = 'L'         ;* LANDSCAPE
151            EXECUTE 'LZR1230.LANDSCAPE'
152      END CASE
153      PRINTER ON
154      CRT 'Printing Form'
155      LINES = DCOUNT(AF.REC,CHAR(254))
156      FOR X = 8 TO LINES
157         PRINT AF.ARRAY(X):
158      NEXT X
159      CRT 'Elapsed Generation Time is ':OCONV((TIME()-STARTING.TIME),'MTS')
160      SLEEP 2
161      PRINTER OFF
162      PRINTER CLOSE
163      EXECUTE 'LZR1230.LANDSCAPE'
164      EXECUTE 'SP-ASSIGN F':DEFAULT.QUEUE
165      STOP
166 *
167 * PRINT HORIZONTAL LINE
168 *
169 7000 IF BOX THEN
170         * MOVE STARTING POSITION BACK 1/2 LINE WEIGHT TO FILL IN TOP LEFT CORNER
171         H.LOC = HD + 36 - (WEIGHT/2)
172         V.LOC = VD - 60 - (WEIGHT/2)
173      END ELSE
174         H.LOC = HD + 36
175         V.LOC = VD - 60 - (WEIGHT/2)
176      END
177      POS= ESC:'&a':H.LOC:'h':V.LOC:'v'
178      IF BOX THEN
179         * MAKE HORIZ LINE ONE CHAR LONGER TO FILL IN TOP RIGHT CORNER
180         LEN = ((WID - 1) * 72) + WEIGHT
181      END ELSE
182         LEN = (WID - 1) * 72
183      END
184      IF TYPE = 1 THEN
185         * DASHED LINE - PATT = DECIPOINT LENGTH OF EACH DASH
186         IF PATT + 0 = 0 THEN PATT = 60
187         D.LEN = PATT                              ;* LENGTH OF DASH
188         B.LEN = OCONV(ICONV(PATT*.66,'MR0'),'MR0') ;* LENGTH OF SPACE
189         OK = 0
190         D.MIN = 0
191         D.MAX = INT(D.LEN)/2
192         LOOP
193            T.LEN = D.LEN + B.LEN
194            DUMMY = OCONV(ICONV((LEN/T.LEN),'MR2'),'MR2')
195            REM = '0.':(FIELD(DUMMY,'.',2) + 0)
196            REM = OCONV(ICONV((T.LEN*REM),'MR0'),'MR0')
```

```
197         BEGIN CASE
198            CASE REM < D.MIN      ;* ENDS WITH A TOO SMALL LINE - NG
199            CASE REM > D.MAX      ;* ENDS WITH A SPACE - NG
200            CASE 1
201               OK = 1
202         END CASE
203      UNTIL OK DO
204         B.LEN = B.LEN - 3
205         IF B.LEN LE 0 THEN
206            B.LEN = OCONV(ICONV(PATT*1.33,'MR0'),'MR0') ;* START AGAIN WITH
   LARGER SPACE
207         END
208      REPEAT
209      L = ESC:'*c':D.MAX:'h':WEIGHT:'v0P':ESC:'&a+':D.MAX+B.LEN:'H'
210      FOR X = D.MAX+B.LEN TO LEN STEP T.LEN
211         IF D.LEN > LEN - X THEN D.LEN = LEN - X
212         L = L:ESC:'*c':D.LEN:'h':WEIGHT:'v0P':ESC:'&a+':D.LEN+B.LEN:'H'
213      NEXT X
214   END ELSE
215      * SOLID LINE
216      L = ESC:'*c':LEN:'h':WEIGHT:'v0P'
217   END
218   PI<-1> = POS:L
219   RETURN
220 *
221 * VERTICAL LINE
222 *
223 7100 POS= ESC:'&a':HD+36-(WEIGHT/2):'h':VD-60:'V'
224      LEN = (HT - 1) * 120
225      IF TYPE = 1 THEN
226         * DASHED LINE - PATT = DECIPOINT LENGTH OF EACH DASH
227         IF PATT + 0 = 0 THEN PATT = 60
228         D.LEN = PATT                            ;* LENGTH OF DASH
229         B.LEN = OCONV(ICONV(PATT*.66,'MR0'),'MR0') ;* LENGTH OF SPACE
230         OK = 0
231         D.MIN = 0
232         D.MAX = INT(D.LEN)/2
233         LOOP
234            T.LEN = D.LEN + B.LEN
235            DUMMY = OCONV(ICONV((LEN/T.LEN),'MR2'),'MR2')
236            REM = '0.':(FIELD(DUMMY,'.',2) + 0)
237            REM = OCONV(ICONV((T.LEN*REM),'MR0'),'MR0')
238            BEGIN CASE
239               CASE REM < D.MIN      ;* ENDS WITH A TOO SMALL LINE - NG
240               CASE REM > D.MAX      ;* ENDS WITH A SPACE - NG
241               CASE 1
242                  OK = 1
243            END CASE
244         UNTIL OK DO
245            B.LEN = B.LEN - 3
246            IF B.LEN LE 0 THEN
247               B.LEN = OCONV(ICONV(PATT*1.33,'MR0'),'MR0') ;* START AGAIN WITH
   LARGER SPACE
248            END
249         REPEAT
250         L = ESC:'*c':WEIGHT:'h':D.MAX:'v0P':ESC:'&a+':D.MAX+B.LEN:'V'
251         FOR X = D.MAX+B.LEN TO LEN STEP T.LEN
252            IF D.LEN > LEN - X THEN D.LEN = LEN - X
253            L = L:ESC:'*c':WEIGHT:'h':D.LEN:'v0P':ESC:'&a+':D.LEN+B.LEN:'V'
254         NEXT X
255      END ELSE
256         * SOLID LINE
257         L = ESC:'*c':WEIGHT:'h':LEN:'v0P'
258      END
259      PI<-1> = POS:L
260      RETURN
261 *
262 * COURIER TYPE
263 *
264 8000 PI<-1> = ESC:'(8U':ESC:'(s0p10h12v0s0b3T'
265      HMI = 72
266      VMI = 120
267      RETURN
268 *
269 * POSITION CURSOR AND PRINT
270 *
```

```
271 9000 IF HRZ # '' THEN
272        IF FIELD(VRT,'.',2) = 0 THEN VRT = FIELD(VRT,'.',1)
273        IF FIELD(HRZ,'.',2) = 0 THEN HRZ = FIELD(HRZ,'.',1)
274        VD=((VRT-1)*120) + V.OFFSET
275        HD=((HRZ-1)*72) + H.OFFSET
276     END
277     ON PROCESS GO TO 9100,9200,9300
278     RETURN
279 *
280 * DRAW BOXES AND LINES
281 *
282 9100 BOX = 0
283     BEGIN CASE
284        CASE HT=1
285           GOSUB 7000
286        CASE WID=1
287           GOSUB 7100
288        CASE TYPE = 0 OR TYPE = 1  ;* SOLID BLACK LINE OF DASHED LINE
289           *
290           * THIS IS A BOX
291           *
292           BOX = 1
293           SHD = HD
294           SVD = VD
295           GOSUB 7000
296           HD = SHD + ((WID-1) * 72)
297           GOSUB 7100
298           HD = SHD
299           VD = SVD
300           GOSUB 7100
301           VD = SVD - ((HT-1) * 120)
302           GOSUB 7000
303        CASE 1         ;* SHADING
304           H.LOC = HD + 36
305           V.LOC = VD - 60
306           POS= ESC:'&a':H.LOC:'h':V.LOC:'v'
307           LEN = (WID - 1) * 72
308           HGT = (HT - 1) * 120
309           L = ESC:'*c':LEN:'h':HGT:'v':PATT:'g':TYPE:'P'
310           PI<-1> = POS:L
311     END CASE
312     RETURN
313 *
314 * DRAW CHECK-OFF BOXES
315 *
316 9200 POS= ESC:'&a':HD:'h':VD:'v'
317     PI<-1> = POS:A.BOX
318     RETURN
319 *
320 * PRINT TEXT
321 *
322 9300 BEGIN CASE
323        CASE ACORD
324           ACORD = 0
325           POS= ESC:'&a':HD:'h':VD:'v'
326           PI<-1> = POS
327           PI<-1> = ESC:'(8U':ESC:'(s0p6.25h12v0s0b0TABCDEF'
328           PI<-1> = FONT.COMMAND
329        CASE CISCO
330           CISCO = 0
331           POS= ESC:'&a':HD:'h':VD:'v'
332           PI<-1> = POS
333           PI<-1> = ESC:'(8U':ESC:'(s0p6.25h12v0s3b0TABCDEF'
334           PI<-1> = ESC:'&a-0690h+0120V':'GHIJKL'
335           PI<-1> = ESC:'&a-0690h+0120V':'MNOPQR'
336           PI<-1> = FONT.COMMAND
337        CASE AETNA
338           AETNA = 0
339           POS= ESC:'&a':HD:'h':VD:'v'
340           PI<-1> = POS
341           PI<-1> = ESC:'(8U':ESC:'(s0p6.25h12v0s3b0TABCDE'
342           PI<-1> = ESC:'&a-0576h+0120V':'FGHIJ'
343           PI<-1> = ESC:'&a-0576h+0120V':'KLMNO'
344           PI<-1> = FONT.COMMAND
345        CASE 1
346           IF HRZ # '' THEN
```

```
347            * THIS TEXT IS NOT A CONTINUATION
348            POS= ESC:'&a':HD:'h':VD:'V'
349            PI<-1> = POS
350          END
351          IF HV='H' THEN
352            PI<-1> = TEXT
353          END ELSE
354            T.VMI = VMI - 12
355            FOR X=1 TO X + 1 UNTIL TEXT[X,1]=''
356              PI<-1> = TEXT[X,1]:ESC:'&a-':HMI:'ha+':T.VMI:'V'
357            NEXT X
358          END
359      END CASE
360      RETURN
361 END
```

[405] 1 items listed out of 1 items.

```
    ACORD.FORMS$2.1.MAIN
001 SUBROUTINE ACORD.FORMS$2.1.MAIN
002 GO TO 9
003 * ACORD FORM PARAMETER ENTRY
004 * ACORD.FORMS.BG
005 * Program....: ACORD.FORMS
006 * Revision...: 2.1 - Add code to set Update Flat in A24 for release process
007 * Project....: 2.0B - Software Release Bugs since 2.0 was released into Pil
    ot.
008 * Programmer.: Michael F. Linehan
009 * Copyright..: 1990 Creative Information Systems CO. Ltd.
010 ******************************************
011 * Creative Information Systems CO. Ltd. *
012 *      650 Bloomfield Ave. Suite 202     *
013 *         Bloomfield, New Jersey  07003  *
014 *              (201) 429-7733            *
015 ******************************************
016 *
017 *
018 *
019 *
020 *
021 *
022 *
023 *
024 *
025 $INCLUDE EQUATES SYSTEM.COMMON
026 *
027 $INCLUDE EQUATES TERMINAL
028 *
029 $INCLUDE USER.BP ACORD.FORMS$2.1.MAIN.EQUATES.INCLUDE
030 $INCLUDE USER.BP MAIN.DEBUG.INCLUDE
031 9 MODE=''
032 LIS.INFO = ''
033 ALST.KEY=''
034 LAST.INT.KEY=''
035 INT.HDR.KEY=''
036 FIELD.REDISPLAY=0
037 ADDL.HIST.DATA=''
038 $INCLUDE USER.BP ACORD.FORMS$2.1.MAIN.OPEN.INCLUDE
039 IF CURRENT.TRAN = 'DIS' THEN
040   * CAN'T ADD OR DELETE RECORDS IN DISPLAY MODE
041   ADD.RECORDS = 0
042   DELETE.RECORDS = 0
043 END
044 * END OF INITIALIZATION SECTION
045 READ FL.REC FROM FL.FILE,EXT.HDR.FILE ELSE NULL
046 IF FL.REC<8> THEN FIELD.XREF = 1 ELSE FIELD.XREF = 0
047 IF ACF.SYS.REC(7) # '' THEN
048   * WRITE AUDIT RECORD INTO SCRIPT FILE
049   AUDIT.STOP = TIME()
050   STD.ARG(1) = PGM.NAME
051   STD.ARG(2) = 'INITIALIZE'
```

```
052     PGMS.KEY = 'STD.AUDIT.FLOW' ;GOSUB 8900
053     AUDIT.START = TIME()
054 END
055 GOSUB 8200
056   GOSUB 9300
057 IF DEBUG.FLAG THEN
058     PROCESS = 3
059     GOSUB 8
060 END
061     * MARKER $$25
062 10  * MAIN PROGRAM LOOP FOR DATA ENTRY
063 100 REF.FILE="ACORD.FORMS.BG";HELP.KEY="ACORD.FORMS.100";LENG=8;ILEN=0
064     HRZ=14;VRT=2;CON="";PATT='0X';MASK="L#8";MAN="KEY";FIELD.NO=1;DY.TAB="
        .
065     IF MODE='' THEN OLDVALUE='' ELSE OLDVALUE=HDR.KEY
066     AMC=0;VMC=0;SVMC=0
067     IF MODE[1,1]="C" THEN
068       SAVE.LENGTH = LENG
069       PRMT.KEY=38
070       GOSUB 9200
071       SKIP.FLAG=1
072       LENG = SAVE.LENGTH
073     END
074     GOSUB 9000 ;***** STD.INPUT
075     IF ENTRY="" THEN PRMT.KEY=5;GOSUB 9200;GO TO 100
076     IF OCONV(ENTRY,"MCU")[1,2]=ESC2:"E" OR OCONV(ENTRY,"MCU")[1,2]=ESC2:"Q
      " THEN
077         IF MODE # '' THEN             ;* CAN'T EXIT WHILE IN CHANGE MODE
078           PRMT.KEY=54
079           GOSUB 9200
080           GO TO 100
081         END
082         GO TO 9999
083     END
084     HDR.KEY=ENTRY ;IF MODE = '' THEN INT.HDR.KEY=ENTRY
085     IF MODE='' THEN
086       INT.HDR.KEY=HDR.KEY
087       MATREAD HDR.REC FROM HDR.FILE,INT.HDR.KEY THEN
088         IF CHANGE.HIST # '' THEN MAT OLD.REC=MAT HDR.REC
089         MODE="C"
090         IF HDR.REC(19):HDR.REC(20):HDR.REC(21):HDR.REC(22) = '' THEN
091           * GET THE OFFSETS FROM THE ACORD.FORMS
092           READV HDR.REC(19) FROM ACORD.FORMS.FILE,INT.HDR.KEY,4 ELSE HDR.R
    EC(19) = '' ;* BG HORIZ
093           READV HDR.REC(20) FROM ACORD.FORMS.FILE,INT.HDR.KEY,5 ELSE HDR.R
    EC(20) = '' ;* BG VERT
094           READV HDR.REC(21) FROM ACORD.FORMS.FILE,INT.HDR.KEY,6 ELSE HDR.R
    EC(21) = '' ;* FG HORIZ
095           READV HDR.REC(22) FROM ACORD.FORMS.FILE,INT.HDR.KEY,7 ELSE HDR.R
    EC(22) = '' ;* FG VERT
096           FOR X = 19 TO 22
097             HDR.REC(X) = ICONV(HDR.REC(X),'MR2')
098           NEXT X
099         END
100         GOSUB 9400 ;***** DISPLAY FOREGROUND
101       END ELSE
102         IF NOT(ADD.RECORDS) THEN PRMT.KEY='109~':ENTRY;GOSUB 9200;GO TO 10
    0
103         MODE="A"
104       END
105       LI.KEY=EXT.HDR.FILE:"*":INT.HDR.KEY
106       PROCESS=1
107       GOSUB 9700
108       IF PRMT.KEY # '' THEN
109         GOSUB 9200
110         MODE='';GOSUB 9450
111         GO TO 100
112       END
113       IF MODE[1,1]="C" THEN GO TO 8000
114     END
115
116 110 REF.FILE="";HELP.KEY="ACORD.FORMS.110";LENG=40;ILEN=0
117     HRZ=36;VRT=2;CON="";PATT='0X';MASK="L#40";MAN="";FIELD.NO=2;DY.TAB=1:A
      M:1
118     OLDVALUE=HDR.REC(3)
```

```
119         AMC=3;VMC=0;SVMC=0
120         GOSUB 9000 ;***** STD.INPUT
121         HDR.REC(3)=ENTRY
122
123   115   REF.FILE="";HELP.KEY="ACORD.FORMS.115";LENG=1;ILEN=0
124         HRZ=77;VRT=2;CON="MCA":VM:"";PATT='0X';MASK="L#1";MAN="";FIELD.NO=3;DY
      .TAB=1
125         OLDVALUE=HDR.REC(2)
126         AMC=2;VMC=0;SVMC=0
127         IF OLDVALUE="" THEN OLDVALUE="P"
128         GOSUB 9000 ;***** STD.INPUT
129         BEGIN CASE
130            CASE ENTRY="P"
131            CASE ENTRY="L"
132            CASE 1
133               PRMT.KEY=67
134               GOSUB 9200 ;***** STD.MESSAGE
135               GO TO 115
136         END CASE
137         HDR.REC(2)=ENTRY
138
139   120   LIS=1
140         LIS.INFO<LIS,5>=DCOUNT(HDR.REC(4)<1>,VM)
141         GOSUB 8600
142         REF.FILE="";HELP.KEY="ACORD.FORMS.120";LENG=3;ILEN=0
143         HRZ=1;VRT=5+LIS.INFO<LIS,2>;CON="MCN":VM:"MR0";PATT='0N';MASK="R#3";MA
      N="LINE";FIELD.NO=4;DY.TAB=2;AM:2
144         OLDVALUE=LIS.INFO<LIS,3>
145         AMC="";VMC="";SVMC=""
146         IF LIS.RTN THEN
147            LIS.RTN = LIS.RTN + 2
148            IF LIS.RTN = 4 THEN LIS.RTN = 0 ;! GOING TO A SPECIFIC LINE
149         END ELSE
150            GOSUB 9000
151         END
152         CRT @(HRZ,VRT):OLDVALUE MASK:
153         IF ENTRY[1,1]="." THEN ENTRY=ENTRY[2,99]
154         LIS.ATTRS=4:AM:5:AM:6:AM:7:AM:8:AM:9:AM:10:AM:23:AM:""
155         BEGIN CASE
156            CASE ENTRY=OLDVALUE       ;***** PROCESS FIRST LIS FIELD
157            CASE ENTRY[1,1]="E"       ;***** JUMP OUT OF THIS LIS SET LOOKING TO
      NEXT FIELD
158               GO TO 1209
159            CASE ENTRY[1,1]="N"       ;***** JUMP OUT OF THIS LIS SET LOOKING TO
      FINISH BUT NOT FILE
160               GO TO 1209
161            CASE ENTRY[1,1]="F"       ;***** JUMP OUT OF THIS LIS SET LOOKING TO
      FINISH AND FILE
162               GO TO 1209
163            CASE ENTRY[1,2]="++"      ;***** LAST PAGE
164               LIS.INFO<LIS,3>=9999
165               GO TO 120
166            CASE ENTRY[1,2]="--"      ;***** FIRST PAGE
167               LIS.INFO<LIS,3>=1
168               GO TO 120
169            CASE ENTRY[1,1]="+"       ;***** NEXT PAGE
170               LIS.INFO<LIS,3>=LIS.INFO<LIS,3> + LIS.INFO<LIS,4>
171               GO TO 120
172            CASE ENTRY[1,1]="-"       ;***** PREVIOUS PAGE
173               LIS.INFO<LIS,3>=LIS.INFO<LIS,3> - LIS.INFO<LIS,4>
174               GO TO 120
175            CASE NUM(ENTRY)           ;***** GO TO SPECIFIC LINE
176               LIS.INFO<LIS,3>=ENTRY
177               GO TO 120
178            CASE ENTRY[1,1]="K"       ;***** KILL THIS LINE
179               PRMT.KEY=41
180               GOSUB 9210
181               IF ANS="Y" THEN
182                  FOR X=1 TO X + 1 UNTIL LIS.ATTRS<X>=''
183                     HDR.REC(LIS.ATTRS<X>)=DELETE(HDR.REC(LIS.ATTRS<X>),1,LIS.INFO<
      LIS,3>,0)
184                  NEXT X
185               END
186               LIS.INFO<LIS,1>=0
187               GO TO 120
188            CASE ENTRY[1,1]="L"       ;***** INSERT A NEW LINE
```

```
189         IF LIS.INFO<LIS,3>+1 > LIS.INFO<LIS,6> THEN
190           PRMT.KEY = "392~":LIS.INFO<LIS,6>
191           GOSUB 9200
192           GO TO 120
193         END
194         LIS.INFO<LIS,3>=LIS.INFO<LIS,3> + 1
195           FOR X=1 TO X + 1 UNTIL LIS.ATTRS<X>=''
196             HDR.REC(LIS.ATTRS<X>)=INSERT(HDR.REC(LIS.ATTRS<X>),1,LIS.INFO<LIS,3>,0,"")
197           NEXT X
198         LIS.INFO<LIS,1>=0
199         ENTRY=LIS.INFO<LIS,3>
200         GOSUB 8600
201       CASE ENTRY[1,1]="I"      ;***** INSERT A NEW LINE IN FRONT OF THIS LINE
202         IF LIS.INFO<LIS,3>+1 > LIS.INFO<LIS,6> THEN
203           PRMT.KEY = "392~":LIS.INFO<LIS,6>
204           GOSUB 9200
205           GO TO 120
206         END
207           FOR X=1 TO X + 1 UNTIL LIS.ATTRS<X>=''
208             HDR.REC(LIS.ATTRS<X>)=INSERT(HDR.REC(LIS.ATTRS<X>),1,LIS.INFO<LIS,3>,0,"")
209           NEXT X
210         LIS.INFO<LIS,1>=0
211         ENTRY=LIS.INFO<LIS,3>
212         GOSUB 8600
213       CASE ENTRY[1,1]="D"      ;***** DUPE A LINE
214         IF LIS.INFO<LIS,3>+1 > LIS.INFO<LIS,6> THEN
215           PRMT.KEY = "392~":LIS.INFO<LIS,6>
216           GOSUB 9200
217           GO TO 120
218         END
219         PRMT.KEY=312
220         LENG = 3
221         GOSUB 9220
222         IF ANS#'E' AND ANS#"" AND NUM(ANS) THEN
223           FOR X=1 TO X + 1 UNTIL LIS.ATTRS<X>=''
224             HDR.REC(LIS.ATTRS<X>)=INSERT(HDR.REC(LIS.ATTRS<X>),1,LIS.INFO<LIS,3>,0,HDR.REC(LIS.ATTRS<X>)<1,ANS>)
225           NEXT X
226         END
227         LIS.INFO<LIS,1>=0
228         GO TO 120
229       CASE 1                   ;* CATCH-ALL
230         PRMT.KEY=43
231         GOSUB 9200 ;***** STD.MESSAGE
232         GO TO 120
233       END CASE
234     LIS.INFO<LIS,3>=ENTRY
235
236 130 LIS=1
237     LIS.INFO<LIS,5>=DCOUNT(HDR.REC(4)<1>,VM)
238     GOSUB 8600
239     REF.FILE="";HELP.KEY="ACORD.FORMS.130";LENG=6;ILEN=0
240     HRZ=5;VRT=5+LIS.INFO<LIS,2>;CON="MR2":VM:"MR2";PATT='0X';MASK="R#6";MAN="";FIELD.NO=5;DY.TAB=2
241     OLDVALUE=HDR.REC(4)<1,LIS.INFO<LIS,3>>
242     AMC=4;VMC=LIS.INFO<LIS,3>;SVMC=0
243     IF OLDVALUE="" THEN
244       IF VMC > 1 THEN OLDVALUE = HDR.REC(AMC)<1,VMC-1>
245     END
246     GOSUB 9000 ;***** STD.INPUT
247     HDR.REC(4)<1,LIS.INFO<LIS,3>>=ENTRY
248
249 140 LIS=1
250     LIS.INFO<LIS,5>=DCOUNT(HDR.REC(4)<1>,VM)
251     GOSUB 8600
252     REF.FILE="";HELP.KEY="ACORD.FORMS.140";LENG=6;ILEN=0
253     HRZ=12;VRT=5+LIS.INFO<LIS,2>;CON="MR2":VM:"MR2";PATT='0X';MASK="R#6";MAN="";FIELD.NO=6;DY.TAB=2
254     OLDVALUE=HDR.REC(5)<1,LIS.INFO<LIS,3>>
255     AMC=5;VMC=LIS.INFO<LIS,3>;SVMC=0
256     IF OLDVALUE="" THEN
257       IF VMC > 1 THEN OLDVALUE = HDR.REC(AMC)<1,VMC-1>
258     END
```

```
259        GOSUB 9000 ;***** STD.INPUT
260        HDR.REC(5)<1,LIS.INFO<LIS,3>>=ENTRY
261
262 150    LIS=1
263        LIS.INFO<LIS,5>=DCOUNT(HDR.REC(4)<1>,VM)
264        GOSUB 8600
265        REF.FILE="";HELP.KEY="ACORD.FORMS.150";LENG=6;ILEN=0
266        HRZ=19;VRT=5+LIS.INFO<LIS,2>;CON="MR2":VM:"MR2";PATT='OX';MASK="R#6";M
    AN="";FIELD.NO=7;DY.TAB=2
267        OLDVALUE=HDR.REC(6)<1,LIS.INFO<LIS,3>>
268        AMC=6;VMC=LIS.INFO<LIS,3>;SVMC=0
269        IF OLDVALUE="" THEN
270          IF VMC > 1 THEN OLDVALUE = HDR.REC(AMC)<1,VMC-1>
271        END
272        GOSUB 9000 ;***** STD.INPUT
273        HDR.REC(6)<1,LIS.INFO<LIS,3>>=ENTRY
274
275 160    LIS=1
276        LIS.INFO<LIS,5>=DCOUNT(HDR.REC(4)<1>,VM)
277        GOSUB 8600
278        REF.FILE="";HELP.KEY="ACORD.FORMS.160";LENG=6;ILEN=0
279        HRZ=26;VRT=5+LIS.INFO<LIS,2>;CON="MR2":VM:"MR2";PATT='OX';MASK="R#6";M
    AN="";FIELD.NO=8;DY.TAB=2
280        OLDVALUE=HDR.REC(7)<1,LIS.INFO<LIS,3>>
281        AMC=7;VMC=LIS.INFO<LIS,3>;SVMC=0
282        IF OLDVALUE="" THEN
283          IF VMC > 1 THEN OLDVALUE = HDR.REC(AMC)<1,VMC-1>
284        END
285        GOSUB 9000 ;***** STD.INPUT
286        HDR.REC(7)<1,LIS.INFO<LIS,3>>=ENTRY
287
288 165    LIS=1
289        LIS.INFO<LIS,5>=DCOUNT(HDR.REC(4)<1>,VM)
290        GOSUB 8600
291        REF.FILE="";HELP.KEY="ACORD.FORMS.165";LENG=3;ILEN=0
292        HRZ=33;VRT=5+LIS.INFO<LIS,2>;CON="MCN":VM:"MR0";PATT='ON';MASK="R#3";M
    AN="Y";FIELD.NO=9;DY.TAB=2
293        OLDVALUE=HDR.REC(8)<1,LIS.INFO<LIS,3>>
294        AMC=8;VMC=LIS.INFO<LIS,3>;SVMC=0
295        IF OLDVALUE="" THEN
296          IF VMC > 1 THEN OLDVALUE = HDR.REC(AMC)<1,VMC-1>
297        END
298        GOSUB 9000 ;***** STD.INPUT
299        HDR.REC(8)<1,LIS.INFO<LIS,3>>=ENTRY
300
301 166    LIS=1
302        LIS.INFO<LIS,5>=DCOUNT(HDR.REC(4)<1>,VM)
303        GOSUB 8600
304        REF.FILE="";HELP.KEY="ACORD.FORMS.166";LENG=1;ILEN=0
305        HRZ=37;VRT=5+LIS.INFO<LIS,2>;CON="MCN":VM:"MR0";PATT='ON';MASK="R#1";M
    AN="Y";FIELD.NO=10;DY.TAB=2
306        OLDVALUE=HDR.REC(9)<1,LIS.INFO<LIS,3>>
307        AMC=9;VMC=LIS.INFO<LIS,3>;SVMC=0
308        IF OLDVALUE="" THEN
309          IF VMC > 1 THEN OLDVALUE = HDR.REC(AMC)<1,VMC-1>
310        END
311        GOSUB 9000 ;***** STD.INPUT
312        BEGIN CASE
313          CASE ENTRY=0
314          CASE ENTRY=1
315          CASE ENTRY=2
316          CASE ENTRY=3
317          CASE 1
318            PRMT.KEY=67
319            GOSUB 9200 ;***** STD.MESSAGE
320            GO TO 166
321        END CASE
322        HDR.REC(9)<1,LIS.INFO<LIS,3>>=ENTRY
323 1689     * CONTINUE
324
325 167    LIS=1
326        LIS.INFO<LIS,5>=DCOUNT(HDR.REC(4)<1>,VM)
327        GOSUB 8600
328        REF.FILE="";HELP.KEY="ACORD.FORMS.167";LENG=4;ILEN=0
329        HRZ=39;VRT=5+LIS.INFO<LIS,2>;CON="MCN":VM:"MR0";PATT='ON';MASK="R#4";M
    AN="";FIELD.NO=11;DY.TAB=2
```

```
330     OLDVALUE=HDR.REC(10)<1,LIS.INFO<LIS,3>>
331     AMC=10;VMC=LIS.INFO<LIS,3>;SVMC=0
332     IF OLDVALUE="" THEN
333        IF VMC > 1 THEN OLDVALUE = HDR.REC(AMC)<1,VMC-1>
334     END
335     GOSUB 9000 ;***** STD.INPUT
336     HDR.REC(10)<1,LIS.INFO<LIS,3>>=ENTRY
337
338 168 LIS=1
339     LIS.INFO<LIS,5>=DCOUNT(HDR.REC(4)<1>,VM)
340     GOSUB 8600
341     REF.FILE="";HELP.KEY="ACORD.FORMS.168";LENG=35;ILEN=0
342     HRZ=44;VRT=5+LIS.INFO<LIS,2>;CON="";PATT='0X';MASK="L#35";MAN="";FIELD
    .NO=12;DY.TAB=2
343     OLDVALUE=HDR.REC(23)<1,LIS.INFO<LIS,3>>
344     AMC=23;VMC=LIS.INFO<LIS,3>;SVMC=0
345     GOSUB 9000 ;***** STD.INPUT
346     HDR.REC(23)<1,LIS.INFO<LIS,3>>=ENTRY
347     LIS.INFO<LIS,3>=LIS.INFO<LIS,3> + 1
348     GO TO 120
349 1209 * CONTINUE WITH NEXT FIELD
350
351 170 LIS=2
352     LIS.INFO<LIS,5>=DCOUNT(HDR.REC(11)<1>,VM)
353     GOSUB 8600
354     REF.FILE="";HELP.KEY="ACORD.FORMS.170";LENG=3;ILEN=0
355     HRZ=1;VRT=11+LIS.INFO<LIS,2>;CON="MCN":VM:"MR0";PATT='ON';MASK="R#3";M
    AN="LINE";FIELD.NO=13;DY.TAB=3:AM:2
356     OLDVALUE=LIS.INFO<LIS,3>
357     AMC="";VMC="";SVMC=""
358     IF LIS.RTN THEN
359        LIS.RTN = LIS.RTN + 2
360        IF LIS.RTN = 4 THEN LIS.RTN = 0 ;! GOING TO A SPECIFIC LINE
361     END ELSE
362        GOSUB 9000
363     END
364     CRT @(HRZ,VRT):OLDVALUE MASK:
365     IF ENTRY[1,1]="." THEN ENTRY=ENTRY[2,99]
366     LIS.ATTRS=11:AM:12:AM:""
367     BEGIN CASE
368        CASE ENTRY=OLDVALUE      ;***** PROCESS FIRST LIS FIELD
369        CASE ENTRY[1,1]="E"      ;***** JUMP OUT OF THIS LIS SET LOOKING TO
    NEXT FIELD
370           GO TO 1709
371        CASE ENTRY[1,1]="N"      ;***** JUMP OUT OF THIS LIS SET LOOKING TO
    FINISH BUT NOT FILE
372           GO TO 1709
373        CASE ENTRY[1,1]="F"      ;***** JUMP OUT OF THIS LIS SET LOOKING TO
    FINISH AND FILE
374           GO TO 1709
375        CASE ENTRY[1,2]="++"     ;***** LAST PAGE
376           LIS.INFO<LIS,3>=9999
377           GO TO 170
378        CASE ENTRY[1,2]="--"     ;***** FIRST PAGE
379           LIS.INFO<LIS,3>=1
380           GO TO 170
381        CASE ENTRY[1,1]="+"      ;***** NEXT PAGE
382           LIS.INFO<LIS,3>=LIS.INFO<LIS,3> + LIS.INFO<LIS,4>
383           GO TO 170
384        CASE ENTRY[1,1]="-"      ;***** PREVIOUS PAGE
385           LIS.INFO<LIS,3>=LIS.INFO<LIS,3> - LIS.INFO<LIS,4>
386           GO TO 170
387        CASE NUM(ENTRY)          ;***** GO TO SPECIFIC LINE
388           LIS.INFO<LIS,3>=ENTRY
389           GO TO 170
390        CASE ENTRY[1,1]="K"      ;***** KILL THIS LINE
391           PRMT.KEY=41
392           GOSUB 9210
393           IF ANS="Y" THEN
394              FOR X=1 TO X + 1 UNTIL LIS.ATTRS<X>=''
395                 HDR.REC(LIS.ATTRS<X>)=DELETE(HDR.REC(LIS.ATTRS<X>),1,LIS.INFO<
    LIS,3>,0)
396              NEXT X
397           END
398           LIS.INFO<LIS,1>=0
```

```
399            GO TO 170
400         CASE ENTRY[1,1]="L"        ;***** INSERT A NEW LINE
401            IF LIS.INFO<LIS,3>+1 > LIS.INFO<LIS,6> THEN
402               PRMT.KEY = "392~":LIS.INFO<LIS,6>
403               GOSUB 9200
404               GO TO 170
405            END
406            LIS.INFO<LIS,3>=LIS.INFO<LIS,3> + 1
407               FOR X=1 TO X + 1 UNTIL LIS.ATTRS<X>=''
408                  HDR.REC(LIS.ATTRS<X>)=INSERT(HDR.REC(LIS.ATTRS<X>),1,LIS.INFO<
     LIS,3>,0,"")
409               NEXT X
410            LIS.INFO<LIS,1>=0
411            ENTRY=LIS.INFO<LIS,3>
412            GOSUB 8600
413         CASE ENTRY[1,1]="I"        ;***** INSERT A NEW LINE IN FRONT OF THIS L
     INE
414            IF LIS.INFO<LIS,3>+1 > LIS.INFO<LIS,6> THEN
415               PRMT.KEY = "392~":LIS.INFO<LIS,6>
416               GOSUB 9200
417               GO TO 170
418            END
419               FOR X=1 TO X + 1 UNTIL LIS.ATTRS<X>=''
420                  HDR.REC(LIS.ATTRS<X>)=INSERT(HDR.REC(LIS.ATTRS<X>),1,LIS.INFO<
     LIS,3>,0,"")
421               NEXT X
422            LIS.INFO<LIS,1>=0
423            ENTRY=LIS.INFO<LIS,3>
424            GOSUB 8600
425         CASE ENTRY[1,1]="D"        ;***** DUPE A LINE
426            IF LIS.INFO<LIS,3>+1 > LIS.INFO<LIS,6> THEN
427               PRMT.KEY = "392~":LIS.INFO<LIS,6>
428               GOSUB 9200
429               GO TO 170
430            END
431            PRMT.KEY=312
432            LENG = 3
433            GOSUB 9220
434            IF ANS#'E' AND ANS#"" AND NUM(ANS) THEN
435               FOR X=1 TO X + 1 UNTIL LIS.ATTRS<X>=''
436                  HDR.REC(LIS.ATTRS<X>)=INSERT(HDR.REC(LIS.ATTRS<X>),1,LIS.INFO<
     LIS,3>,0,HDR.REC(LIS.ATTRS<X>)<1,ANS>)
437               NEXT X
438            END
439            LIS.INFO<LIS,1>=0
440            GO TO 170
441         CASE 1                     ;* CATCH-ALL
442            PRMT.KEY=43
443            GOSUB 9200 ;***** STD.MESSAGE
444            GO TO 170
445         END CASE
446      LIS.INFO<LIS,3>=ENTRY
447
448 180  LIS=2
449      LIS.INFO<LIS,5>=DCOUNT(HDR.REC(11)<1>,VM)
450      GOSUB 8600
451      REF.FILE="";HELP.KEY="ACORD.FORMS.180";LENG=6;ILEN=0
452      HRZ=6;VRT=11+LIS.INFO<LIS,2>;CON="MR2":VM:"MR2";PATT='0X';MASK="R#6";M
     AN="";FIELD.NO=14;DY.TAB=3
453      OLDVALUE=HDR.REC(11)<1,LIS.INFO<LIS,3>>
454      AMC=11;VMC=LIS.INFO<LIS,3>;SVMC=0
455      IF OLDVALUE="" THEN
456         IF VMC > 1 THEN OLDVALUE = HDR.REC(AMC)<1,VMC-1>
457      END
458      GOSUB 9000 ;***** STD.INPUT
459      HDR.REC(11)<1,LIS.INFO<LIS,3>>=ENTRY
460
461 190  LIS=2
462      LIS.INFO<LIS,5>=DCOUNT(HDR.REC(11)<1>,VM)
463      GOSUB 8600
464      REF.FILE="";HELP.KEY="ACORD.FORMS.190";LENG=6;ILEN=0
465      HRZ=14;VRT=11+LIS.INFO<LIS,2>;CON="MR2":VM:"MR2";PATT='0X';MASK="R#6";
     MAN="";FIELD.NO=15;DY.TAB=3
466      OLDVALUE=HDR.REC(12)<1,LIS.INFO<LIS,3>>
467      AMC=12;VMC=LIS.INFO<LIS,3>;SVMC=0
468      IF OLDVALUE="" THEN
```

```
469         IF VMC > 1 THEN OLDVALUE = HDR.REC(AMC)<1,VMC-1>
470       END
471       GOSUB 9000  ;***** STD.INPUT
472       HDR.REC(12)<1,LIS.INFO<LIS,3>>=ENTRY
473       LIS.INFO<LIS,3>=LIS.INFO<LIS,3> + 1
474       GO TO 170
475 1709 * CONTINUE WITH NEXT FIELD
476
477 200  LIS=3
478      LIS.INFO<LIS,5>=DCOUNT(HDR.REC(14)<1>,VM)
479      GOSUB 8600
480      REF.FILE="";HELP.KEY="ACORD.FORMS.200";LENG=3;ILEN=0
481      HRZ=1;VRT=14+LIS.INFO<LIS,2>;CON="MCN":VM:"MR0";PATT='ON';MASK="R#3";M
    AN="LINE";FIELD.NO=16;DY.TAB=4:AM:2
482      OLDVALUE=LIS.INFO<LIS,3>
483      AMC="";VMC="";SVMC=""
484      IF LIS.RTN THEN
485        LIS.RTN = LIS.RTN + 2
486        IF LIS.RTN = 4 THEN LIS.RTN = 0 ;! GOING TO A SPECIFIC LINE
487      END ELSE
488        GOSUB 9000
489      END
490      CRT @(HRZ,VRT):OLDVALUE MASK:
491      IF ENTRY[1,1]="." THEN ENTRY=ENTRY[2,99]
492      LIS.ATTRS=13:AM:14:AM:16:AM:17:AM:18:AM:15:AM:""
493      BEGIN CASE
494         CASE ENTRY=OLDVALUE       ;***** PROCESS FIRST LIS FIELD
495         CASE ENTRY[1,1]="E"       ;***** JUMP OUT OF THIS LIS SET LOOKING TO
    NEXT FIELD
496            GO TO 2009
497         CASE ENTRY[1,1]="N"       ;***** JUMP OUT OF THIS LIS SET LOOKING TO
    FINISH BUT NOT FILE
498            GO TO 2009
499         CASE ENTRY[1,1]="F"       ;***** JUMP OUT OF THIS LIS SET LOOKING TO
    FINISH AND FILE
500            GO TO 2009
501         CASE ENTRY[1,2]="++"      ;***** LAST PAGE
502            LIS.INFO<LIS,3>=9999
503            GO TO 200
504         CASE ENTRY[1,2]="--"      ;***** FIRST PAGE
505            LIS.INFO<LIS,3>=1
506            GO TO 200
507         CASE ENTRY[1,1]="+"       ;***** NEXT PAGE
508            LIS.INFO<LIS,3>=LIS.INFO<LIS,3> + LIS.INFO<LIS,4>
509            GO TO 200
510         CASE ENTRY[1,1]="-"       ;***** PREVIOUS PAGE
511            LIS.INFO<LIS,3>=LIS.INFO<LIS,3> - LIS.INFO<LIS,4>
512            GO TO 200
513         CASE NUM(ENTRY)           ;***** GO TO SPECIFIC LINE
514            LIS.INFO<LIS,3>=ENTRY
515            GO TO 200
516         CASE ENTRY[1,1]="K"       ;***** KILL THIS LINE
517            PRMT.KEY=41
518            GOSUB 9210
519            IF ANS="Y" THEN
520               FOR X=1 TO X + 1 UNTIL LIS.ATTRS<X>=''
521                  HDR.REC(LIS.ATTRS<X>)=DELETE(HDR.REC(LIS.ATTRS<X>),1,LIS.INFO<
    LIS,3>,0)
522               NEXT X
523            END
524            LIS.INFO<LIS,1>=0
525            GO TO 200
526         CASE ENTRY[1,1]="L"       ;***** INSERT A NEW LINE
527            IF LIS.INFO<LIS,3>+1 > LIS.INFO<LIS,6> THEN
528               PRMT.KEY = "392~":LIS.INFO<LIS,6>
529               GOSUB 9200
530               GO TO 200
531            END
532            LIS.INFO<LIS,3>=LIS.INFO<LIS,3> + 1
533               FOR X=1 TO X + 1 UNTIL LIS.ATTRS<X>=''
534                  HDR.REC(LIS.ATTRS<X>)=INSERT(HDR.REC(LIS.ATTRS<X>),1,LIS.INFO<
    LIS,3>,0,"")
535               NEXT X
536            LIS.INFO<LIS,1>=0
537            ENTRY=LIS.INFO<LIS,3>
538            GOSUB 8600
```

```
539         CASE ENTRY[1,1]="I"        ;***** INSERT A NEW LINE IN FRONT OF THIS L
INE
540            IF LIS.INFO<LIS,3>+1 > LIS.INFO<LIS,6> THEN
541               PRMT.KEY = "392~":LIS.INFO<LIS,6>
542               GOSUB 9200
543               GO TO 200
544            END
545            FOR X=1 TO X + 1 UNTIL LIS.ATTRS<X>=''
546               HDR.REC(LIS.ATTRS<X>)=INSERT(HDR.REC(LIS.ATTRS<X>),1,LIS.INFO<
LIS,3>,0,"")
547            NEXT X
548            LIS.INFO<LIS,1>=0
549            ENTRY=LIS.INFO<LIS,3>
550            GOSUB 8600
551         CASE ENTRY[1,1]="D"        ;***** DUPE A LINE
552            IF LIS.INFO<LIS,3>+1 > LIS.INFO<LIS,6> THEN
553               PRMT.KEY = "392~":LIS.INFO<LIS,6>
554               GOSUB 9200
555               GO TO 200
556            END
557            PRMT.KEY=312
558            LENG = 3
559            GOSUB 9220
560            IF ANS#'E' AND ANS#"" AND NUM(ANS) THEN
561               FOR X=1 TO X + 1 UNTIL LIS.ATTRS<X>=''
562                  HDR.REC(LIS.ATTRS<X>)=INSERT(HDR.REC(LIS.ATTRS<X>),1,LIS.INFO<
LIS,3>,0,HDR.REC(LIS.ATTRS<X>)<1,ANS>)
563               NEXT X
564            END
565            LIS.INFO<LIS,1>=0
566            GO TO 200
567         CASE 1                     ;* CATCH-ALL
568            PRMT.KEY=43
569            GOSUB 9200 ;***** STD.MESSAGE
570            GO TO 200
571         END CASE
572      LIS.INFO<LIS,3>=ENTRY
573
574 210  LIS=3
575      LIS.INFO<LIS,5>=DCOUNT(HDR.REC(14)<1>,VM)
576      GOSUB 8600
577      REF.FILE="";HELP.KEY="ACORD.FORMS.210";LENG=6;ILEN=0
578      HRZ=5;VRT=14+LIS.INFO<LIS,2>;CON="MR2":VM:"MR2";PATT='0X';MASK="R#6";M
AN="";FIELD.NO=17;DY.TAB=4
579      OLDVALUE=HDR.REC(13)<1,LIS.INFO<LIS,3>>
580      AMC=13;VMC=LIS.INFO<LIS,3>;SVMC=0
581      IF OLDVALUE="" THEN
582         IF VMC > 1 THEN OLDVALUE = HDR.REC(AMC)<1,VMC-1>
583      END
584      GOSUB 9000 ;***** STD.INPUT
585      HDR.REC(13)<1,LIS.INFO<LIS,3>>=ENTRY
586
587 220  LIS=3
588      LIS.INFO<LIS,5>=DCOUNT(HDR.REC(14)<1>,VM)
589      GOSUB 8600
590      REF.FILE="";HELP.KEY="ACORD.FORMS.220";LENG=6;ILEN=0
591      HRZ=12;VRT=14+LIS.INFO<LIS,2>;CON="MR2":VM:"MR2";PATT='0X';MASK="R#6";
MAN="";FIELD.NO=18;DY.TAB=4
592      OLDVALUE=HDR.REC(14)<1,LIS.INFO<LIS,3>>
593      AMC=14;VMC=LIS.INFO<LIS,3>;SVMC=0
594      IF OLDVALUE="" THEN
595         IF VMC > 1 THEN OLDVALUE = HDR.REC(AMC)<1,VMC-1>
596      END
597      GOSUB 9000 ;***** STD.INPUT
598      HDR.REC(14)<1,LIS.INFO<LIS,3>>=ENTRY
599
600 225  LIS=3
601      LIS.INFO<LIS,5>=DCOUNT(HDR.REC(14)<1>,VM)
602      GOSUB 8600
603      REF.FILE="";HELP.KEY="ACORD.FORMS.225";LENG=1;ILEN=0
604      HRZ=19;VRT=14+LIS.INFO<LIS,2>;CON="MCA":VM:"";PATT='0X';MASK="L#1";MAN
="";FIELD.NO=19;DY.TAB=4
605      OLDVALUE=HDR.REC(16)<1,LIS.INFO<LIS,3>>
606      AMC=16;VMC=LIS.INFO<LIS,3>;SVMC=0
607      IF OLDVALUE="" THEN OLDVALUE='H'
```

```
608         GOSUB 9000 ;***** STD.INPUT
609         BEGIN CASE
610           CASE ENTRY='H'
611           CASE ENTRY='V'
612           CASE 1
613             PRMT.KEY=67
614             GOSUB 9200 ;***** STD.MESSAGE
615             GO TO 225
616         END CASE
617         HDR.REC(16)<1,LIS.INFO<LIS,3>>=ENTRY
618
619 226   LIS=3
620         LIS.INFO<LIS,5>=DCOUNT(HDR.REC(14)<1>,VM)
621         GOSUB 8600
622         REF.FILE="";HELP.KEY="ACORD.FORMS.226";LENG=2;ILEN=0
623         HRZ=21;VRT=14+LIS.INFO<LIS,2>;CON="MCN":VM:"MR0";PATT='ON';MASK="R#2";
    MAN="Y";FIELD.NO=20;DY.TAB=4
624         OLDVALUE=HDR.REC(17)<1,LIS.INFO<LIS,3>>
625         AMC=17;VMC=LIS.INFO<LIS,3>;SVMC=0
626         IF OLDVALUE="" THEN
627           IF VMC > 1 THEN OLDVALUE = HDR.REC(AMC)<1,VMC-1>
628         END
629         GOSUB 9000 ;***** STD.INPUT
630         HDR.REC(17)<1,LIS.INFO<LIS,3>>=ENTRY
631
632 228   LIS=3
633         LIS.INFO<LIS,5>=DCOUNT(HDR.REC(14)<1>,VM)
634         GOSUB 8600
635         REF.FILE="";HELP.KEY="ACORD.FORMS.228";LENG=1;ILEN=0
636         HRZ=24;VRT=14+LIS.INFO<LIS,2>;CON="MCA":VM:"";PATT='OX';MASK="L#1";MAN
    ="Y";FIELD.NO=21;DY.TAB=4
637         OLDVALUE=HDR.REC(18)<1,LIS.INFO<LIS,3>>
638         AMC=18;VMC=LIS.INFO<LIS,3>;SVMC=0
639         IF OLDVALUE="" THEN OLDVALUE='B'
640         GOSUB 9000 ;***** STD.INPUT
641         BEGIN CASE
642           CASE ENTRY='M'
643           CASE ENTRY='B'
644           CASE 1
645             PRMT.KEY=67
646             GOSUB 9200 ;***** STD.MESSAGE
647             GO TO 228
648         END CASE
649         HDR.REC(18)<1,LIS.INFO<LIS,3>>=ENTRY
650
651 230   LIS=3
652         LIS.INFO<LIS,5>=DCOUNT(HDR.REC(14)<1>,VM)
653         GOSUB 8600
654         REF.FILE="";HELP.KEY="ACORD.FORMS.230";LENG=53;ILEN=0
655         HRZ=26;VRT=14+LIS.INFO<LIS,2>;CON="";PATT='OX';MASK="L#53";MAN="";FIEL
    D.NO=22;DY.TAB=4
656         OLDVALUE=HDR.REC(15)<1,LIS.INFO<LIS,3>>
657         AMC=15;VMC=LIS.INFO<LIS,3>;SVMC=0
658         GOSUB 9000 ;***** STD.INPUT
659         HDR.REC(15)<1,LIS.INFO<LIS,3>>=ENTRY
660         LIS.INFO<LIS,3>=LIS.INFO<LIS,3> + 1
661         GO TO 200
662 2009 * CONTINUE WITH NEXT FIELD
663
664 240   REF.FILE="";HELP.KEY="ACORD.FORMS.240";LENG=6;ILEN=0
665         HRZ=30;VRT=12;CON="MR2":VM:"MR2";PATT='OX';MASK="R#6";MAN="";FIELD.NO=
    23;DY.TAB=5;AM:1
666         OLDVALUE=HDR.REC(19)
667         AMC=19;VMC=0;SVMC=0
668         GOSUB 9000 ;***** STD.INPUT
669         HDR.REC(19)=ENTRY
670
671 250   REF.FILE="";HELP.KEY="ACORD.FORMS.250";LENG=6;ILEN=0
672         HRZ=44;VRT=12;CON="MR2":VM:"MR2";PATT='OX';MASK="R#6";MAN="";FIELD.NO=
    24;DY.TAB=5
673         OLDVALUE=HDR.REC(20)
674         AMC=20;VMC=0;SVMC=0
675         GOSUB 9000 ;***** STD.INPUT
676         HDR.REC(20)=ENTRY
677
678 260   REF.FILE="";HELP.KEY="ACORD.FORMS.260";LENG=6;ILEN=0
```

```
679         HRZ=59;VRT=12;CON="MR2":VM:"MR2";PATT='0X';MASK="R#6";MAN="";FIELD.NO=
    25;DY.TAB=5
680         OLDVALUE=HDR.REC(21)
681         AMC=21;VMC=0;SVMC=0
682         GOSUB 9000 ;***** STD.INPUT
683         HDR.REC(21)=ENTRY
684
685 270   REF.FILE="";HELP.KEY="ACORD.FORMS.270";LENG=6;ILEN=0
686         HRZ=73;VRT=12;CON="MR2":VM:"MR2";PATT='0X';MASK="R#6";MAN="";FIELD.NO=
    26;DY.TAB=5
687         OLDVALUE=HDR.REC(22)
688         AMC=22;VMC=0;SVMC=0
689         GOSUB 9000 ;***** STD.INPUT
690         HDR.REC(22)=ENTRY
691
692       * END OF KERNELS
693 8000 BEGIN CASE
694         CASE MODE='A' ; MODE='CA'
695         CASE MODE='AC' ; MODE='C'
696       END CASE
697       IF SKIP.FLAG=998 THEN
698         PRE.STORE=INSERT(PRE.STORE
699         SKIP.FLAG=0
700       END ELSE
701         SKIP.FLAG=0
702       END
703       FIELD.NO=LAST.FIELD.NO
704       MAN=''
705       REF.FILE=''
706       HELP.KEY=FIELD(PGM.NAME,'$',1): 8000
707       PRMT.KEY=SCREEN.PROMPT
708       LENG=SCREEN.PROMPT.LEN
709       GOSUB 9220
710       IF ANS[1,1]='.' THEN ANS=ANS[2,99]
711       BEGIN CASE
712     CASE ANS = 'F' ;* FILE AND CREATE THE PRINT IMAGE
713         GOSUB 8100
714         SAVE.KEY = INT.HDR.KEY
715         GOSUB 8200
716         PRMT.KEY = 155
717         GOSUB 9210
718         BEGIN CASE
719           CASE ANS = 'Y'
720             DATA SAVE.KEY
721             CRT CLR:PROTECT.MODE.OFF:
722             PGMS.KEY = 'STD.FORMS.BUILDER' ;GOSUB 8950
723             CRT PROTECT.MODE.ON:
724             GOSUB 9300
725           CASE 1
726             GOSUB 9450
727         END CASE
728         GO TO 10
729       CASE ANS='F'
730         $INCLUDE USER.BP FILE.INCLUDE
731       CASE ANS='D'
732         $INCLUDE USER.BP DELETE.INCLUDE
733       CASE ANS='Q';* QUIT
734         GOSUB 8200
735         GOSUB 9450
736         GO TO 10
737       CASE ANS = 'S' ;* SCREEN CALL
738         HELP.KEY = ''
739         X = 0
740         LOOP
741         X = X + 1
742         SC.HRZ = CALLED.SCREENS<X,2>
743         SC.VRT = CALLED.SCREENS<X,3>
744         UNTIL CALLED.SCREENS<X,1> = '' DO
745         CRT PROTECT.MODE.OFF:@(SC.HRZ+1,SC.VRT):R.BOUNDRY:@(SC.HRZ-1,SC.VRT
    ):L.BOUNDRY:
746         PRMT.KEY = 500
747         GOSUB 9210
748         CRT PROTECT.MODE.OFF:@(SC.HRZ-1,SC.VRT):TRM.RESET.NV:PROTECT.MODE.O
    N:
749         BEGIN CASE
```

```
750         CASE ANS = 'Y'
751           PGMS.KEY = CALLED.SCREENS<X,1>
752           GOSUB 8900
753           GOSUB 9500
754         CASE ANS = 'E'
755           X = 99
756       END CASE
757     REPEAT
758   CASE ANS[1,1] = CHAR(9) AND CURRENT.TRAN = 'DIS'
759     PRMT.KEY = '498~<Tab>'
760     GOSUB 9200
761   CASE ANS[1,1]=CHAR(9);* TAB
762     ENTRY = ANS
763     DY.TAB=1
764     GO TO 9020
765   CASE ANS[1,1] = CHAR(11) AND CURRENT.TRAN = 'DIS'
766     PRMT.KEY = '498~<Up Arrow>'
767     GOSUB 9200
768   CASE ANS[1,1]=CHAR(11);* UP ARROW
769     ENTRY = ANS
770     FIELD.NO=LAST.FIELD.NO - ANS[2,3] + 1
771     GO TO 9010
772   CASE ANS[1,1] = CHAR(10) AND CURRENT.TRAN = 'DIS'
773     PRMT.KEY = '498~<Down Arrow>'
774     GOSUB 9200
775   CASE ANS[1,1]=CHAR(10);* DOWN ARROW
776     ENTRY = ANS
777     DY.TAB=1
778     GO TO 9020
779   CASE ANS[1,1] = CHAR(30) AND CURRENT.TRAN = 'DIS'
780     PRMT.KEY = '498~<Home>'
781     GOSUB 9200
782   CASE ANS[1,1]=CHAR(30);* HOME
783     ENTRY = ANS
784     DY.TAB=1
785     GO TO 9020
786   CASE INDEX(ANS,';',1) AND CURRENT.TRAN = 'DIS'
787     PRMT.KEY = '498~Line Item #'
788     GOSUB 9200
789   CASE INDEX(ANS,';',1)
790     ENTRY = FIELD(ANS,';',2)
791     ANS = FIELD(ANS,';',1)
792     IF ANS GE 1 AND ANS LE 5 THEN NULL ELSE ANS = 1
793     LIS.RTN = 2
794     GO TO 8090
795   CASE INDEX(ANS,'++',1)
796     ANS = FIELD(ANS,'+',1)
797     IF ANS GE 1 AND ANS LE 5 THEN NULL ELSE ANS = 1
798     LIS.RTN = 1
799     ENTRY = '++'
800     GO TO 8090
801   CASE INDEX(ANS,'--',1)
802     ANS = FIELD(ANS,'-',1)
803     IF ANS GE 1 AND ANS LE 5 THEN NULL ELSE ANS = 1
804     LIS.RTN = 1
805     ENTRY = '--'
806     GO TO 8090
807   CASE INDEX(ANS,'+',1)
808     ANS = FIELD(ANS,'+',1)
809     IF ANS GE 1 AND ANS LE 5 THEN NULL ELSE ANS = 1
810     LIS.RTN = 1
811     ENTRY = '+'
812     GO TO 8090
813   CASE INDEX(ANS,'-',1)
814     ANS = FIELD(ANS,'-',1)
815     IF ANS GE 1 AND ANS LE 5 THEN NULL ELSE ANS = 1
816     LIS.RTN = 1
817     ENTRY = '-'
818     GO TO 8090
819   CASE ANS # '' AND NUM(ANS) AND CURRENT.TRAN = 'DIS'
820     PRMT.KEY = '498~Line Item #'
821     GOSUB 9200
822   CASE ANS # '' AND NUM(ANS)
823     ENTRY = ANS
824     ANS = 1
```

```
825              LIS.RTN = 2
826  8090     ON ANS GO TO 120,170,200
827            CASE 1
828              PRMT.KEY='13'
829              GOSUB 9200
830            END CASE
831            GO TO 8000
832  8100 * UPDATING ROUTINE
833         IF ACF.SYS.REC(7) # '' AND CURRENT.TRAN # 'DIS' THEN
834           * WRITE AUDIT RECORD INTO SCRIPT FILE
835           AUDIT.STOP = TIME()
836           STD.ARG(1) = PGM.NAME
837           STD.ARG(2) = 'DATA ENTRY'
838           PGMS.KEY = 'STD.AUDIT.FLOW' ;GOSUB 8900
839           AUDIT.START = TIME()
840         END
841  * UPDATE THE ACORD.FORMS FILE RECORD WITH OFFSETS
842  WRITEV OCONV(HDR.REC(19),'MR2') ON ACORD.FORMS.FILE,INT.HDR.KEY,4 ;* BG HO
     RIZ
843  WRITEV OCONV(HDR.REC(20),'MR2') ON ACORD.FORMS.FILE,INT.HDR.KEY,5 ;* BG VE
     RT
844  WRITEV OCONV(HDR.REC(21),'MR2') ON ACORD.FORMS.FILE,INT.HDR.KEY,6 ;* FG HO
     RIZ
845  WRITEV OCONV(HDR.REC(22),'MR2') ON ACORD.FORMS.FILE,INT.HDR.KEY,7 ;* FG VE
     RT
846         $INCLUDE USER.BP UPDATE.INCLUDE
847         RETURN
848  8200 * RESET ROUTINE
849         $INCLUDE USER.BP RESET.INCLUDE
850  LIS.INFO<1> = 1:VM:1:VM:1:VM:5:VM:VM:999:VM:1:VM:"":VM:"":VM:"":VM:""
851  LIS.ATTR.LIST<1> = 4:VM:5:VM:6:VM:7:VM:8:VM:9:VM:10:VM:23
852  LIS.INFO<2> = 1:VM:1:VM:1:VM:2:VM:VM:999:VM:1:VM:"":VM:"":VM:"":VM:""
853  LIS.ATTR.LIST<2> = 11:VM:12
854  LIS.INFO<3> = 1:VM:1:VM:1:VM:8:VM:VM:999:VM:1:VM:"":VM:"":VM:"":VM:""
855  LIS.ATTR.LIST<3> = 13:VM:14:VM:16:VM:17:VM:18:VM:15
856         * MARKER $$50
857         HDR.KEY=''
858         INT.HDR.KEY=''
859         LIS.RTN=0
860         RETURN
861  8300 * UPDATE RTN UPON PGM EXIT
862         * MARKER $$60
863         RETURN
864  8400 * RTN UPON PGM EXIT
865         * MARKER $$70
866         RETURN
867  8500 * RTN UPON RECORD DELETION
868         * MARKER $$80
869         RETURN
870  8600 * LIS ACTIVE PAGE DETERMINATION AND DISPLAY
871         PROCESS = LIS
872         PGMS.KEY = "STD.LIS.DISPLAY" ; GOSUB 8900
873         IF LIS.RTN = 3 THEN
874            LIS.RTN = 0
875            RETURN TO 8000
876         END
877         RETURN
878  *
879  * STANDARD CALL ROUTINE
880  *
881  $INCLUDE USER.BP STD.CALL.INCLUDE$1
882  *
883  * STANDARD EXECUTE ROUTINE
884  *
885  $INCLUDE USER.BP STD.EXECUTE.INCLUDE$1
886  *
887  9000 PGMS.KEY = 'STD.INPUT' ;GOSUB 8900
888        IF DEBUG.FLAG THEN
889           PROCESS = 1
890           GOSUB 8
891        END
892        BEGIN CASE
893          CASE ENTRY[1,1]=CHAR(11) ;* UP ARROW
894            IF DY.TAB<2>=2 THEN;* THIS IS A LIS FIELD
895              IF LIS.INFO<LIS,3> > 1 THEN;* MOVE UP A LINE
896                 LIS.INFO<LIS,3>=LIS.INFO<LIS,3> - ENTRY[2,3]
```

```
897                RETURN TO 9010
898              END ELSE;* JUMP UP OUT OF LIS SET
899                NULL
900              END
901            END
902            FIELD.NO=FIELD.NO - ENTRY[2,3]
903            IF FIELD.NO < 1 THEN FIELD.NO=1
904            IF FIELD.NO=1 AND MAIN.SCREEN THEN
905              IF EXT.INT.KEY AND MODE='C' THEN
906                NULL
907              END ELSE
908                PRMT.KEY = "4"
909                GOSUB 9210
910                IF ANS = "Y" THEN
911                  GOSUB 8200
912                  GOSUB 9450
913                END ELSE
914                  FIELD.NO=2
915                END
916              END
917            END
918            RETURN TO 9010
919          CASE ENTRY[1,1]=CHAR(10) ;* DOWN ARROW
920            IF DY.TAB<2>=2 THEN;* THIS IS A LIS FIELD
921              LIS.INFO<LIS,3>=LIS.INFO<LIS,3> + ENTRY[2,3]
922              RETURN TO 9010
923            END
924            FIELD.NO=FIELD.NO + ENTRY[2,3]
925            RETURN TO 9010
926          CASE ENTRY[1,1]=CHAR(30);*HOME
927            DY.TAB=1
928            RETURN TO 9020
929          CASE ENTRY[1,1]=CHAR(9);*UP OR DOWN TAB
930            BEGIN CASE
931              CASE MODE[1,1]='C' AND ENTRY[2,5] > 0
932                DY.TAB=DY.TAB<1> + 1
933              CASE 1
934                IF DY.TAB<2> # '' THEN
935                  DY.TAB=DY.TAB<1> - 1
936                  IF DY.TAB < 1 THEN DY.TAB=1
937                END
938            END CASE
939            RETURN TO 9020
940          CASE ENTRY[1,2]=ESC2:"Q"  ;* QUIT THIS TRANSACTION
941            PRE.STORE=INSERT(PRE.STORE,1,1,0,'Q')
942            RETURN TO 8000
943          CASE ENTRY[1,2]=ESC2:"F" AND MODE[1,1]='C';* FILE THIS TRANSACTION
944            PRE.STORE=INSERT(PRE.STORE,1,1,0,'F')
945            RETURN TO 8000
946          CASE ENTRY[1,2]=ESC2:"N" AND MODE[1,1]='C';* GO TO ACCEPTANCE PROMPT
947            RETURN TO 8000
948          CASE 1
949        END CASE
950        RETURN
951 9010      ON FIELD.NO GO TO 100,110,115,120,130,140,150,160,165,166,167,168,
    170,180,190,200,210,220,225,226,228,230,240,250,260,270
952        GO TO 8000
953 9020      ON DY.TAB GO TO 110,120,170,200,240
954        GO TO 8000
955 9200 CRT BELL:
956      $INCLUDE USER.BP MESSAGE.INCLUDE
957      RETURN
958 9300 PROCESS=1;* DISPLAY BG
959      PGMS.KEY = SCREEN.SUB ;GOSUB 8900
960      RETURN
961 9400 PROCESS=2;* DISPLAY FG
962 9410 PGMS.KEY = SCREEN.SUB ;GOSUB 8900
963      RETURN
964 9450 PROCESS=3;* CLEAR FG
965      PGMS.KEY = SCREEN.SUB ;GOSUB 8900
966      RETURN
967 9500 * DISPLAY BG & FG
968      GOSUB 9300
969      GOSUB 9400
970      RETURN
```

```
971 9600  * GENERATE HISTORY RECORD
972       * MARKER $$100
973         RETURN
974 *
975 9700 PGMS.KEY = 'STD.LOCK' ;GOSUB 8900
976        RETURN
977 *
978 9725 *
979       * MARKER $$102
980        RETURN
981 *
982 9900 PGMS.KEY = 'STD.OPEN' ;GOSUB 8900
983        IF PRMT.KEY # '' THEN
984          GOSUB 9200
985          ABORT
986        END
987        RETURN
988 *
989 9999 IF DEBUG.FLAG THEN
990          PROCESS = 4
991          GOSUB 8
992        END
993        RETURN
994 *
995       * MARKER $$90
996 END
```

[405] 1 items listed out of 1 items.

```
    ACORD.FORMS$2.1.BGFG
001 SUBROUTINE ACORD.FORMS$2.1.BGFG
002 GO TO 9
003 **********************************************************
004 * Creative Information Systems CO. Inc.                   *
005 * Copyright 1989 Creative Information Systems CO. Ltd*
006 **********************************************************
007 *
008 *
009 *
010 *
011 *
012 *
013 *
014 *
015 *
016 *
017 *
018 *
019 *
020 *
021 *
022 *
023 *
024 *
025 $INCLUDE EQUATES SYSTEM.COMMON
026 *
027 $INCLUDE EQUATES TERMINAL
028 *
029 $INCLUDE USER.BP ACORD.FORMS$2.1.MAIN.EQUATES.INCLUDE
030 9    IF DEBUG.FLAG THEN
031        CRT @(0,22):CL:PGM.NAME:'.BGFG DEBUG':
032        INPUT DUMMY,1:
033        CRT @(0,22):CL:
034      END
035      ON PROCESS<1> GO TO 100,200,300,400
036      ABORT
037 100 * BACKGROUND TEXT STRING
038      PRINT CLR:PROTECT.MODE.ON:START.BG:@(0,0):\Ref: ACRD.FRMS$2.1\:@(23,0)
    :CRT.LOGO:
039      PRINT @(23,1):\ACORD Forms Generation Parameters\:@(76,1):\P/L\:
040      PRINT @(0,2):\ACORD Form #:\:@(23,2):\Description:\:
041      PRINT @(0,3):\---------------------------------- Lines and Boxes --------
    -----------------------\:
042      PRINT @(0,4):\Line  Horiz  Vert  Height  Width  Wt T Patt ----- Commen
    ts --------------------\:
```

```
043        PRINT @(1,10):\- Check off Boxes -\:@(23,10):\--------------- Printi
   ng Offsets ---------------------\:
044        PRINT @(23,11):\-------- Background --------  -------- Foreground -----
   --\:
045        PRINT @(23,12):\Horiz:\:@(38,12):\Vert:\:@(52,12):\Horiz:\:@(67,12):\V
   ert:\:
046        PRINT @(0,13):\------Horiz---Vert-O-Pt-Wt----- Background Text -------
   ---------------------\:
047        PRINT END.BG:
048        * END OF BG LINES
049        RETURN
050 200    * DISPLAY THE RECORD
051        ON PROCESS<2> GO TO 201,202,203
052        CRT @(14,2):FIELD(HDR.KEY,"*",1)'L#8':
053        CRT @(36,2):HDR.REC(3)'L#40':
054        CRT @(77,2):HDR.REC(2)'L#1':
055 201    LIS=1
056        LIS.INFO<LIS,5> = DCOUNT(HDR.REC(4)<1>,VM)
057        PAGE.INDX = ((LIS.INFO<LIS,1> - 1) * LIS.INFO<LIS,4>) + 1
058        IF PAGE.INDX > LIS.INFO<LIS,5> + 1 THEN
059           PAGE.INDX = 1
060           LIS.INFO<LIS,1> = 1
061        END
062        LIS.OFFSET = 0
063        FOR LIS.X = 0 TO LIS.INFO<LIS,4> - 1
064           CRT @(1,5+LIS.OFFSET):CL:OCONV(PAGE.INDX+LIS.X,'MR0')'R#3':
065           CRT @(5,5+LIS.OFFSET):OCONV(HDR.REC(4)<1,PAGE.INDX+LIS.X,0>,'MR2')'R
   #6':
066           CRT @(12,5+LIS.OFFSET):OCONV(HDR.REC(5)<1,PAGE.INDX+LIS.X,0>,'MR2')'
   R#6':
067           CRT @(19,5+LIS.OFFSET):OCONV(HDR.REC(6)<1,PAGE.INDX+LIS.X,0>,'MR2')'
   R#6':
068           CRT @(26,5+LIS.OFFSET):OCONV(HDR.REC(7)<1,PAGE.INDX+LIS.X,0>,'MR2')'
   R#6':
069           CRT @(33,5+LIS.OFFSET):OCONV(HDR.REC(8)<1,PAGE.INDX+LIS.X,0>,'MR0')'
   R#3':
070           CRT @(37,5+LIS.OFFSET):OCONV(HDR.REC(9)<1,PAGE.INDX+LIS.X,0>,'MR0')'
   R#1':
071           CRT @(39,5+LIS.OFFSET):OCONV(HDR.REC(10)<1,PAGE.INDX+LIS.X,0>,'MR0')
   'R#4':
072           CRT @(44,5+LIS.OFFSET):HDR.REC(23)<1,PAGE.INDX+LIS.X,0>'L#35':
073           LIS.OFFSET = LIS.OFFSET + LIS.INFO<LIS,7>
074        NEXT LIS.X
075        IF PROCESS<2> = 1 THEN RETURN
076 202    LIS=2
077        LIS.INFO<LIS,5> = DCOUNT(HDR.REC(11)<1>,VM)
078        PAGE.INDX = ((LIS.INFO<LIS,1> - 1) * LIS.INFO<LIS,4>) + 1
079        IF PAGE.INDX > LIS.INFO<LIS,5> + 1 THEN
080           PAGE.INDX = 1
081           LIS.INFO<LIS,1> = 1
082        END
083        LIS.OFFSET = 0
084        FOR LIS.X = 0 TO LIS.INFO<LIS,4> - 1
085           CRT @(1,11+LIS.OFFSET):CL:OCONV(PAGE.INDX+LIS.X,'MR0')'R#3':
086           CRT @(6,11+LIS.OFFSET):OCONV(HDR.REC(11)<1,PAGE.INDX+LIS.X,0>,'MR2')
   'R#6':
087           CRT @(14,11+LIS.OFFSET):OCONV(HDR.REC(12)<1,PAGE.INDX+LIS.X,0>,'MR2'
   )'R#6':
088           LIS.OFFSET = LIS.OFFSET + LIS.INFO<LIS,7>
089        NEXT LIS.X
090        IF PROCESS<2> = 2 THEN RETURN
091        CRT @(30,12):OCONV(HDR.REC(19),'MR2')'R#6':
092        CRT @(44,12):OCONV(HDR.REC(20),'MR2')'R#6':
093        CRT @(59,12):OCONV(HDR.REC(21),'MR2')'R#6':
094        CRT @(73,12):OCONV(HDR.REC(22),'MR2')'R#6':
095 203    LIS=3
096        LIS.INFO<LIS,5> = DCOUNT(HDR.REC(14)<1>,VM)
097        PAGE.INDX = ((LIS.INFO<LIS,1> - 1) * LIS.INFO<LIS,4>) + 1
098        IF PAGE.INDX > LIS.INFO<LIS,5> + 1 THEN
099           PAGE.INDX = 1
100           LIS.INFO<LIS,1> = 1
101        END
102        LIS.OFFSET = 0
103        FOR LIS.X = 0 TO LIS.INFO<LIS,4> - 1
104           CRT @(1,14+LIS.OFFSET):CL:OCONV(PAGE.INDX+LIS.X,'MR0')'R#3':
```

```
105         CRT @(5,14+LIS.OFFSET):OCONV(HDR.REC(13)<1,PAGE.INDX+LIS.X,0>,'MR2')
    'R#6':
106         CRT @(12,14+LIS.OFFSET):OCONV(HDR.REC(14)<1,PAGE.INDX+LIS.X,0>,'MR2'
    )'R#6':
107         CRT @(19,14+LIS.OFFSET):HDR.REC(16)<1,PAGE.INDX+LIS.X,0>'L#1':
108         CRT @(21,14+LIS.OFFSET):OCONV(HDR.REC(17)<1,PAGE.INDX+LIS.X,0>,'MR0'
    )'R#2':
109         CRT @(24,14+LIS.OFFSET):HDR.REC(18)<1,PAGE.INDX+LIS.X,0>'L#1':
110         CRT @(26,14+LIS.OFFSET):HDR.REC(15)<1,PAGE.INDX+LIS.X,0>'L#53':
111         LIS.OFFSET = LIS.OFFSET + LIS.INFO<LIS,7>
112      NEXT LIS.X
113      IF PROCESS<2> = 3 THEN RETURN
114      * END OF FG LINES
115      RETURN
116 300  * CLEAR THE FOREGROUND
117      IF TRM.LEVEL THEN PRINT CLR.FG:; RETURN
118      CRT @(14,2):SPACE(9):
119      CRT @(36,2):SPACE(41):
120      CRT @(77,2):SPACE(2):
121      FOR LIS.X = 5 TO 9
122         CRT @(0,LIS.X):CL:
123      NEXT LIS.X
124      FOR LIS.X = 11 TO 12
125         CRT @(0,LIS.X):CL:
126      NEXT LIS.X
127      CRT @(30,12):SPACE(7):
128      CRT @(44,12):SPACE(7):
129      CRT @(59,12):SPACE(7):
130      CRT @(73,12):SPACE(7):
131      FOR LIS.X = 14 TO 21
132         CRT @(0,LIS.X):CL:
133      NEXT LIS.X
134      * END OF FG CLEAR LINES
135      RETURN
136 400  * DISPLAY THE ACTIVE HISTORY RECORD
137      ON PROCESS<2> GO TO 401,402,403
138      CRT @(22,2):TRM.NV:@(13,2):" ":@(14,2):FIELD(HDR.KEY,"*",1)'L#8':
139      CRT @(76,2):TRM.NV:@(35,2):VISUAL.REC<3>:@(36,2):ACTIVE.REC<3>'L#40':
140      CRT @(78,2):TRM.NV:@(76,2):VISUAL.REC<2>:@(77,2):ACTIVE.REC<2>'L#1':
141 401  LIS=1
142      LIS.INFO<LIS,5> = DCOUNT(ACTIVE.REC<4>,VM)
143      PAGE.INDX = ((LIS.INFO<LIS,1> - 1) * LIS.INFO<LIS,4>) + 1
144      IF PAGE.INDX > LIS.INFO<LIS,5> + 1 THEN
145         PAGE.INDX = 1
146         LIS.INFO<LIS,1> = 1
147      END
148      IF LIS.INFO<LIS,9> # "" THEN
149         ACTIVE.REC<LIS.INFO<LIS,9>,LIS.INFO<LIS,10>+0,LIS.INFO<LIS,11>+0> =
    DCOUNT(ACTIVE.REC<LIS.INFO<LIS,8>>,VM)
150      END
151      LIS.OFFSET = 0
152      LIS.AC = DCOUNT(LIS.ATTR.LIST<LIS>,VM)
153      FOR LIS.X = 0 TO LIS.INFO<LIS,4> - 1
154         FOR LAC = 1 TO LIS.AC
155            IF VISUAL.REC<LIS.ATTR.LIST<LIS,LAC>,PAGE.INDX+LIS.X,0> = "" THEN
    VISUAL.REC<LIS.ATTR.LIST<LIS,LAC>,PAGE.INDX+LIS.X,0> = TRM.RESET.NV
156         NEXT LAC
157         CRT @(1,5+LIS.OFFSET):OCONV(PAGE.INDX+LIS.X,'MR0')'R#3':
158         CRT @(11,5+LIS.OFFSET):TRM.NV:@(4,5+LIS.OFFSET):VISUAL.REC<4,PAGE.IN
    DX+LIS.X,0>:@(5,5+LIS.OFFSET):OCONV(ACTIVE.REC<4,PAGE.INDX+LIS.X,0>,'MR2')'
    R#6':
159         CRT @(18,5+LIS.OFFSET):TRM.NV:@(11,5+LIS.OFFSET):VISUAL.REC<5,PAGE.I
    NDX+LIS.X,0>:@(12,5+LIS.OFFSET):OCONV(ACTIVE.REC<5,PAGE.INDX+LIS.X,0>,'MR2'
    )'R#6':
160         CRT @(25,5+LIS.OFFSET):TRM.NV:@(18,5+LIS.OFFSET):VISUAL.REC<6,PAGE.I
    NDX+LIS.X,0>:@(19,5+LIS.OFFSET):OCONV(ACTIVE.REC<6,PAGE.INDX+LIS.X,0>,'MR2'
    )'R#6':
161         CRT @(32,5+LIS.OFFSET):TRM.NV:@(25,5+LIS.OFFSET):VISUAL.REC<7,PAGE.I
    NDX+LIS.X,0>:@(26,5+LIS.OFFSET):OCONV(ACTIVE.REC<7,PAGE.INDX+LIS.X,0>,'MR2'
    )'R#6':
162         CRT @(36,5+LIS.OFFSET):TRM.NV:@(32,5+LIS.OFFSET):VISUAL.REC<8,PAGE.I
    NDX+LIS.X,0>:@(33,5+LIS.OFFSET):OCONV(ACTIVE.REC<8,PAGE.INDX+LIS.X,0>,'MR0'
    )'R#3':
163         CRT @(38,5+LIS.OFFSET):TRM.NV:@(36,5+LIS.OFFSET):VISUAL.REC<9,PAGE.I
    NDX+LIS.X,0>:@(37,5+LIS.OFFSET):OCONV(ACTIVE.REC<9,PAGE.INDX+LIS.X,0>,'MR0'
    )'R#1':
```

```
164          CRT @(43,5+LIS.OFFSET):TRM.NV:@(38,5+LIS.OFFSET):VISUAL.REC<10,PAGE.
     INDX+LIS.X,0>:@(39,5+LIS.OFFSET):OCONV(ACTIVE.REC<10,PAGE.INDX+LIS.X,0>,'MR
     0')'R#4':
165          CRT @(79,5+LIS.OFFSET):TRM.NV:@(43,5+LIS.OFFSET):VISUAL.REC<23,PAGE.
     INDX+LIS.X,0>:@(44,5+LIS.OFFSET):ACTIVE.REC<23,PAGE.INDX+LIS.X,0>'L#35':
166          LIS.OFFSET = LIS.OFFSET + LIS.INFO<LIS,7>
167        NEXT LIS.X
168        IF PROCESS<2> = 1 THEN RETURN
169  402   LIS=2
170        LIS.INFO<LIS,5> = DCOUNT(ACTIVE.REC<11>,VM)
171        PAGE.INDX = ((LIS.INFO<LIS,1> - 1) * LIS.INFO<LIS,4>) + 1
172        IF PAGE.INDX > LIS.INFO<LIS,5> + 1 THEN
173          PAGE.INDX = 1
174          LIS.INFO<LIS,1> = 1
175        END
176        IF LIS.INFO<LIS,9> # "" THEN
177          ACTIVE.REC<LIS.INFO<LIS,9>,LIS.INFO<LIS,10>+0,LIS.INFO<LIS,11>+0> =
     DCOUNT(ACTIVE.REC<LIS.INFO<LIS,8>>,VM)
178        END
179        LIS.OFFSET = 0
180        LIS.AC = DCOUNT(LIS.ATTR.LIST<LIS>,VM)
181        FOR LIS.X = 0 TO LIS.INFO<LIS,4> - 1
182          FOR LAC = 1 TO LIS.AC
183            IF VISUAL.REC<LIS.ATTR.LIST<LIS,LAC>,PAGE.INDX+LIS.X,0> = "" THEN
     VISUAL.REC<LIS.ATTR.LIST<LIS,LAC>,PAGE.INDX+LIS.X,0> = TRM.RESET.NV
184          NEXT LAC
185          CRT @(1,11+LIS.OFFSET):OCONV(PAGE.INDX+LIS.X,'MR0')'R#3':
186          CRT @(12,11+LIS.OFFSET):TRM.NV:@(5,11+LIS.OFFSET):VISUAL.REC<11,PAGE
     .INDX+LIS.X,0>:@(6,11+LIS.OFFSET):OCONV(ACTIVE.REC<11,PAGE.INDX+LIS.X,0>,'M
     R2')'R#6':
187          CRT @(20,11+LIS.OFFSET):TRM.NV:@(13,11+LIS.OFFSET):VISUAL.REC<12,PAG
     E.INDX+LIS.X,0>:@(14,11+LIS.OFFSET):OCONV(ACTIVE.REC<12,PAGE.INDX+LIS.X,0>,
     'MR2')'R#6':
188          LIS.OFFSET = LIS.OFFSET + LIS.INFO<LIS,7>
189        NEXT LIS.X
190        IF PROCESS<2> = 2 THEN RETURN
191        CRT @(36,12):TRM.NV:@(29,12):VISUAL.REC<19>:@(30,12):OCONV(ACTIVE.REC<
     19>,'MR2')'R#6':
192        CRT @(50,12):TRM.NV:@(43,12):VISUAL.REC<20>:@(44,12):OCONV(ACTIVE.REC<
     20>,'MR2')'R#6':
193        CRT @(65,12):TRM.NV:@(58,12):VISUAL.REC<21>:@(59,12):OCONV(ACTIVE.REC<
     21>,'MR2')'R#6':
194        CRT @(79,12):TRM.NV:@(72,12):VISUAL.REC<22>:@(73,12):OCONV(ACTIVE.REC<
     22>,'MR2')'R#6':
195  403   LIS=3
196        LIS.INFO<LIS,5> = DCOUNT(ACTIVE.REC<14>,VM)
197        PAGE.INDX = ((LIS.INFO<LIS,1> - 1) * LIS.INFO<LIS,4>) + 1
198        IF PAGE.INDX > LIS.INFO<LIS,5> + 1 THEN
199          PAGE.INDX = 1
200          LIS.INFO<LIS,1> = 1
201        END
202        IF LIS.INFO<LIS,9> # "" THEN
203          ACTIVE.REC<LIS.INFO<LIS,9>,LIS.INFO<LIS,10>+0,LIS.INFO<LIS,11>+0> =
     DCOUNT(ACTIVE.REC<LIS.INFO<LIS,8>>,VM)
204        END
205        LIS.OFFSET = 0
206        LIS.AC = DCOUNT(LIS.ATTR.LIST<LIS>,VM)
207        FOR LIS.X = 0 TO LIS.INFO<LIS,4> - 1
208          FOR LAC = 1 TO LIS.AC
209            IF VISUAL.REC<LIS.ATTR.LIST<LIS,LAC>,PAGE.INDX+LIS.X,0> = "" THEN
     VISUAL.REC<LIS.ATTR.LIST<LIS,LAC>,PAGE.INDX+LIS.X,0> = TRM.RESET.NV
210          NEXT LAC
211          CRT @(1,14+LIS.OFFSET):OCONV(PAGE.INDX+LIS.X,'MR0')'R#3':
212          CRT @(11,14+LIS.OFFSET):TRM.NV:@(4,14+LIS.OFFSET):VISUAL.REC<13,PAGE
     .INDX+LIS.X,0>:@(5,14+LIS.OFFSET):OCONV(ACTIVE.REC<13,PAGE.INDX+LIS.X,0>,'M
     R2')'R#6':
213          CRT @(18,14+LIS.OFFSET):TRM.NV:@(11,14+LIS.OFFSET):VISUAL.REC<14,PAG
     E.INDX+LIS.X,0>:@(12,14+LIS.OFFSET):OCONV(ACTIVE.REC<14,PAGE.INDX+LIS.X,0>,
     'MR2')'R#6':
214          CRT @(20,14+LIS.OFFSET):TRM.NV:@(18,14+LIS.OFFSET):VISUAL.REC<16,PAG
     E.INDX+LIS.X,0>:@(19,14+LIS.OFFSET):ACTIVE.REC<16,PAGE.INDX+LIS.X,0>'L#1':
215          CRT @(23,14+LIS.OFFSET):TRM.NV:@(20,14+LIS.OFFSET):VISUAL.REC<17,PAG
     E.INDX+LIS.X,0>:@(21,14+LIS.OFFSET):OCONV(ACTIVE.REC<17,PAGE.INDX+LIS.X,0>,
```

```
  'MR0')'R#2':
6      CRT @(25,14+LIS.OFFSET):TRM.NV:@(23,14+LIS.OFFSET):VISUAL.REC<18,PAG
  E.INDX+LIS.X,0>:@(24,14+LIS.OFFSET):ACTIVE.REC<18,PAGE.INDX+LIS.X,0>'L#1':
7      CRT @(79,14+LIS.OFFSET):TRM.NV:@(25,14+LIS.OFFSET):VISUAL.REC<15,PAG
  E.INDX+LIS.X,0>:@(26,14+LIS.OFFSET):ACTIVE.REC<15,PAGE.INDX+LIS.X,0>'L#53':

8       LIS.OFFSET = LIS.OFFSET + LIS.INFO<LIS,7>
9       NEXT LIS.X
0       IF PROCESS<2> = 3 THEN RETURN
1       * END OF HISTORY FG LINES
2       RETURN
3 END

!05] 1 items listed out of 1 items.
```

Having thus described the invention, what it is desired to claim and thereby protect by Letters Patent is:

1. An office automation system comprising:
a host computer,
an entry device and a plurality of character-mode displays, each in communication with the host computer,
means for storing, updating and displaying the contents of a database, each of said functions of storing, updating and displaying comprising all or part of a task that the system is capable of performing in response to entries from the entry device, and
means for maintaining an audit history of the database comprising:
  (a) means for generating an audit history of a plurality of records of said database, each of said plurality of records having associated therewith:
    (i) an original active record stored in a first temporary memory storage location, and
    (ii) at least one delta record stored in a second temporary memory storage location comprising an identification of each location within the record of data that was changed at a session and a copy of the data changed at said session,
  said generating means comprising:
    (iii) means for retrieving the original active record and delta records associated with a record,
    (iv) means for applying to the original active record, the corresponding delta record to create a first chronologically-ordered displayable historical data image record stored in a third temporary memory storage location, said historical data image record comprising:
      (1) data associated with the record after data in the original active record was updated and stored in memory in the first session,
    wherein the means further comprises applying each subsequent delta record to the previously created historical data image record until all delta records associated with the record have been applied, whereupon, each sequential displayable historical data image record represents data corresponding to the record each time the record was sequentially stored into the database, and
  (b) means for displaying said displayable historical data image records.

2. The office automation system of claim 1 wherein each record further comprises an original visual image record stored in a fourth temporary memory storage location, and means (a)(iv) further comprises means for creating a visual image record for each corresponding historical data image record, each visual image record having associated therewith:
  (i) means for highlighting the changed data in each of said displayable historical data images,
and means (b) further comprises means for displaying each visual image record in conjunction with its corresponding historical image record, thus creating a historical image,
whereby the changed data is highlighted in each of said historical images.

3. The office automation system of claim 2 wherein each visual image record further comprises means for separately highlighting the data changed in the session associated with the historical data image over other changed data,
wherein the data changed in each session is highlighted in bright reverse video and the other changed data is highlighted in reverse video in each of said displayable historical images.

4. The office automation system of claim 1 further comprising means for generating the original active record and at least one delta record from a record comprising:
  (a) a current active record stored in memory, wherein the current active record contains current information, and
  (b) an audit history record stored in memory, wherein the audit history record is generated at each session at which data in the current information in the current active record has been changed and entered into memory, comprising:
    (i) a change number associated with said each session, and
    (ii) an identification of each location within the current active record at which the data in the current information was changed during said each session and a copy of the data previously contained at that location,
said means comprising:
  (c) means for retrieving the current active record into a temporary memory storage location identified as an active record,
  (d) means for applying to the active record previous data stored in memory and associated with a location in the audit history record having the highest change number, for creating:
    (iii) a resulting active record comprising the previous data associated with the location in the audit history record at the beginning of the session associated with said highest change number, and
    (iv) a delta record of changes within the active record made at the session associated with said highest change number, said delta record comprising an identification of each location within the active record at which said changes during said session were made and a copy of the changes made at said session and at said location within the active record, wherein the applying means further comprises applying the next audit history record having the next highest change number to the resulting active record until each subsequent audit history record associated with the database record has been applied to each subsequent corresponding resulting active record, whereupon the information created is that associated with the original active record and a delta record created for the application of each audit history record.

5. The office automation system of claim 4 comprising means for applying audit history records, associated with the record and generated by other application programs, to the database record comprising:

(a) means for determining if other application programs have generated audit history records associated with the record;

(b) means for retrieving the audit history records generated by other application programs and applying said historical audit records to the corresponding active record.

6. The office automation system of claim 4 wherein the audit history record further comprises the data and time of posting corresponding to the session data changes were made to the current active record.

7. The office automation system of claim 6 further comprising means for displaying the historical images in chronological order of posting comprising:

(a) means for generating a sorted key table sorted by posting date and change number, (b) means for prompting an operator to select a starting date for which the first history image is to be displayed, and (c) means for retrieving and displaying the historical data image as designated by the sorted key table corresponding to the starting date selected.

8. The office automation system of claim 4 wherein the audit history record further comprises additional history information of an alternate display sequence.

9. The office automation system of claim 8 further comprising means for displaying the historical images in some alternative order corresponding to the additional history information comprising:

(a) means for generating a sorted key table sorted by the additional history information, (b) means for prompting an operator to select a starting date for which the first historical data image is to be displayed, and (c) means for retrieving and displaying the historical data image as designated by the sorted key table corresponding to the starting date selected.

10. The office automation system of claim 9 further comprising means for displaying the historical data image prior to or after the historical data image corresponding to the starting date comprising:

(a) means for prompting the operator for the next display command, and (b) means for displaying the next historical data image in the alternative order as designated by the sorted key table corresponding to the operator's regressive or progressive command.

11. The office automation system of claim 10 further comprising means of displaying historical data images in any increment, regressive or progressive, of the historical data image corresponding to the starting date.

12. The office automation system of claim 8 wherein the additional data history is the effective date of the data changes made to the current active record.

13. An office automation system comprising:

a host computer, an entry device and a plurality of character-mode displays, each in communication with the host computer, means for storing, updating and displaying the contents of a database, each of said functions of storing, updating and displaying comprising all or part of a task that the system is capable of performing in response to entries from the entry device, and means for generating an audit history record of a database record for each session data changes to the database record are saved in memory, wherein each database record comprises:

(a) a current active record stored in memory which records current information, said means for generating an audit history record comprising:

(b) means for prompting an operator to select a database record to change existing information in the current active record, (c) means for retrieving the current active record of the selected database record from memory into a location identified as an old record, (d) means for storing in a temporary storage location said current active record and data changes made to said current active record in a session in response to the operator's inputs to change data in the current active record, (e) means for comparing the data contents of the old record comprising the current active record of the selected database record with the data contents of the temporary storage location to select for storage said data changes made to said current active record during said session, (f) said means for generating an audit history record further comprising:

(i) a change number associated with said session, said change number incremented by one over the change number of the previous session, (ii) an identification of each location within the old record that has different data than in the temporary storage location and a copy of the data contained in the old record at that location, (iii) means for storing in memory said different data at each said location having said identification within the old record as said audit history record associated with said session, and;

(g) means for reading the contents of the temporary storage location back into memory as the new current active record, whereby an audit history record is created and stored in memory for each session during which the data in the current active record is changed by the operator.

14. A method for maintaining an audit history of a plurality of active records of a database residing in memory of a host computer, each record having associated therewith:
- (i) an original active record stored in a first temporary memory storage location, and
- (ii) at least one delta record stored in a second temporary memory storage location comprising an identification of each location within the record of data that was changed at a session and a copy of the data changed at said session, said method comprising the operation of the host computer to perform the following steps:
- (a) retrieving the original active record and delta records associated with a record,
- (b) applying to the original active record the corresponding delta record to create a first chronologically-ordered displayable historical data image record stored in a third temporary memory storage location, said historical data image record comprising data associated with the record after data in the original active record was updated and stored in memory in the first session,
- (c) applying each subsequent delta record to the previously created historical data image record until all delta records associated with the record have been applied, whereupon, each sequential displayable historical data image record represents data corresponding to the record each time the record was sequentially stored into the database, and
- (d) displaying said displayable historical data images.

15. The method of claim 14 further comprising the steps of:
- (1) generating the original active record and at least one delta record from a record comprising:
  - (a) a current active record stored in memory, wherein the current active record contains current information, and
  - (b) an audit history record stored in memory, wherein the audit history record is generated at each session at which data in the current information in the current active record has been changed and entered into memory, comprising:
    - (i) a change number associated with said each session, and
    - (ii) an identification of each location within the current active record at which the data in the current information was changed during said each session and a copy of the data previously contained at that location,
- (2) retrieving the current active record into a temporary memory storage location identified as an active record,
- (3) applying to the active record changed data recorded in memory and associated with a location in the audit history record having the highest change number, for creating:
  - (iii) a resulting active record comprising previous data stored in memory and associated with the location in the audit history record at the beginning of the session associated with said highest change number, and
  - (iv) a delta record of changes within the active record made at the session associated with said highest change number, said delta record comprising an identification of each location within the active record at which said changes during said session were made and a copy of the changes made at said session and at said location within the active record,
- (4) applying the next audit history record having the next highest change number to the resulting active record until each subsequent audit history record associated with the database record has been applied to each subsequent corresponding resulting active record, whereupon the information created is that associated with the original active record and a delta record created for the application of each audit history record.

16. A method for maintaining an audit history of a plurality of active records of a database residing in memory of a host computer, wherein each said active record comprises a current active record stored in memory which records current information, said method comprising the operation of the host computer to perform the following steps:
- (a) prompting an operator to select a database record to change existing information in the current active record,
- (b) retrieving the current active record of the selected database record from memory into a location identified as an old record,
- (c) storing in a temporary storage location said current active record and data changes made in response to the operator's inputs to change data in the current active record,
- (d) comparing the data contents of the old record comprising the selected database record with the data contents of the temporary storage location to select for storage said data changes made to said current active record,
- (e) generating an audit history record comprising:
  - (i) a change number associated with said session, said change number incremented by one over the change number of the previous session, and
  - (ii) an identification of each location within the old record that has different data than in the temporary storage location and a copy of the data contained in the old record at that location;
  - (iii) storing in memory said different data at each said location having said identification within the old record as said audit history record associated with said session, and
- (f) reading the contents of the temporary storage location back into memory as the new current active record, whereby an audit history record is created and stored in memory for each session during which the data in the current active record is changed by the operator.

17. An office automation system comprising:
a host computer,
an entry device and a plurality of character-mode displays, each in communication with the host computer,
means for storing, updating and displaying the contents of a database, each of said functions of storing, updating and displaying comprising all or part of a task that the system is capable of performing in response to entries from the entry device,
means for generating an audit history of a plurality of records of said database, each of said plurality of records having associated therewith:

(i) an original active record stored in a first temporary memory storage location, and (ii) at least one delta record stored in a second temporary memory storage location comprising an identification of each location within the record of data that was changed at a session and a copy of the data changed at said session, (iii) means for retrieving the original active record and delta records associated with the record, (iv) means for applying to the original active record, the corresponding delta record to create a first chronologically-ordered displayable historical data image record stored in a third temporary memory storage location, said historical data image record comprising said copy of the data associated with the record after data in the original active record was updated and stored in memory in the first session, wherein the generating means further comprise means for applying each subsequent data record to the previously created historical data image record until all delta records associated with the record have been applied, whereupon, each sequential displayable historical data image record represents data corresponding to the record each time the record was sequentially updated into the database, and means for displaying said displayable historical data image records.

18. The office automation system of claim 17 wherein the original active record is a filled-in form and the delta record comprises changes made in said filled-in form.

19. The office automation system of claim 18 wherein the filled-in form is a form used in an insurance agency.

20. An office automation system comprising:

a host computer;

an entry device and a plurality of character-mode displays, each in communication with the host computer;

(a) means for storing, updating and displaying the contents of a database, each of said functions of storing, updating and displaying comprising all or part of a task that the system is capable of performing in response to entries from the entry device, said database comprising a plurality of active records, where each of said plurality of said active records comprises a current active record and at least one audit history record associated with said active record;

(b) means for generating audit history of said active record comprising:

(i) means for retrieving said current active record from said database, (ii) means for storing said current active record in a first temporary storage location, and (iii) means for retrieving and storing in a second temporary storage location at least one said audit history record associated with said active record as a delta record, said delta record comprising, an audit history change number, a changed data associated with said audit history change number and an identifying location in said active record of said changed data;

(iv) means for applying to said current active record the corresponding delta record to create a first chronologically-ordered displayable historical data image record stored in a third temporary storage location, where said historical data image record comprises said changed data associated with said corresponding delta record, wherein said generating means further comprise applying each previous delta record to the subsequently created displayable historical data image record until all delta records in said audit history record have been applied, whereupon, each sequential displayable historical data image record represents changed data corresponding to each time said active record was subsequently stored in the database; and (c) means for displaying said displayable historical data image records.

* * * * *